(12) United States Patent
Nozawa et al.

(10) Patent No.: US 6,575,642 B2
(45) Date of Patent: Jun. 10, 2003

(54) LENS BARREL

(75) Inventors: Masaya Nozawa, deceased, late of Saitama (JP); by Mieko Nozawa, legal representative, Kawamoto-machi (JP); Haruo Onozuka, Saitama (JP); Fumio Iwai, Saitama (JP); Noboru Shimada, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/899,445

(22) Filed: Jul. 6, 2001

(65) Prior Publication Data

US 2002/0005992 A1 Jan. 17, 2002

(30) Foreign Application Priority Data

Jul. 6, 2000 (JP) ........................................ 2000-205923

(51) Int. Cl.⁷ ............................................... G03B 17/02

(52) U.S. Cl. ...................................... 396/349; 396/448

(58) Field of Search .................................. 396/349, 448

(56) References Cited

U.S. PATENT DOCUMENTS 5,461,441 A * 10/1995 Kotani ...................... 396/133
5,489,958 A    2/1996 Katagiri et al.
5,661,609 A    8/1997 Asakura et al.

FOREIGN PATENT DOCUMENTS

JP    07-020369    1/1995

* cited by examiner

*Primary Examiner*—David Gray
(74) *Attorney, Agent, or Firm*—Leydig, Voit & Mayer, Ltd.

(57) ABSTRACT

The present invention provides a lens barrel which can carry out barrier opening/closing operations and lens moving operations of an optical lens system by use of a single driving source, and can adjust the focus without any obstruction even in a state allowing the baffler to open/close. A state capable of transmitting a driving force to a barrier opening/closing mechanism is attained when collapsing a lens barrel to a predetermined extent or more, and a state incapable of transmitting the driving force to the barrier opening/closing mechanism is attained when the lens barrel is extended to a predetermined extent or more, whereby a single motor can carry out baffler opening/closing operations and lens moving operations of a lens is optical system.

6 Claims, 132 Drawing Sheets

LENS BARREL

BACKGROUND OF THE INVENTION

1. Field of the Invention

The present invention relates to a lens barrel, used in an optical system for an optical device such as a camera, for changing its power and adjusting its focus.

2. Related Background Art

Conventionally known as a lens barrel, used in an optical system of an optical device such as a camera, for changing its power and adjusting its focus is one having four lens groups, all of which are attached to a frame expandable from the camera body, whereas the lens groups are appropriately moved in the optical axis direction by use of a cam mechanism so as to change the power and adjust the focus, as disclosed in Japanese Patent Application Laid-Open No. HEI 7-20369.

This lens barrel comprises a barrier blade, disposed in front of a taking optical system, for opening/closing an optical path; a lens driving mechanism for advancing/retracting a part of the taking optical system upon a focusing operation of the taking optical system; a barrier driving mechanism for opening/closing the barrier blade; a first transmission mechanism for transmitting a driving force of a driving source to the lens driving mechanism; and a second transmission mechanism for transmitting the driving force of the driving source to the barrier driving mechanism, in which the transmission of the driving force to the second transmission mechanism is switched via a clutch mechanism as appropriate. The switching of the clutch mechanism is carried out by utilizing a pivotal member, so as to enhance the space efficiency, thereby reducing the size of the camera.

If the driving source is driven in such a lens barrel in the state where the driving force is transmitted to the barrier driving mechanism, the barrier will be opened/closed, whereby no lens movement of the taking optical system can be carried out as a focusing operation. Consequently, for taking a photograph, it is necessary to attain a state where the lens barrel is expanded and so forth, so that no driving force is transmitted to the barrier driving mechanism.

Hence, the expanding of the lens barrel narrowly restricts the power-varying range of the taking optical system. For widening the power-varying range, it is desirable that a photographing preparation state be attained without expanding the lens barrel in the state where the barrier is open. In order to prevent shutter chances from missing, it is desirable that shutter release operations be carried out instantly without expanding the lens barrel in the state where the barrier is open.

SUMMARY OF THE INVENTION

In order to eliminate such a problem, it is an object of the present invention to provide a lens barrel which can carry out barrier opening/closing operations and lens moving operations of a lens optical system by use of a single driving source, and can adjust the focus without any obstruction even in a state allowing the barrier to open/close.

In order to achieve such an object, the present invention provides a lens barrel comprising a plurality of cylindrical bodies, accommodating a lens optical system having a plurality of lens groups, adapted to expand and collapse the lens optical system in a multistage manner; a driving source, installed in one of the cylindrical bodies, for generating a predetermined driving force; a first driving transmission mechanism for transmitting the driving force of the driving source to a barrier opening/closing mechanism; a second driving transmission mechanism for transmitting the driving force of the driving source to a moving mechanism of the lens optical system; and driving transmission switching means for placing the first driving transmission mechanism into a state capable of transmitting the driving force to the barrier opening/closing mechanism when the plurality of cylindrical bodies are collapsed to a predetermined extent or more, and placing the first driving transmission mechanism into a state incapable of transmitting the driving force to the barrier opening/closing mechanism when the plurality of cylindrical bodies are expanded to a predetermined extent or more; wherein the lens optical system is totally expanded so as to adjust a focus in a state where the driving source is stopped if the driving force is made transmittable to the barrier opening/closing mechanism by the driving transmission switching means.

The lens barrel in accordance with the present invention may be configured such that the first driving transmission mechanism has two gears adapted to switch between meshed and unmeshed states, the driving force is transmitted by way of the two gears, the driving transmission switching means causes the two gears to mesh with each other so as to place the first drive transmission mechanism into a state capable of transmitting the driving force when the plurality of cylindrical bodies are collapsed to a predetermined extent or more and causes the two gears to come out of mesh with each other so as to place the first driving transmission mechanism into a state incapable of transmitting the driving force when the plurality of cylindrical bodies are expanded to a predetermined extent or more.

The lens barrel in accordance with the present invention may be configured such that the driving transmission switching means comprises a rod adapted to move toward the two gears when the plurality of cylindrical bodies are collapsed to a predetermined extent or more; and a swing plate, in which one of the two gears is installed, adapted to swing so as to place the two gears in the unmeshed state when the rod is moved.

According to these aspects of the present invention, a single driving source can open/close the barrier and adjust the focus of the lens optical system. Also, if the lens optical system is totally expanded so as to adjust the focus in a state where the driving force is transmittable to the barrier opening/closing mechanism, the focus can be adjusted while the driving source is stopped. If the lens barrel is employed in a camera or the like, photographing will be possible without expanding the lens barrel. Therefore, the power-varying range of the taking optical system can be widened, which enables prompt photographing.

Also, the present invention provides a lens barrel comprising a plurality of cylindrical bodies, accommodating a lens optical system having a plurality of lens groups, adapted to expand and collapse the lens optical system in a multistage manner; a driving source, installed in one of the cylindrical bodies, for generating a predetermined driving force; a first driving transmission mechanism for transmitting the driving force of the driving source to a barrier opening/closing mechanism; a second driving transmission mechanism for transmitting the driving force of the driving source to a moving mechanism of the lens optical system; driving transmission switching means for placing the first driving transmission mechanism into a state capable of transmitting the driving force to the barrier opening/closing mechanism when the plurality of cylindrical bodies are collapsed to a predetermined extent or more, and placing the first driving transmission mechanism into a state incapable of transmitting the driving force to the barrier opening/closing mechanism when the plurality of cylindrical bodies are expanded to a predetermined extent or more; and switching error recovery means for expanding the plurality of cylindrical bodies to a predetermined position if the driving transmission switching means is not in a state capable of transmitting the driving force to the driving transmission switching means when the plurality of cylindrical bodies are collapsed to a predetermined extent or more, and then collapsing the plurality of cylindrical bodies to a predetermined position.

The lens barrel in accordance with the present invention may be configured such that the first driving transmission mechanism has two gears adapted to switch between meshed and unmeshed states, the driving force is transmitted by way of the two gears, the driving transmission switching means causes the two gears to mesh with each other so as to place the first drive transmission mechanism into a state capable of transmitting the driving force when the plurality of cylindrical bodies are collapsed to a predetermined extent or more and causes the two gears to come out of mesh with each other so as to place the first driving transmission mechanism into a state incapable of transmitting the driving force when the plurality of cylindrical bodies are expanded to a predetermined extent or more, and the switching error recovery means expands the plurality of cylindrical bodies to a predetermined position if the two gears are not in a normal meshed state when the plurality of cylindrical bodies are collapsed to a certain extent or more, rotates at least one of the two gears, and then collapses the plurality of cylindrical bodies to a predetermined position.

According to these aspects of the present invention, if the first driving transmission mechanism fails to attain a state capable of normally transmitting the driving force to the barrier opening/closing mechanism when collapsing the lens barrel, the lens barrel may be collapsed again after being expanded, whereby the driving force transmitting state of the first driving transmission mechanism can be recovered. Also, if the lens barrel is expanded to a predetermined position, at least one of the two gears is rotated, and then the lens barrel is collapsed to a predetermined position, the two gears can favorably be meshed with each other. Since the driving force transmitting state of the first driving transmission mechanism is recovered, it is not required to be processed as an error. Therefore, camera failures can be reduced.

Also, the present invention provides a lens barrel comprising a plurality of cylindrical bodies, accommodating a lens optical system having a plurality of lens groups, adapted to expand and collapse the lens optical system in a multistage manner; a driving source, installed in one of the cylindrical bodies, for generating a predetermined driving force; a first driving transmission mechanism for transmitting the driving force of the driving source to a barrier opening/closing mechanism; a second driving transmission mechanism for transmitting the driving force of the driving source to a moving mechanism of the lens optical system; driving transmission switching means for placing the first driving transmission mechanism into a state capable of transmitting the driving force to the barrier opening/closing mechanism when the plurality of cylindrical bodies are collapsed to a predetermined extent or more, and placing the first driving transmission mechanism into a state incapable of transmitting the driving force to the barrier opening/closing mechanism when the plurality of cylindrical bodies are expanded to a predetermined extent or more; and drive control means for driving and controlling the driving source, the drive control means setting a lower driving speed for the driving source and driving the driving source when the first driving transmission mechanism is placed in a state capable of transmitting the driving force to the barrier opening/closing mechanism.

According to this aspect of the present invention, the driving speed of the driving source is set lower when the first driving transmission mechanism is placed in a state capable of transmitting the driving force to the barrier opening/closing mechanism due to the meshing of gears and the like, whereby the meshing sound of the gears for transmitting the driving force can be lowered.

BRIEF DESCRIPTION OF THE DRAWINGS

FIG. 120 is a flowchart for explaining the focus error recovery processing operation of the camera equipped with the lens barrel of FIG. 1;

FIG. 121 is a chart showing a relationship between the species of driving control and the speed in a focus drive processing operation of the camera equipped with the lens barrel of FIG. 1;

FIG. 122 is a flowchart of the focus drive processing operation of the camera equipped with the lens barrel of FIG. 1;

FIG. 123 is a flowchart of the focus drive processing operation of the camera equipped with the lens barrel of FIG. 1;

FIG. 124 is a flowchart of the focus drive processing operation of the camera equipped with the lens barrel of FIG. 1;

FIG. 125 is a flowchart of the focus drive processing operation of the camera equipped with the lens barrel of FIG. 1;

FIG. 126 is a flowchart of the focus drive processing operation of the camera equipped with the lens barrel of FIG. 1;

FIG. 127 is a flowchart of the focus drive processing operation of the camera equipped with the lens barrel of FIG. 1;

FIG. 128 is a flowchart of the focus drive processing operation of the camera equipped with the lens barrel of FIG. 1;

FIG. 129 is a flowchart of the focus drive processing operation of the camera equipped with the lens barrel of FIG. 1;

FIG. 130 is a flowchart of the focus drive processing operation of the camera equipped with the lens barrel of FIG. 1;

FIG. 131 is a flowchart of the focus drive processing operation of the camera equipped with the lens barrel of FIG. 1;

Figure 1:
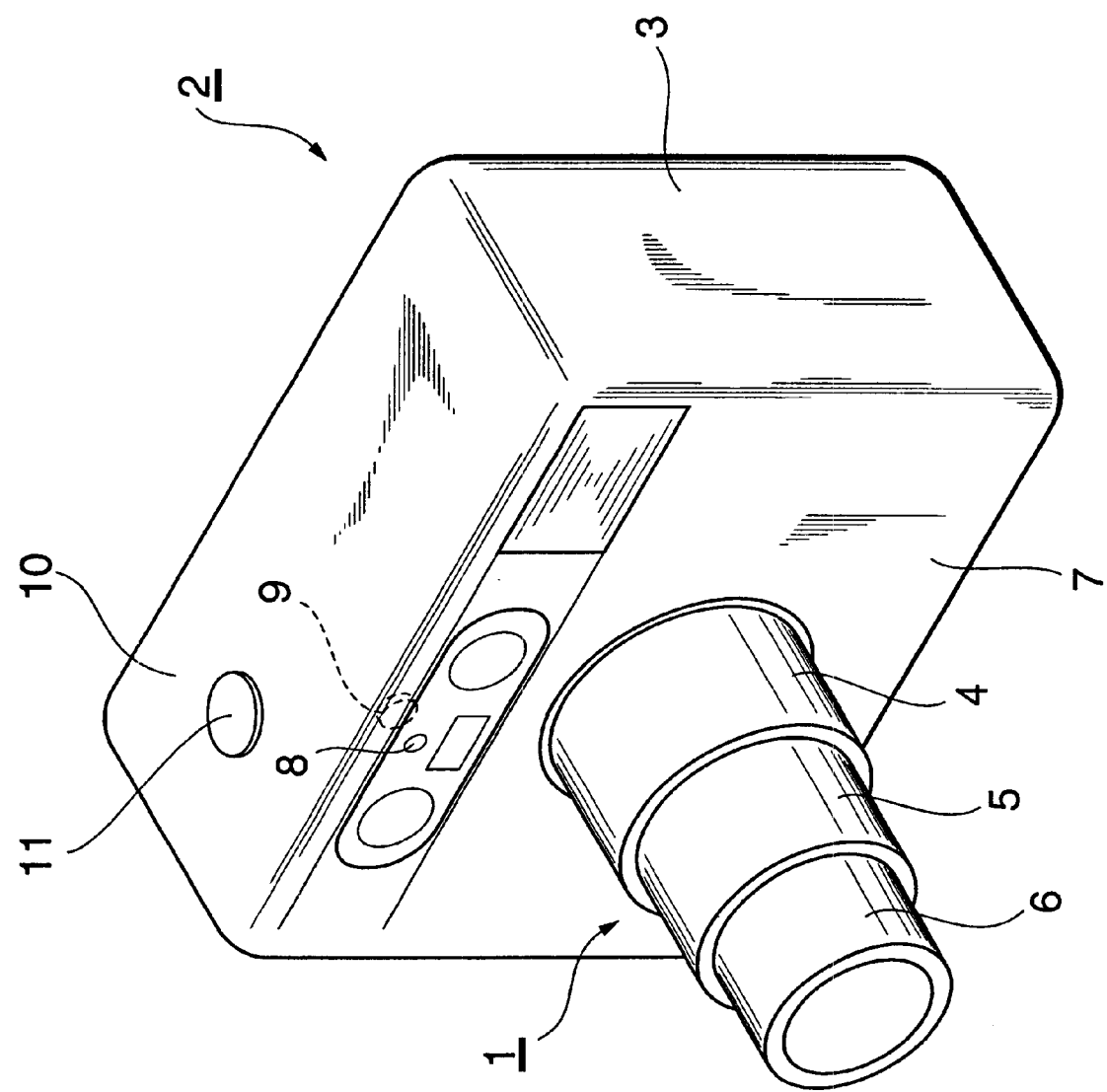
FIG. 1 is an explanatory view of the lens barrel in accordance with an embodiment of the present invention.
Figure 132:
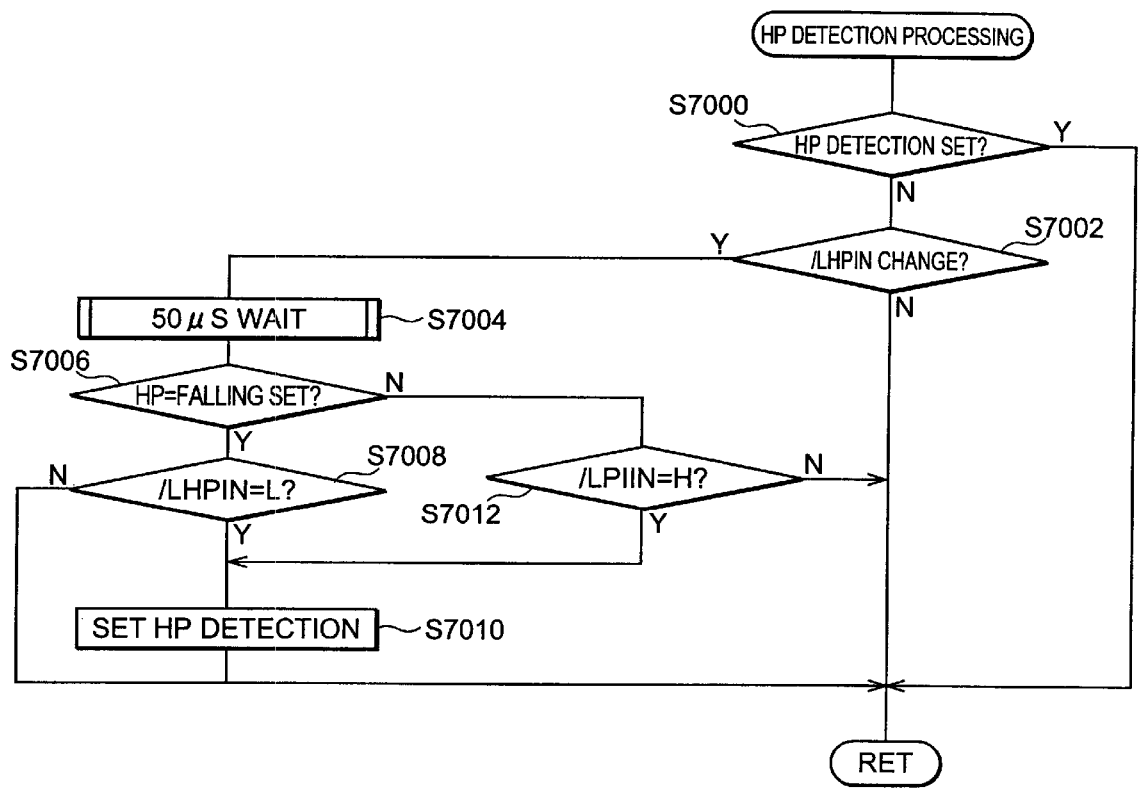
Figure 133:
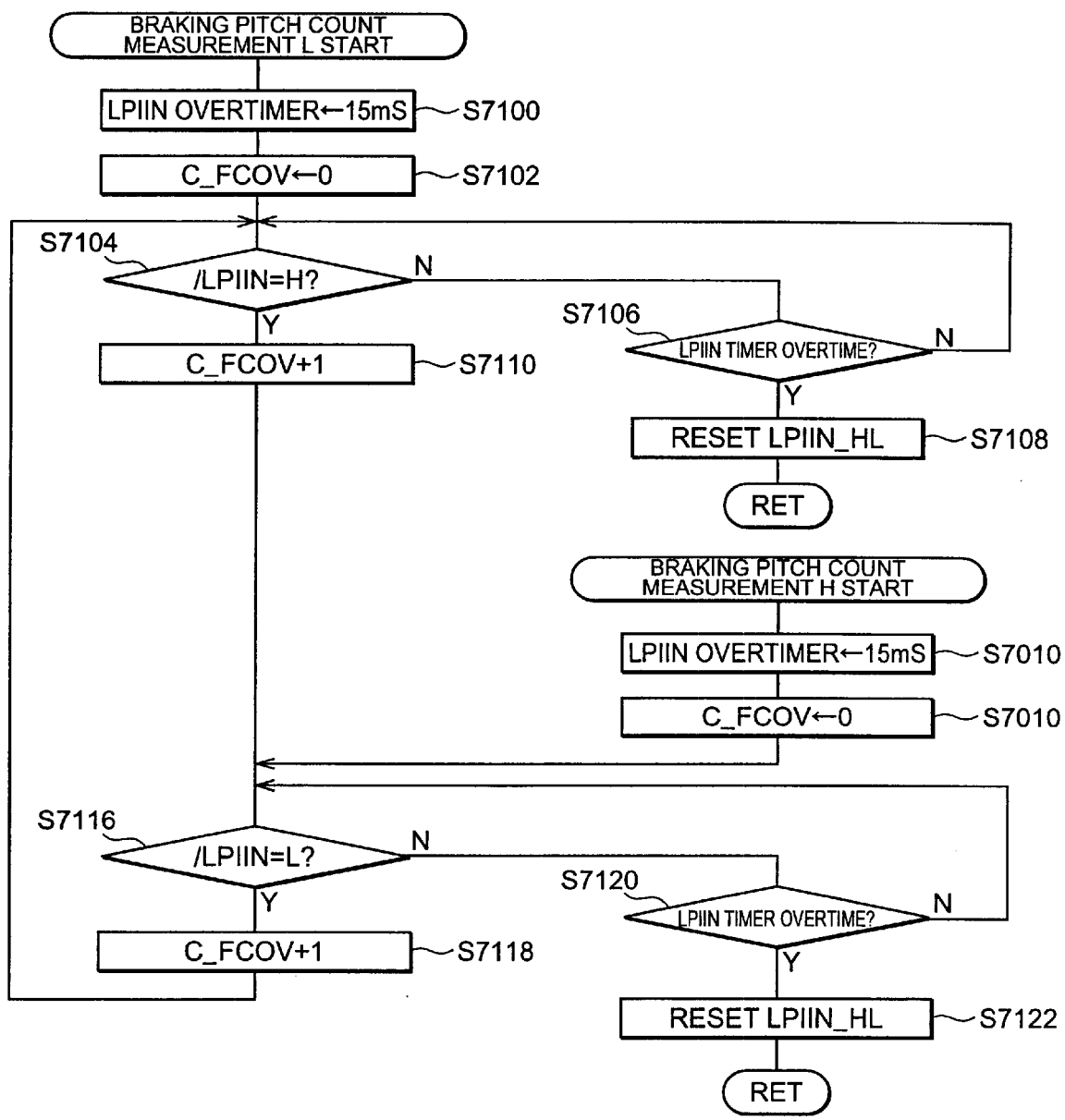

FIG. 132 is a flowchart of an HP detection processing operation of the camera equipped with the lens barrel of FIG. 1; and FIG. 133 is a flowchart of a braking pitch count drive processing operation of the camera equipped with the lens barrel of FIG. 1.

DESCRIPTION OF THE PREFERRED EMBODIMENTS

In the following, an embodiment of the present invention will be explained with reference to the accompanying drawings. Among the drawings, constituents identical to each other will be referred to with numerals or letters identical to each other without repeating their overlapping descriptions. Also, ratios of dimensions in the drawings do not always match those explained.

Figure 2:
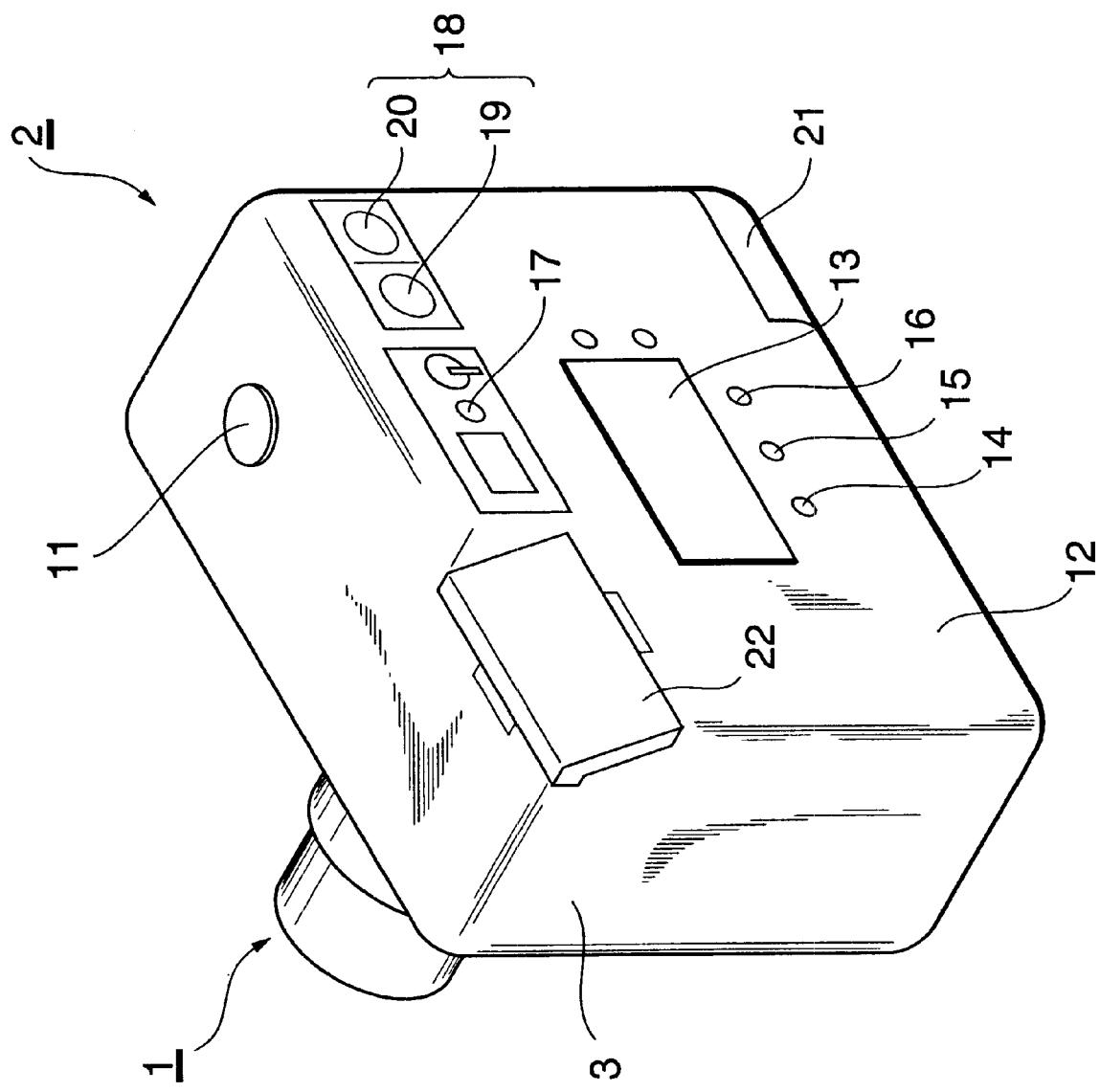
FIG. 2 is an explanatory view of a camera equipped with the lens barrel of FIG. 1.

FIGS. 1 and 2 show a camera using the lens barrel in accordance with this embodiment. As shown in FIG. 1, the lens barrel 1 in accordance with this embodiment is used in a taking optical system of a camera 2. The camera 2 comprises the lens barrel 1 expandable from the front face 7 of a main body 3. The lens barrel 1 has a plurality of cylindrical bodies expandable in a multistage fashion, i.e., a first cylinder 4, a second cylinder 5, and a third cylinder 6. The first cylinder 4 is expandable from and collapsible into the main body 3. The second cylinder 5 is expandable from and collapsible into the first cylinder 4. The third cylinder 6 is expandable from and collapsible into the second cylinder 5. They are expanded and collapsed upon switching operations in the main body 3.

The upper part of the front face 7 of the main body 3 is provided with a photometric sensor window 8. A photometric sensor 9 is installed inside the photometric sensor window 8. The upper face 10 of the main body 3 is provided with a shutter button 11.

As shown in FIG. 2, the back face 12 of the main body 3 is provided with a display section 13 near the center thereof. As the display section 13, an LCD adapted to display marks for representing photographing modes and numbers for displaying dates is used, for example. Below the display section 13, a mode switch 14, a self-timer switch 15, and a main switch (power switch) 16 are disposed in parallel.

Disposed at the center of the upper part of the back face 12 is an AFLED 17. Disposed on the right side of the upper part of the back face 17 is a zoom switch 18. The zoom switch 18 comprises a TELE switch 19 and a WIDE switch 20. The lower part of the main body 3 is provided with a cartridge lid 21. When the cartridge lid 21 is opened, a cartridge film can be taken out from or loaded into the main body 3. The section for accommodating the cartridge film is provided with a cartridge on/off switch which is not depicted.

A battery lid 22 is disposed on the upper left side of the back face 12. When the battery lid 22 is opened, a battery can be taken out from or loaded into the main body 3.

Figure 3:
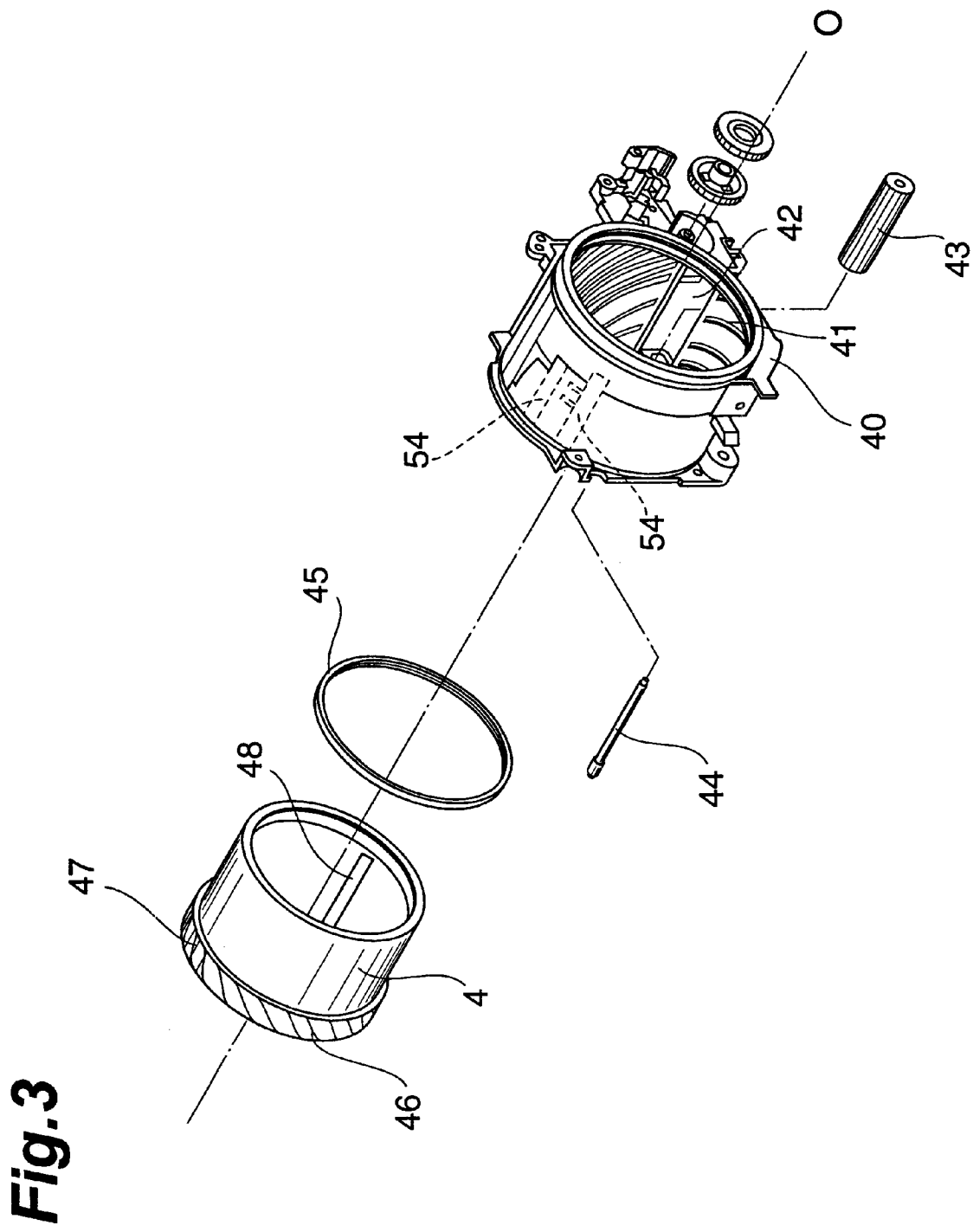
FIG. 3 is an exploded perspective view of the lens barrel of FIG. 1.
Figure 4:
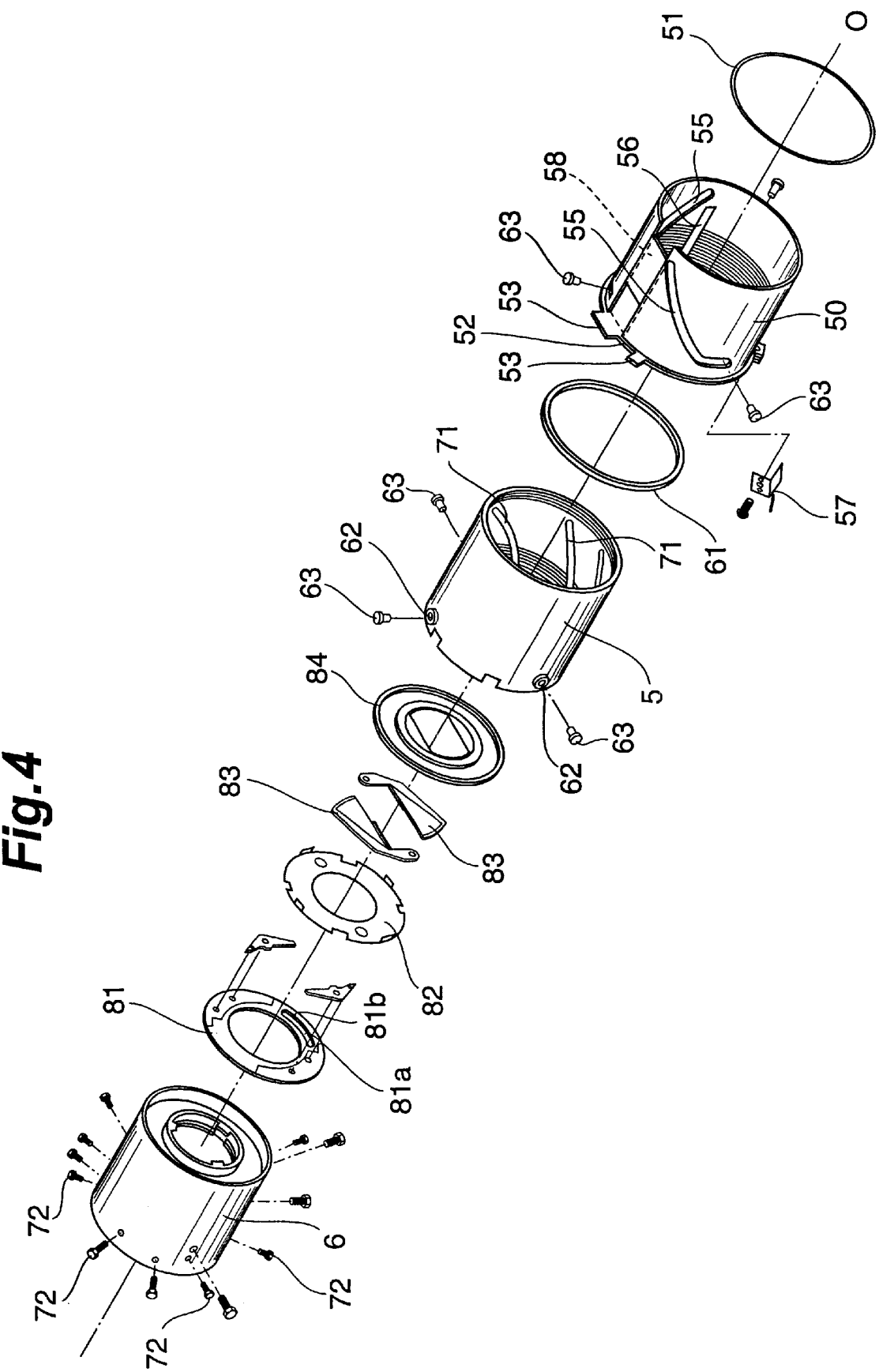
FIG. 4 is an exploded perspective view of the lens barrel of FIG. 1.
Figure 5:
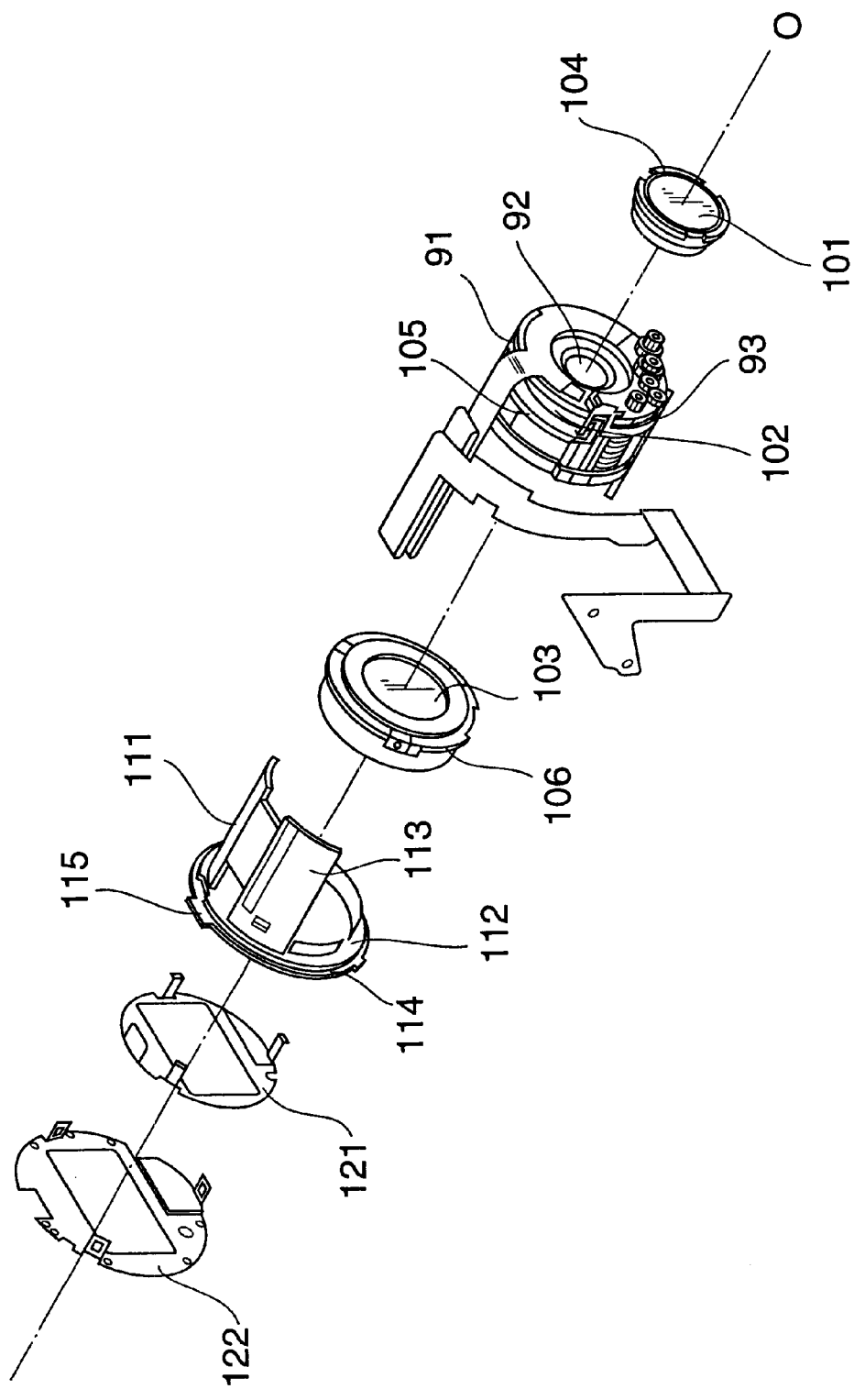
FIG. 5 is an exploded perspective view of the lens barrel of FIG. 1.

FIGS. 3 to 5 show exploded perspective views of the lens barrel 1.

As shown in FIG. 3, the lens barrel 1 comprises a fixed tube 40 to be secured to the main body 3 of the camera 2. The fixed tube 40 is a cylindrical body for accommodating the first cylinder 4, the second cylinder 5, and the third cylinder 6, and is attached to the main body 3 substantially at the center thereof. The inner peripheral face of the fixed tube 40 is formed with a helicoid thread 41. The helicoid thread 41 is a series of spiral recesses and protrusions. A part of the inner peripheral face of the fixed tube 40 is axially cut so as to form a cutout 42. A columnar gear 43 is disposed at the position of the cutout 42. The columnar gear 43 rotates as being driven by a barrel driving motor (not depicted). Numeral 44 in FIG. 3 refers to an axial pin for axially supporting the columnar gear 43.

The first cylinder 4 is accommodated within the fixed tube 40. The first cylinder 4 is a cylindrical body having both ends open and is installed as being inserted into the fixed tube 40 via a light-shielding rubber ring 45. The outer peripheral face of the rear part of the first cylinder 4 is formed with a helicoid thread 46. The helicoid thread 46 is in mesh with the helicoid thread 41 of the inner peripheral face of the fixed tube 40. A part of the outer peripheral face of the rear part of the first cylinder 4 is formed with gear teeth 47. The gear teeth 47 are in mesh with the columnar gear 43. As the columnar gear 43 rotates, the first cylinder 4 rotates via the gear teeth 47, so that the helicoid threads 46, 47 mesh with each other, whereby the first cylinder 4 is expanded from or collapsed into the fixed tube 40.

The inner peripheral face of the first cylinder 4 is formed with axially extending longitudinal grooves 48. A plurality of, e.g., three, longitudinal grooves 48 are formed with predetermined circumferential intervals.

As shown in FIG. 4, a translation cam cylinder 50 is installed inside the first cylinder 4. The translation cam cylinder 50 is a cylindrical body having both ends open. The outer periphery of the rear part of the translation cam cylinder 50 is formed with a flange 52 protruding outward. The flange 52 is formed greater than the inside diameter of the first cylinder 4 and engages the rear end of the first cylinder 4.

The flange 52 is formed with protrusions 53 further projecting outward. The protrusions 53 engage respective longitudinal grooves 54 formed in the inner peripheral face of the fixed tube 40. Therefore, the translation can cylinder 50 moves in the optical axis direction together with the first cylinder 4 without rotating.

The peripheral face of the translation cam cylinder 50 is formed with cam slits 55. Each cam slit 55 is a slit spirally extending in the peripheral face of the translation cam cylinder 50. A contact terminal 57 is attached to the rear part of the translation cam cylinder 50. The contact terminal 57 is a terminal for detecting the expanding position of the lens barrel by coming into contact with an encoder pattern (not depicted) installed within the fixed tube 40.

The second cylinder 5 is accommodated within the translation cam cylinder 50. The second cylinder 5 is a cylindrical body having both ends open and is installed as being inserted into the translation cam cylinder 50 via a ring member 51 and a light-shielding rubber ring 61. The outer peripheral face of the rear part of the second cylinder 5 is formed with protrusions 62. The protrusions 62 are used for engaging the second cylinder 5 with the translation cam cylinder 50, and are inserted into the respective cam slits 55 of the translation cam cylinder 50.

Pins 63 are attached to the respective protrusions 62. The pins 63 are used for engaging the second cylinder 5 with the first cylinder 4, and are disposed at the upper part of the respective protrusions 62 so as to project therefrom. The pins 63 attached to the second cylinder 5 are inserted into the longitudinal grooves 48 of the first cylinder 4 and rotate the second cylinder 5 as the first cylinder 4 rotates.

The inner peripheral face of the second cylinder 5 is formed with cam grooves 71. A plurality of, e.g., six, cam grooves 71 are formed with predetermined peripheral intervals so as to extend spirally.

The third cylinder 6 is accommodated within the second cylinder 5. The third cylinder 6 is a cylindrical body for accommodating the individual lens groups of the taking optical system, and is positioned at the leading end in the lens barrel 1 when expanded. Pins 72 are attached to the outer peripheral face of the rear part of the third cylinder 6. The pins 72 are members for engaging the third cylinder 6 with the second cylinder 5, and project from the outer peripheral face of the third cylinder 6 so as to be inserted into the respective cam grooves 71 of the second cylinder 5. The number of pins 72 to be attached is set according to the number of cam grooves 71 to be formed.

A barrier driving ring 81, a barrier bottom plate 82, a barrier 83, and a barrier cover 84 are successively attached to the front end portion of the third cylinder 6.

Also, as shown in FIG. 5, a shutter unit 91 is accommodated in the third cylinder 6. The shutter unit 91 is formed as a unit assembled with a shutter 92 and a second lens group 102. A first lens group 101 is disposed in front of the shutter unit 91 in the third cylinder 6, whereas a third lens group 103 is disposed behind the shutter unit 91. The first lens group 101 is secured within the third cylinder 6 as being attached to a first lens frame 104. The third lens group 103 is secured within the third cylinder 6 as being attached to a third lens frame 106.

A translation key ring 111 is attached to the rear part of the third cylinder 6. In the translation key ring 111, a ring part 112 is formed with an axially extending key part 113. The translation key ring 111 is installed such that the key part 113 is inserted into the third cylinder 6. The outer periphery of the rear part of the translation key ring 111 is formed with a flange 114 projecting outward. The flange 114 is formed greater than the inside diameter of the second cylinder 5 and engages the rear end of the second cylinder 5.

Also, the flange 114 is formed with a protrusion 115 projecting further outward. The protrusion 115 engages the longitudinal groove 58 formed in the inner peripheral face of the translation cam cylinder 50.

A light-shielding mask 121 is attached to the rear end of the translation key ring 111. On the other hand, a light-shielding mask 122 is attached to the rear end of the translation cam groove 50.

Figure 6:
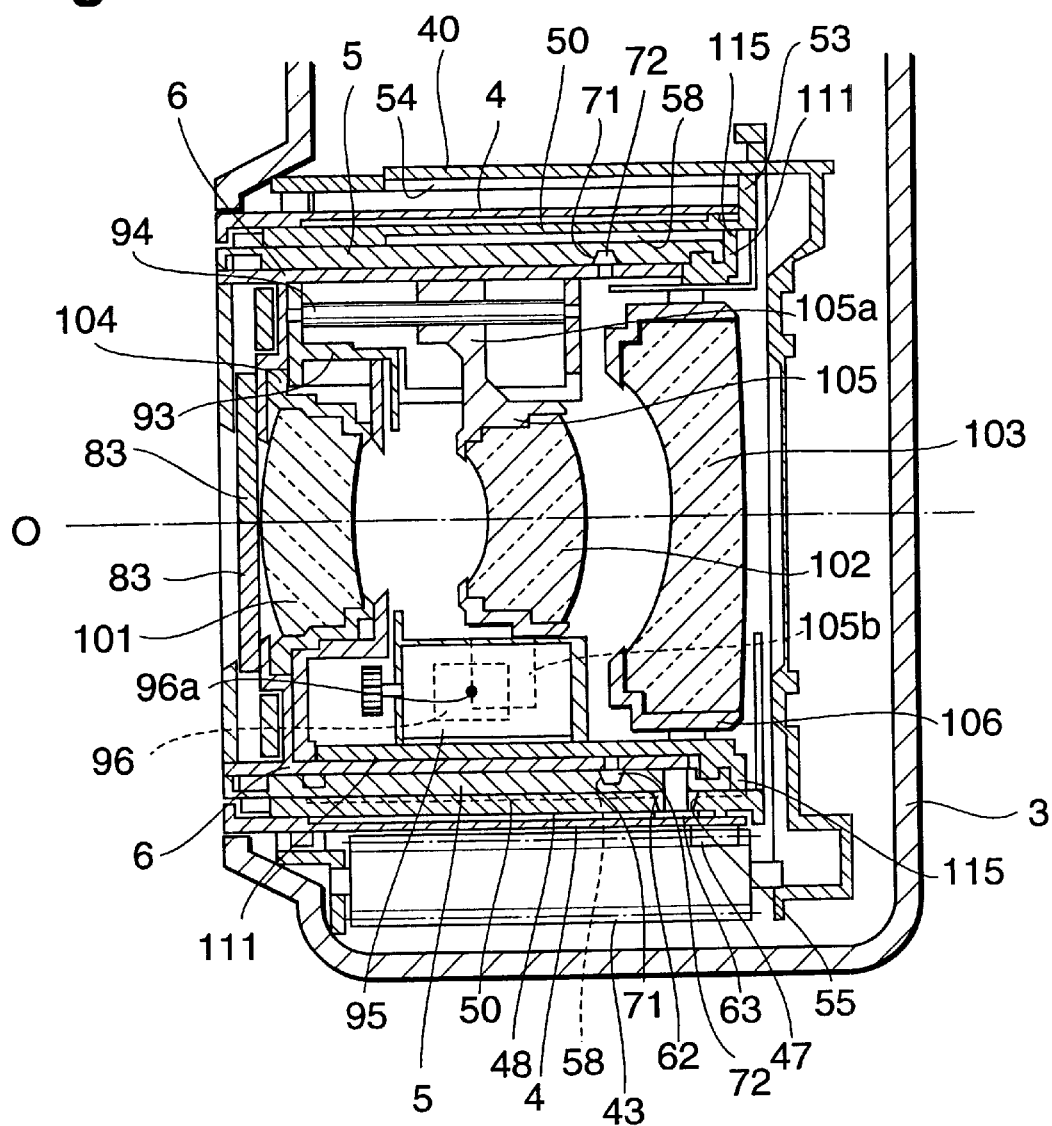
FIG. 6 is a sectional view of the lens barrel of FIG. 1.

FIG. 6 shows a schematic sectional view of the lens barrel.

This drawing is a schematic sectional view of the lens barrel 1 in a state accommodated within the main body 3 of the camera 2. The fixed tube 40 is installed within the main body 3, whereas the first cylinder 4 is accommodated within the fixed tube 40. The gear teeth 47 formed in the outer peripheral face of the rear part of the first cylinder 4 are in mesh with the columnar gear 43 attached to the fixed tube 40.

The translation cam cylinder 50 is inserted in the rear part of the first cylinder 4. The protrusions 53 of the translation cam cylinder 50 engage the respective longitudinal grooves 54 of the fixed tube 40. Therefore, the translation cam cylinder 50 moves along the longitudinal grooves 54 without rotating. The second cylinder 5 is accommodated in the translation cam cylinder 50. The protrusions 62 and pins 63 of the second cylinder 5 penetrate through the cam slits 55. The pins 63 are further inserted through the respective longitudinal grooves 48 of the first cylinder 4. Therefore, as the first cylinder 4 rotates, the second cylinder 5 rotates, thereby expanding forward with respect to the first cylinder 4 and the translation cam cylinder 50 due to the cam slits 55.

The third cylinder 6 is accommodated in the second cylinder 5. The pins 72 of the third cylinder 6 are inserted in the respective cam grooves 71 of the second cylinder 5. Therefore, as the second cylinder 5 rotates, a forward/backward moving force is generated in the third cylinder 6 via the cam grooves 71. The translation key ring 111 is accommodated in the third cylinder 6. The key part 113 of the translation key ring 111 engages a projection (not depicted) axially extending in the inner peripheral face of the third cylinder 6, and prevents the third cylinder 6 from rotating but allows it to move only forward and backward.

The first lens group 101, second lens group 102, and third lens group 103 are accommodated within the third cylinder 6. The first lens group 101, second lens group 102, and third lens group 103 constitute a lens optical system, and function as a taking optical system of the camera 2. The first lens group 101, second lens group 102, and third lens group 103 are successively arranged in this order along the optical axis O from the front side (object side).

The first lens group 101 is attached to the first lens frame 104 and is fixed so as to block the front open end of the third cylinder 6. The third lens 103 is attached to the third lens frame 106 and is fixed so as to block the rear open end of the third cylinder 6. The second lens group 102 is attached to a second lens frame 105 so as to be assembled to a shutter unit frame 93, and is disposed between the first lens group 101 and the third lens group 103. The second lens frame 105 is formed with an arm portion 105a. A rod-shaped shaft 94 penetrates through the arm portion 105a. Therefore, the second lens frame 105 is movable only in the axial direction of the shaft 94 via the arm portion 105a. The second lens group 102 moves in the optical axis direction together with the second lens frame 105, whereby the focusing of the taking optical system is carried out.

In FIG. 6, the individual lenses constituting the first lens group 101, second lens group 102, and third lens group 103 are not depicted.

Since the individual lens groups of the taking optical system are accommodated in a single cylindrical body, i.e., the third cylinder 6, it becomes easier to accurately hold the optical axis and posture of each lens group. Even if an external force is exerted on the lens barrel 1, the postures of individual lens groups with respect to each other will not deteriorate, whereby optical performances will be easier to keep. Also, zooming is possible by expanding and collapsing the third cylinder, so that delicate cam correction movements between the individual lens groups and the like are unnecessary, whereby accurate zooming can be carried out.

Since the second lens group 102 acting as a movable lens group is disposed between the first lens group 101 and third lens group 103 acting as fixed lens groups, the sliding part of the second lens group 102 or second lens frame 105 and moving mechanisms for the second lens group 102 such as the shaft 94 and arm portion 105a are concealed by the first lens group 101 and third lens group 103. Therefore, dust, dirt, and the like can be kept from attaching to the sliding portion and moving mechanism, whereby delicate driving for focusing can securely be prevented from being obstructed.

A motor 95 is attached to the shutter unit frame 93. The motor 95 is a driving source for moving the second lens group 102 and opening and closing the barrier 83. In FIG. 6, the transmission mechanism for the driving force of the motor 95 is not depicted.

The shutter unit frame 93 is provided with a detector 96. The detector 96 is detection means for detecting the position of the second lens group 102. An optical type detector, e.g., a photo interrupter for detecting a passage between a light-projecting part and a light-receiving part, is used. Also, a reflection type photo reflector may be used as the detector 96. The photodetector 96 detects whether the second lens group 102 passes a predetermined position, and senses the position of the second lens group 102 by way of this passage.

The detector 96 detects the position of the second lens group 102 by way of the position of a rectangular detection plate 105b formed in the second lens frame 105. For example, the detector 96 yields HIGH and LOW outputs when the detection plate 105b exists and does not exit at a detecting position 96a of the detector 96, respectively. As a consequence, the output of detector 96 switches from HIGH to LOW or from LOW to HIGH when an end part of the detection plate 105b passes the detecting position 96a, whereby the moving position of the second lens group 102 can be detected.

Figure 7:
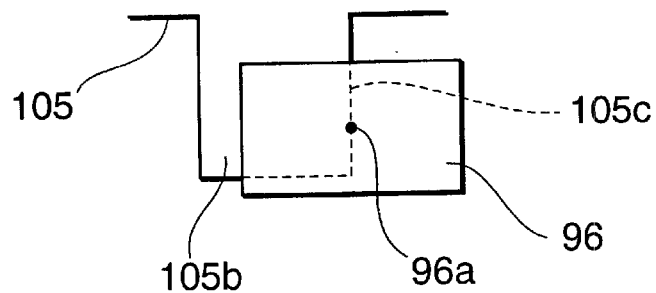
FIG. 7 is an explanatory view concerning detection of a second lens group in the lens barrel of FIG. 1.
Figure 8:
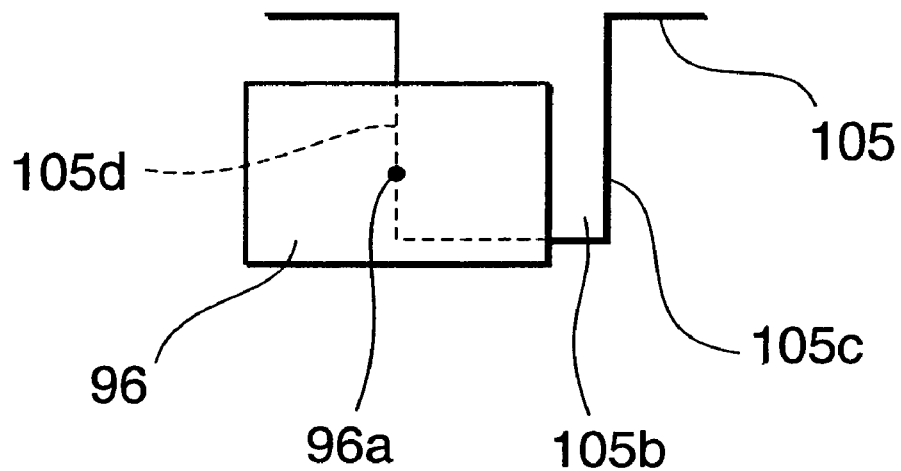
FIG. 8 is an explanatory view concerning the detection of second lens group in the lens barrel of FIG. 1.

Here, the position can be detected when the rear end 105c of the detection plate 105b passes the detecting position 96a of the detector 96 as shown in FIG. 7 or when the front end 105d of the detection plate 105b passes the detecting position 96a of the detector 96 as shown in FIG. 8, whereby the two position of the second lens group 102 can be detected by use of the single detector 96 and the single detection plate 105b. As a consequence, the lens barrel 1 can be made smaller at a lower cost.

Since the position of the second lens group 102 is detected at two locations as such, two reference positions for focusing the second lens group 102 can accurately be set. For example, assuming these reference positions to be first and second reference positions, respectively, the first and second reference positions will be set with a predetermined distance therebetween within the movable range of the second lens group. A WIDE wait position (near-side wait position) for the second lens group 102 is set near the first reference position, whereas a TELE wait position (far-side wait position) is set near the second reference position. If the WIDE wait position or TELE wait position are selectively set as the wait position of the second lens group 102 as appropriate according to the state of expansion of the third cylinder 6, then the moving distance of the second lens group 102 for focusing can be shortened, so that errors in movement can be reduced, whereby accurate focusing is possible. Also, time parallax upon photographing can be reduced.

The detection plate 105b has a predetermined width W in the optical axis direction. The width of the detection plate 105b is set in view of the amount of movement of the second lens group 102, preferably within the range of 3 to 10 mm, for example.

Figure 9:
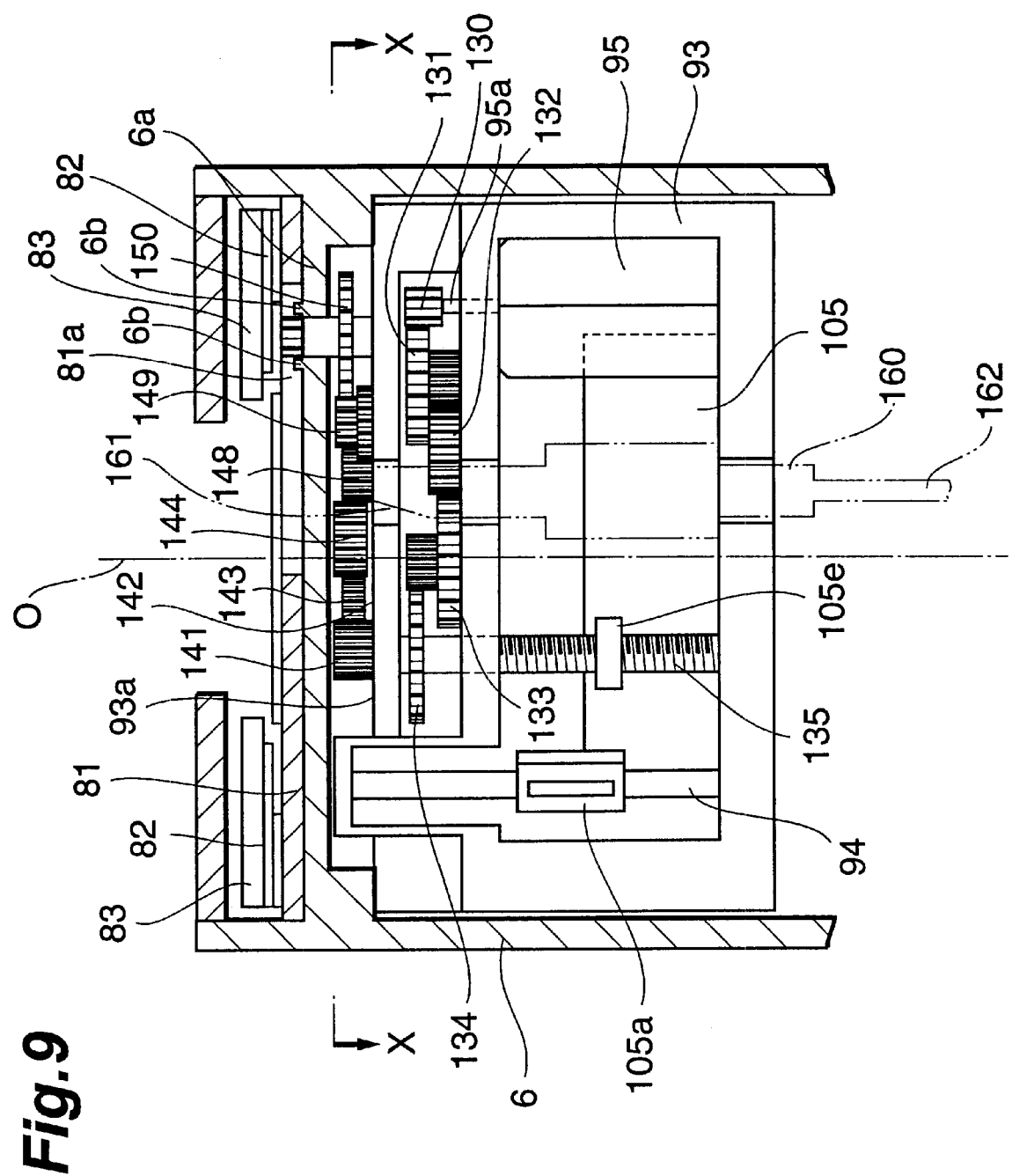
FIG. 9 is a sectional view of a third cylinder in the lens barrel of FIG. 1.
Figure 10:
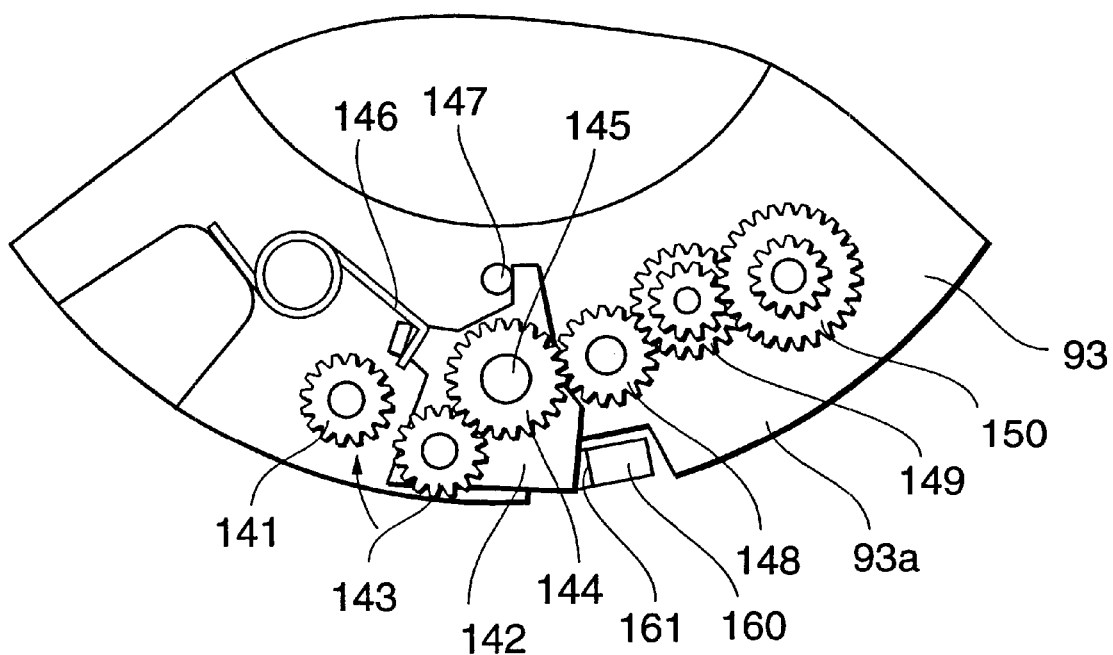
FIG. 10 is a sectional view taken along X—X of FIG. 9.

FIGS. 9 and 10 show a lens moving mechanism and a barrier opening and closing mechanism.

FIG. 9 is a sectional view of the third cylinder 6. As depicted, a gear 130 is attached to the rotary shaft 95a of the motor 95. By way of gears 131, 132, 133, the rotary force of the gear 130 is transmitted to a gear 134. The gears 130 to 134 function as a second driving transmission mechanism for transmitting the driving force of the motor 95 to the lens moving mechanism.

The gear 134 is attached to the upper part of a threaded shaft 135. The threaded shaft 135 is a rod member having a threaded peripheral face, and is attached to the shutter unit frame 93 along the optical axis direction so as to be rotatable. An arm portion 105c extending from the second lens frame 105 is in mesh with the threaded shaft 135. The threaded shaft 135 and the arm portion 105c function as the lens moving mechanism.

As the motor 95 rotates, the threaded shaft 135 rotates by way of the gears 130 to 134, whereby the second lens group 102 moves in the optical axis direction together with the second lens frame 105. As the second lens group 102 moves, the focusing of the taking optical system is effected.

The upper part of the threaded shaft 135 further penetrates through the front face 93a of the shutter unit frame 93, whereas a gear 141 is attached to this penetrating portion. A swing plate 142 is attached to the front face 93a, whereas gears 143, 144 are rotatably attached onto the swing plate 142.

As shown in FIG. 10, the swing plate 142 is axially supported by an axial pin 145 of the gear 144, and is rotatable about the axial pin 145. Also, the swing plate 142 is urged by a torsion spring 146 in the leftward direction as seen from thereabove, and is engaged and stopped by a pin 147 projecting from the front face 93a. The gear 143 on the swing plate 142 is usually in mesh with the gear 144 but is separated from and out of mesh with the gear 141 when the swing plate 142 is in a state rotated leftward by the torsion spring 146.

The front face 93a is provided with gears 148, 149, 150 successively in mesh with each other. The gear 148 is in mesh with the gear 144. As the gear 144 rotates, the gear 148 transmits the rotary force to the gear 150 via the gears 148, 149. The gear 150 penetrates through a front wall part 6a of the third cylinder 6, thereby meshing with the barrier driving ring 81. Namely, as shown in FIG. 9, the gear 150 is inserted into a curved long hole 81a formed in the barrier driving ring 81, thereby meshing with gear teeth 81b (see FIG. 4) formed in the inner peripheral face of the long hole 81a. The gears 130 to 140, the threaded shaft 135, and the gears 141, 143, 144, and 148 to 150 function as a first driving transmission mechanism for transmitting the driving force of the motor 95 to the barrier opening and closing mechanism.

The part through which the gear 150 penetrates in the front wall part 6a of the third cylinder 6 is formed with a stopper 6b. The stopper 6b restricts the moving area of the barrier driving ring 81, and comes into contact with the inner wall of the long hole 81a when the barrier driving ring 81 moves, thereby limiting the movement of the barrier driving ring 81.

As shown in FIG. 9, a rod member 160 is attached to the shutter unit frame 93. The rod member 160 is a member shaped like a rod and is disposed so as to orient in the optical axis direction. The rod member 160 is assembled so as to be movable in the optical axis direction within a predetermined range, and moves as the lens barrel 1 is expanded and collapsed. The leading end part 161 of the rod member 160 is tapered down, and is positioned below the swing plate 142. The rear end part 162 of the rod member 160 projects from the rear open end of the third cylinder 6.

When the lens barrel 1 such as the third cylinder 6 is collapsed into the main body 3, the rear end part 162 of the rod member 160 comes into contact with the main body 3 and the like. Upon this contact, the rod material 160 moves in front of the shutter unit frame 93. As shown in FIG. 10, this movement rotates the swing plate 142 rightward, whereby the gear 143 on the swing plate 142 meshes with the gear 141. Consequently, the driving force of the motor 95 is transmitted toward the barrier by way of the gears 141, 143, 144, and 148 to 150, whereby the barrier can be closed.

When the lens barrel 1 such as the third cylinder 6 is expanded from the main body 3 by a predetermined extent or greater, on the other hand, the rear end part 162 of the rod member 160 does not come into contact with the wall face (not depicted) of the main body 3. As a consequence, the rod member 160 is positioned behind the shutter unit frame 93, whereby the swing plate 142 attains a state rotated leftward. Therefore, the gear 143 on the swing plate 142 does not mesh with the gear 141, whereby the driving force of the motor 95 is not transmitted toward the barrier. If the motor 95 is driven, only the second lens group 102 will move in the optical axis direction, so that the barrier will not be closed.

Thus, the rod member 160 and the swing plate 142 function as driving transmission switching means for switching between a transmission enabled state and a transmission disabled state concerning the transmission of the driving force of the motor 95 to the barrier opening and closing mechanism.

When the gear 143 on the swing plate 142 meshes with the gear 141, the movement of the second lens group 102 and the opening/closing of the barrier 83 are synchronized with each other upon driving the motor 95 acting as the driving source. As a consequence, if the position of the second lens group 102 is detected by the detector 96, then the opening/closing state of the barrier 83 can be detected indirectly. Hence, sensors and the like for detecting the opening and closing of the barrier can be omitted.

A basic operation of the lens barrel 1 will now be explained.

Figure 11:
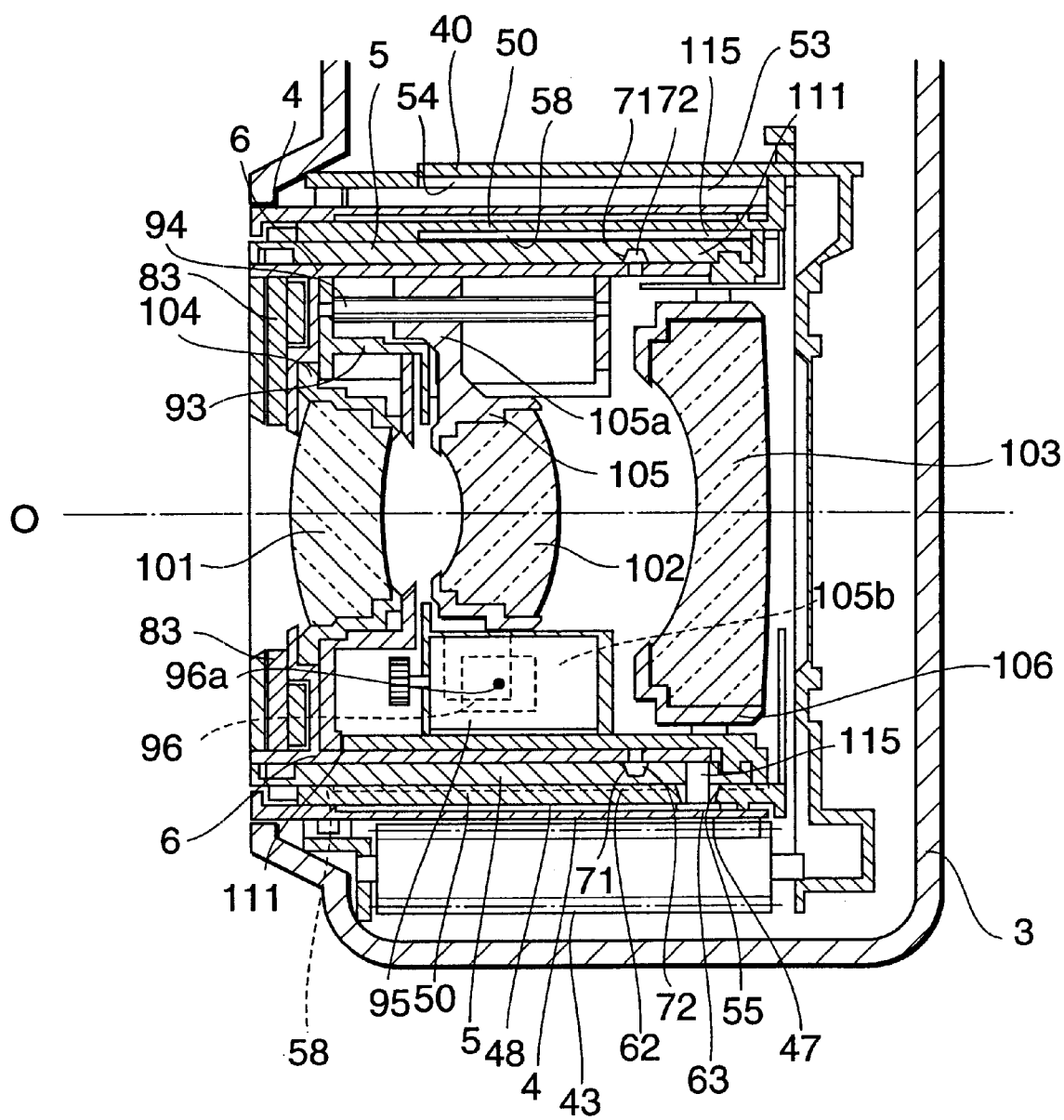
FIG. 11 is an explanatory view concerning a basic operation of the lens barrel of FIG. 1.

When the camera 2 is in its OFF state in which photographing is impossible, as shown in FIG. 6, the lens barrel 1 is collapsed in the main body 3, and the barrier 83 is closed. If the main switch 16 of the main body 3 is pushed in this state, then the motor 95 is driven, and its driving force is transmitted to the barrier opening and closing mechanism, whereby the barrier 83 is opened as shown in FIG. 11. The driving force of the motor 95 is also transmitted to the lens moving mechanism, whereby the second lens group 102 moves toward the object.

In this state, since the lens barrel 1 is collapsed, the opening/closing of the barrier 83 and the movement of the second lens group 102 are carried out in synchronization with each other upon driving the motor 95. The second lens group 102 is stopped at the WIDE wait position.

Figure 12:
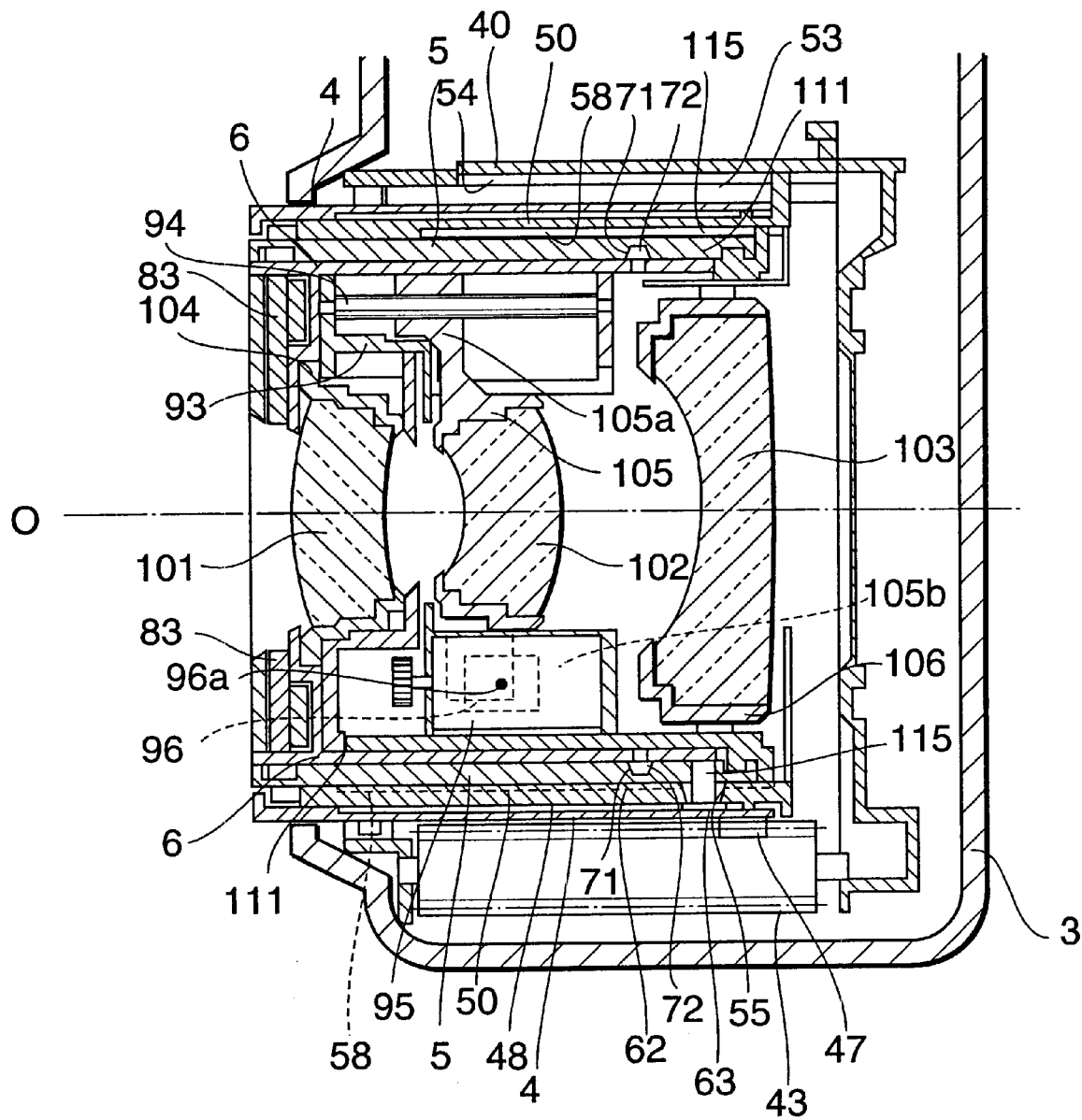
FIG. 12 is an explanatory view concerning the basic operation of the lens barrel of FIG. 1.

If the shutter button 11 is pushed in the state of FIG. 11, a lens barrel driving motor, which is not depicted, rotates according to AF rangefinding data, so that the columnar gear 43 rotates, whereby the first cylinder 4 is expanded as shown in FIG. 12. Here, the motor 95 is not driven, whereby the first lens group 101, second lens group 102, and third lens group 103 are expanded in total without changing their mutual group distances. This total expansion carries out focus adjustment. Subsequently, the shutter is released, so as to carry out photographing. After the shutter release, the first cylinder 4 is collapsed into the main body 3.

Figure 13:
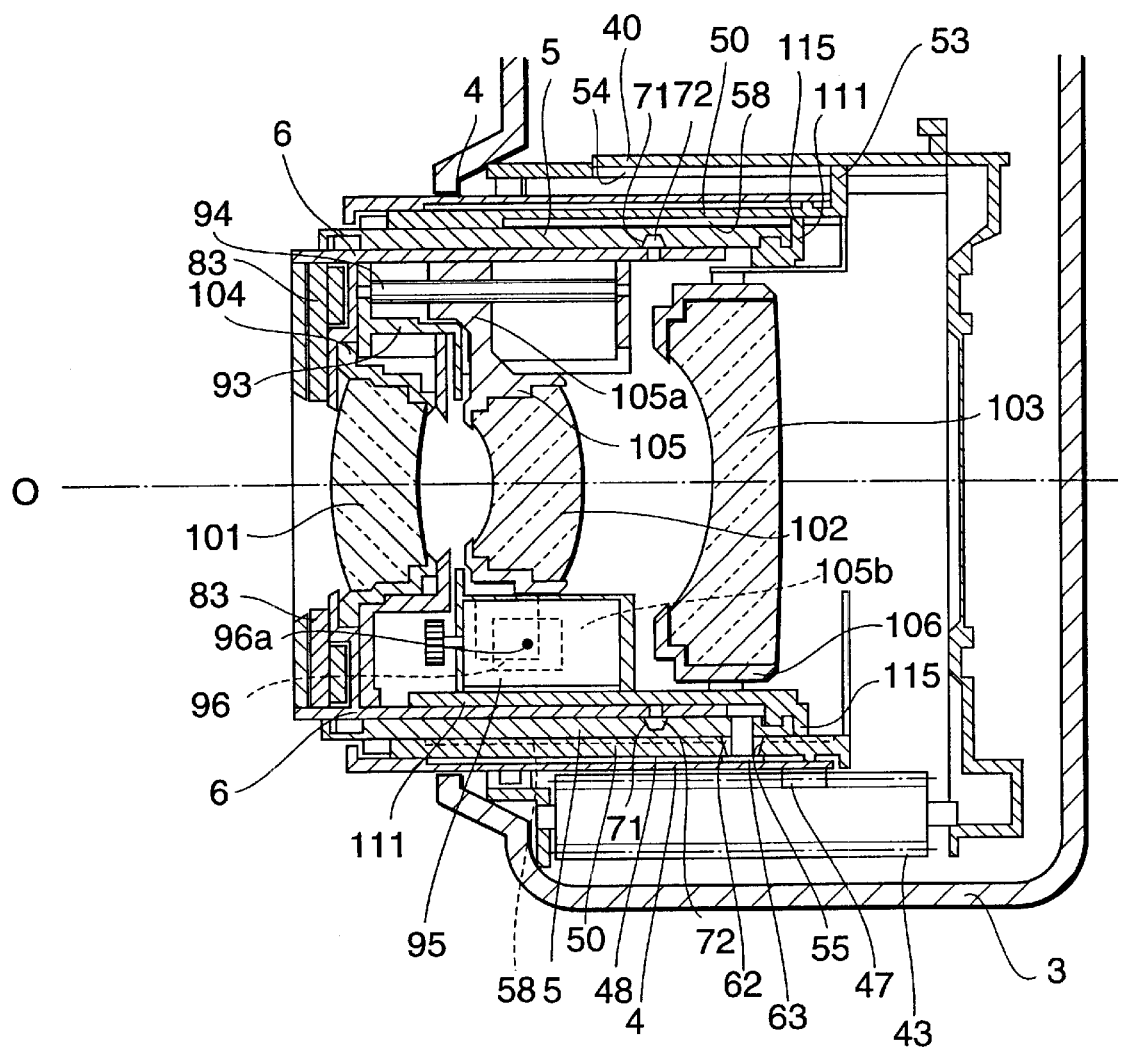
FIG. 13 is an explanatory view concerning the basic operation of the lens barrel of FIG. 1.

When a zooming operation is carried out in the state of FIG. 11, the unshown lens driving motor is driven in response to the operation, so that the columnar gear 43 rotates along therewith, whereby the first cylinder 4 is expanded from the main body 3 and fixed tube 40 as shown in FIG. 13 while rotating. Also, along with the first cylinder 4, the second cylinder 5 rotates so as to be expanded from the first cylinder 4. Further, the third cylinder 6 is expanded from the second cylinder 5. As the first cylinder 4, second cylinder 5, and third cylinder 6 are expanded, the first lens group 101, second lens group 102, and third lens group 103 are expanded together, whereby zooming is carried out. Here, the second lens group 102 waits at the WIDE wait position.

Figure 14:
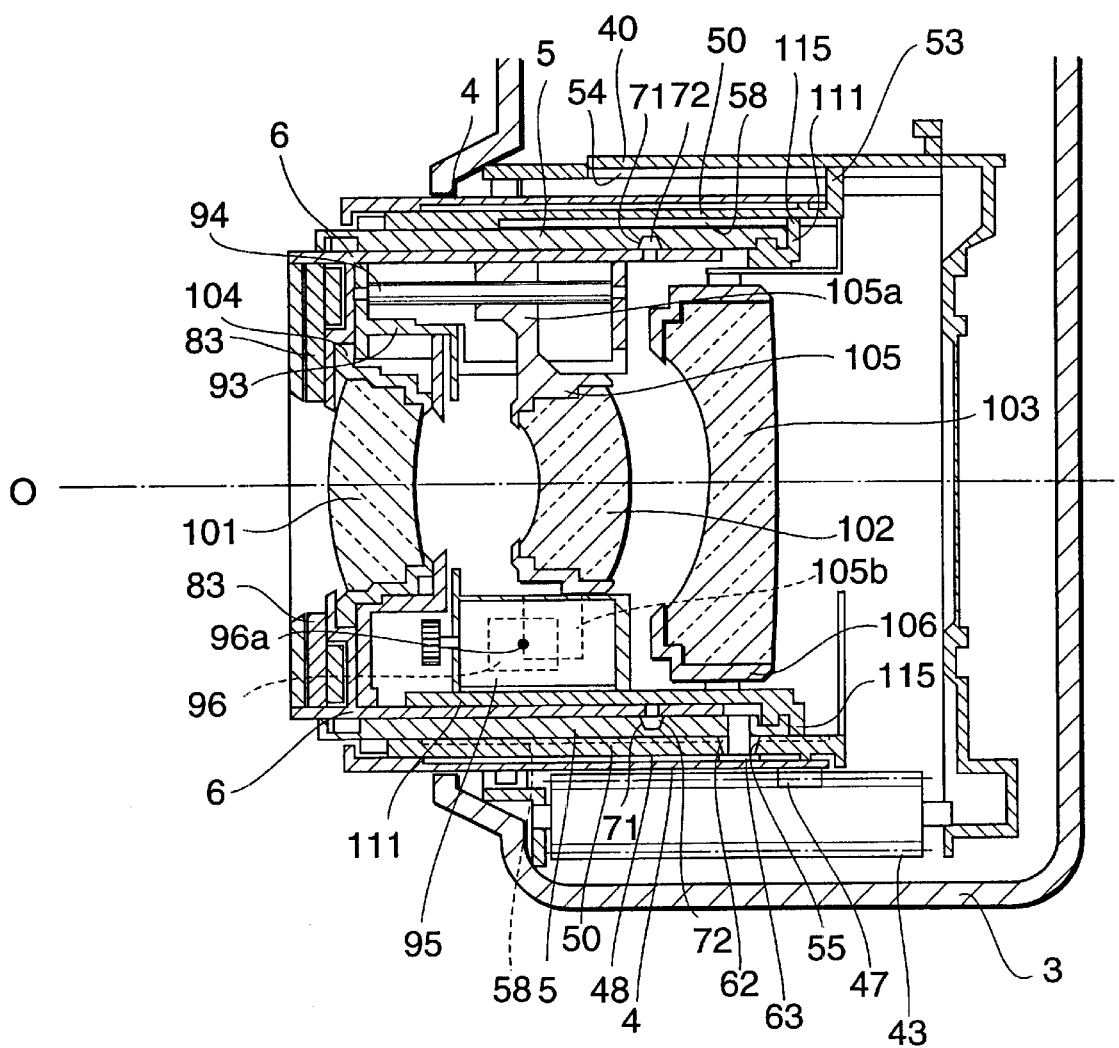
FIG. 14 is an explanatory view concerning the basic operation of the lens barrel of FIG. 1.

If the shutter button 11 is pushed in the state of FIG. 13, then the motor 95 is driven according to the AF range finding data, so that the second lens group 102 retracts from the WIDE wait position as shown in FIG. 14, whereby focus adjustment is carried out. Subsequently, the shutter is released, whereby photographing is effected.

Figure 15:
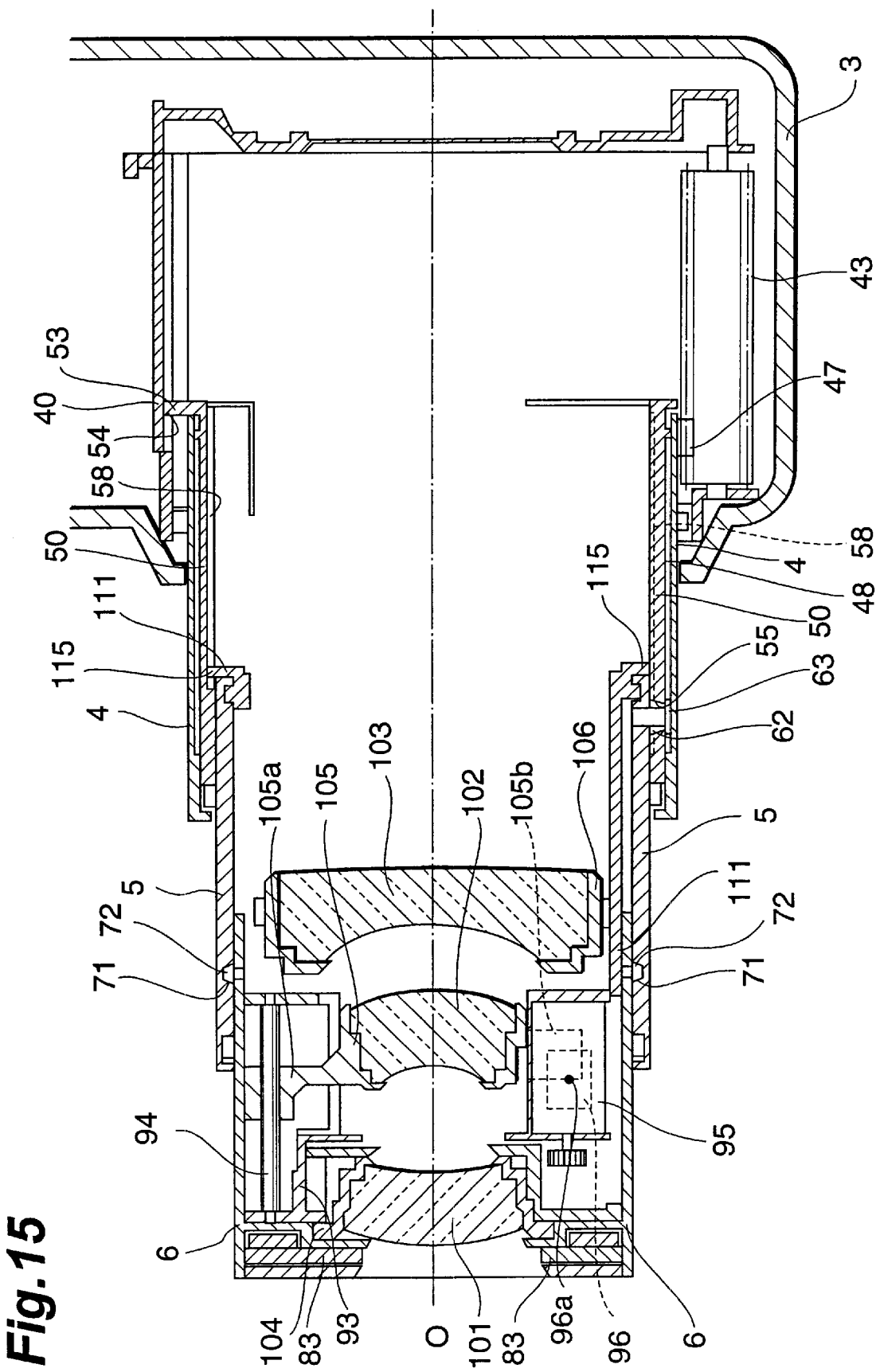
FIG. 15 is an explanatory view concerning the basic operation of the lens barrel of FIG. 1.

If a zooming operation is further carried out in the state of FIG. 13, then the unshown lens driving motor is driven according to this operation as shown in FIG. 15, so that the columnar gear 43 rotates along therewith, whereby the first cylinder 4 is expanded from the main body 3 and fixed tube 40 as shown in FIG. 15 while rotating. Also, along with the first cylinder 4, the second cylinder 5 rotates so as to be expanded from the first cylinder 4. Further, the third cylinder 6 is expanded from the second cylinder 5. As the first cylinder 4, second cylinder 5, and third cylinder 6 are expanded, the first lens group 101, second lens group 102, and third lens group 103 are expanded together, whereby zooming is carried out.

Here, if the third cylinder 6 is expanded by a predetermined extent or greater, then the second lens group 102 retracts from the WIDE wait position to the TELE wait position and waits at the TELE wait position. In FIG. 15, the TELE wait position of the second lens group 102 is indicated by the dash-double-dot line.

Here, when the lens barrel 1 is expandable by step zooming of seven stages Z1 to Z7, for example, the amount of expansion between zoom codes Z2 and Z3 is set as "expansion by a predetermined extent or greater." Namely, when the lens barrel 1 is expanded from the zoom code Z2 to the zoom code Z3, the second lens group 102 moves from the WIDE wait position to the TELE wait position. The movement of the second lens group 102 is carried out by the driving of the motor 95.

Upon this driving, the transmission of the driving force of the motor 95 to the barrier opening and closing mechanism is interrupted by the expansion of the lens barrel 1, whereby the barrier 83 is not closed even when the motor 95 is driven.

If the shutter button 11 is pushed in the state of FIG. 15, then the motor 95 is driven according to the AF range finding data, so that the second lens group 102 retracts from the TELE wait position (position indicated by the dash-double-dot line), whereby focus adjustment is carried out. Then, the shutter is released, whereby photographing is effected.

The electric configuration of the camera using the lens barrel 1 will now be explained.

Figure 16:
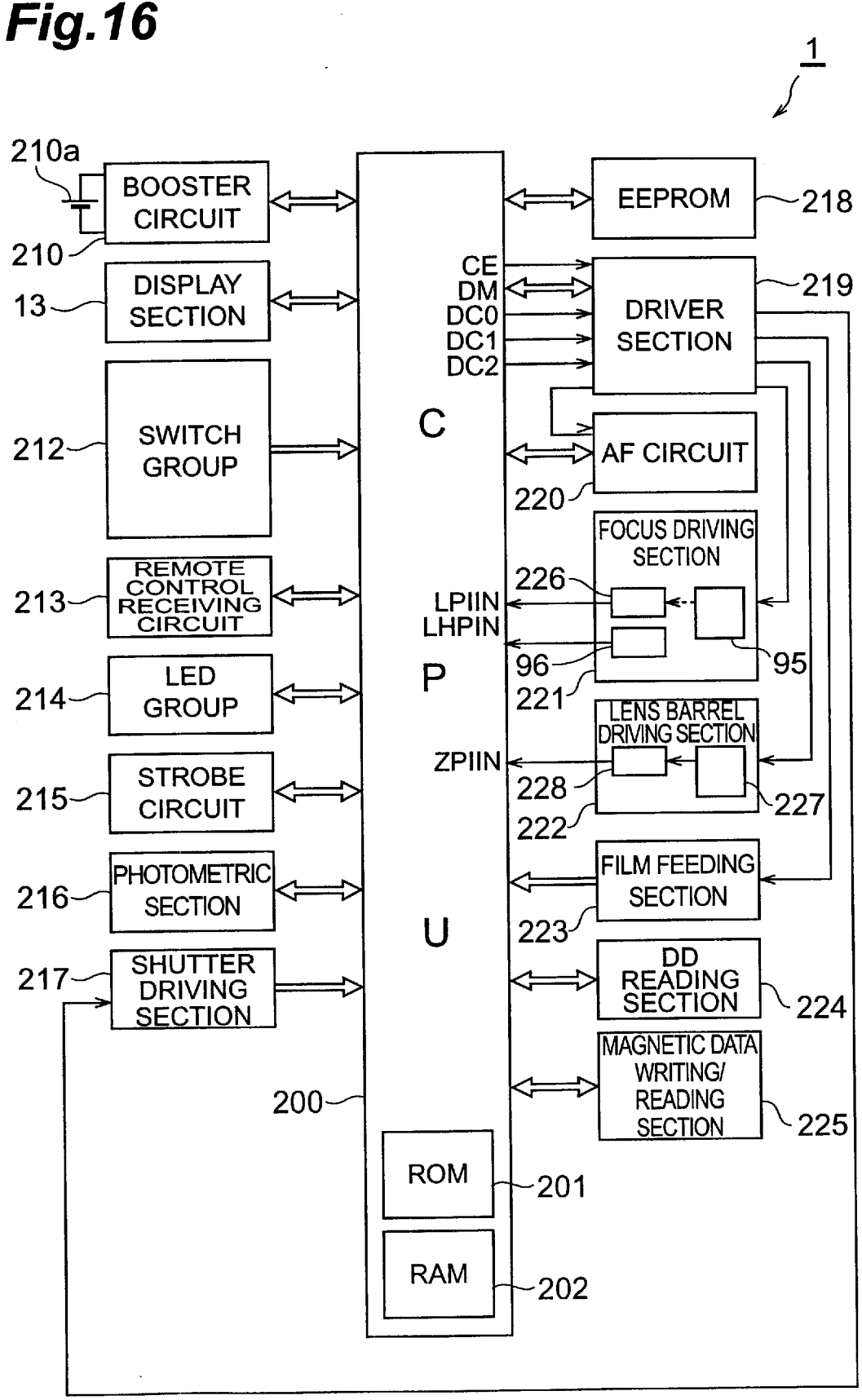
FIG. 16 is a diagram showing an electric configuration in the camera equipped with the lens barrel of FIG. 1.

FIG. 16 is a block diagram showing the electric configuration of the camera using the lens barrel 1. As shown in this drawing, the camera 2 is equipped with a CPU 200. The CPU 200 controls the camera 2 as a whole, and incorporates therein a ROM 201 in which programs for control and arithmetic processing are stored beforehand, and a RAM 202 for storing various data upon control and arithmetic operations.

Connected to the CPU 200 are a booster circuit 210, the display section 13, a switch group 212, a remote control receiving circuit 213, an LED group 214, a strobe circuit 215, a photometric section 216, and a shutter driving section 217.

A battery 210a is connected to the booster circuit 210. Under the control of CPU 200, the booster circuit 210 boosts the power voltage outputted from the battery 210a, and supplies thus boosted power voltage to individual electric parts and the like within the camera 2.

The switch group 212 is constituted by the shutter button 11 for releasing the shutter, the mode switch 14 for setting photographing modes, the self-timer switch 15 for setting self-timer photographing, the main switch 16 for switching between the photographing enabled state and photographing disabled state, the zoom switch 18 (TELE switch 19 and WIDE switch 20), an opening/closing switch for opening and closing the cartridge lid 21, an MR switch for instructing the rewinding of the film in the middle, a cartridge ON/OFF switch for verifying whether the camera is loaded with a film cartridge or not, and the like.

The strobe circuit 215 has a luminous body installed inside a strobe window, and causes the luminous body to stroboscopically emit light according to a selected photographing mode (mode concerning stroboscopic light emission and the like) under the control of CPU 200. The photometric section 216 is constituted by the photometric sensor 9 and the like. The shutter driving section 217 drives the shutter and is actuated in response to driving signals from a driver section 219.

Also connected to the CPU 200 are an EEPROM 218, the driver section 219, an AF circuit 220, a focus driving section 221, a lens barrel driving section 222, a film feeding section 223, a DD (data disk) reading section 224, and a magnetic data writing and reading section 225.

The EEPROM 218 stores the state of the camera 2 at each point in time, various control parameters, and the like. In response to control signals from the CPU 200, the driver section 219 outputs driving signals to the focus driving section 221, the lens barrel driving section 222, the film feeding section 223, and the shutter-driving section 217. The driver section 219 is connected to a driver ON/OFF terminal CE, a serial terminal DM, and parallel terminals DC0, DC1, DC2 of the CPU 200. The driver section 219 turns on the driver ON/OFF terminal CE, so as to select a driving section to be driven by serial signals, and drives thus selected driving section according to data signals from the parallel terminals DC0, DC1, DC2. After the selected driving section is completely driven, the driver ON/OFF terminal CE is turned off, so as to turn off the driver section 219.

The AF circuit 220 has a luminous body and a light-emitting body inside its AF light-projecting window and AF light-receiving window, respectively, measures the distance to the object based on the principle of trigonometry using the luminous body and light-receiving body according to an instruction from the CPU 200, and sends the result of measurement to the CPU 200.

The focus driving section 221, equipped with the motor 95, is used for moving the lenses of the second lens group 102 and opening and closing the barrier 83. The motor 95 is driven in response to driving signals from the driver section 219, so as to move the lenses of the second lens group 102 and open and close the barrier 83. The focus driving section 221 also comprises a drive detector 226 for outputting pulse signals as the motor 95 is driven to rotate. As the drive detector 226, a photo interrupter is used, for example. The focus driving section 221 further comprises the detector 96 for detecting the position of the second lens group 102.

The lens barrel driving section 222, equipped with a motor 227, is used for driving the lens barrel 1 to expand and collapse. The motor 227 is a lens barrel driving motor and is driven in response to driving signals from the driver section 219, so as to rotate the first cylinder 4 by way of the columnar gear 43 and the like, thereby expanding or collapsing the lens barrel 1. The lens barrel driving section 222 is equipped with a drive detector 228 for outputting pulse signals as the motor 227 is driven to rotate. As the drive detector 228, a photo interrupter is used, for example.

According to an instruction from the CPU 200, the film feeding section 223 feeds the film of the loaded film cartridge forward or backward. As instructed by the CPU 200, immediately after the main body 3 is loaded with a film cartridge, the DD reading section 224 reads out data concerning the film information (the film species, film sensitivity, and number of frames that can be photographed) and state of use of films (unused/during photographing/photographed/developed) recorded in the data disk of the film cartridge, and sends thus read-out data to the CPU 200. Here, the data disk is a disk-shaped member disposed at a side edge of the film cartridge, indicating the film information by a barcode displayed on its surface and representing the state of use of film by its azimuth of rotation when it is stopped.

According to an instruction from the CPU 200, the magnetic data reading and writing section 225 writes information data such as the date of photographing, number of prints, language, and title into a magnetic recording area of the film of the film cartridge or reads out such information data therefrom.

Each control processing operation in the camera 2 equipped with the lens barrel 1 will now be explained in detail.

First, the summary of a basic control processing operation of the camera 2 will be explained.

Figure 17:
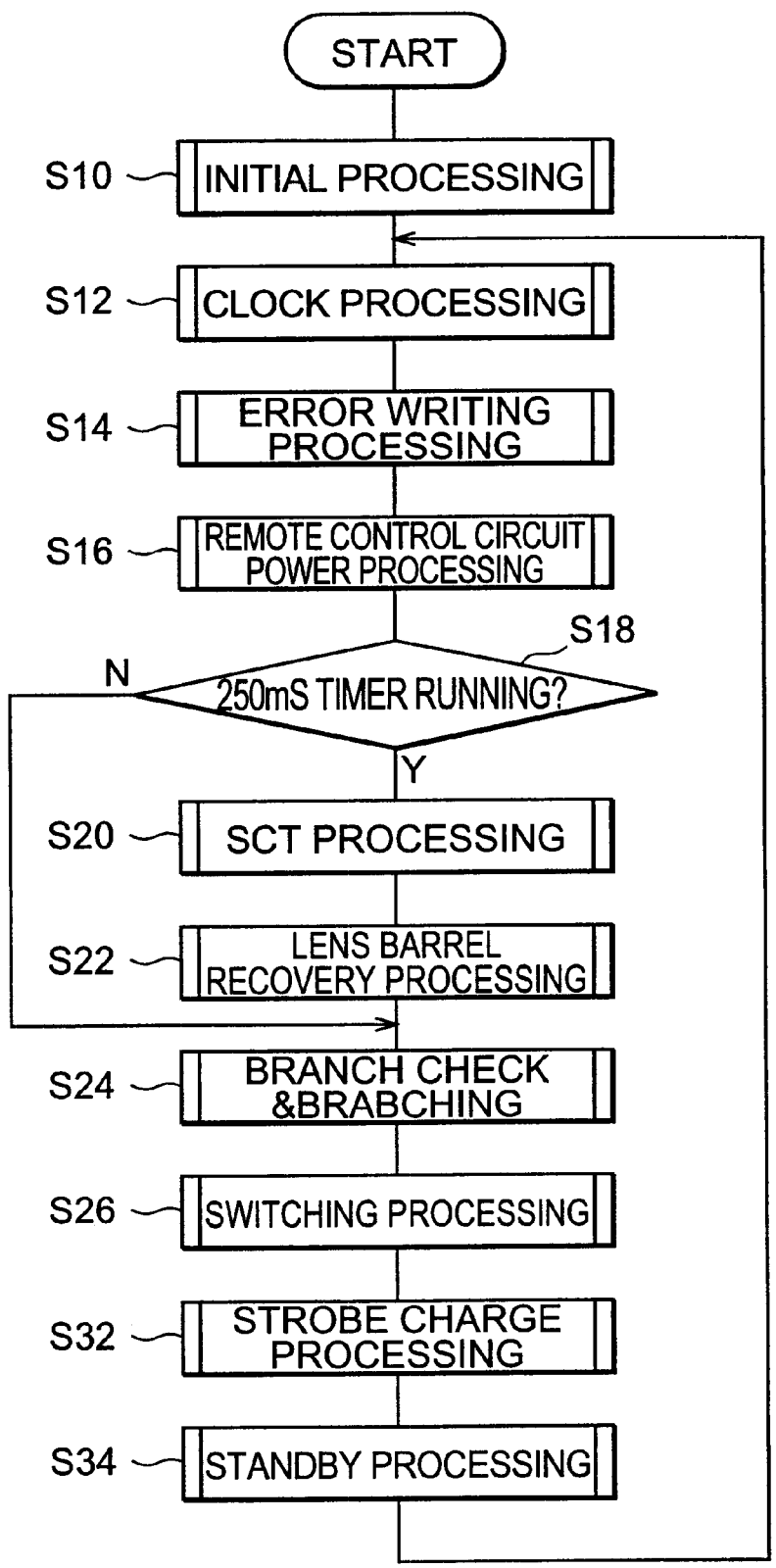
FIG. 17 is a flowchart of a branch processing operation of the camera equipped with the lens barrel of FIG. 1.

FIG. 17 shows a schematic flowchart of the basic control processing operation of the camera 2. As shown in S10 of this chart, an initial processing operation of is carried out when the camera 2 is loaded with a battery. The initial processing operation is so-called power-on resetting, whereby the initial setting of the CPU 200, the initial port setting, the initial setting of RAM 202, the expansion of the value of EEPROM 218 into the RAM 202, and the like are carried out. The details thereof will be explained later. Subsequently, the flow shifts to S12, where a clock processing operation is carried out. The clock processing operation is an operation for updating the time display to that corresponding to the clock count.

Then, the flow shifts to S14, where an error writing processing operation is carried out. The error writing processing operation is an operation for carrying out writing at a predetermined area allocated in the EEPROM 218 when error writing is requested in each processing operation.

Subsequently, the flow shifts to S16, where a remote control circuit power processing operation is carried out. Then, the flow shifts to S18, where it is determined whether a 250-ms timer is running or not. If it is determined that the 250-ms timer is not running, then the flow shifts to S24. If it is determined that the 250-ms timer is running, by contrast, then an SCT processing operation is carried out (S20), and a lens barrel recovery processing operation is carried out (S22).

The SCT processing operation is an operation for detecting whether a cartridge exists or not. The lens barrel recovery processing operation is an operation for returning the lens barrel 1 to an appropriate position or completely collapsing the lens barrel 1 when the lens barrel is forcibly expanded or collapsed by a user. The lens barrel recovery processing operation will be explained later in detail.

Then, the flow shifts to S24, where a branch check processing and branching processing operation is carried out. The branch check processing and branching processing operation is an operation for determining whether a signal inputted by a switch operation or the like is effective or not, and causes the flow to branch to a processing operation corresponding to the inputted signal when the signal is effective. Subsequently, the flow shifts to S26, where a switching processing operation is carried out. The switching processing operation is an operation for actually carrying out an action corresponding to the switch operation or the like.

Then, the flow shifts to S32, where a strobe charge processing operation is carried out. The strobe charge processing operation is an operation for charging the battery. Subsequently, the flow shifts to S34, where a standby processing operation is carried out. The standby processing operation will be explained later in detail. After the standby processing operation at S34 is completed, the flow returns to S12.

The initial processing operation will now be explained.

Figure 18:
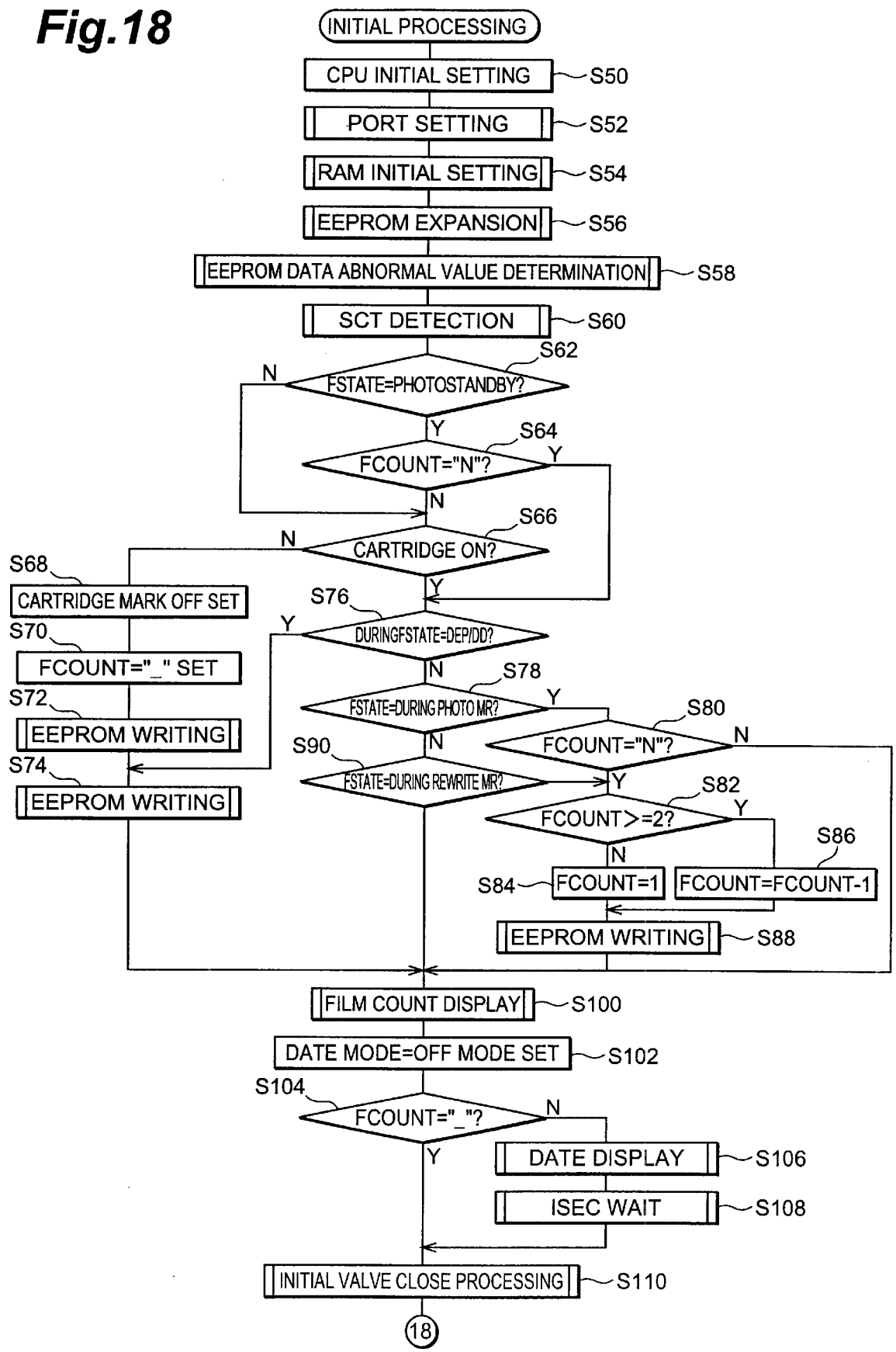
FIG. 18 is a flowchart of an initial processing operation of the camera equipped with the lens barrel of FIG. 1.
Figure 19:
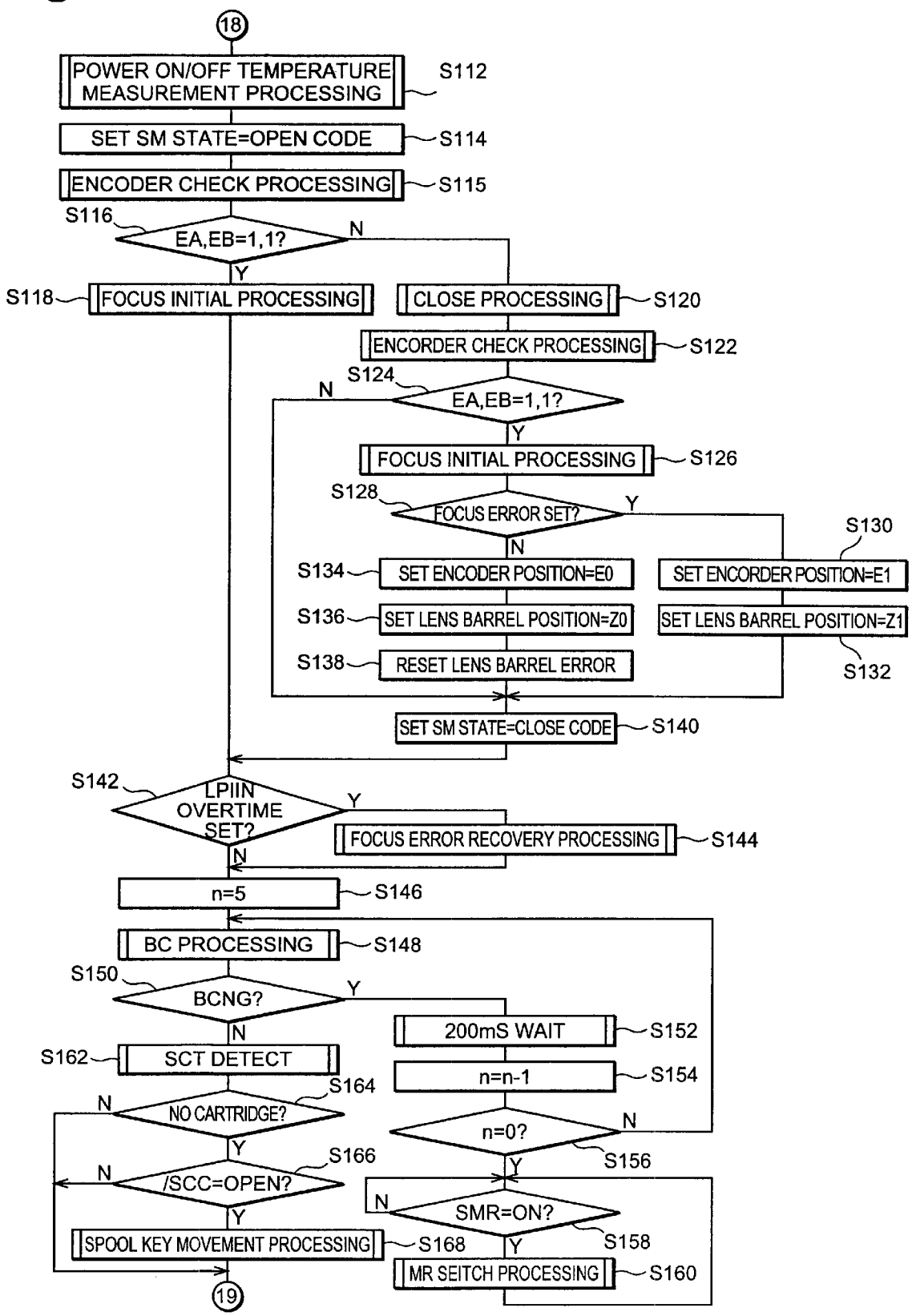
FIG. 19 is a flowchart of the initial processing operation of the camera equipped with the lens barrel of FIG. 1.
Figure 20:
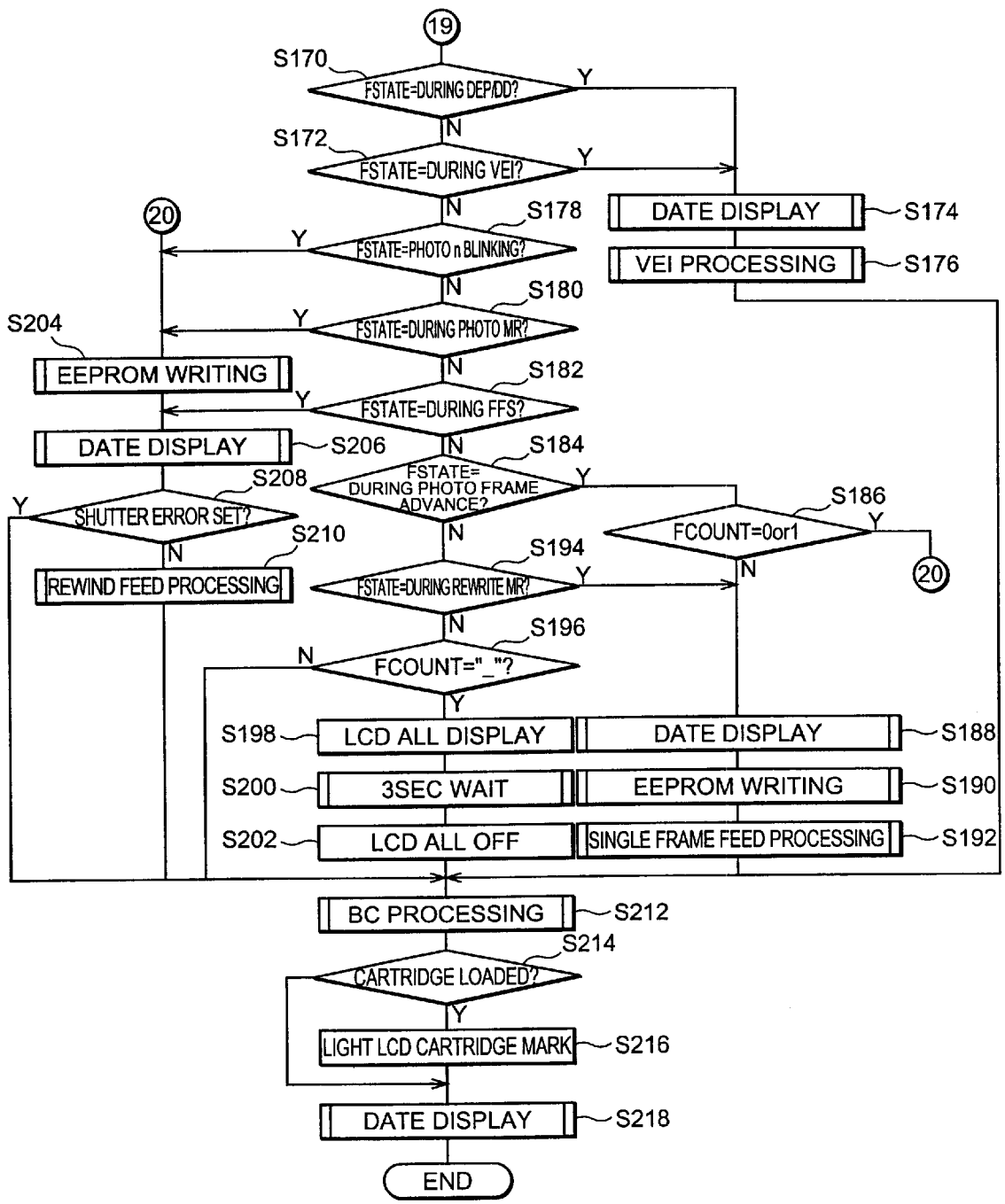
FIG. 20 is a flowchart of the initial processing operation of the camera equipped with the lens barrel of FIG. 1.

FIGS. 18 to 20 show flowcharts of the initial processing operation. The initial processing operation is an operation for initializing the CPU 200 and the like when loaded with the battery.

As shown at S50 in FIG. 18, initial setting of the CPU 200 is carried out. Subsequently, port setting and initial setting of the RAM 202 are carried out (S52, S54). Then, predetermined data in the EEPROM 218 are expanded into the RAM 202 (S56), and it is determined whether or not there is abnormality in the data of EEPROM 218 (S58). Here, abnormal data are rounded into a predetermined value.

Substantially, the flow shifts to S60, where an SCT detection processing operation is carried out. The SCT detection processing operation is an operation for determining whether the main body 3 of the camera 2 is loaded with a film cartridge or not. Then, the flow shifts to S62, where it is determined whether the feed state data (FSTATE) of the EEPROM 218 is in a standby status for photographing or not. If it is determined not, then the flow shifts to S66.

If it is determined to be in a standby status for photographing, then the flow shifts to S64, where it is determined whether or not a certain value "N" is set as film count data (FCOUNT) of the EEPROM 218. If it is determined that the certain value "N" is set as the film count data (FCOUNT), then the flow shifts to S76. If it is determined not, by contrast, then the flow shifts to S66, where it is determined according to the data of EEPROM 218 whether the main body 3 is loaded with a cartridge or not.

If it is determined at S66 that the main body 3 is not loaded with a cartridge, then a cartridge mark turning off flag in the RAM 202 is set (S68), and "null" is set as the film count data (S70). Then, "photography standby" is written into the EEPROM 218 as the feed state data (FSTATE) of the camera 2, and "null" as the film count data (S72). Further, predetermined values for the shutter speed and film type are written into the EEPROM 218 as initial data.

At S76, it is determined whether the feed state data (FSTATE) in the EEPROM 218 is that during DEP/DD. Here, "during DEP/DD" refers to the time during which the species of film (sensitivity, negative/positive, etc.) and the state of use are being read out when the main body 3 is loaded with a cartridge. If it is determined to be during DEP/DD at S76, then the flow shifts to S74.

If it is determined not to be during DEP/DD, then the flow shifts to S78, where it is determined whether the feed state data in the EEPROM 218 is that during photographing MR or not. Here, "photographing MR" refers to during manual rewinding in the middle of photographing. If it is determined to be during photographing MR at S78, then the flow shifts to S80, where it is determined whether or not a certain value "N" is set as the film count data (FCOUNT) in the EEPROM 218. If it is determined that the certain value "N" is not set as the film count data, then the flow shifts to S100.

If it is determined at S80 that the certain value "N" is set as the film count data, by contrast, then the flow shifts to S82, where it is determined whether or not a value of at least 2 is set as the film count data in the EEPROM 218. If it is determined that a value of at least 2 is set as the film count data in the EEPROM 218, then the flow shifts to S86, where a value obtained when 1 is subtracted from the former value is set as the film count data. If it is determined not, by contrast, then the flow shifts to S84, where 1 is set as the film count data.

Subsequently, the flow shifts to S88, where the values set as the feed state data and film count data in the RAM 202 are written into the EEPROM 218.

If it is determined not to be during the photographing MR at S78, by contrast, then the flow shifts to S90, where it is determined whether the feed state data in the EEPROM 218 is during the rewrite MR or not. Here, "during rewrite MR" refers to the case during rewriting magnetic information.

Subsequently, the flow shifts to S100, where the film count value is displayed on the display section 13. Then, the flow shifts to S102, where it is determined whether the film count data (FCOUNT) is "null" or not. If the film count data (FCOUNT) is determined to be "null," then the flow shifts to S110. If it is determined that the film count data is not "null," then the flow shifts to S106, where the date is displayed. Namely, "- - - " is displayed as the date display of OFF mode on the display section (see FIG. 2) provided in the back face of the main body 3. Then, the flow shifts to S108 and, after a wait of 1 sec, further to S110.

At S100, an initial valve close processing operation is carried out. The initial valve close processing operation is an operation for closing the shutter incorporated in the lens barrel 1. Subsequently, a power on/off temperature measurement processing operation is carried out (S112 in FIG. 19), an open code is set as a main switch condition into the RAM 202 (S114), and an encoder check processing operation is carried out (S115). The power on/off temperature measurement processing operation is an operation for carrying out temperature measurement for driving the focus driving section 221 (see FIG. 16). The encoder check processing operation is an operation for reading out terminals EA, EB of an encoder installed in the lens barrel 1 in order to determine the current lens barrel position.

Subsequently, the flow shifts to S116, where it is determined whether the respective inputs of terminals EA, EB detected in the encoder check processing operation are both at 1 or not. The case where the inputs of terminals EA, EB are both at 1 is a case where the lens barrel 3 is completely collapsed into the main body 3. If it is determined that both of the terminals EA, EB are at 1, then the flow shifts to S118, where a focus initial processing operation is carried out. The focus initial processing operation is an operation for closing the barrier after detecting the position of the second lens group 102. The details thereof will be explained later.

If it is determined that both of the terminals EA, EB are not at 1, then the flow shifts to S120, where a close processing operation is carried out. The close processing operation is an operation for collapsing the lens barrel 1 to a zoom code Z1 at which the terminals EA, EB are at 1. The close processing operation will be explained later in detail.

Subsequently, the flow shifts to S122, where an encoder check processing operation is carried out, and then it is determined whether both of the terminals EA, EB detected by the encoder check processing operation are at 1 or not (S124). If it is determined that the terminals EA, EB are not at 1, then the flow shifts to S140. If it is determined that both of the terminals EA, EB are at 1, then the flow shifts to S126, where a focus initial setting operation is carried out.

Subsequently, the flow shifts to S128, where it is determined whether a focus error is set or not. If the focus error is set, then the encoder position is set to E1 (S130), and the lens barrel position is set to Z1 (S132). If no focus error is set, by contrast, then the encoder position is set to E0 (S134), the lens barrel position is set to Z0 (S136), and the lens barrel error is reset (S138).

Subsequently, the flow shifts to S140, where a close code is set as a main switch condition in the RAM 202. Then, the flow shifts to S142, where it is determined whether LPIIN overtime is set or not. Here, "LPIIN" refers to the input from the drive detector 226 (see FIG. 16) of the focus driving section 221, and "LPIIN overtime" means that a preset time has elapsed.

If it is determined at S142 that the LPIIN overtime is set, then the flow shifts to S144, where a focus error recovery processing operation is carried out. The focus error recovery processing operation is an operation for recovering from the state in which gears do not favorably mesh with each other in the case where the second lens group 102 is moved to the WIDE wait position and the like. This operation will be explained later in detail.

If it is determined at S142 that no LPIIN overtime is set, then the flow shifts to S146, where 5 is set as the count data n. Subsequently, the flow shifts to S148, where a battery check processing operation (BC processing operation) is carried out. The battery check processing operation is an operation for checking the voltage of the battery 210a.

Subsequently, the flow shifts to S150, where it is determined whether the battery check is a failure or not. If it is determined to be a failure, then, after a wait of 200 ms (S152), 1 is subtracted from the count data n (S154). Thereafter, it is determined whether the resulting count data n is 0 or not (S156). If it is determined that the count data n is not 0, then the flow returns to S148. If it is determined that the count data n is 0, then the flow shifts to S158, where it is determined whether the MR switch is turned ON or not. If the MR switch is ON, then an MR switch processing operation is carried out so as to forcibly take up the film.

If it is determined at S150 that the battery check is not failure, then the flow shifts to S162 and S164, where it is detected whether the main body 3 is loaded with a cartridge or not. If it is determined that the main body 3 is loaded with no cartridge, then the flow shifts to S170 in FIG. 20. If it is determined that the main body 3 is loaded with a cartridge, by contrast, then it is determined whether the cartridge lid 21 is open or not (S166). If it is determined that the cartridge lid 21 is not open, then the flow shifts to S170 of FIG. 20. If it is determined that the cartridge lid 21 is open, then the flow shifts to S168, where a spool key movement processing operation is carried out. The spool key movement processing operation is an operation for moving the position of a spool key to the position of X.

Subsequently, the flow shifts to S170 in FIG. 20, where it is determined whether the feed state data (FSTATE) of EEPROM 218 is during DEP/DD or not. If it is determined to be during DEP/DD, then the flow shifts to S174, where the date is displayed, and a VEI processing operation is carried out, whereby the display of the use of the cartridge is set to the exposed state (S176). Thereafter, the flow shifts to S212.

If it is determined not to be during DEP/DD at S170, then it is determined whether the feed state data of EEPROM 218 is during VEI or not (S172). If it is determined to be during VEI, then the flow shifts to S174. If it is determined not to be during VEI, then the flow shifts to S178, where it is determined whether the feed state data of EEPROM 218 is n blinking or not. Here, "n blinking" refers to a state where a feeding error is generated in the camera 2.

If it is determined to be n blinking at S178, then the flow shifts to S204, where "exposed" is written as data of the VEI processing stop position into EEPROM 218, and the value set in the RAM 202 is written as the film count data (FCOUNT) into the EEPROM 218.

Subsequently, the flow shifts to S206, where the date is displayed, and then it is determined whether a shutter error is set or not (S208). If it is determined that the shutter error is set, then the flow shifts to S212. If it is determined that no shutter error is set, on the other hand, then a rewind feed processing operation is carried out (S210). The rewind feed processing operation is an operation for totally taking up the film.

If it is determined at S178 that the feed state data of EEPROM 218 is not n blinking, then it is determined whether the feed state data is that during MR (manual rewinding) or not. If it is determined to be during MR, then the flow shifts to S204. If it is determined not, then the flow shifts to S184, where it is determined whether the feed state data of EEPROM 218 is that during FFS (first frame set) or not. If it is determined to be during FFS, then the flow shifts to S206.

If it is determined not to be during FFS at S182, then the flow shifts to S184, where it is determined whether the feed state data of the EEPROM 218 is during frame advance or not. If the feed state data is determined to be during feed advance, then the flow shifts to S186, where it is determined whether or not the film count data is 0 or 1. If the film count data is determined to be 0 or 1, then the flow shifts to S204. If the film count data is determined to be neither 0 nor 1, then the flow shifts to S188, where the date is displayed, and thereafter "exposed" is written as data of the VEI processing stop position into the EEPROM 218, whereas the value set as the film count data (FCOUNT) in the RAM 202 is written into the EEPROM 218 (S190). Then, the flow shifts to S192, where a single frame feed processing operation for the film is carried out.

Meanwhile, if the feed state data is determined to be not during frame advance at S184, then the flow shifts to S194, where it is determined whether the feed state data of the EEPROM 218 is that during rewrite feed or not. If the feed state data is determined to be that during rewrite feed, then the flow shifts to S188. If it is determined not, by contrast, then the flow shifts to S196, where it is determined whether the film count data is 0 or not. If it is determined that the film count data is not 0, then the flow shifts to S212. If the film count data is determined to be 0, then the display section 113 is totally displayed for 3 seconds (S198 to S202).

Subsequently, the flow shifts to S212, where a battery check processing operation is carried out, so as to determine whether the main body 3 is loaded with a cartridge or not. If the main body 3 is loaded with a cartridge, then the cartridge mark of the display section 13 is lit (S216). If not, then the flow shifts to S218, where the date is displayed, whereby the initial processing operation is terminated.

A release processing operation will now be explained.

FIGS. 21 to 25 show flowcharts of the release processing operation. The release processing operation is an operation carried out when the shutter button 11 is manipulated.

Figure 21:
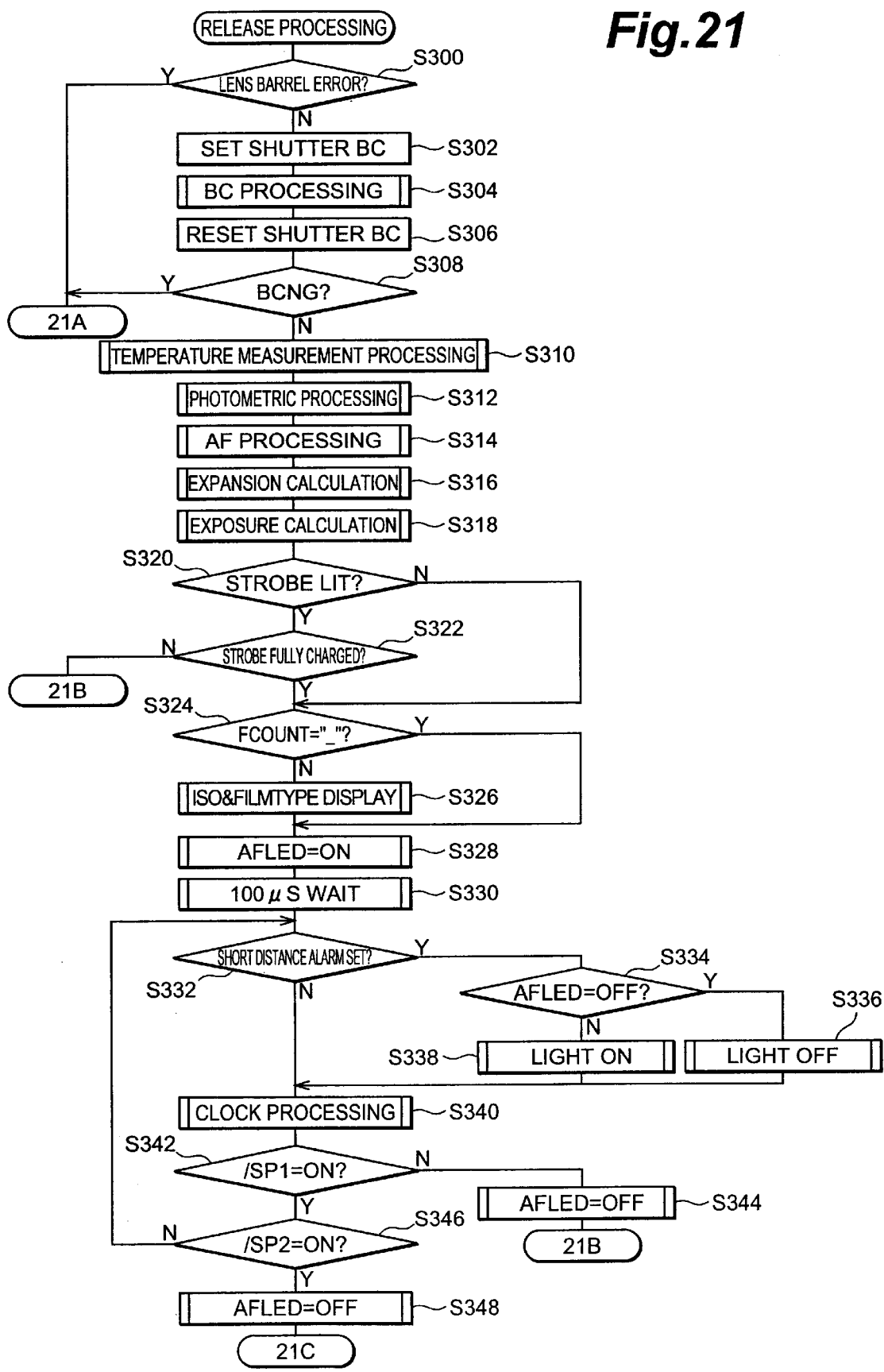
FIG. 21 is a flowchart of a release processing operation of the camera equipped with the lens barrel of FIG. 1.
Figure 22:
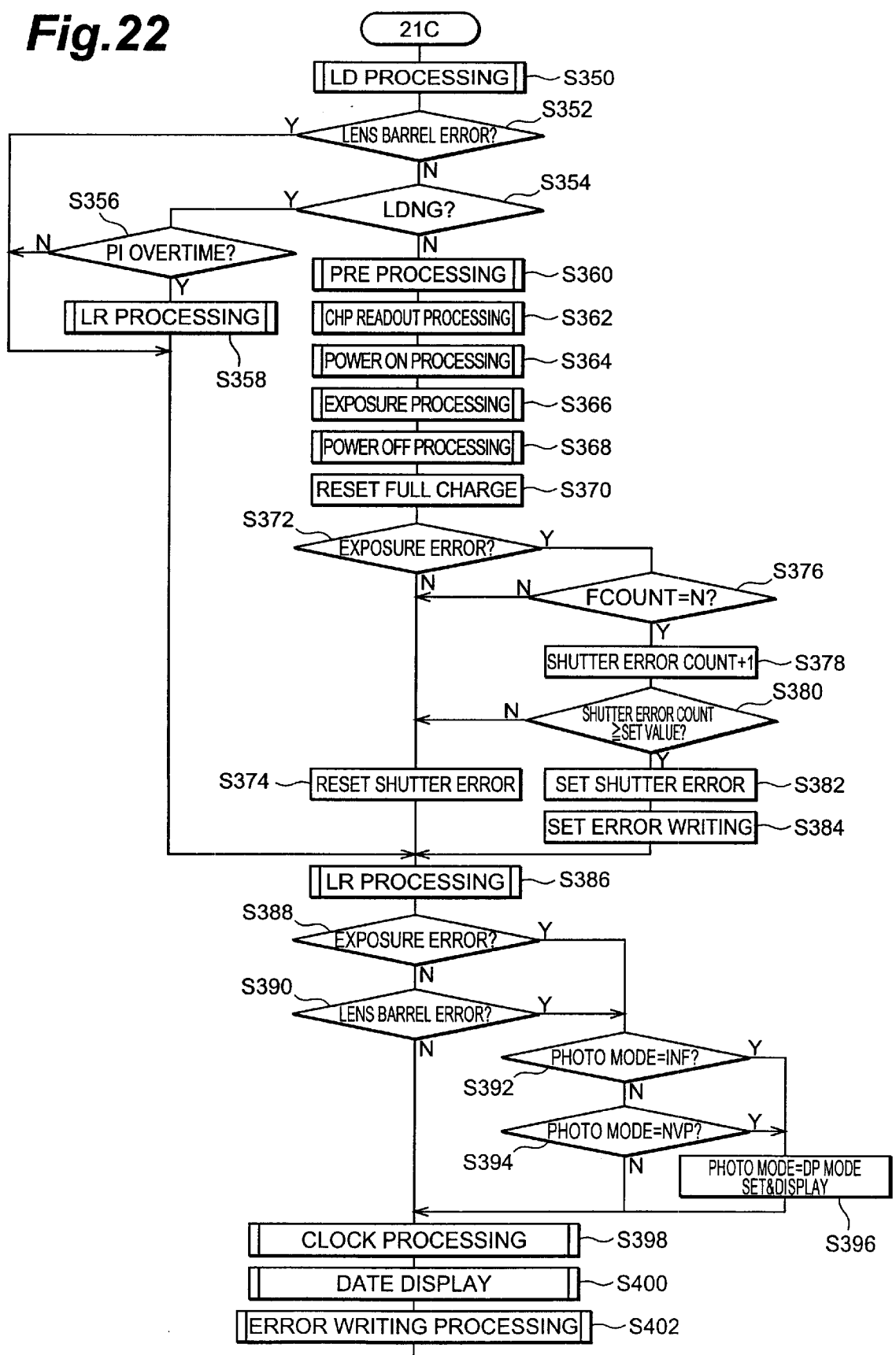
FIG. 22 is a flowchart of the release processing operation of the camera equipped with the lens barrel of FIG. 1.
Figure 23:
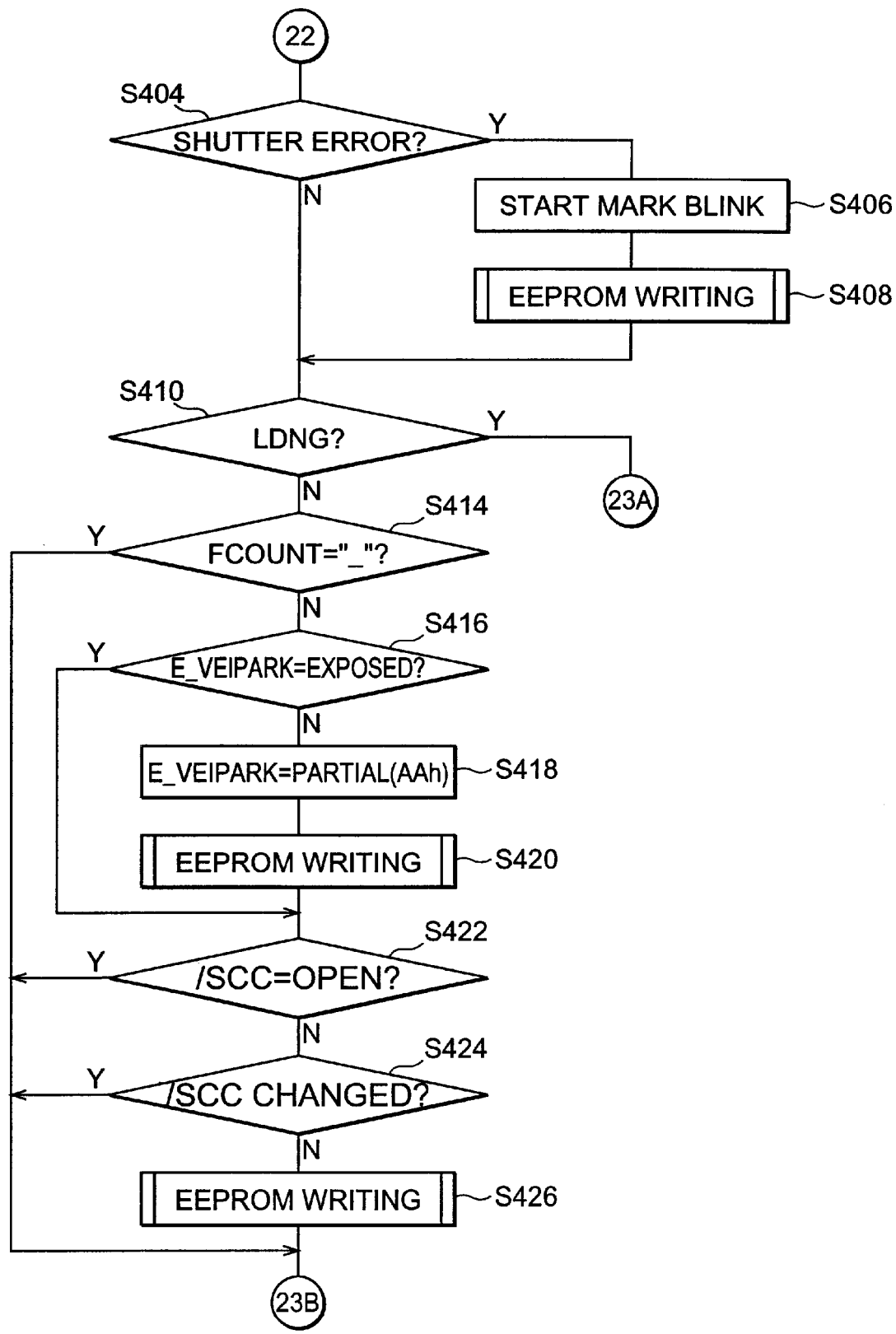
FIG. 23 is a flowchart of the release processing operation of the camera equipped with the lens barrel of FIG. 1.

As shown in S300 of FIG. 21, it is determined whether a lens barrel error flag is set in the RAM 202 or not. If it is determined that the lens barrel error flag is set, then the flow shifts to S462 in FIG. 25. If it is determined not, by contrast, then a shutter battery check is set (S302). Subsequently, a battery check processing operation is carried out (S304), and the shutter battery check is reset (S306).

Then, the flow shifts to S308, where it is determined whether the battery check is a failure or not. If the battery check is determined to be a failure, then the flow shifts to S462 in FIG. 25. If it is determined not, then a temperature measurement processing operation (S310), a photometric processing operation (S312), an AF (autofocus) processing operation (S314), an expansion calculating operation (S316), and an exposure calculating operation (S318) are carried out successively.

The temperature measurement processing operation is an operation for measuring temperature. The photometric processing operation is an operation for measuring the brightness of the outside. The AF processing operation is an operation for measuring the distance to the object. The expansion calculating operation is an operation for calculating the amount of movement of the second lens group 102 for focus adjustment according to the result of measurement of AF processing operation. The exposure calculating operation is an operation for calculating the exposure time caused by the shutter opening according to the result of measurement of photometric processing operation and the like, so as to calculate the strobe lighting time.

Subsequently, the flow shifts to S320, where it is determined whether the stroboscopic lighting is to be carried out or not. If it is determined not, then the flow shifts to S324. If it is determined that stroboscopic lighting is to be carried out, then it is determined whether the strobe is completely charged or not (S322). If it is determined that the strobe is not completely charged, then the flow shifts to S462 in FIG. 25.

If it is determined that the strobe is completely charged, then the flow shifts to S324, where it is determined whether the film count data (FCOUNT) is "null" or not. If it is determined that the film count data is "null," then the flow shifts to S328. If it is determined not, then the ISO sensitivity of film and the film type are displayed on the display section 13.

Subsequently, the flow shifts to S328, where the autofocus LED (AFLED) is lit. Then, after a wait of 100 .s (S330), the flow shifts to S332, where it is determined whether a short distance alarm is set or not.

If it is determined that the short distance alarm is set, then it is determined whether the autofocus LED (AFLED) is lit or not (S334). If it is determined that the AFLED is lit, then it is turned off (S336). If it is determined that the AFLED is not lit, then it is turned on (S338). As a consequence, the autofocus LED blinks until a switch SP2 is pushed or a switch SP1 is turned off.

Subsequently, the flow shifts to S340, where it is determined whether the switch SP1 is ON or not. The switch SP1 is a switch for detecting whether the shutter button 11 is half-pushed or not, and is turned on when the shutter button 11 is half-pushed.

Figure 25:
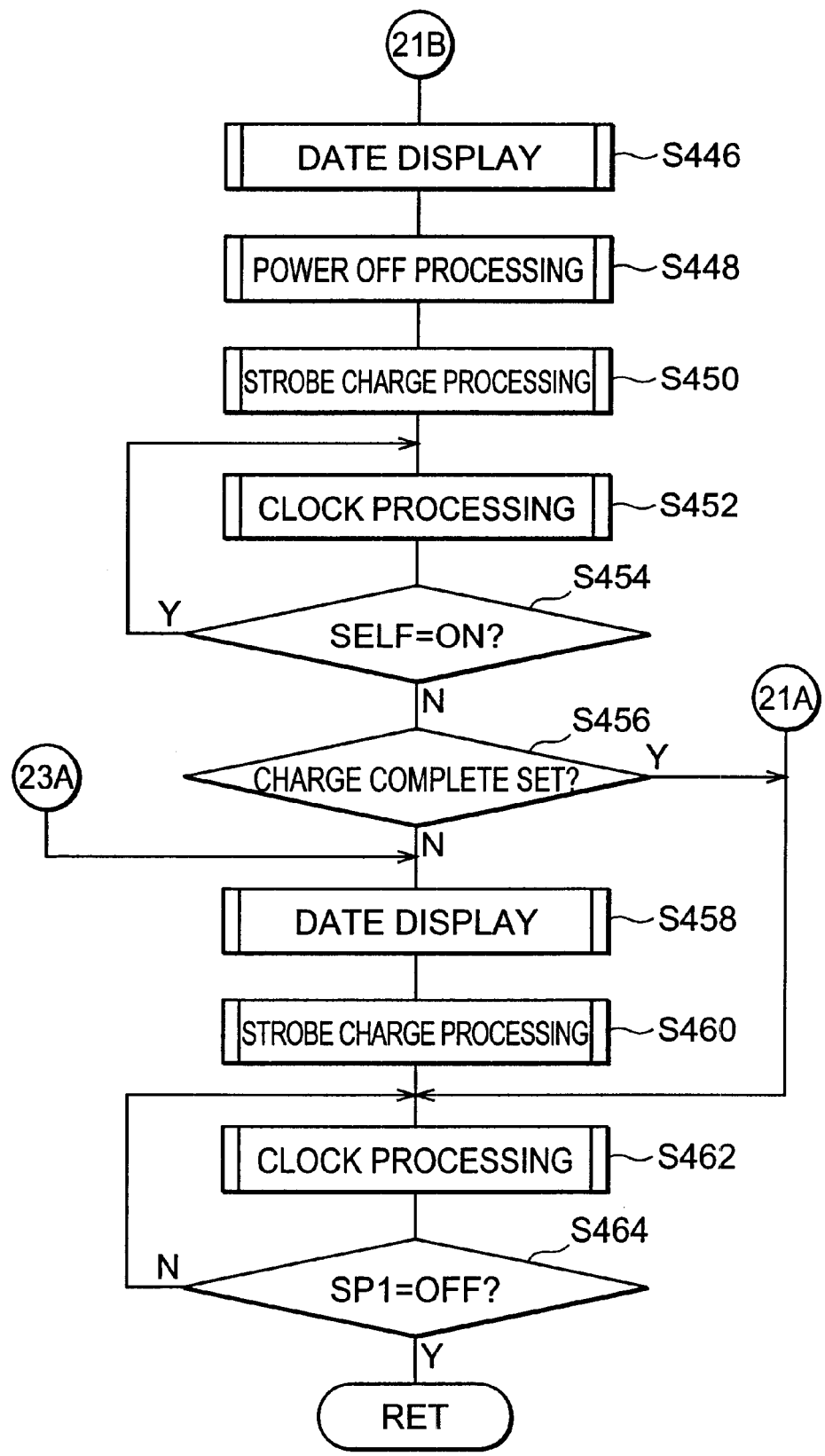
FIG. 25 is a flowchart of the release processing operation of the camera equipped with the lens barrel of FIG. 1.

If it is determined at S340 that the switch SP1 is not ON, then the autofocus LED is turned off (S344), and the flow shifts to S446 in FIG. 25. If it is determined that the switch SP1 is ON, then it is determined whether the switch SP2 is ON or not (S346). The switch SP2 is a switch for detecting whether the shutter button 11 is completely pushed or not, and is turned on when the shutter button 11 is completely pushed.

If it is determined at S346 that the switch SP2 is not ON, then the flow returns to S322. If it is determined that the switch SP2 is ON, by contrast, then the autofocus LED is turned off (S348), and the flow shifts to S350 in FIG. 22.

At S350, a lens drive processing operation (LD processing operation) is carried out. The lens drive processing operation is an operation for moving the whole lens barrel 1 or the second lens group 102 according to the result of the expansion calculating operation at S316 in FIG. 21. The details thereof will be explained later. Subsequently, the flow shifts to S352, where it is determined whether a lens barrel error flag is set or not. If it is determined that the lens barrel error flag is set, then the flow shifts to S386.

If it is determined that no lens barrel error flag is set, then it is determined whether a lens drive failure (LDNG) is set or not (S354). If it is determined that the lens drive failure is set, then the flow shifts to S356, where it is determined whether PI overtime is reached or not. The PI overtime means that overtime has occurred in the PI signal of the lens barrel motor or focus motor. If it is determined at S356 that the PI overtime is not reached, then the flow shifts to S386. If it is determined that the PI overtime is reached, by contrast, then the flow shifts to S358, where a lens return (LR) processing operation is carried out. The lens return processing operation is an operation by which the lens barrel 1 or second lens group 102 moved by the lens drive processing operation is returned to a predetermined wait position. The details thereof will be explained later. After the lens return processing at S358, the flow shifts to S386.

If it is determined at S358 that no lens drive failure is set, by contrast, then a PRE processing operation (S360), a CHP readout processing operation (S362), a power ON processing operation (S364), an exposure processing operation (S366), a power OFF processing operation (S368), and a power completion setting operation (S370) are carried out successively. The PRE processing operation is an operation for blinking the strobe before exposure depending on whether the photographing mode is a redeye alleviating mode or not. The CHP readout processing operation is an operation for reading out a selected print type. The exposure processing operation is an operation for releasing the shutter according to the result of the exposure calculating operation at S318 in FIG. 21.

Subsequently, the flow shifts to S372, where it is determined whether an exposure error has occurred or not. If it is determined not, then the shutter error is reset (S374). If it is determined that the exposure error has occurred, by contrast, then it is determined whether a certain value "N" is set as the film count data (FCOUNT) in EEPROM 218 or not (S376).

If it is determined that the certain value "N" is not set as the film count data, then the flow shifts to S374. If it is determined that the certain value "N" is set as the film count data, by contrast, then 1 is added to the data of the shutter error count (S378). Subsequently, the flow shifts to S380, where it is determined whether the shutter error count is at least a predetermined set value or not. If it is determined that the shutter error count is not at least the predetermined set value, then the flow shifts to S374. If it is determined that the shutter error count is at least the predetermined set value, by contrast, then a shutter error is set (S382), and the error writing is set (S384).

Subsequently, the flow shifts to S386, where a lens return processing operation is carried out. Next, it is determined whether an exposure error has occurred or not (S388). If it is determined not, the flow shifts to S390, where it is determined whether a lens barrel error has occurred or not. If it is determined that no lens barrel error has occurred, then the flow shifts to S398. If it is determined at S388 that the exposure error has occurred, and it is determined at S390 that the lens barrel error has occurred, then it is determined whether the photographing mode of the camera 2 is a distant view mode (INF) or a night view mode (NVP) or not (S392, S394). If it is determined that the photographing mode of the camera 2 is the distant view mode (INF) or night view mode (NVP), then the photographing mode is set to a normal mode (DP mode) and is displayed on the display section 13 (S396). If the photographing mode of the camera 2 is neither the distant view mode (INF) nor the night view mode (NVP), then the flow shifts to S398.

A clock processing operation is carried out at S398. Then, a date display operation (S400) and an error writing processing operation (S402) are carried out. Subsequently, it is determined whether a shutter error has occurred or not (S404). If it is determined that no shutter error has occurred, then the flow shifts to S410. If it is determined that the shutter error has occurred, then a predetermined mark is blinked on the display section 13 (S406), whereby a user and the like can see the shutter error.

Subsequently, the flow shifts to S408, where "exposed" is written as data of the VEI processing stop position into the EEPROM 218, and the value set as the film count data (FCOUNT) in the RAM 202 is written into the EEPROM 218.

Then, the flow proceeds to S410, where it is determined whether a lens drive failure exists or not. If it is determined that the lens drive failure exists, then the flow proceeds to S458 in FIG. 25. If it is determined not, by contrast, then the flow proceeds to S414, where it is determined whether the film count data (FCOUNT) is "null" or not. If it is determined to be "null," then the flow shifts to S428 in FIG. 24. If it is determined not, by contrast, then it is determined whether the VEI processing stop position (E_VEIPARK) is "exposed" or not (S416).

If the VEI processing stop position is determined to be "exposed" here, then the flow shifts to S422. If it is determined not, by contrast, then "partial" is set as data of the VEI processing stop position (S418), and the data set in the RAM 202 is written into the EEPROM 218 as data of the VEI processing stop position, and the value set in the RAM 202 is written as the film count data (FCOUNT) into the EEPROM 218 (S420).

Subsequently, the flow shifts to S422, where it is determined whether the cartridge lid 21 is open (SCC=open) or not. If it is determined that the cartridge lid 21 is open, then the flow shifts to S428 in FIG. 24. If it is determined not, then it is determined whether the opening/closing of the cartridge lid 21 has changed (SCC change exists) or not (S424).

Figure 24:
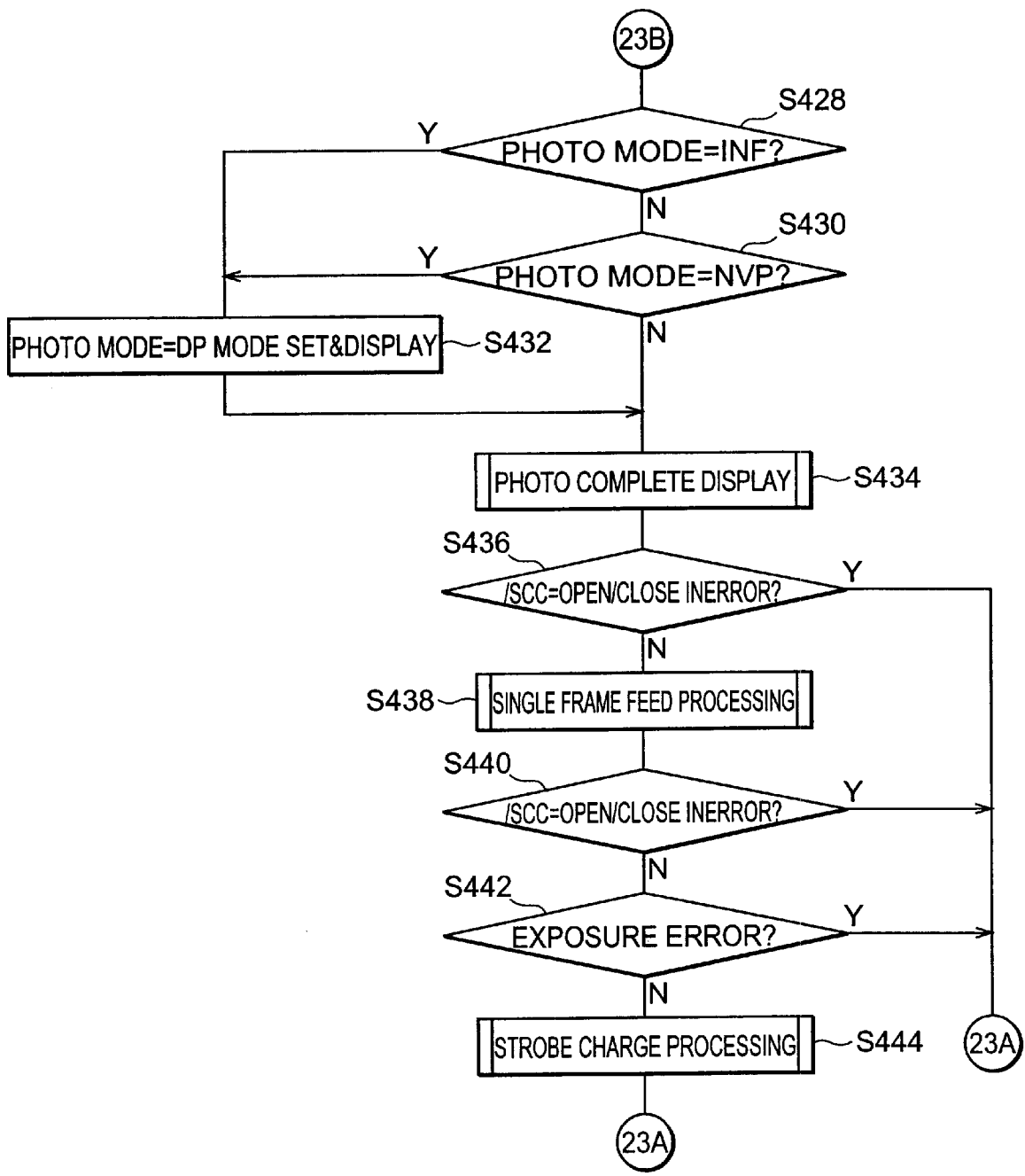
FIG. 24 is a flowchart of the release processing operation of the camera equipped with the lens barrel of FIG. 1.

If it is determined that the opening/closing of the cartridge lid 21 has changed, then the flow shifts to S428 in FIG. 24. If it is determined not, then the flow shifts to S426, where "during frame advance upon photographing" is written into the EEPROM 218 as the feed state data (FSTATE) of the camera 2, and the film count data set in the RAM 202 is written into the EEPROM 218 as the film count data (S72).

Subsequently, the flow shifts to S428 in FIG. 24, where it is determined whether the photographing mode of the camera 2 is the distant view mode (INF) or night view mode (NVP) or not (S428, S430). If it is determined that the photographing mode of the camera 2 is the distant view mode (INF) or night view mode (NVP), then the photographing mode is set to the normal mode (DP mode) and is displayed on the display section 13 (S432). If the photographing mode of the camera 2 is neither the distant view mode (INF) nor the night view mode (NVP), then the flow shifts to S434.

At S434, a photographing complete display is carried out. The photographing complete display is carried out by lighting the autofocus LED (AFLED) and the self-mode LED (SELFLED). Subsequently, it is determined whether the cartridge lid 21 is erroneously opened/closed or not (S436). If it is determined that the cartridge lid 21 is erroneously opened/closed, then the flow shifts to S458 in FIG. 25. If it is determined not, by contrast, then a single frame feed processing operation is carried out (S438).

Subsequently, it is determined whether the cartridge lid 21 is erroneously opened/closed or not (S440). If it is determined that the cartridge lid 21 is erroneously opened/closed, then the flow shifts to S458 in FIG. 25. If it is determined that the cartridge lid 21 is not erroneously opened/closed, then it is determined whether an exposure error has occurred or not (S442). If it is determined that the exposure error has occurred, then the flow shifts to S458 in FIG. 25. If it is determined not, by contrast, then a strobe charge processing operation is carried out (S444).

At S446 in FIG. 25, a date display operation is carried out. Subsequently, after a power OFF processing operation (S448), a strobe charge processing operation (S450), and a clock processing operation (S452), it is determined whether the self switch is ON or not (S454). If it is ON, then the flow returns to S452. If it is not ON, then the flow shifts to S456, where it is determined whether charge completion is set or not.

If it is determined that the charge completion is set, then the flow shifts to S462. If it is determined not, then the flow shifts to S458.

At S458, a date display operation is carried out. Subsequently, after a strobe charge processing operation (S460) and a clock processing operation (S462), it is determined whether the half pushing of the shutter button is cleared (SP1 is OFF) or not (S464). If it is determined not, then the flow returns to S462. If it is determined that the half pushing of the shutter button is cleared, then the release processing operation is terminated.

A main switch processing operation will now be explained.

Figure 26:
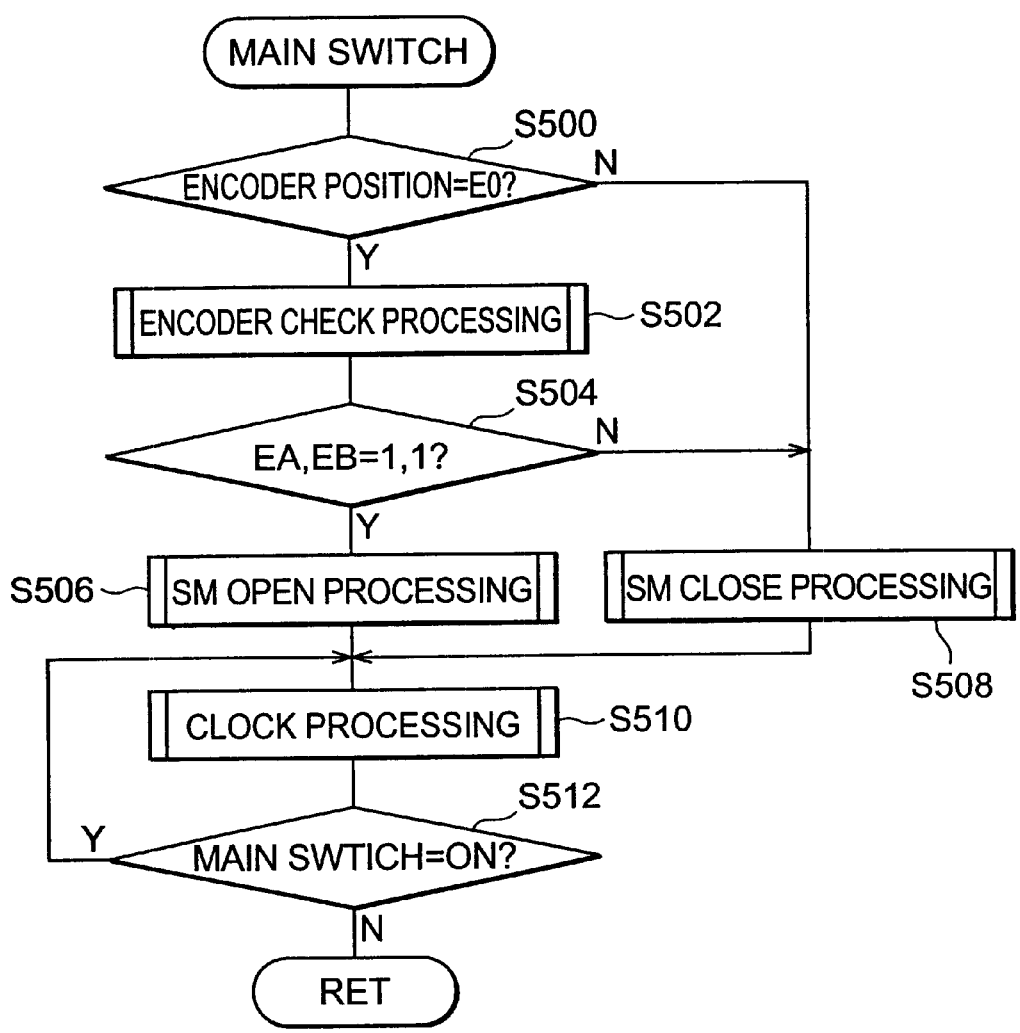
FIG. 26 is a flowchart of a main switch processing operation of the camera equipped with the lens barrel of FIG. 1.

FIG. 26 shows a flowchart of the main switch processing operation. The main switch processing operation is an operation carried out when the main switch 16 is manipulated.

As shown at S500 in FIG. 26, it is determined whether the encoder position is at an encoder code E0 or not. Here, "encoder position is at an encoder code E0" refers to a state where the lens barrel 1 is collapsed into the main body 3 whereas the barrier 83 is closed. If it is determined that the encoder position is not at the encoder code E0, then the flow shifts to S508. If it is determined that the encoder position is at the encoder code E0, then an encoder check processing operation is carried out (S502). As mentioned above, the encoder check processing operation is an operation for reading out terminals EA, EB of an encoder installed in the lens barrel 1 in order to determine the current lens barrel position.

Subsequently, the flow shifts to S504, where it is determined whether both of the terminals EA, EB detected in the encoder check processing operation are at 1 or not. If both of the terminals EA, EB are not at 1, then the flow shifts to S508, where an SM close processing operation is carried out. The SM close processing operation is an operation for collapsing the lens barrel 1 into the main body 3 and closing the barrier 83. This operation will be explained later in detail. If it is determined that both of the terminals EA, EB are at 1, then an SM open processing operation is carried out (S506). The SM open processing operation is an operation for opening the barrier 83. This operation will be explained later in detail.

Subsequently, the flow shifts to S510, where a clock processing operation is carried out, and then it is determined whether the main switch is pushed or not (S512). If it is determined that the main switch is pushed, then the flow returns to S510. If it is determined not, by contrast, then the main switch processing operation is terminated.

The SM open processing operation will now be explained.

Figure 27:
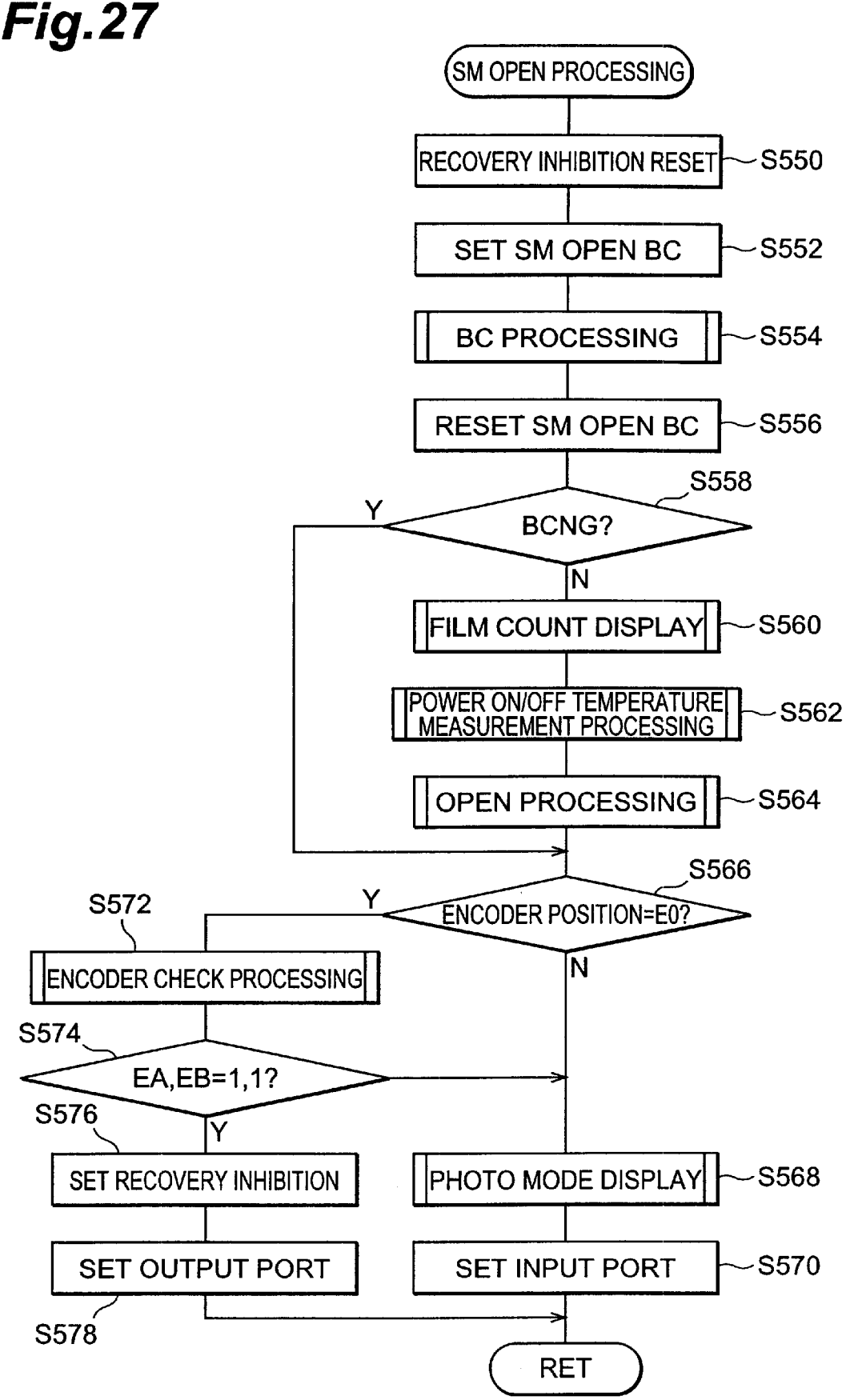
FIG. 27 is a flowchart of an SM open processing operation of the camera equipped with the lens barrel of FIG. 1.

FIG. 27 shows a flowchart of the SM open processing operation. The SM open processing operation carries out an operation for opening the barrier and the like when the main switch 16 is manipulated.

As shown at S550 in FIG. 27, a recovery inhibition flag is reset, and then an SM open battery check flag is set (S552). Subsequently, a battery check processing operation is carried out (S554), and the SM open battery check flag is reset.

Thereafter, it is determined whether the battery check is a failure or not. If it is determined to be a failure, then the flow shifts to S566. If it is determined not, by contrast, then a film count display (S560), a power ON/OFF temperature measurement processing operation (S562), and an open processing operation (S564) are carried out. The open processing operation is an operation for opening the barrier, which will be explained later in detail.

Subsequently, the flow shifts to S566, where it is determined whether the encoder position is at the encoder code E0 or not. If it is determined not, then it is considered that the open processing operation is carried out normally, whereby the flow shifts to S508, where a photographing mode display operation is carried out. Here, "photographing mode display" refers to the display of a mark indicative of the selected photographing mode. For example, no display is made in the auto mode, whereas an eye mark is displayed in the redeye alleviating mode.

Subsequently, the flow shifts to S570, where an input port for the switch group 212 (see FIG. 16) is set. Setting the input port allows each switch to input.

If it is determined at S566 that the encoder position is not at the encoder code E0, then it is considered that the barrier 83 is not normally opened by the open processing operation, whereby an encoder check processing operation is carried out (S572). Subsequently, it is determined whether both of the terminals EA, EB detected in the encoder check processing operation are at 1 or not (S574). If it is determined that both of the terminals EA, EB are not at 1, then the flow shifts to S568. If it is determined that both of the terminals EA, EB are at 1, then the recovery inhibition flag is set (S576). Subsequently, the flow shifts to S578, where an output port is set for the switch group 212 (see FIG. 16). Setting the output port inhibits each switch from inputting. After the operations of S578 and S570, the SM open processing operation is terminated.

The SM close processing operation will now be explained.

Figure 28:
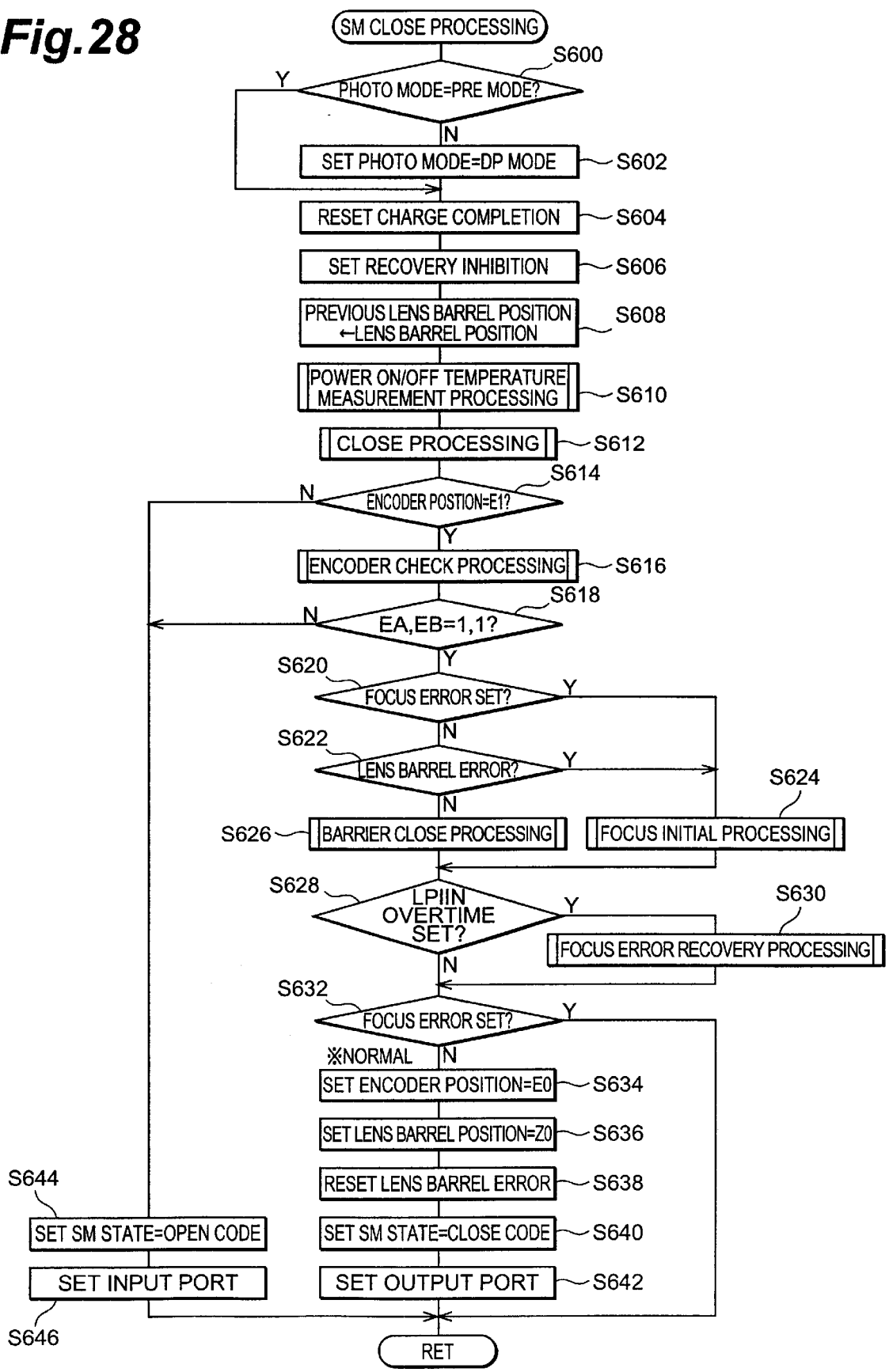
FIG. 28 is a flowchart of an SM close processing operation of the camera equipped with the lens barrel of FIG. 1.

FIG. 28 shows a flowchart of the SM close processing operation. The SM close processing operation is an operation for collapsing the lens barrel 1 into the main body 3 and closing the barrier when the main switch 16 is manipulated, and so forth.

As shown at S600 in FIG. 28, it is determined whether the photographing mode is the redeye alleviating mode (PRE mode) or not. If it is determined that the photographing mode of the camera 2 is the redeye alleviating mode, then the flow shifts to S604. If it is determined not, by contrast, then the photographing mode is set to the normal mode (DP mode) (S602).

Subsequently, the flow shifts to S604, where a charge completion flag is reset, and then a recovery inhibition flag is set (S606). Thereafter, the current lens barrel position data is set as the previous lens barrel position data (S608), a power ON/OFF temperature measurement processing operation is carried out (S610), and a close processing operation is carried out (S612). The close processing operation is an operation for collapsing the lens barrel 1 into the main body 3, which will be explained later in detail.

Subsequently, the flow shifts to S614, where it is determined whether the encoder position is at an encoder code E1 or not. Here, "encoder position is at an encoder code E1" refers to a state where the lens barrel 1 is collapsed into the main body 3 whereas the barrier 83 is open. If it is determined that the encoder position is not at the encoder code E1, then the flow shifts to S644, where an open code is set as the main switch state, whereby an input port is set for the switch group 212 (see FIG. 16) (S646).

If it is determined at S614 that the encoder position is at the encoder code E1, then an encoder check processing operation is carried out (S616). Subsequently, the flow shifts to S618, where it is determined whether both of the terminals EA, EB detected in the encoder check processing operation are at 1 or not. If it is determined that both of the terminals EA, EB are not at 1, then the flow shifts to S644.

If it is determined that both of the terminals EA, EB are not at 1, by contrast, then it is determined whether a focus error is set or not (S620). If it is determined that the focus error is set, then the flow shifts to S624, where a focus initial processing operation is carried out. The focus initial processing operation is an operation for checking where the second lens group 102 (focus) is located and carrying out the barrier close processing operation. The barrier close processing operation is an operation for closing the barrier 83. The focus initial processing operation and the barrier close processing operation will be explained later in detail. If it is determined at S620 that no focus error is set, by contrast, then it is determined whether a lens barrel error is set or not (S622).

If it is determined that the lens barrel error is set, then the flow shifts to S624. If it is determined not, by contrast, then a barrier close processing operation is carried out (S626).

Subsequently, the flow shifts to S628, where it is determined whether the LPIIN overtime is set or not. If it is determined that the LPIIN overtime is set, then a focus error recovery processing operation is carried out (S630). If it is determined not, by contrast, then it is determined whether a focus error is set or not (S632). If it is determined that the focus error is set, then the SM close processing operation is terminated. If it is determined that no focus error is set, by contrast, then E0 is set as encoder position data (S634), Z0 is set as lens barrel position data (S636), the lens barrel error is reset (S638), and the close code is set as the main switch condition (SM state) (S640).

Subsequently, the flow shifts to S642, where an output port for the switch group 212 (see FIG. 16) is set. Setting this output port inhibits each switch from inputting. After the operations of S642 and S646, the SM close processing operation is terminated.

The standby processing operation will now be explained.

Figure 29:
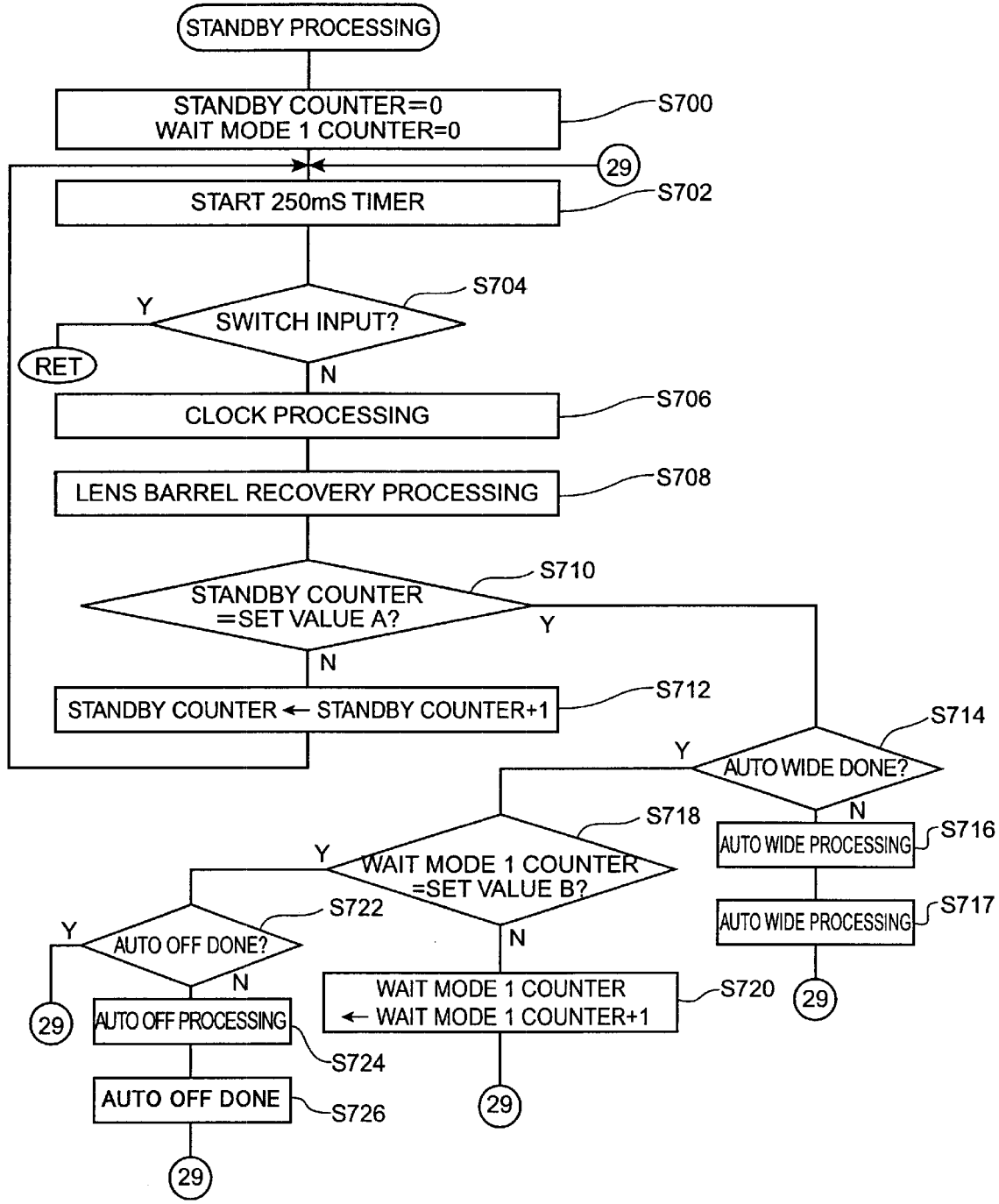
FIG. 29 is a flowchart of a standby processing operation of the camera equipped with the lens barrel of FIG. 1.

FIG. 29 shows a flowchart of the standby processing operation. The standby processing operation is carried out when there is no switch manipulation after each switch processing operation and the like.

As shown at S700 in FIG. 29, 0 is set as the value for the standby counter and wait mode 1 counter. Subsequently, after a 250-ms timer is started at S702, it is determined whether there is a switch input or not (S704). If it is determined that there is a switch input, then the standby processing operation is terminated, whereby the flow shifts to its corresponding switch processing operation.

If it is determined at S704 that there is no switch input, then a clock processing operation (S706) and a lens barrel recovery check processing operation (S708) are carried out successively. The lens barrel recovery check processing operation will be explained later in detail.

Subsequently, the flow shifts to S710, where it is determined whether or not the standby counter is at a predetermined set value A which is set beforehand. As the set value A, a value corresponding to 5 minutes is set, for example. If it is determined that the standby counter A is not at the set value A, then 1 is added to the value of standby counter (S712), and the flow returns to S702. If it is determined that the standby counter is at the predetermined set value A, by contrast, then it is determined whether an auto WIDE done flag is set or not (S714).

If it is determined that the auto WIDE done flag is not set, then an auto WIDE processing operation is carried out (S716). The auto-WIDE processing operation will be explained later in detail. Subsequently, the flow shifts to S717, where the auto WIDE done flag is set, and the flow returns to S702.

If it is determined at S714 that the auto WIDE done flag is set, then it is determined whether or not the wait mode 1 counter is at a predetermined set value set beforehand (S718). As the set value B, a value corresponding to 8 to 10 minutes is set, for example. If it is determined that the wait mode 1 counter is not at the set value B, then 1 is added to the wait mode 1 counter (S720), and the flow returns to S702.

If it is determined at S718 that the wait mode 1 counter is at the set value B, then it is determined whether an auto OFF done flag is set or not. If it is determined that the auto OFF done flag is set, then the flow returns to S702. If it is determined that no auto OFF done flag is set, then an auto OFF set processing operation is carried out (S724). The auto OFF processing operation is an operation for collapsing the lens barrel 1 into the main body 3 and closing the barrier as with the SM close processing operation. Subsequently, the flow shifts to S726, where the auto OFF done flag is set, and the flow returns to S702.

The auto WIDE processing operation will now be explained.

Figure 30:
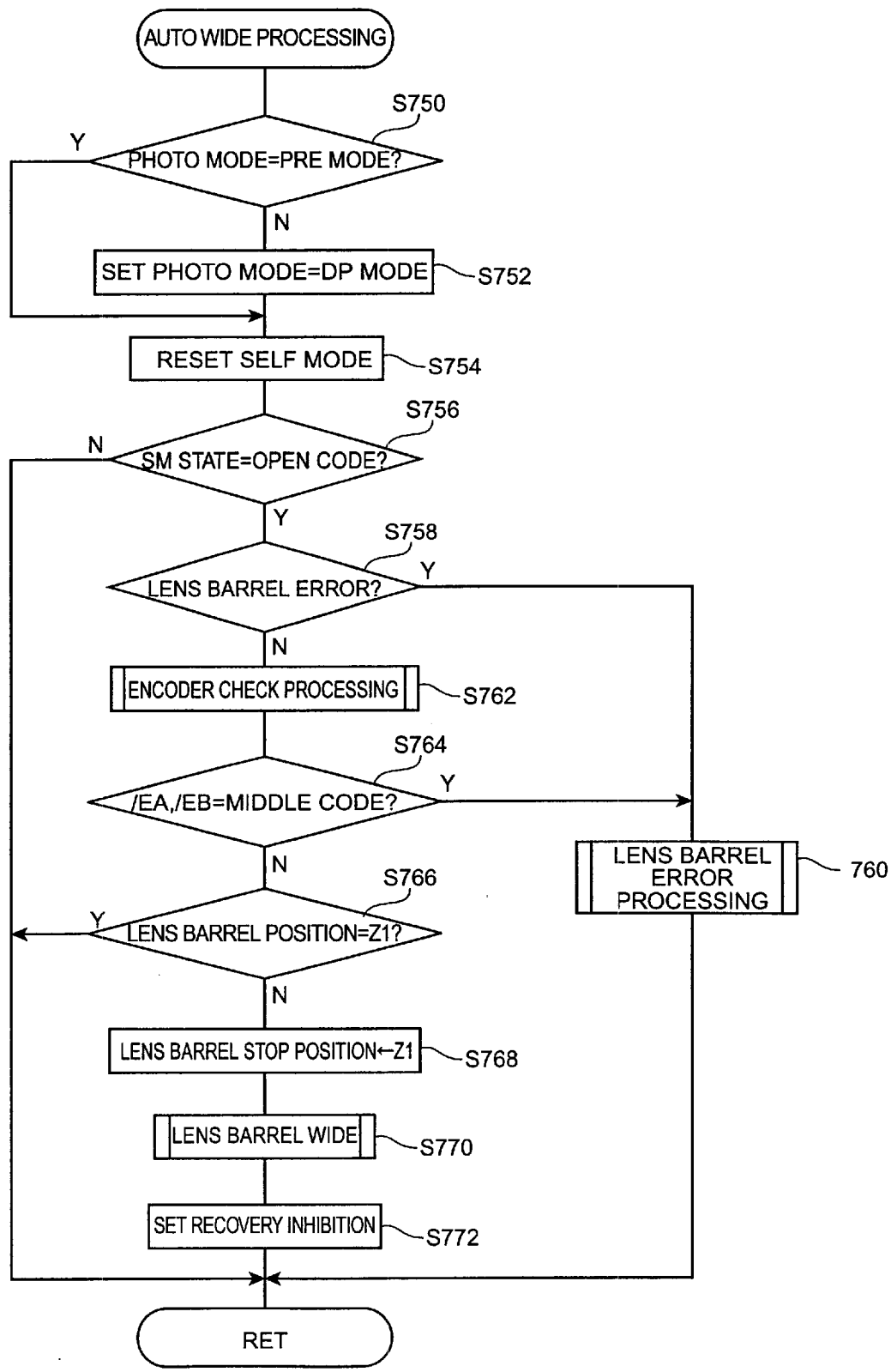
FIG. 30 is a flowchart of an auto WIDE processing operation of the camera equipped with the lens barrel of FIG. 1.

FIG. 30 shows a flowchart of the auto WIDE processing operation. The auto WIDE processing operation is an operation carried out when a predetermined time has elapsed without any switch manipulation while the camera 2 is in the standby state.

As shown at S750 in FIG. 30, it is determined whether the photographing mode of the camera 2 is the redeye alleviating mode (PRE mode) or not. If it is determined that the photographing mode of the camera 2 is the redeye alleviating mode, then the flow shifts to S754. If it is determined not, by contrast, then the photographing mode is set to the normal mode (DP mode) (S752).

Subsequently, the flow shifts to S754, where the self mode is reset, and it is determined whether an open code is set as the main switch state or not (S756). If it is determined not, then the auto WIDE processing operation is terminated. If it is determined that the open code is set, by contrast, then it is determined whether a lens barrel error is set or not (S758). If it is determined that the lens barrel error is set, then a lens barrel error processing operation is carried out (S760). The lens barrel error processing operation is an operation for collapsing the lens barrel 1 into the main body 3, closing the barrier, and then verifying the encoder position.

If no lens barrel error is set at S758, then an encoder check processing operation (S762) is carried out, and thereafter it is determined whether the encoder terminals EA, EB are at a middle code or not (S764). Here, "middle code" is a code allocated to the terminals EA, EB when the lens barrel expanding position is located between predetermined zoom code (Zn) and zoom code (Zn+1).

If it is determined at S764 that the encoder terminals EA, EB are at a middle code, then the flow shifts to S760. If it is determined not, by contrast, then it is determined whether the lens barrel position is at the zoom code Z1 or not (S766). If it is determined that the lens position is at the zoom code Z1, then the auto WIDE processing operation is terminated. If it is determined not, then Z1 is set as the lens barrel stop position (5768).

Subsequently, the flow shifts to S770, where the lens barrel 1 is collapsed to the position of zoom code Z1 (hereinafter simply referred to as "Z1" when appropriate). Then, the recovery inhibition is set, whereby the auto WIDE processing operation is terminated.

The lens barrel recovery check processing operation will now be explained.

Figure 31:
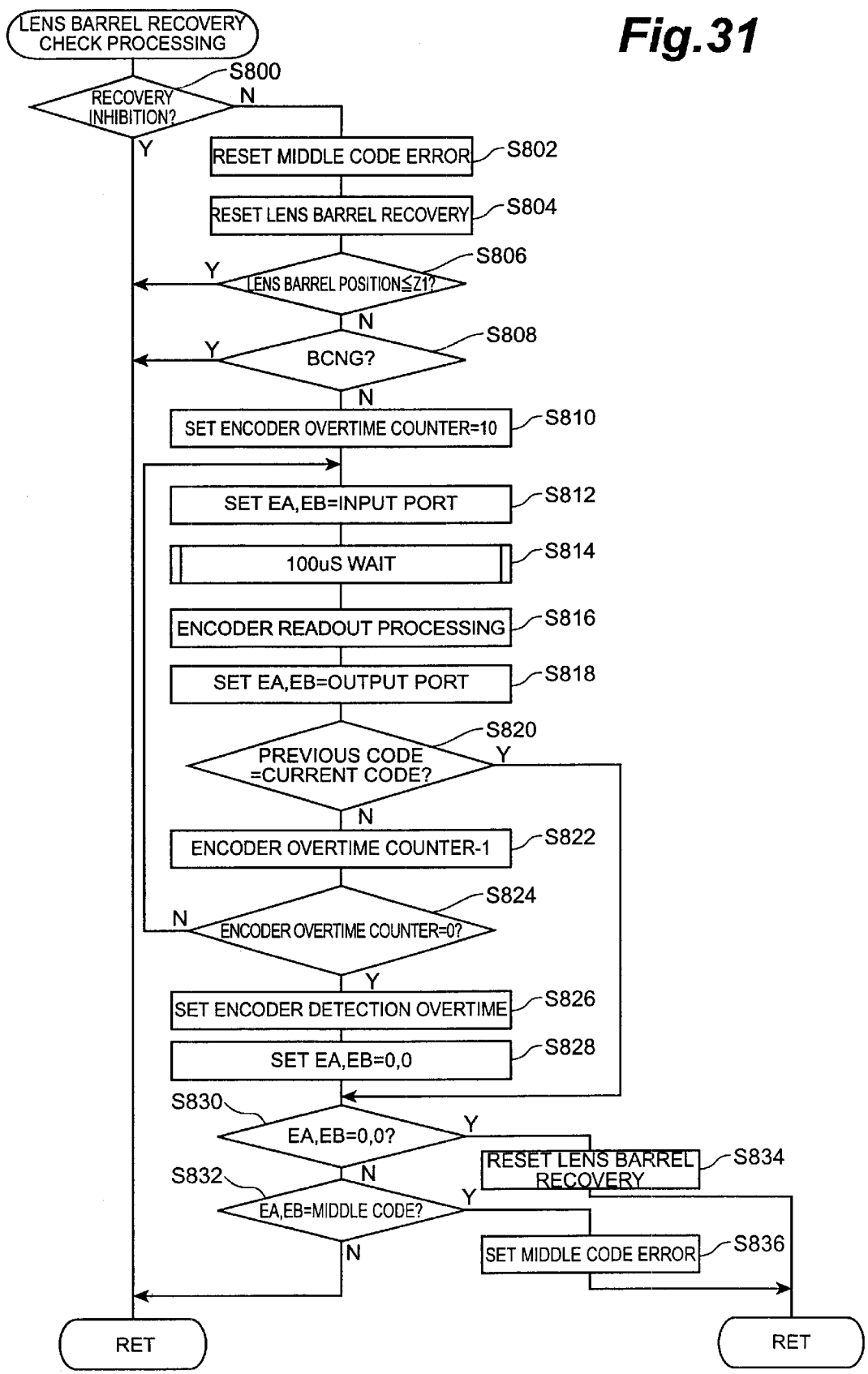
FIG. 31 is a flowchart of a lens barrel recovery check processing operation of the camera equipped with the lens barrel of FIG. 1.

FIG. 31 shows a flowchart of the lens barrel recovery check processing operation. The lens barrel recovery check processing operation is an operation, carried out when the camera 2 is in the standby state, for reading out the encoder every 250 ms and driving the lens barrel if the positional state of the lens barrel has been moved to a position other than the zoom code.

As shown at S800 in FIG. 31, it is determined whether a recovery inhibition flag is set or not. If the recovery inhibition flag is set, then the lens barrel recovery check processing operation is terminated. If no recovery inhibition flag is set, by contrast, then a middle code error is reset (S802), and the lens barrel recovery is reset (S804).

Subsequently, it is determined whether the lens barrel position is at Z1 or not (S806). If it is determined that the lens barrel position is at Z1, then the lens barrel recovery check processing is terminated since the recovery is impossible. If it is determined not, then it is determined whether the battery check is a failure or not (S808).

If it is determined at S808 that the battery check is a failure, then the lens barrel recovery check processing operation is terminated. If it is determined that the battery check is not a failure, then the encoder overtime counter is set to 10 (S810), the encoder terminals EA, EB are set to the input port (S812), and then, after a wait of 100 .s (S814), the encoder terminals EA, EB are read out (S816).

Subsequently, the encoder terminals EA, EB are set to the output port (S818), and it is determined whether the previous code in the encoder and the currently read-out code coincide with each other or not (S820). If it is determined that these codes coincide with each other, then the flow shifts to S830. If they do not coincide with each other, then 1 is subtracted from the value of encoder overtime counter (S822), and it is determined whether the value of encoder overtime counter is 0 or not (S824). If it is determined that the value of encoder overtime counter is not 0, then the flow returns to S812.

If it is determined that the value of encoder overtime counter is 0, by contrast, then the flow shifts to S826, where the encoder detection overtime is set, and subsequently both of the encoder terminals EA, EB are set to 0 (S828).

Thereafter, the flow shifts to S830, where it is determined whether both of the encoder terminals EA, EB are at 0 or not. If it is determined that at least one of the encoder terminals EA, EB is not at 0, then it is determined that whether the terminals EA, EB are at a middle code or not (S832). If it is determined that the terminals EA, EB are not at the middle code, then the lens barrel recovery check processing operation is terminated. If it is determined that the terminals EA, EB are at the middle code, then the middle code error flag is set (S836), and the lens barrel recovery check processing operation is terminated.

If it is determined at S830 that at least one of the encoder terminals EA, EB is at 0, then it is considered that the lens barrel is out of the zoom code Zn, whereby the lens barrel recovery flag is set (S834), and the lens barrel recovery check processing operation is terminated.

In the lens barrel recovery check processing operation, as in the foregoing, the encoder is read out every 250 ms, and a state is set for driving the lens barrel if the lens barrel is moved to a position other than the zoom code, whereby it is detected if the lens barrel 1 is drawn out or pushed in because of external reasons.

The outline of motor control logic and lens barrel operations will now be explained.

Figure 32:
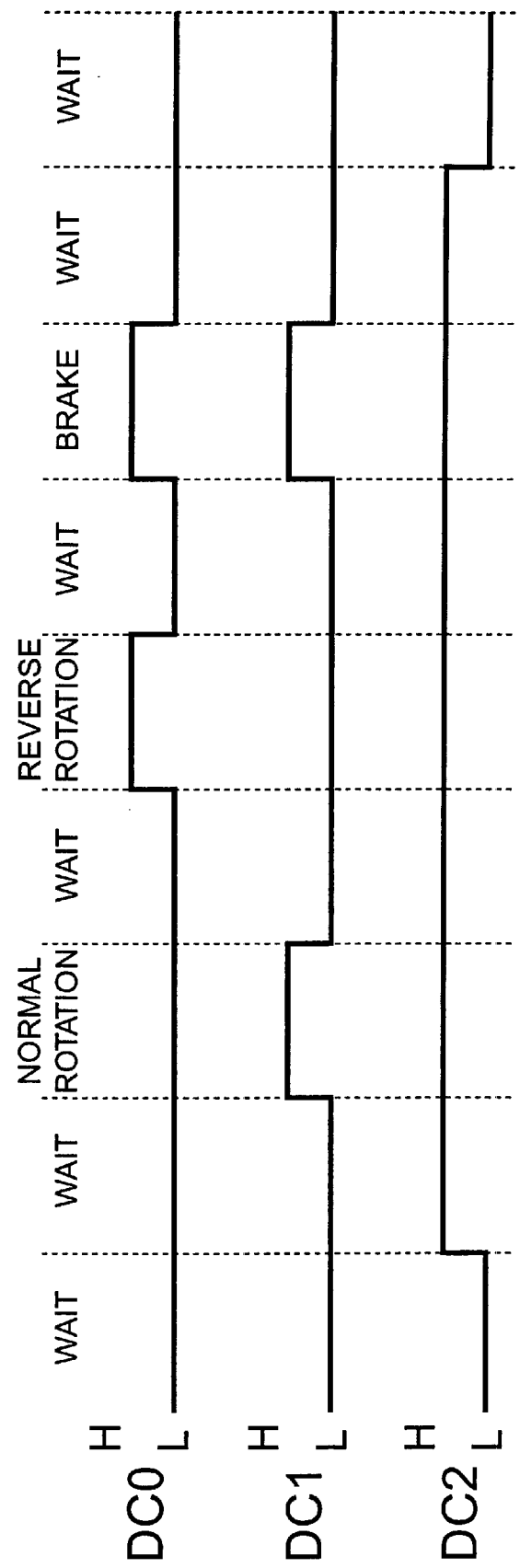
FIG. 32 is an explanatory view of control signals for a lens barrel driving motor and a second lens group driving motor in the camera equipped with the lens barrel of FIG. 1.

FIG. 32 shows control signals in a lens barrel driving motor and a second lens group driving motor. The lens barrel driving motor and the second lens group driving motor are driven by driving signals outputted from the driver section 219 according to control signals from the CPU 200.

After the motor to drive is selected according to a selection signal outputted from the driver ON/OFF terminal CE of the CPU 200, details of the driving of the lens barrel driving motor and second lens group driving motor are determined according to the logic outputted from the parallel terminals DC0, DC1, DC2.

For example, in the case where DC0, DC1, and DC2 are at 0 and the case where DC0 is at 0, DC1 is at 0, and DC2 is at 1, the lens driving motor 95 or the second lens group driving motor 227 is in a wait state as shown in FIG. 32. In the case where DC0 is at 0 whereas DC1 and DC2 are at 1, the motor is driven to rotate normally, i.e., in the TELE direction. In the case where DC0 is at 1, DC1 is at 0, and DC2 is at 1, the motor is driven to rotate in reverse, i.e., in the WIDE direction. In the case where DC0, DC1, and DC2 are at 1, a braking operation is carried out.

Figure 33:
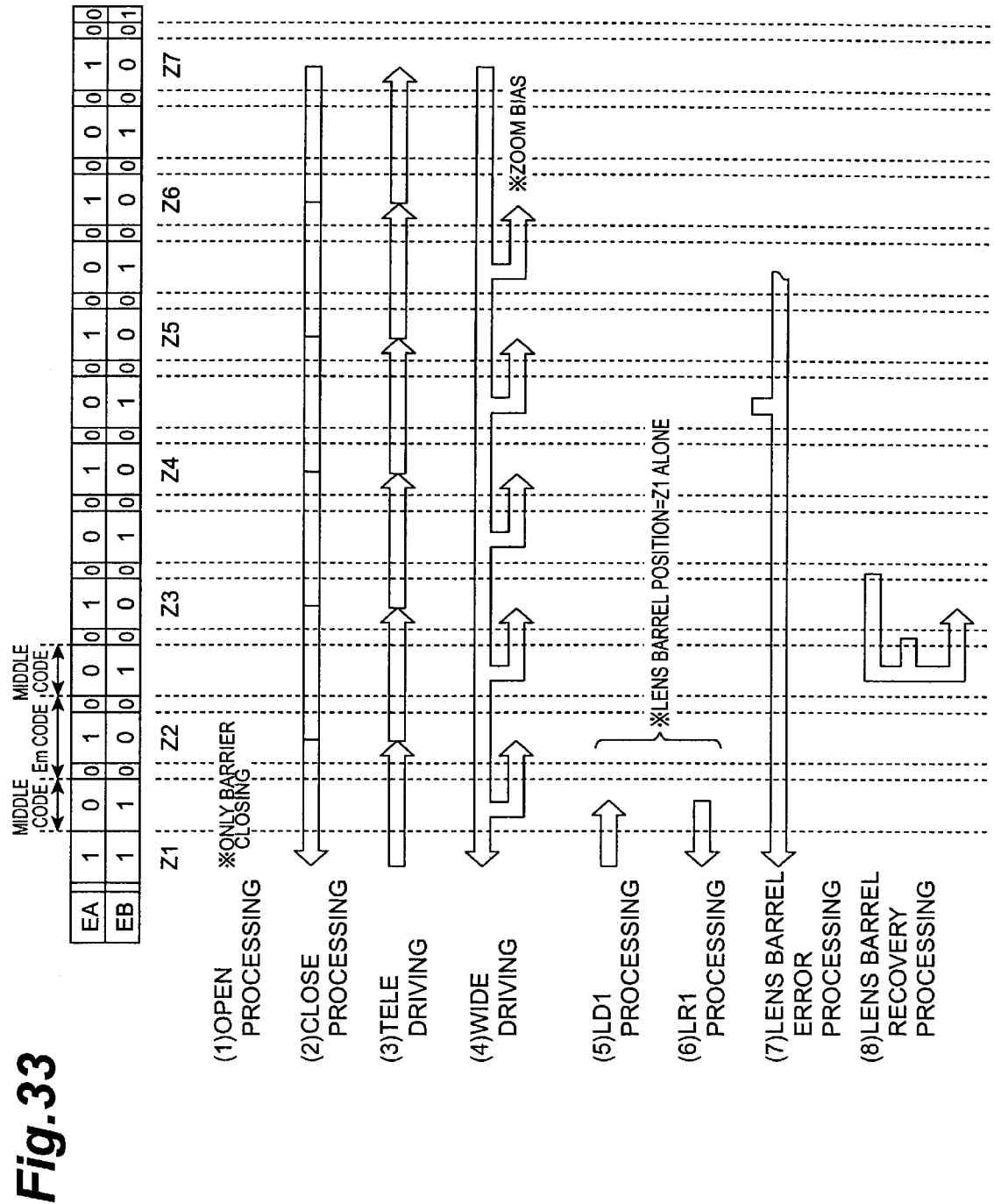
FIG. 33 is a schematic explanatory view of operations in the lens barrel of FIG. 1.

FIG. 33 shows an outline of operations of the lens barrel 1.

As shown in this chart, a stoppable position upon zoom-driving of the lens barrel 1 is at zoom codes Zn. As the zoom codes Zn, Z1 to Z7 are set, for example. Em codes of the encoder are allocated so as to correspond to the zoom codes Z1 to Z7, respectively. Em codes of E0 and E1 are allocated to the zoom code Z1. The code E0 is a code in the case where the lens barrel is stopped at the zoom code Z1 whereas the barrier 83 is closed. The code E1 is a code in the case where the lens barrel is stopped at the zoom code Z1 whereas the barrier 83 is open.

Em codes of E2, E3, E4, E5, E6, and E7 are allocated to the zoom codes Z2, Z3, Z4, Z5, Z6, and Z7, respectively. Middle codes are allocated to the intervals between the individual zoom codes Zn.

As shown in (1) of FIG. 33, the open processing operation is an operation for opening the barrier 83 alone without carrying out driving for expanding the lens barrel 1 and so forth. As shown in (2) of this chart, the close processing operation carries out driving from any zoom code Zn to Z1 and closes the barrier 83. As shown in (3) of this chart, the TELE driving operation carries out driving for expanding the lens barrel from any zoom code Zn. As shown in (4) of this chart, the WIDE driving operation carries out driving for collapsing the lens barrel from any zoom code Zn. In this case, the lens barrel once passes the zoom code Zn to be stopped at and then is stopped as being driven from the WIDE side, i.e., zoom biasing is carried out.

As shown in (5) of this chart, the lens drive 1 processing operation carries out driving for expanding the whole lens barrel from Z1. As shown in (6) of this chart, the lens return 1 processing operation carries out driving for causing the lens barrel expanded from Z1 to collapse to Z1. As shown in (7) of this chart, the lens barrel error processing operation carries out driving for causing the lens barrel moved to the middle code to collapse to Z1, and closes the barrier 83. As shown in (8) of this chart, the lens barrel recovery processing operation carries out driving by which, when the lens barrel is moved out of the zoom code Zn onto any of the codes at both ends, the lens barrel is returned to the initial zoom code Zn.

The open processing operation will now be explained.

Figure 34:
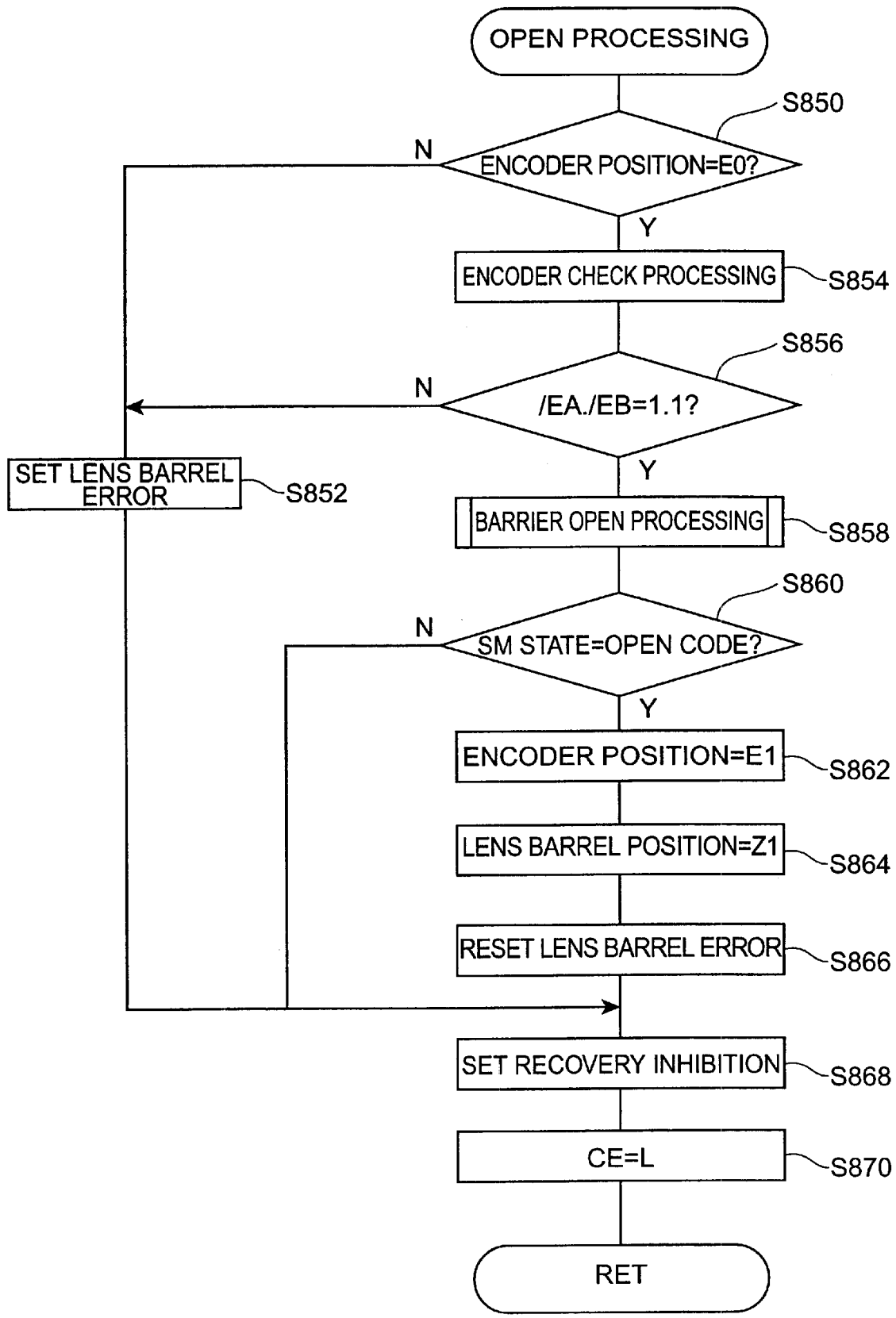
FIG. 34 is a flowchart of an open processing operation of the camera equipped with the lens barrel of FIG. 1.

FIG. 34 shows a flowchart of the open processing operation. The open processing operation is an operation for opening the barrier 83 as the main switch 16 is manipulated.

As shown at S850 in FIG. 34, it is determined whether the encoder position is at the code E0 or not. If it is determined not, then the flow shifts to S852, where a lens barrel error flag is set, and further to S868. If it is determined that the encoder position is at the code E0, by contrast, then the encoder check processing operation is carried out (S854).

Subsequently, the flow shifts to S856, where it is determined whether both of the terminals EA, EB are at 1 or not. If it is determined not, then the flow shifts to S852. If it is determined that both of the terminals EA, EB are at 1, then a barrier open processing operation is carried out (S858). The barrier open processing operation is an operation for driving the motor 95 of the focus driving section 212 so as to open the barrier 83. The barrier open processing operation will be explained later in detail.

Subsequently, the flow shifts to S860, where it is determined whether the open code is set as the main switch state or not. If it is determined not, then it is considered that the barrier 83 is not open, whereby the flow shifts to S868. If it is determined that the open code is set, then E1 is set as the encoder position (S862), Z1 is set as the lens barrel position (S864), and the lens barrel error flag is reset (S866).

Thereafter, the flow shifts to S868, where the recovery inhibition flag is set, the driver ON/OFF terminal CE is set LOW so that the driver section 219 is placed into the inactive state (S870), and the open processing operation is terminated.

The close processing operation will now be explained.

Figure 35:
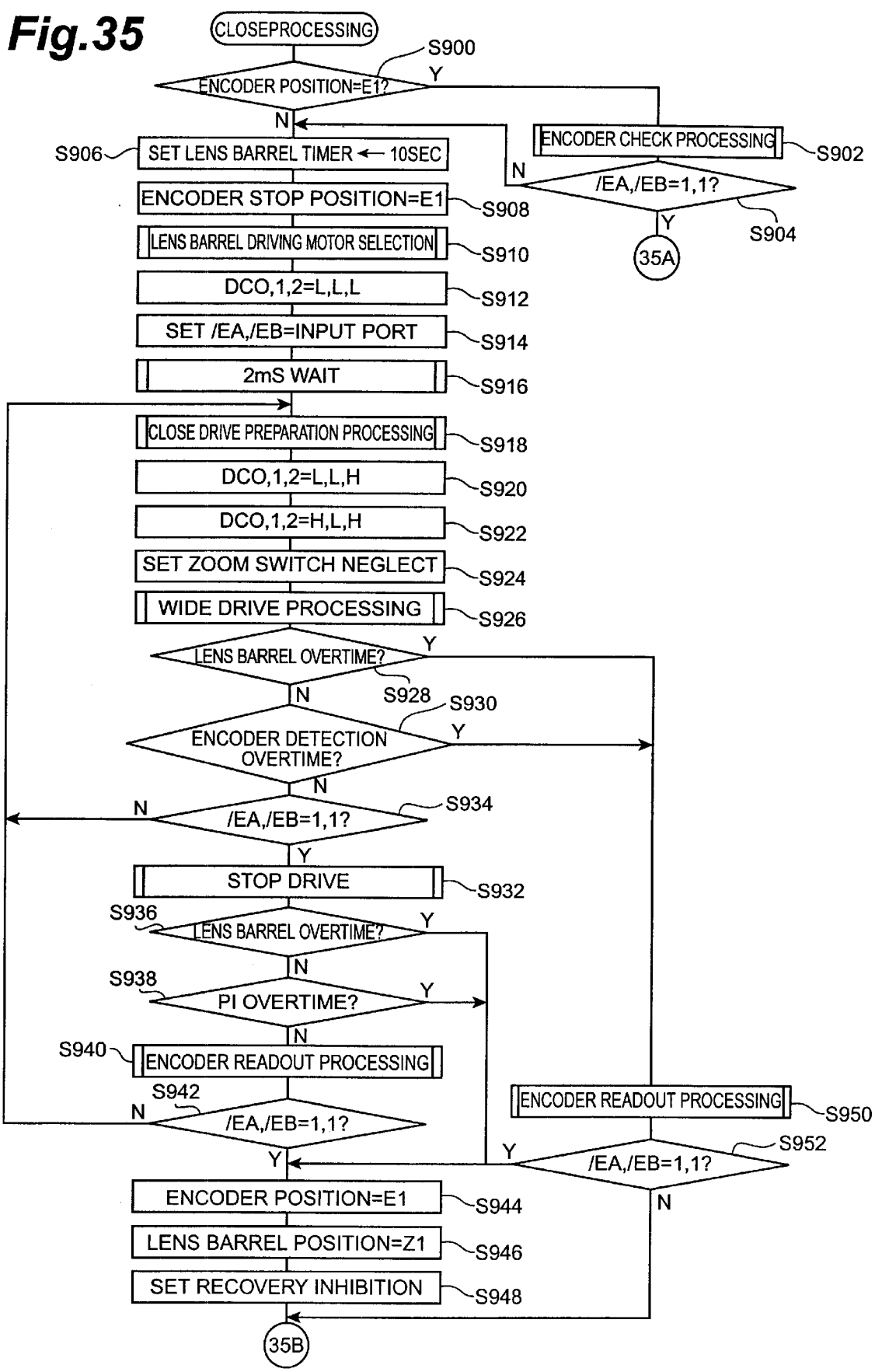
FIG. 35 is a flowchart of a close processing operation of the camera equipped with the lens barrel of FIG. 1.
Figure 36:
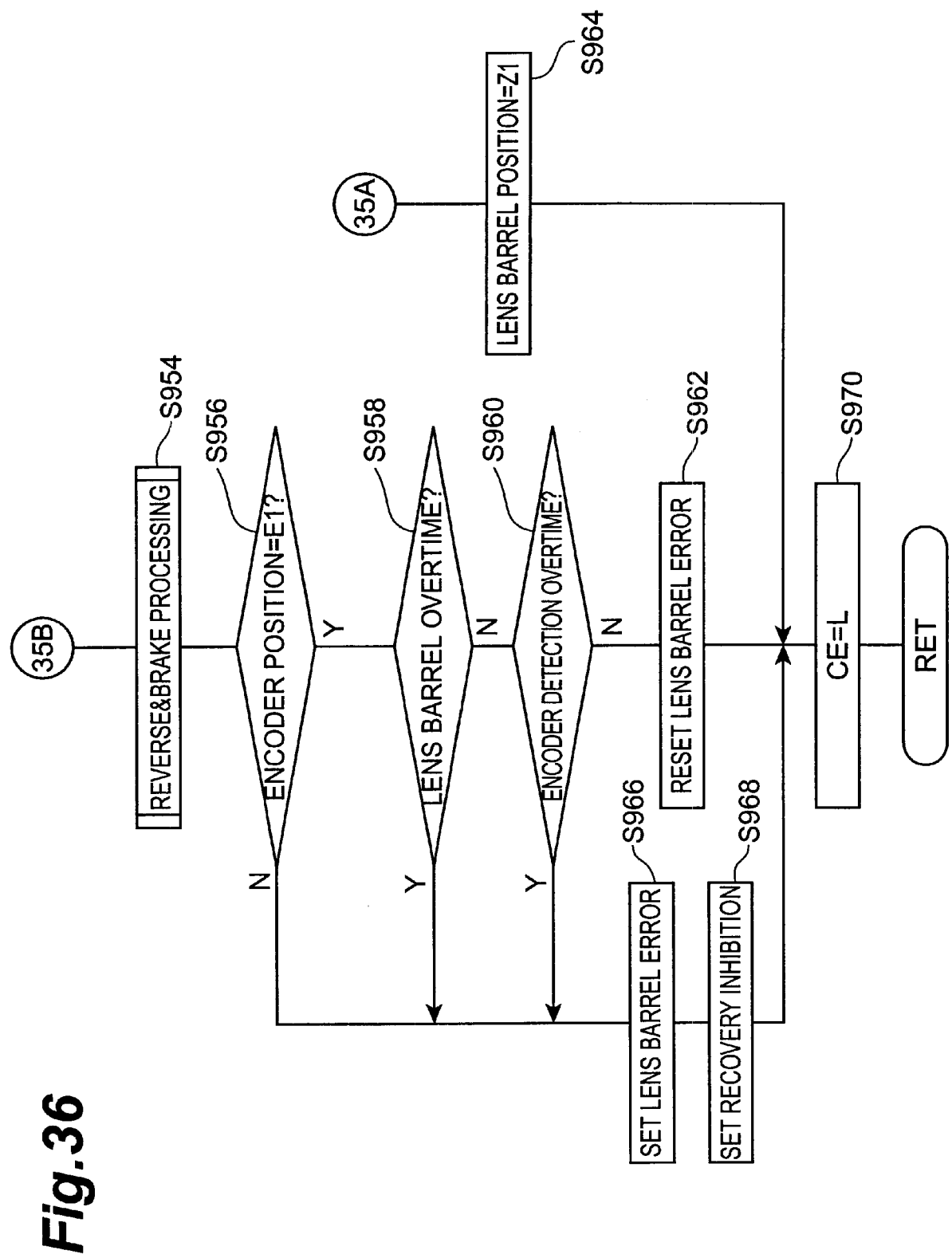
FIG. 36 is a flowchart of the close processing operation of the camera equipped with the lens barrel of FIG. 1.

FIGS. 35 and 36 show flowcharts of the close processing operation. The close processing-operation is an operation for collapsing the lens barrel 1 to the zoom code Z1 and closing the barrier 83 as the main switch 16 is manipulated.

As shown at S900 in FIG. 35, it is determined whether the encoder position is at the code E1 or not. If it is determined that the encoder position is at the code E1, then the flow shifts to S902, where an encoder check processing operation is carried out, and it is determined whether both of the terminals EA, EB are at 1 or not (S904). If it is determined that both of the terminals EA, EB are at 1, then the flow shifts to S964 in FIG. 36. If it is determined that both of the terminals EA, EB are at 1, by contrast, then the flow shifts to S906.

If it is determined at S900 that the encoder position is not at the code E1, then the flow shifts to S906, where the lens barrel timer is set to 10 sec. Subsequently, the encoder stop position is set to E1 (S908), and the motor 227 of the lens barrel driving section 222 is selected as the motor to drive (hereinafter referred to as "lens barrel driving motor is selected") (S910).

Thereafter, the flow shifts to S912, where the outputs of parallel terminals DC0 to DC2 are set LOW so that the motor 227 is placed into a wait state, and the terminals EA, EB are set to the input port (S914). Then, after a wait of 2 ms (S916), a close drive preparation processing operation is carried out (S918). The close drive preparation processing operation is an operation for setting Z1 position DC drive switching point pulse data (E_P_Z1_BRAKE), normal rotation width restriction time (E_T_PI), and the like.

Subsequently, the flow shifts to S920, whereby the output of parallel terminal DC0 is set LOW (hereinafter referred to as "L"), the output of parallel terminal DC1 is set L, and the output of parallel terminal DC2 is set HIGH (hereinafter referred to as "H"). Then, the flow shifts to S922, where the outputs of parallel terminals DC0, DC1, and DC2 are set H, L, and H, respectively, so that WIDE driving is carried out. Thereafter, a zoom switch neglect flag is set (S924), and a WIDE drive processing operation is carried out (S926). The WIDE drive processing operation is an operation for collapsing the lens barrel 1, which will be explained later in detail.

Subsequently, the flow shifts to S928, where it is determined whether the lens barrel overtime is reached or not. If it is determined that the lens barrel overtime is reached, then the flow shifts to S950. Here, the lens barrel overtime means that the time initially set to the lens barrel timer (e.g., a period of 10 seconds) has elapsed. It is used for determining whether lens barrel operations are abnormal or not, since a certain operational inconvenience exists in the lens barrel if this time has elapsed.

If it is determined at S928 that the lens barrel overtime is not reached, then it is determined whether the encoder detection overtime is reached or not (S930).

If it is determined that the encoder detection overtime is reached, then the flow shifts to S950. As with the lens barrel overtime, the encoder detection overtime is used for determining that the case where the encoder signal does not change for a predetermined time is abnormal at the encoder detection stage.

If it is determined at S930 that the encoder detection overtime is not reached, then the flow shifts to S932, where it is determined whether both of the terminals EA, EB are at 1 or not. If it is determined that the terminals EA, EB are not at 1, then the flow shifts to S918. If it is determined that both of the terminals EA, EB are at 1, then a stop drive processing operation is carried out (S932).

Figure 37:
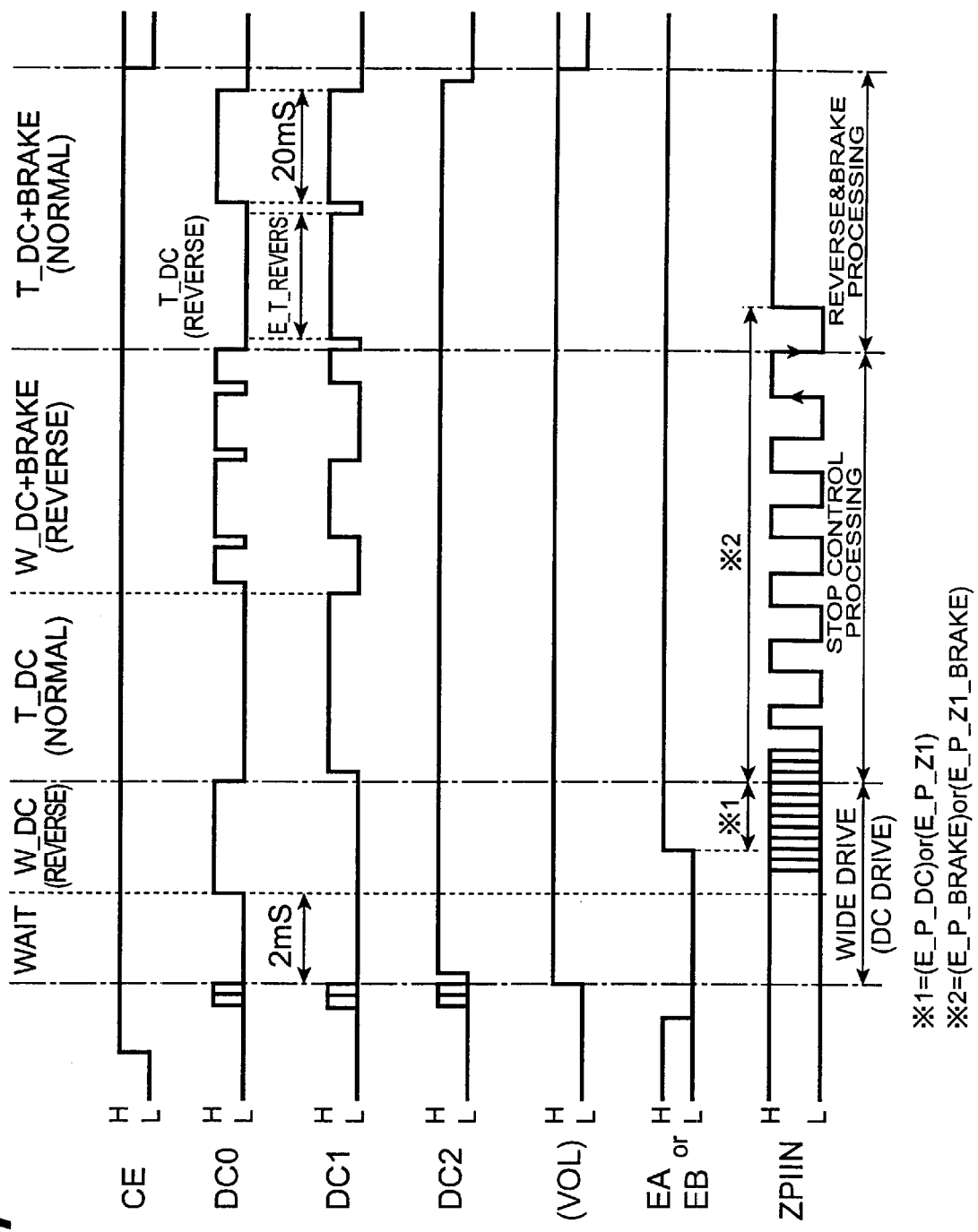
FIG. 37 is a timing chart for stopping the driving at the time of WIDE driving of the lens barrel of FIG. 1.

The stop drive processing operation is an operation for feeding a reverse rotating signal to the motor 227 so as to decelerate the rotation of motor 227 and then feeding a normal rotating signal thereto so as to carry out constant low-speed driving. FIG. 37 shows a timing chart of the stop drive at the time of WIDE driving.

Subsequently, at S936 in FIG. 35, it is determined whether the lens barrel overtime is reached or not. If it is determined that the lens barrel overtime is reached, then the flow shifts to S944. If it is determined not, by contrast, then it is determined whether the PI overtime is reached or not (S938). Here, "PI overtime" means the case where there is no output from the drive detector 228, which detects the rotary driving of the motor 227, for a predetermined time.

If it is determined at S938 that the PI overtime is reached, then the flow shifts to S944. If it is determined not, then an encoder readout processing operation is carried out (S940), and it is determined whether both of the terminals EA, EB are at 1 or not (S942). If it is determined that both of the terminals EA, EB are not at 1, then the flow returns to S918. If it is determined that both of the terminals EA, EB are at 1, then the flow shifts to S944.

At S950, an encoder readout processing operation is carried out. Subsequently, the flow shifts to S952, where it is determined whether both of the terminals EA, EB are at 1 or not. If it is determined not, then the flow shifts to S954 in FIG. 36. If it is determined that both of the terminals EA, EB are at 1, then the flow shifts to S944.

At S944, the encoder position is set to E1. Subsequently, the lens barrel position is set to Z1 (S946), and the recovery inhibition is set (S948). Then, the flow shifts to S954 in FIG. 36, whereby a reverse and brake processing operation i carried out. The reverse and brake processing operation is an operation for energizing the motor 227 in its reverse rotation direction and thereby abruptly stopping the rotation (see FIG. 37).

Subsequently, the flow shifts to S956, where it is determined whether the encoder position is at E1 or not. If it is determined not, then the lens barrel error is set (S966), the recovery inhibition is set (S968), and the flow shifts to S970. If it is determined that the encoder position is at E1, then it is determined whether the lens barrel overtime is reached or not. If it is determined that the lens barrel overtime is reached, then the flow shifts to S966. If it is determined that the lens barrel overtime is not reached, by contrast, then it is determined whether the encoder detection overtime is reached or not (S960).

If it is determined that the encoder detection overtime is reached, then the flow shifts to S966. If it is determined not, by contrast, then the flow shifts to S962, where the lens barrel error is reset, and the flow shifts to S970.

At S964, the lens barrel position is set to Z1, and then the flow shifts to S970. At S970, the driver ON/OFF terminal CE is set L so that the driver section 219 is placed into the inactive state, whereby the close processing operation is terminated.

A zoom TELE processing operation will now be explained.

Figure 38:
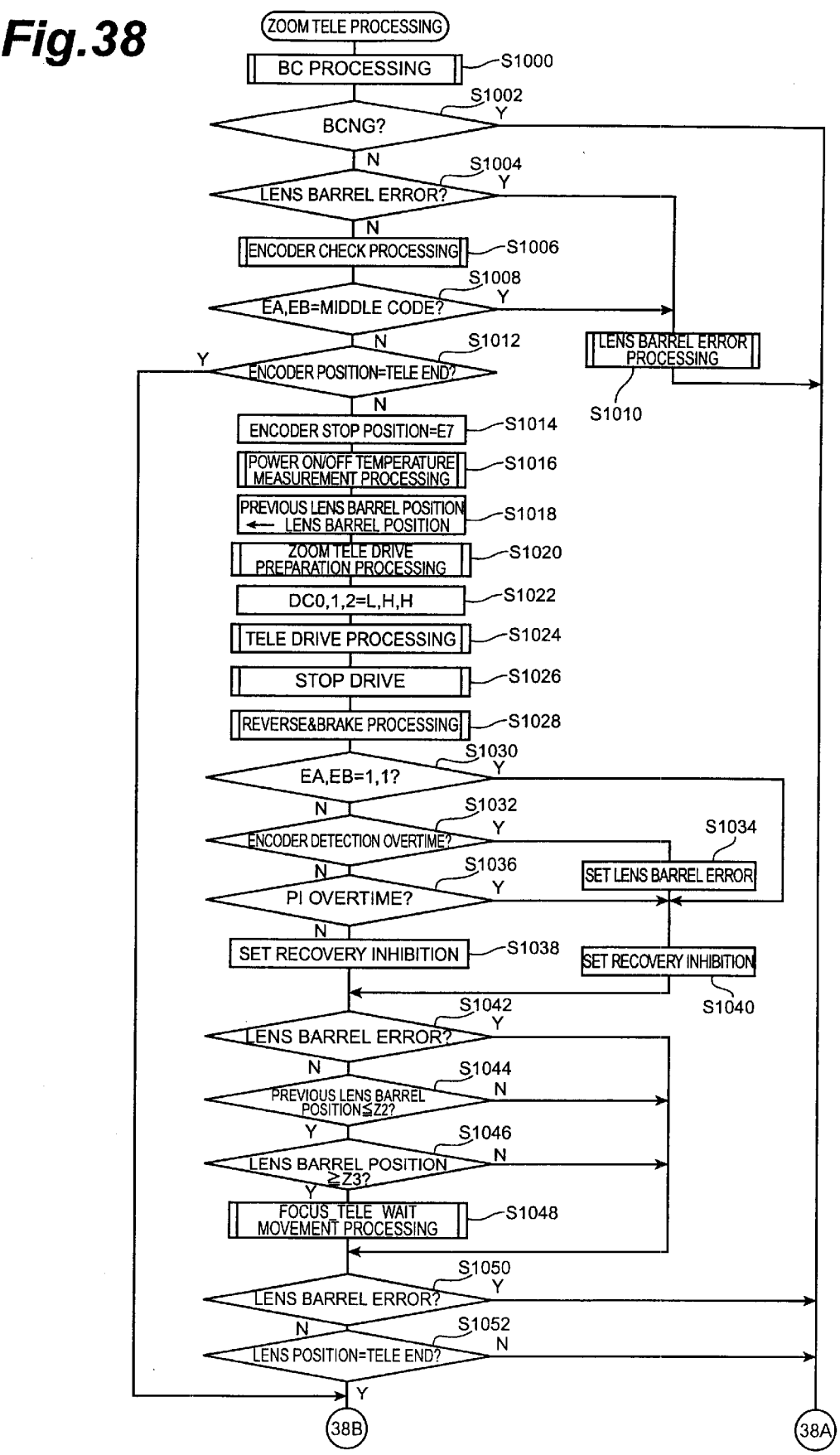
FIG. 38 is a flowchart of a zoom TELE processing operation of the camera equipped with the lens barrel of FIG. 1.
Figure 39:
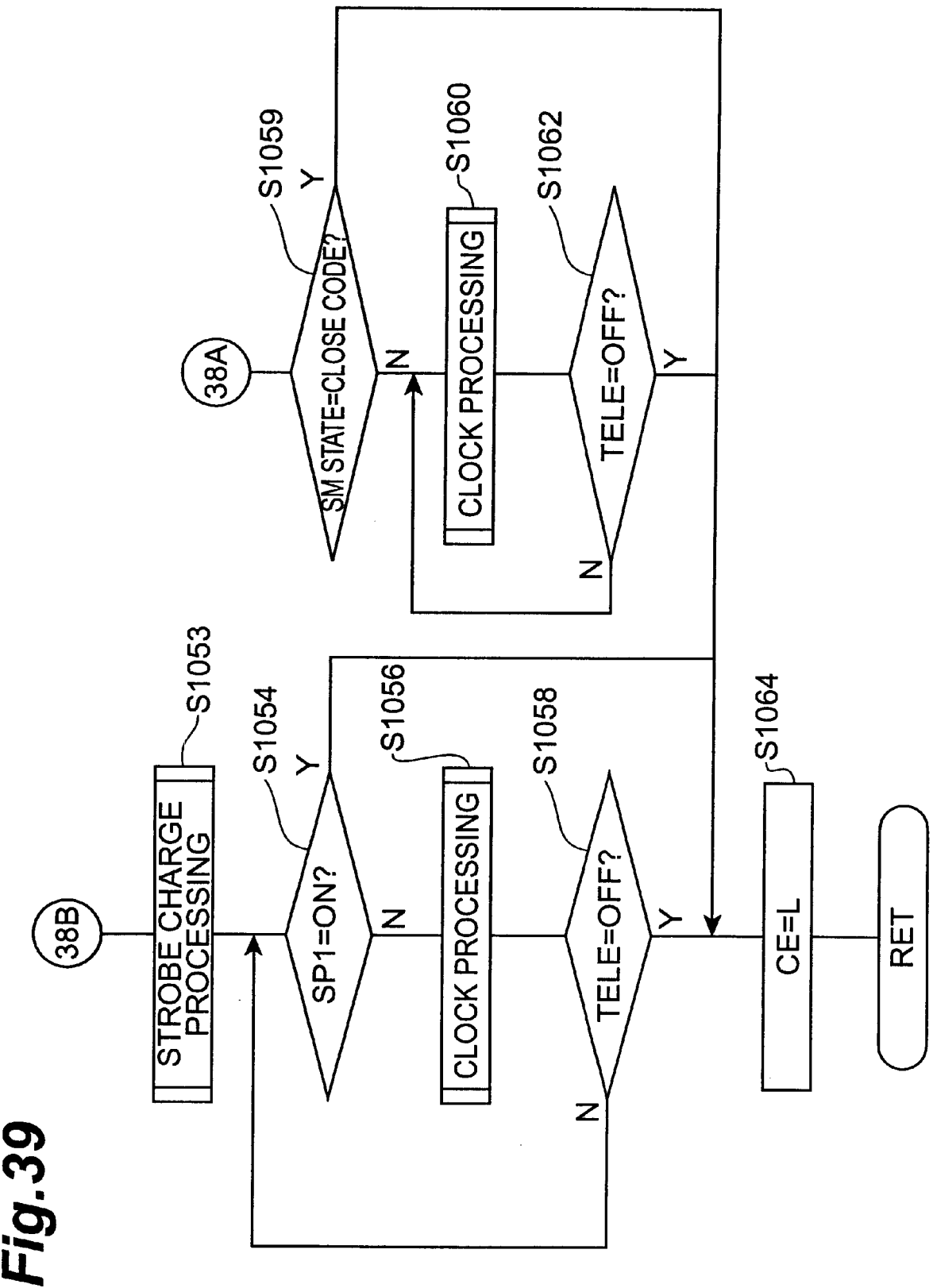
FIG. 39 is a flowchart of the zoom TELE processing operation of the camera equipped with the lens barrel of FIG. 1.

FIGS. 38 and 39 show flowcharts of the zoom TELE processing operation. The zoom TELE processing operation is an operation for expanding the lens barrel 1 as the TELE switch 19 is manipulated.

As shown at S1000 in FIG. 38, a battery check processing operation is carried out. Subsequently, it is determined whether the battery check is a failure or not (S1002). If the battery check is a failure, then the flow shifts to S1059 in FIG. 39. If not, then the flow shifts to S1004, where it is determined whether the lens barrel error is set or not.

If the lens barrel error is set, then a lens barrel error processing operation is carried out (S1010), and the flow shifts to S1059 in FIG. 39. If the lens barrel error is not set, then an encoder check processing operation is carried out (S1006), and it is determined whether the terminals EA, EB are at a middle code or not (S1008). If it is determined that the terminals EA, EB are at the middle code, then the flow shifts to S1010. If it is determined that the terminals EA, EB are not at the middle code, by contrast, then it is determined whether the encoder position is at the TELE end or not (S1012).

If it is determined at S1012 that the encoder position is at the TELE end, then the flow shifts to S1053 in FIG. 39. If it is determined not, by contrast, then the encoder stop position is set to E7 (S1014), a power on/off temperature measurement processing operation is carried out (S1016), the current lens barrel position is set as the previous lens barrel position (S1018), and a zoom TELE drive preparation processing operation is carried out (S1020). The zoom TELE drive preparation processing operation is an operation for setting data such as brake point pulse data (E_P_BRAKE) and normal rotation width restriction time (E_T_PI) used for stop driving and the like.

Subsequently, the flow shifts to S1022, where the outputs of parallel terminals DC0, DC1, and DC2 are set L, H, and H, respectively. Then, a TELE drive processing operation is carried out (S1024). The TELE drive processing operation will be explained later in detail.

Figure 40:
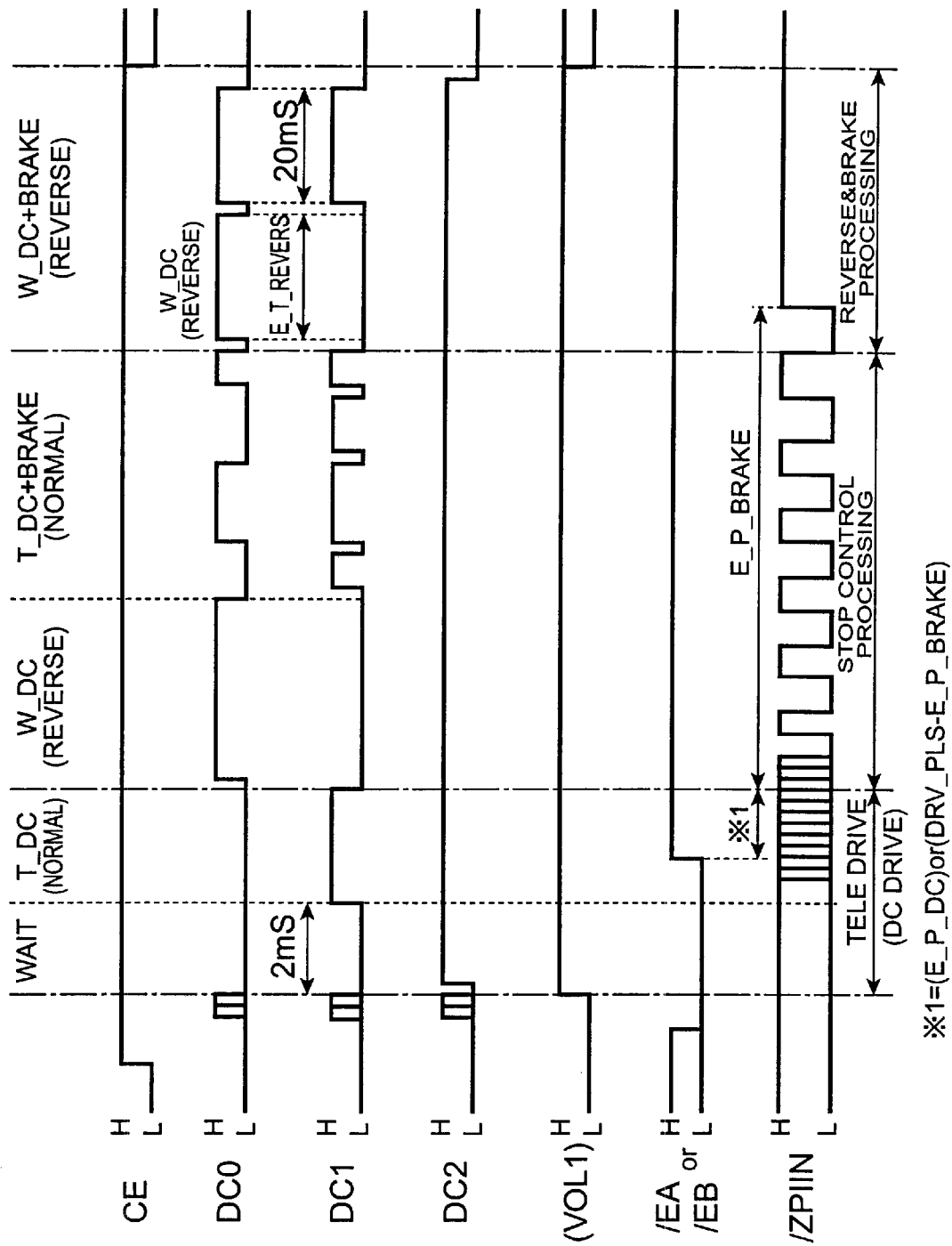
FIG. 40 is a timing chart for stopping the driving at the time of TELE driving of the lens barrel of FIG. 1.

Subsequently, a stop drive processing operation is carried out (S1026), and a reverse and brake processing operation is carried out (S1028). The stop drive processing operation is an operation for feeding a reverse rotation signal to the motor 227 so as to decelerate its rotation and then feeding a forward rotation signal thereto so as to carry out constant low-speed driving. FIG. 40 shows a timing chart for stop driving at the time of TELE driving. The reverse and brake processing operation is an operation for rotating the motor 227 in reverse so as to stop its rotation (see FIG. 40).

Subsequently, the flow shifts to S1030, where it is determined whether both of the terminals EA, EB are at 1 or not. If it is determined that both of the terminals EA, EB are at 1, then the flow shifts to S1040. If it is determined not, by contrast, then it is determined whether the encoder detection overtime is reached or not (S1032). If it is determined that the encoder detection overtime is reached, then the lens barrel error is set (S1034), and the flow shifts to S1040, where the recovery inhibition is set.

If it is determined that the encoder detection overtime is not reached, by contrast, then it is determined whether the PI overtime is reached or not (S1036). If it is determined that the PI overtime is not reached, then the flow shifts to S1040. If it is determined that the PI overtime is not reached, by contrast, then the recovery inhibition is reset (S1038).

Thereafter, the flow shifts to S1042, where it is determined whether the lens barrel error is set or not. If it is determined that the lens barrel error is set, then the flow shifts to S1050. If not, then it is determined whether the previous lens barrel position is at most Z2 or not (S1044).

If it is determined that the previous lens barrel position exceeds Z2, then the flow shifts to S1050. If it is determined that the previous lens barrel position is at most Z2, by contrast, then it is determined whether the lens barrel position is at least Z3 or not (S1046). If it is determined that the lens barrel position is not at least Z3, then the flow shifts to S1050. If it is determined that the lens barrel position is at least Z3, by contrast, then a focus TELE wait movement processing operation is carried out (S1048).

The focus TELE wait movement processing operation is an operation for moving the second lens group 102 (focus) to the TELE wait position when the lens barrel position is moved from Z1 or Z2 to Z3 or further as the TELE switch 19 is manipulated. The focus TELE wait movement processing operation will be explained later in detail.

Subsequently, the flow shifts to S1050, where it is determined whether the lens barrel error is set or not. If it is determined that the lens barrel error is set, then the flow shifts to S1059 in FIG. 39. If it is determined not, then it is determined whether the lens barrel position is at the TELE end or not (S1052). If it is determined that the lens barrel position is not at the TELE end, then the flow shifts to S1059 in FIG. 39. If it is determined that the lens barrel position is at the TELE end, then the flow shifts to S1053 in FIG. 39, whereby a strobe charge processing operation is carried out.

Subsequently, the flow shifts to S1054, where it is determined whether the shutter button 11 is half-pushed (SP1 is turned on) or not. If it is determined that the shutter button 11 is half-pushed, then the flow shifts to S1064. If it is determined not, by contrast, then a clock processing operation is carried out (S1056), and it is determined whether the TELE switch 19 is turned off or not (S1058). If it is determined that the TELE switch 19 is not turned off, then the flow returns to S1054. If it is determined that the TELE switch 19 is turned off, by contrast, then the flow shifts to S1064.

At S1059, it is determined whether the open code is set as the main switch condition or not. If it is determined that the open code is set, then the flow shifts to S1064. If it is determined not, then a clock processing operation is carried out (S1060), and it is determined whether the TELE switch 19 is turned off or not (S1062). If it is determined that the TELE switch 19 is not turned off, then the flow returns to S1060. If it is determined that the TELE switch 19 is turned off, then the flow shifts to S1064, where the driver ON/OFF terminal CE is set L so that the driver section 219 is placed into the inactive state, whereby the zoom TELE processing operation is terminated.

A zoom WIDE processing operation will now be explained.

Figure 41:
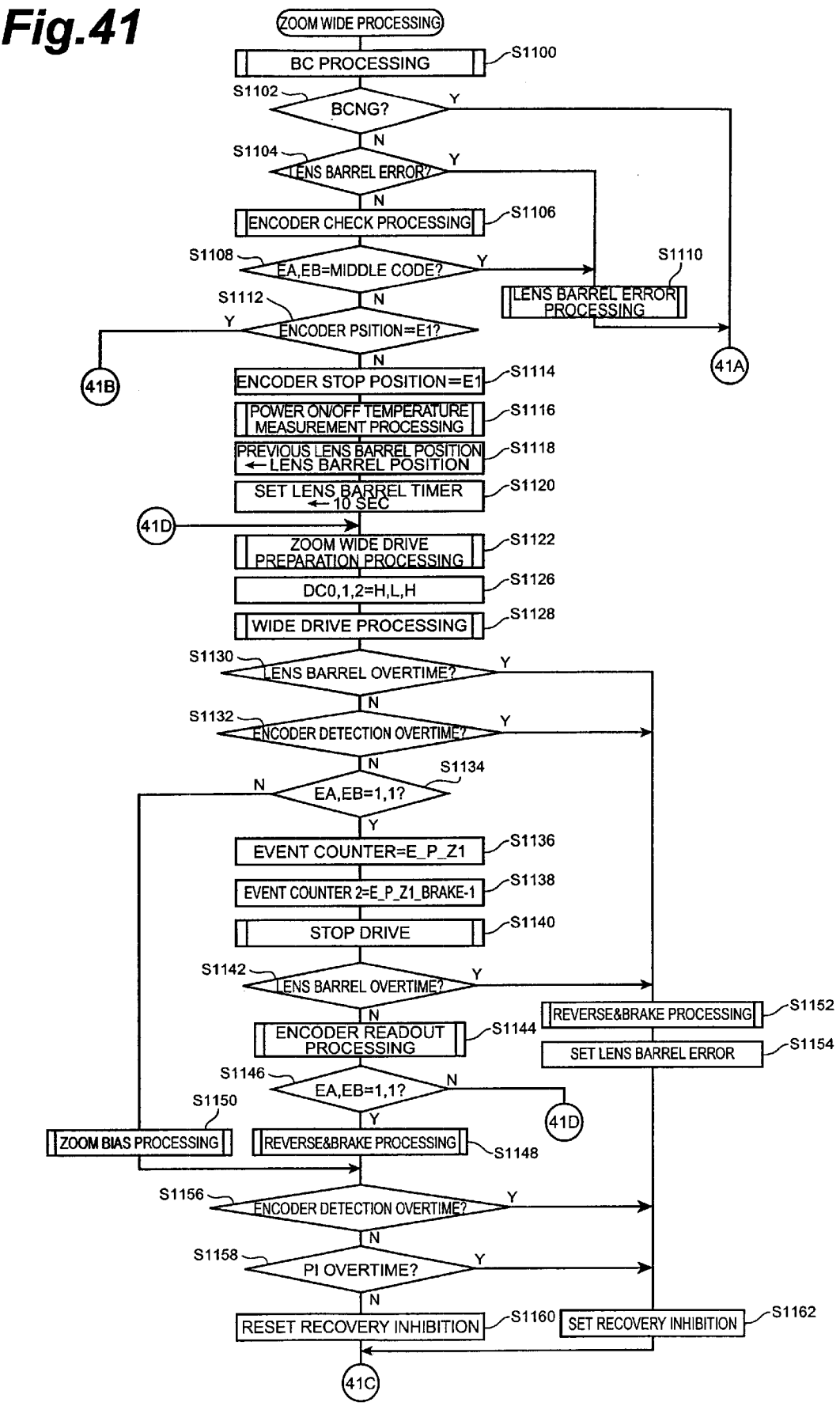
FIG. 41 is a flowchart of a zoom WIDE processing operation of the camera equipped with the lens barrel of FIG. 1.
Figure 42:
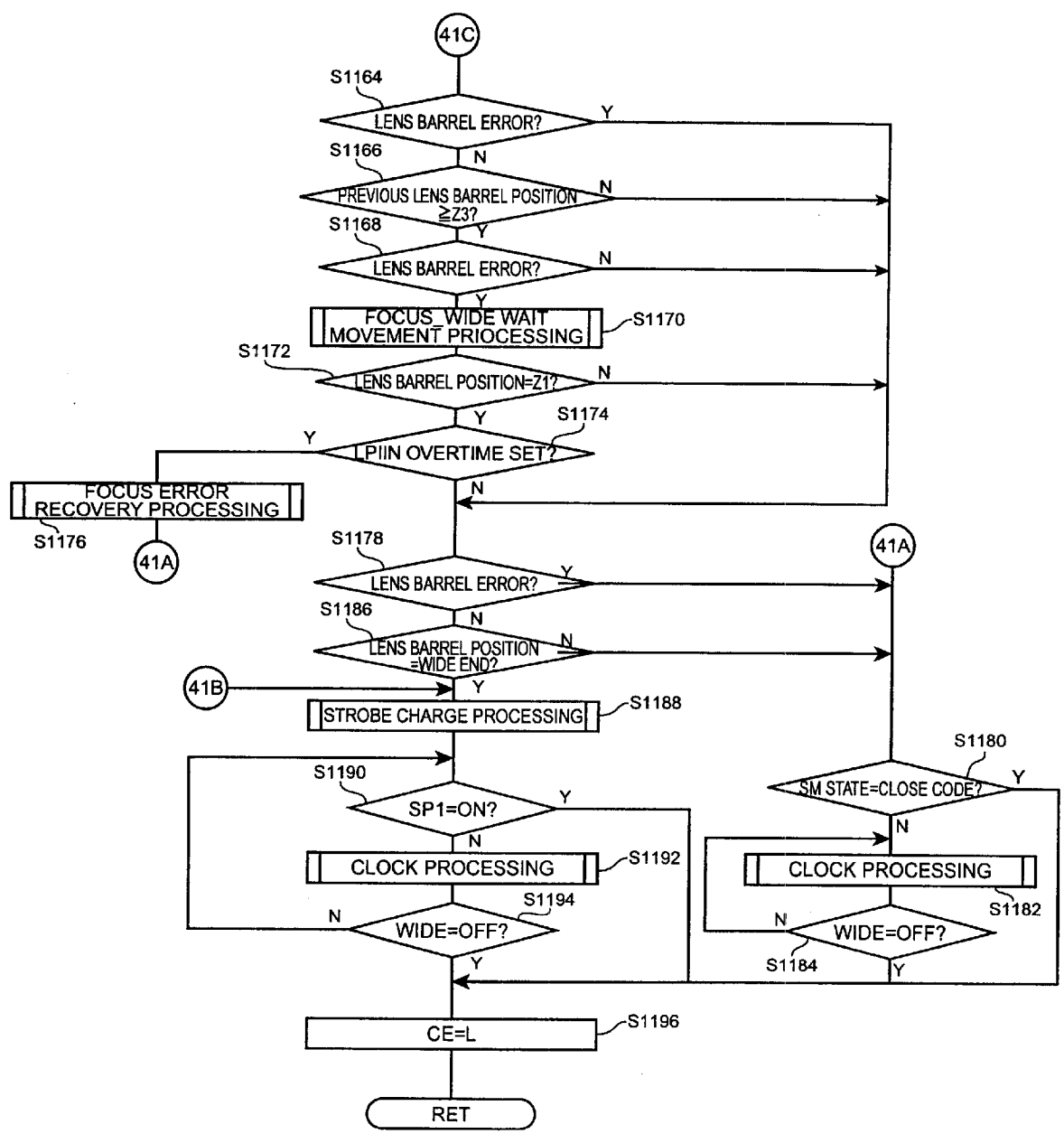
FIG. 42 is a flowchart of the zoom WIDE processing operation of the camera equipped with the lens barrel of FIG. 1.

FIGS. 41 and 42 show flowcharts of the zoom WIDE processing operation. The zoom WIDE processing operation is an operation for collapsing the lens barrel 1 as the WIDE switch 20 is manipulated.

As shown at S1100 in FIG. 41, a battery check processing operation is carried out. Subsequently, it is determined whether the battery check is a failure or not (S1102). If the battery check is a failure, then the flow shifts to S1180 in FIG. 42. If the battery check is not a failure, then the flow shifts to S1104, where it is determined whether the lens barrel error is set or not.

If the lens barrel error is set, then a lens barrel error processing operation is carried out (S1110), and the flow shifts to S1180 in FIG. 42. If not, then an encoder check processing operation is carried out (S1106), whereby it is determined whether the terminals EA, EB are at a middle code or not (S1108). If it is determined that the terminals EA, EB are at the middle code, then the flow shifts to S1110. If it is determined that the terminals EA, EB are not at the middle code, by contrast, then it is determined whether the encoder position is at E1 or not (S1112).

If it is determined at S1112 that the encoder position is at E1, then the flow shifts to S1188 in FIG. 42. If it is determined not, by contrast, then the encoder stop position is set to E1 (S1114), a power ON/OFF temperature measurement processing operation is carried out (S1116), the current lens barrel position is set as the previous lens barrel position data, a time of 10 sec is set for the lens barrel timer (S1120), and a zoom WIDE drive preparation processing operation is carried out (S1122).

The zoom WIDE drive preparation processing is an operation for setting data of the normal rotation width restriction time (E_T_PI) and the reverse rotation brake time data (E_T_REVERS), setting DC drive switch point pulse data (E_P_DC) to an event counter, and setting brake point pulse data (E_P_BRAKE) and the like to an event counter 2.

Subsequently, the flow shifts to S1126, where the outputs of parallel terminals DC0, DC1, and DC2 are set to L, L, and H, respectively. Then, a WIDE drive processing operation is carried out (S1128). The WIDE drive processing operation will be explained later in detail.

Subsequently, it is determined whether the lens barrel overtime is reached or not (S1130). If it is determined that the lens barrel overtime is reached, then a reverse and brake processing operation is carried out (S1152), the lens barrel error is set (S1154), the recovery inhibition is set (S1156), and the flow shifts to S1164 in FIG. 42. The reverse and brake processing operation is an operation for rotating the motor 227 in reverse so as to stop its rotation (see FIG. 37).

If it is determined at S1130 that the lens barrel overtime is not reached, then it is determined whether the encoder detection overtime is reached or not (S1132). If it is determined that the encoder detection overtime is reached, then the flow shifts to S1152. If it is determined that the encoder detection overtime is not reached, by contrast, then it is determined whether both of the terminals EA, EB are at 1 or not (S1134). If it is determined that both of the terminals EA, EB are not at 1, then the flow shifts to S1150, where a zoom bias processing operation is carried out.

Figure 43:
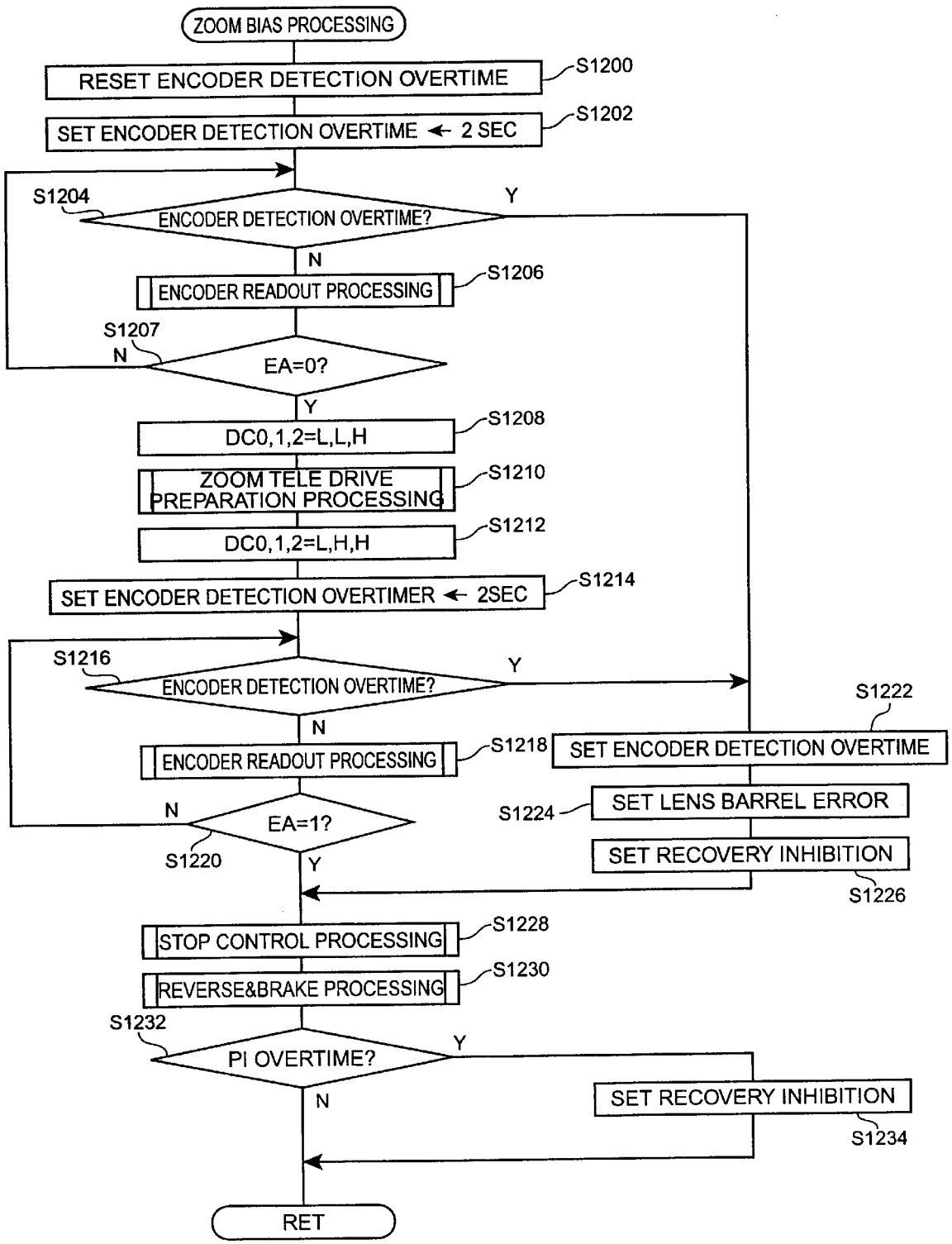
FIG. 43 is a flowchart of a zoom bias processing operation of the camera equipped with the lens barrel of FIG. 1.

FIG. 43 shows a flowchart of the zoom bias processing operation.

As depicted, the encoder detection overtime is reset (S1200), and a time of 2 sec is set as the encoder detection overtime (S1202). Subsequently, it is determined whether the encoder detection overtime is reached or not (S1204). If it is determined that the encoder detection overtime is reached, then the encoder detection overtime is set (S1222), the lens barrel error is set (S1224), the recovery inhibition is set (S1226), and the flow shifts to S1228.

If it is determined at S1204 that the encoder detection overtime is not reached, by contrast, then an encoder readout processing operation is carried out (S1206), and it is determined whether the terminal EA is at 0 or not (S1207). If it is determined not, then the flow returns to S1204. If it is determined that the terminal EA is at 0, then the outputs of parallel terminals DC0, CD1, and DC2 are set L, L, and H, respectively, so as to attain a wait state (S1208), and a zoom TELE drive preparation processing operation is carried out (S1210).

Subsequently, the outputs of parallel terminals DC0, CD1, and DC2 are set L, H, and H (S1212), respectively, a time of 2 sec is set as the encoder detection overtime (S1214), and it is determined whether the encoder detection overtime is reached or not (S1216). If it is determined that the encoder detection overtime is reached, then the flow shifts to S1222. If it is determined not, then an encoder readout processing operation is carried out (S1218), and it is determined whether the terminal EA is at 1 or not (S1220). If it is determined that the terminal EA is not at 1, then the flow returns to S1216. If it is determined that the terminal EA is at 1, then the flow shifts to S1228, where a stop control processing operation is carried out, and a reverse and brake processing operation is carried out (S1230).

Subsequently, the flow shifts to S1232, where it is determined whether the PI overtime is reached or not. If it is determined that the PI overtime is reached, then the recovery inhibition is set (S1234), and the zoom bias processing operation is terminated. If it is determined not, by contrast, then the zoom bias processing operation is directly terminated.

If it is determined at S1134 in FIG. 41 that both of the terminals EA, EB are at 1, then Z1 position pulse data (E_P_Z1) is set (S1136) to the event counter, and Z1 stopping brake point data 1 (E_P_Z1_BRAKE-1) is set to the event counter 2 (S1138).

Subsequently, the flow shifts to S1140, where a stop drive processing operation is carried out, and it is determined whether the lens barrel overtime is reached or not (S1142). If it is determined that the lens barrel overtime is reached, then the flow shifts to S1152. If it is determined that the lens barrel overtime is not reached, then an encoder readout processing operation is carried out (S1144), and it is determined whether both of the terminals EA, EB are at 1 or not (S1146). If it is determined that both of the terminals EA, EB are not at 1, then the flow returns to S1122. If it is determined that both of the terminals EA, EB are at 1, by contrast, then a reverse and brake processing operation is carried out (S1148).

Subsequently, the flow shifts to S1156, where it is determined whether the encoder detection overtime is reached or not. If it is determined that the encoder detection overtime is reached, then the flow shifts to S1162. Subsequently, the flow shifts to S1158, where it is determined whether the PI overtime is reached or not. If it is determined that the PI overtime is reached, then the flow shifts to S1162. If it is determined that the PI overtime is not reached, then the recovery inhibition is set (S1160).

Subsequently, the flow shifts to S1164 in FIG. 42, where it is determined whether the lens barrel error is set or not. If it is determined that the lens barrel error is set, then the flow shifts to S1178. If it is determined that the lens barrel error is not set, then it is determined whether the previous lens barrel position is at least Z3 or not (S1166).

If it is determined that the previous lens barrel position is less than Z3, then the flow shifts to S1178. If it is determined that the lens barrel position is at least Z3, by contrast, then it is determined whether the lens barrel position is at most Z2 or not (S1168). If it is determined that the lens barrel position is not at most Z2, then the flow shifts to S1178. If it is determined that the lens barrel position is at most Z2, by contrast, then a focus WIDE wait movement processing operation is carried out (S1170).

The focus WIDE wait movement processing operation is an operation for moving the position of the second lens group 102 (focus) to the WIDE wait position when the lens barrel position is moved from a position of Z3 or further to Z1 or Z2 upon manipulating the WIDE switch 20. The focus WIDE wait movement processing operation will be explained later in detail.

Subsequently, the flow shifts to S1172, where it is determined whether the lens barrel position is at Z1 or not. If it is determined that the lens barrel position is not at Z1, then the flow shifts to S1178. If it is determined that the lens barrel position is at Z1, then it is determined whether the LPIIN overtime is set or not. If it is determined that the LPIIN overtime is set, then the flow shifts to S1176, where a focus error recovery processing operation is carried out. The focus error recovery processing operation is an operation for recovering from a state where gears are not favorably in mesh when the second lens group 102 is moved to the WIDE wait position, and the like. This operation will be explained later in detail.

If it is determined that the LPIIN overtime is not set, then the flow shifts to S1178. At S1178, it is determined whether the lens barrel error is set or not. If it is determined that the lens barrel error is set, then the flow shifts to S1180. At S1180, it is determined whether the close code is set as the main switch condition or not. If it is determined that the close code is set, then the flow shifts to S1196. If it is determined that the close code is not set, by contrast, then a clock processing operation is carried out (S1182), and it is determined whether the WIDE switch 20 is turned off or not (S1184). If it is determined that the WIDE switch 20 is not turned off, then the flow shifts to S1182. If it is determined that the WIDE switch 20 is turned off, by contrast, then the flow shifts to S1196.

If it is determined at S1178 that the lens barrel error is not set, then it is determined whether the lens barrel position is at the WIDE end or not (S1186). If it is determined that the lens barrel position is not at the WIDE end, then the flow shifts to S1180. If it is determined that the lens barrel position is at the WIDE end, by contrast, then the flow shifts to S1188, where a strobe charge processing operation is carried out.

Subsequently, the flow shifts to S1190, where it is determined whether the shutter button 11 is half-pushed (SP1 is turned on) or not. If it is determined that the shutter button 11 is half-pushed, then the flow shifts to S1196. If it is determined not, by contrast, then a clock processing operation is carried out (S1192), and it is determined whether the WIDE switch 20 is turned off or not (S1194). If it is determined that the WIDE switch 20 is not turned off, then the flow returns to S1190. If it is determined that the WIDE switch 20 is turned off, then the flow shifts to S1196.

At S1196, the driver ON/OFF terminal CE is set L so that the driver section 219 is placed into the inactive state, whereby the zoom WIDE processing operation is terminated.

The TELE drive processing operation will now be explained.

Figure 44:
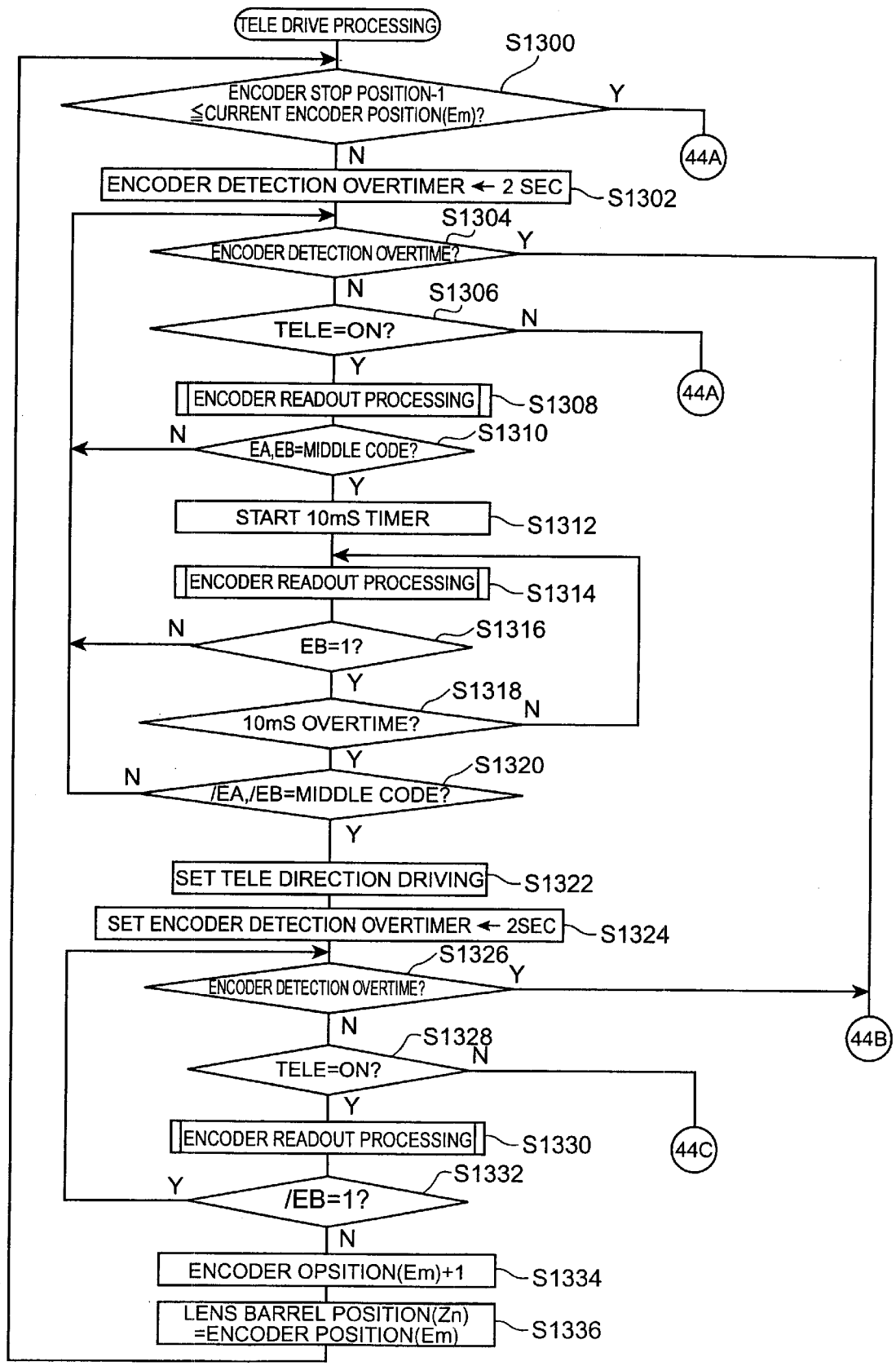
FIG. 44 is a flowchart of a TELE drive processing operation of the camera equipped with the lens barrel of FIG. 1.
Figure 45:
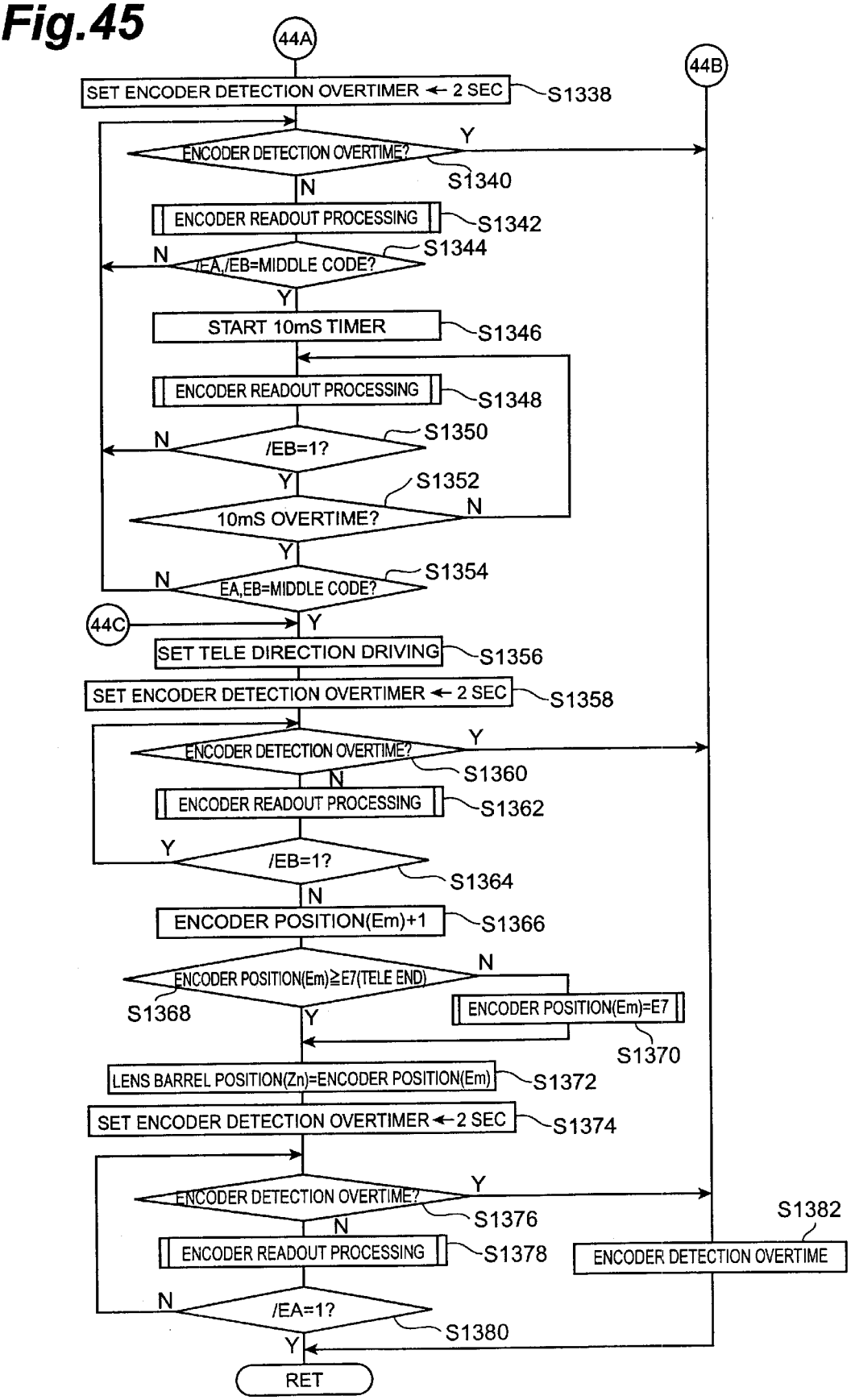
FIG. 45 is a flowchart of the TELE drive processing operation of the camera equipped with the lens barrel of FIG. 1.

FIGS. 44 and 45 show flowcharts of the TELE drive processing operation. The TELE drive processing operation is an operation for expanding the lens barrel 1.

As shown at S1300 in FIG. 44, it is determined whether the encoder stop position −1 is at most the current encoder position (Em) or not. If it is determined that the encoder stop position −1 is at most the current encoder position (Em), then the flow shifts to S1338 in FIG. 45. If it is determined not, by contrast, then a time of 2 sec is set as the encoder detection overtime (S1302).

Subsequently, it is determined whether the encoder detection overtime is reached or not (S1304). If it is determined that the encoder detection overtime is reached, then the flow shifts to S1382 in FIG. 45. If it is determined not, by contrast, then the flow shifts to S1306, where it is determined whether the TELE switch 19 is ON or not. If it is determined that the TELE switch 19 is not ON, then the flow shifts to S1338 in FIG. 45. If it is determined that the TELE switch 19 is ON, then the flow shifts to S1308, where an encoder readout processing operation is carried out.

Subsequently, it is determined whether the terminals EA, EB are at a middle code or not (S1310). If it is determined not, then the flow returns to S1304. If it is determined that the terminals EA, EB are at the middle code, by contrast, then a 10-ms timer is started (S1312), an encoder readout processing operation is carried out (S1314), and it is determined whether the terminal EB is at 1 or not (S1316).

If it is determined that the terminal EB is not at 1, then the flow returns to S1304. If it is determined that the terminal EB is at 1, by contrast, then it is determined whether the 10-ms overtime is reached or not (S1318). If it is determined that the overtime is not reached, then the flow returns to S1314. If it is determined that the overtime is reached, by contrast, then it is determined whether the terminals EA, EB are at a middle code or not (S1320). If it is determined that the terminals EA, EB are not at the middle code, then the flow returns to S1304. If it is determined that the terminals EA, EB are at the middle code, then the TELE direction driving is set (S1322), and a time of 2 sec is set as the encoder detection overtime (S1324).

Subsequently, the flow shifts to S1326, where it is determined whether the encoder detection overtime is reached or not. If it is determined that the encoder detection overtime is reached, then the flow shifts to S1382 in FIG. 45. If it is determined not, then it is determined whether the TELE switch 19 is ON or not (S1328). If it is determined that the TELE switch 19 is not ON, then the flow shifts to S1356 in FIG. 45.

If it is determined that the TELE switch 19 is ON, then an encoder readout processing operation is carried out (S1330), and it is determined whether the terminal EB is at 1 or not (S1332). If it is determined that the terminal EB is at 1, then the flow returns to S1326. If it is determined that the terminal EB is not at 1, by contrast, then 1 is added to the encoder position (Em) (S1334), and the encoder position (Em) is set as the lens barrel position (Zn). Subsequently, the flow returns to S1300.

At S1338 in FIG. 45, a time of 2 sec is set as the encoder detection overtime. Subsequently, it is determined whether the encoder detection overtime is reached or not (S1340). If it is determined that the encoder detection overtime is reached, then the flow shifts to S1382. If it is determined not, then the flow shifts to S1342, where an encoder readout processing operation is carried out.

Subsequently, it is determined whether the terminals EA, EB are at a middle code or not (S1344). If it is determined not, then the flow returns to S1340. If it is determined that the terminals are at the middle code, then a 10-ms timer is started (S1346), an encoder readout processing operation is carried out (S1348), and it is determined whether the terminal EB is at 1 or not (S1350).

If it is determined that the terminal EB is not at 1, then the flow returns to S1340. If it is determined that that the terminal EB is at 1, then it is determined whether the 10-ms overtime is reached or not (S1352). If it is determined not, then the flow returns to S1348. If it is determined that the overtime is reached, by contrast, then it is determined whether the terminals EA, EB are at a middle code or not (S1354). If it is determined that the terminals EA, EB are not at the middle code, then the flow returns to S1340. If it is determined that the terminals EA, EB are at the middle code, by contrast, then the TELE direction driving is set (S1356), and a time of 2 sec is set as the encoder detection overtime (S1358).

Subsequently, the flow shifts to S1360, where it is determined whether the encoder detection overtime is reached or not. If it is determined that the encoder detection overtime is reached, then the flow shifts to S1382. If it is determined not, by contrast, then an encoder readout processing operation is carried out (S1362), and it is determined whether the terminal EB is at 1 or not (S1364). If it is determined that the terminal EB is at 1, then the flow returns to S1360. If it is determined that the terminal EB is not at 1, then 1 is added to the encoder position (S1366).

Subsequently, the flow shifts to S1368, where it is determined whether the encoder position is at least E7 (TELE end) or not. If it is determined not, then E7 is set as the encoder position (S1370). If it is determined that the encoder position is at least E7, then the flow shifts to S1372, where the encoder position (Em) is set as the lens barrel position (Zn), and a time of 2 sec is set as the encoder detection over time (S1374).

Subsequently, the flow shifts to S1376, where it is determined whether the encoder detection overtime is reached or not. If it is determined that the encoder detection overtime is reached, then the flow shifts to S1382. At S1382, the encoder detection overtime is set. Then, the TELE drive processing operation is terminated.

If it is determined at S1376 that the encoder detection overtime is not reached, then an encoder readout processing operation is carried out (S1378), and it is determined whether the terminal EA is at 1 or not (S1380). If it is determined that the terminal EA is not at 1, then the flow returns to S1376. If it is determined that the terminal EA is at 1, by contrast, then the TELE drive processing operation is terminated.

The WIDE drive processing operation will now be explained.

Figure 46:
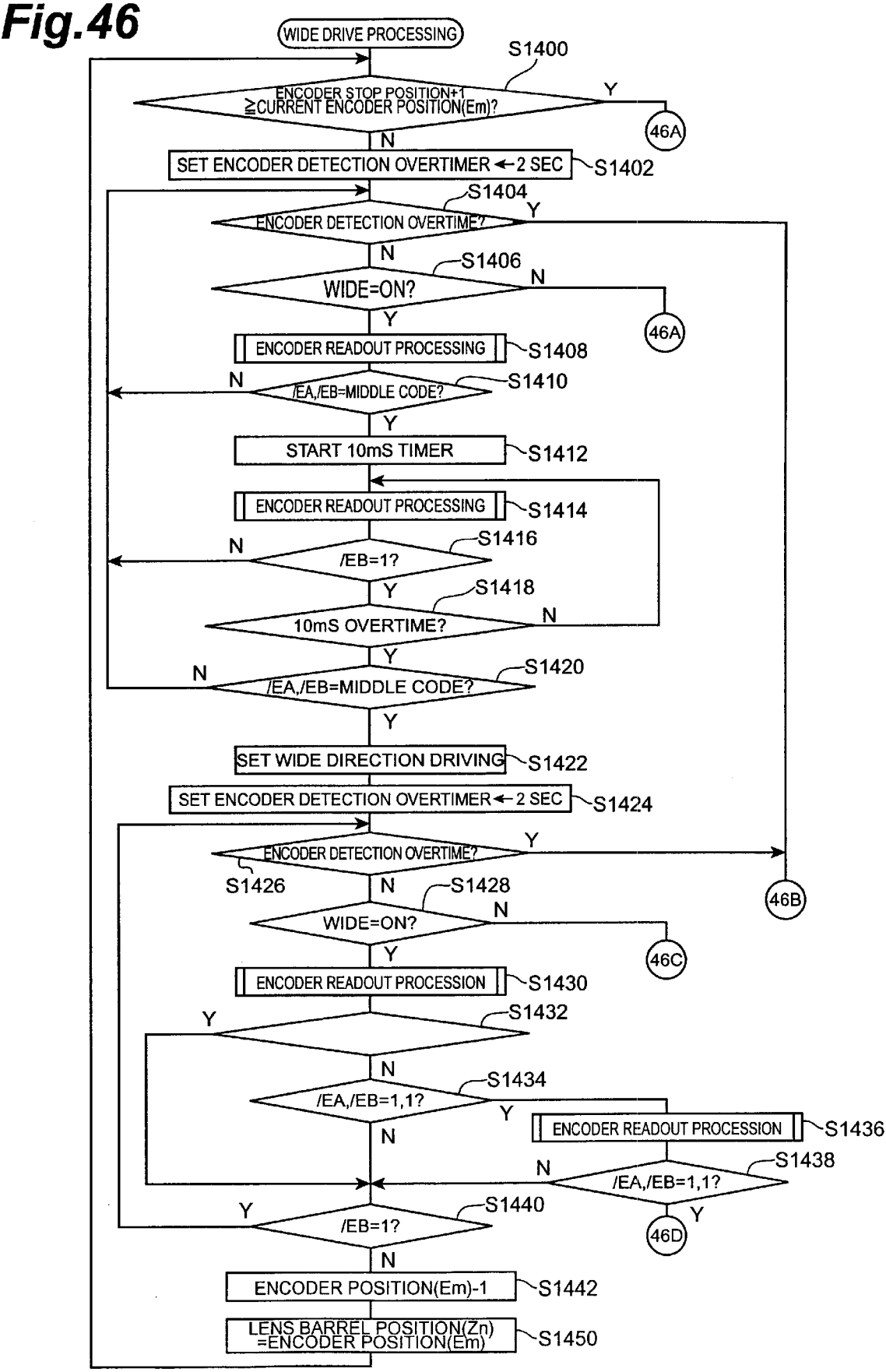
FIG. 46 is a flowchart of a WIDE drive processing operation of the camera equipped with the lens barrel of FIG. 1.
Figure 47:
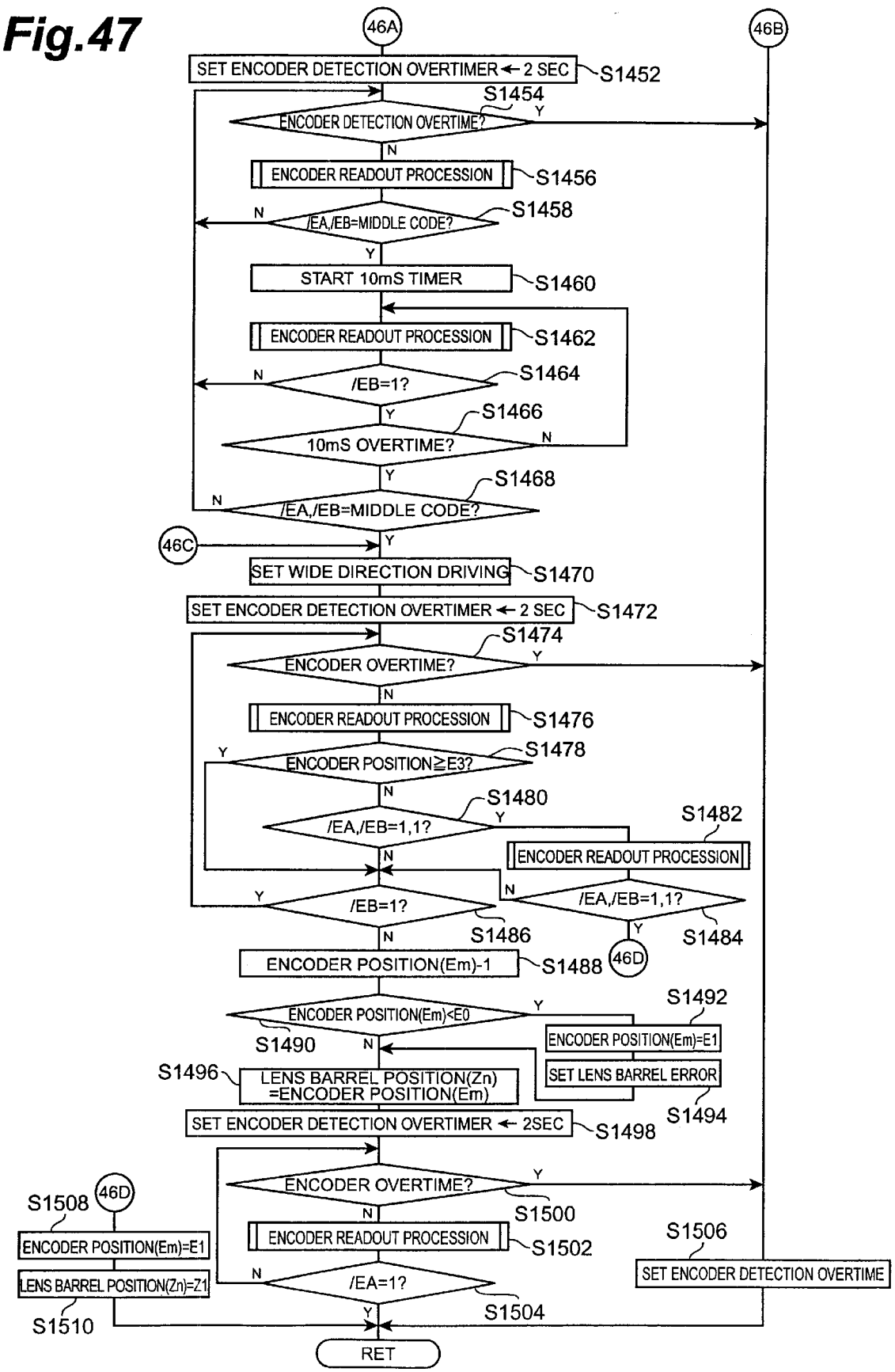
FIG. 47 is a flowchart of the WIDE drive processing operation of the camera equipped with the lens barrel of FIG. 1.

FIGS. 46 and 47 show flowcharts of the WIDE drive processing operation. The WIDE drive processing operation is an operation for collapsing the lens barrel 1.

As shown at S1400 in FIG. 46, it is determined whether the encoder stop position +1 is at least the current encoder position (Em) or not. If it is determined that the encoder stop position +1 is at least the current encoder position (Em), then the flow shifts to S1506 in FIG. 47. If it is determined not, by contrast, then a time of 2 sec is set as the encoder detection overtime (S1402).

Subsequently, it is determined whether the encoder detection overtime is reached or not (S1404). If it is determined that the encoder detection overtime is reached, then the flow shifts to S1506 in FIG. 47. If it is determined not, then the flow shifts to S1406, where it is determined whether the WIDE switch 20 is ON or not. If it is determined that the WIDE switch 20 is not ON, then the flow shifts to S1452 in FIG. 47. If it is determined that the WIDE switch 20 is ON, then the flow shifts to S1408, where an encoder readout processing operation is carried out.

Subsequently, it is determined whether the terminals EA, EB are at a middle code or not (S1410). If it is determined not, then the flow shifts to S1404. If it is determined that the terminals EA, EB are at the middle code, by contrast, then a 10-ms timer is started (S1412), an encoder readout processing operation is carried out (S1414), and it is determined whether the terminal EB is 1 or not (S1416).

If it is determined that the terminal EB is not at 1, then the flow returns to S1404. If it is determined that the terminal EB is at 1, by contrast, then it is determined whether the 10-ms overtime is reached or not (S1418). If it is determined that the overtime is not reached, then the flow returns to S1414. If it is determined that the overtime is reached, by contrast, then it is determined whether the terminals EA, EB are at a middle code or not (S1420). If it is determined that the terminals EA, EB are not at the middle code, then the flow returns to S1404. If it is determined that the terminals EA, EB are at the middle code, then the WIDE direction driving is set (S1422), and a time of 2 sec is set as the encoder detection overtime (S1424).

Subsequently, the flow shifts to S1426, where it is determined whether the encoder detection overtime is reached or not. If it is determined that the encoder detection overtime is reached, then the flow shifts to S1506 in FIG. 47. If it is determined not, then it is determined whether the WIDE switch 20 is ON or not (S1428). If it is determined that the WIDE switch 20 is not ON, then the flow shifts to S1470 in FIG. 47.

If it is determined that the WIDE switch 20 is ON, by contrast, then an encoder readout processing operation is carried out (S1430), and it is determined whether the encoder position is at least E3 or not (S1432). If it is determined that the encoder position is at least E3, then the flow shifts to S1440. If it is determined that the encoder position is not at least E3, by contrast, then it is determined whether both of the terminals EA, EB are at 1 or not (S1434). If it is determined that both of the terminals EA, EB are at 1, then the flow shifts to S1436, where an encoder readout processing operation is carried out, and it is determined again whether both of the terminals EA, EB are at 1 or not (S1438).

If it is determined at S1438 that both of the terminals EA, EB are not at 1, then the flow shifts to S1440. If it is determined at S1438 that both of the terminals EA, EB are at 1, then the flow shifts to S1510 in FIG. 47.

If it is determined at S1434 that both of the terminals EA, EB are not at 1, then it is determined whether the terminal EB is at 1 or not (S1440). If it is determined that the terminal EB is at 1, then the flow returns to S1426. If it is determined that the terminal EB is not at 1, by contrast, then 1 is subtracted from the encoder position (Em) (S1442), and the encoder position (Em) is set as the lens barrel position (Zn) (S1450). Subsequently, the flow returns to S1400.

At S1452 in FIG. 47, a time of 2 sec is set as the encoder detection overtime. Subsequently, it is determined whether the encoder detection overtime is reached or not (S1454). If it is determined that the encoder detection overtime is reached, then the flow shifts to S1506. If it is determined not, by contrast, then the flow shifts to S1456, where an encoder readout processing operation is carried out.

Subsequently, it is determined whether the terminals EA, EB are at a middle code or not (S1458). If it is determined not, then the flow returns to S1454. If it is determined that the terminals EA, EB are at the middle code, then a 10-ms timer is started (S1460), an encoder readout processing operation is carried out (S1462), and it is determined whether the terminal EB is at 1 or not (S1464).

If it is determined at S1464 that the terminal EB is not at 1, then the flow returns to S1454. If it is determined that the terminal EB is at 1, then it is determined whether the 10-ms overtime is reached or not (S1466). If it is determined that the overtime is not reached, by contrast, then the flow returns to S1462. If it is determined that the overtime is reached, then it is determined whether the terminals EA, EB are at a middle code or not (S1468). If it is determined that the terminals EA, EB are not at the middle code, then the flow returns to S1454. If it is determined that the terminals EA, EB are at the middle code, by contrast, then the WIDE direction driving is set (S1470), and a time of 2 sec is set as the encoder detection overtime (S1472).

Subsequently, the flow shifts to S1474, where it is determined whether the encoder detection overtime is reached or not. If it is determined that the encoder detection overtime is reached, then the flow shifts to S1506. If it is determined not, by contrast, then an encoder readout processing operation is carried out (S1476), and it is determined whether the encoder position is at least E3 or not (S1478). If it is determined that the encoder position is at least E3, then the flow shifts to S1486. If it is determined that the encoder position is not at least E3, then it is determined whether both of the terminals EA, EB are at 1 or not (S1480). If it is determined that both of the terminals EA, EB are at 1, then the flow shifts to S1482, where an encoder readout processing operation is carried out, and it is determined again whether both of the terminals EA, EB are at 1 or not (S1484).

If it is determined at S1484 that both of the terminals EA, EB are not at 1, then the flow shifts to S1486. If it is determined at S1484 that both of the terminals EA, EB are at 1, by contrast, then the flow shifts to S1508.

E1 is set as the encoder position at S1508, and Z1 is set as the lens barrel position (S1510). Subsequently, the WIDE drive processing operation is terminated.

At S1486, it is determined whether the terminal EB is at 1 or not. If it is determined that the terminal EB is at 1, then the flow returns to S1474. If it is determined that the terminal EB is not at 1, then 1 is subtracted from the encoder position (S1488).

Subsequently, the flow shifts to S1490, where it is determined whether the encoder position is smaller than E0 or not. If it is determined that the encoder position is smaller than E0, then E1 is set as the encoder position (S1492), and the lens barrel error is set (S1494).

If it is determined at S1490 that the encoder position is not smaller than E0, by contrast, then the flow shifts to S1496, where the encoder position (Em) is set as the lens barrel position (Zn), and a time of 2 sec is set as the encoder detection overtime (S1498).

Subsequently, the flow shifts to S1500, where it is determined whether the encoder detection overtime is reached or not. If it is determined that the encoder detection overtime is reached, then the flow shifts to S1506. At S1506, the encoder detection overtime is set. Then, the WIDE drive processing operation is terminated.

If it is determined at S1500 that the encoder detection overtime is not reached, then an encoder readout processing operation is carried out (S1502), and it is determined whether the terminal EA is at 1 or not (S1504). If it is determined that the terminal EA is not at 1, then the flow returns to S1500. If it is determined that the terminal EA is at 1, by contrast, then the WIDE drive processing operation is terminated.

The lens barrel recovery processing operation will now be explained.

Figure 48:
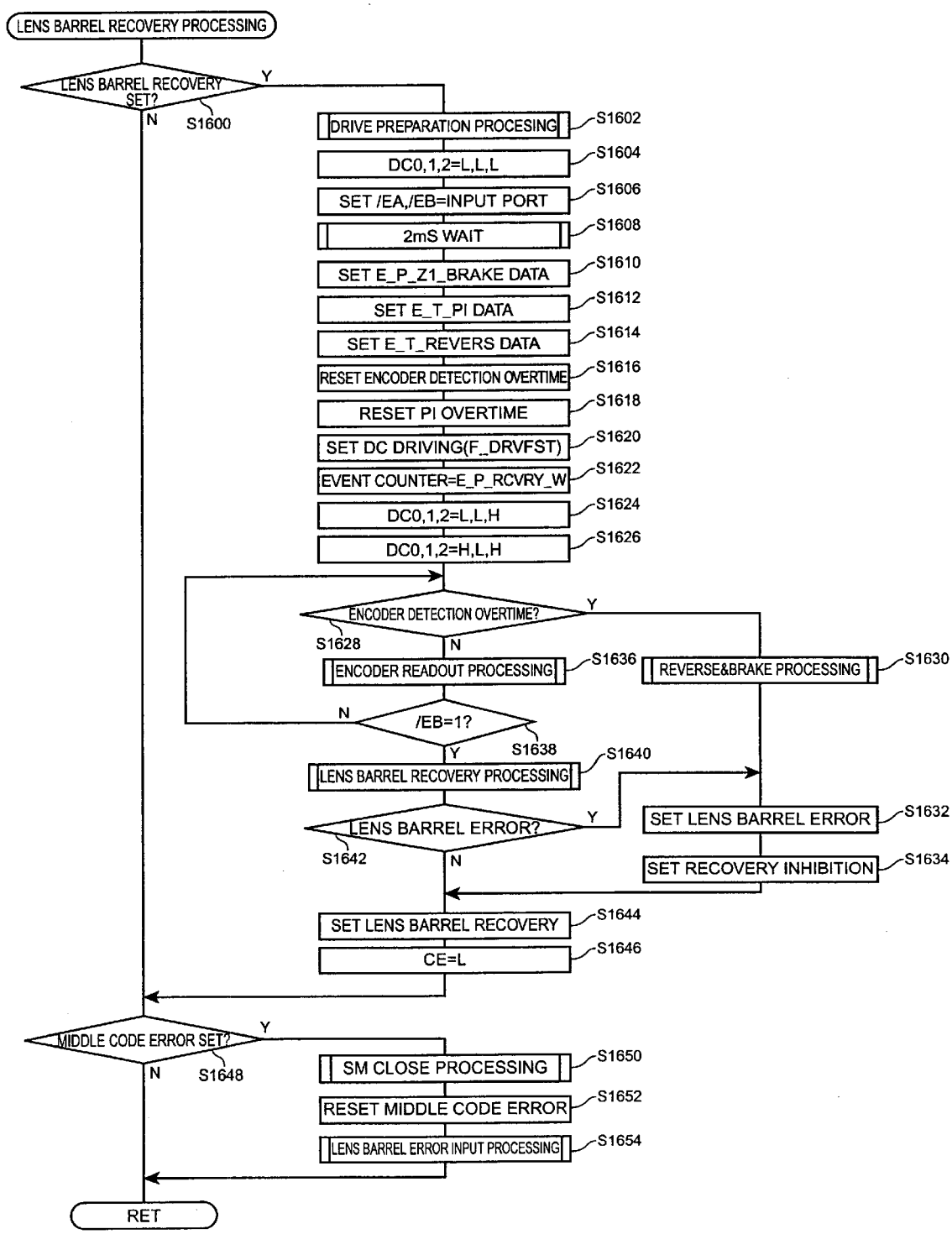
FIG. 48 is a flowchart of a lens barrel recovery processing operation of the camera equipped with the lens barrel of FIG. 1.
Figure 49:
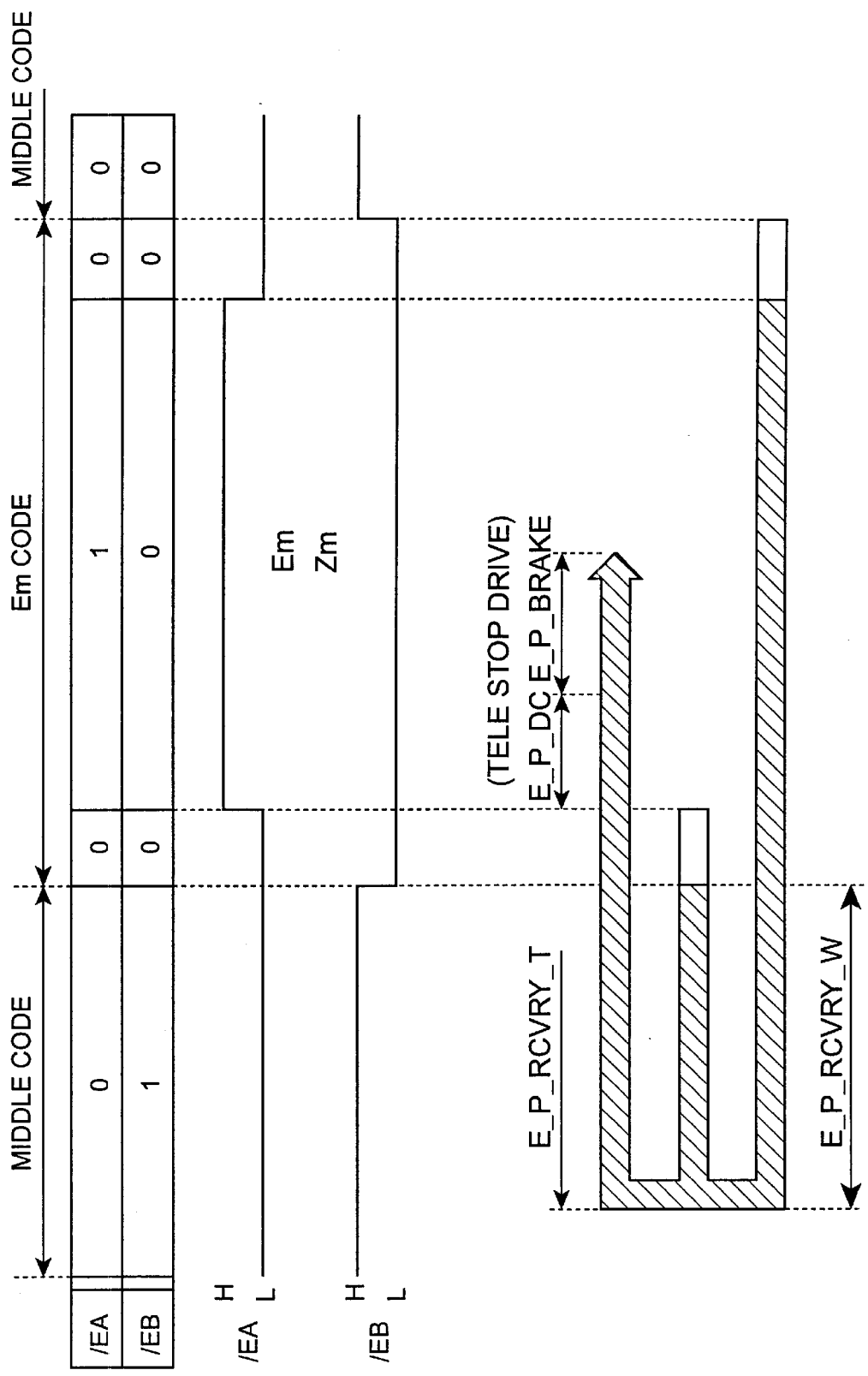
FIG. 49 is a schematic operational chart of the lens barrel recovery processing operation of the camera equipped with the lens barrel of FIG. 1.

FIG. 48 is a flowchart of the lens barrel recovery processing operation, whereas FIG. 49 shows an outline of the lens barrel recovery processing operation. The lens barrel recovery processing operation is an operation by which, when the lens barrel is drawn out or pushed in because of external reasons while the camera 2 is in the standby state, the lens barrel is driven to return.

As shown at S1600 in FIG. 48, it is determined whether the lens barrel recovery is set or not. If it is determined that the lens barrel recovery is not set, then it is considered that the lens barrel is neither drawn out nor pushed in because of external reasons, whereby the flow shifts to S1648. If it is determined that the lens barrel recovery is set, then it is considered that the lens barrel is drawn out or pushed in because of external reasons, whereby the flow shifts to S1602, where a drive preparation processing operation is carried out, so that the lens barrel driving motor 227 is selected as the motor to drive.

Subsequently, the flow shifts to S1604, where the outputs of parallel terminals DC0 to DC2 are set L so that the motor 227 is placed into the wait state, and terminals EA, EB are set as the input port (S1606). Then, after a wait of 2 ms (S1608), Z1 stopping brake point data (E_P_Z1_BRAKE) is set (S1610), normal rotation width restriction time data (E_T_PI) is set (S1612), and reverse rotation brake time data (E_T_REVERS) is set (S1614).

Subsequently, the encoder detection overtime is reset (S1616), the PI overtime is reset (S1618), the DC driving flag is set (S1620), and WIDE driving WIDE direction recovery pulse data (E_P_RCVRY_W) is set as the event counter (S1622).

Subsequently, the flow shifts to S1624, where the outputs of parallel terminals DC0, DC1, and DC2 are set L, L, and H, respectively, so as to attain the wait state. Then, the outputs of parallel terminals DC0, DC1, and DC2 are set H, L, and H, respectively, so as to carry out WIDE driving (S1626), and it is determined whether the encoder detection overtime is reached or not (S1628). If it is determined that the encoder detection overtime is reached, then a reverse and brake processing operation is carried out (S1630), the lens barrel error is set (S1632), and the recovery inhibition is set (S1634).

If it is determined at S1628 that the encoder detection overtime is not reached, by contrast, then an encoder readout processing operation is carried out (S1636), and it is determined whether the terminal EB is at 1 or not (S1638). If it is determined that the terminal EB is not at 1, then the flow returns to S1628. If it is determined that the terminal EB is at 1, by contrast, then a lens barrel recovery drive processing operation is carried out (S1640). The lens barrel recovery drive processing operation will be explained later in detail.

Subsequently, the flow shifts to S1642, where it is determined whether the lens barrel error is set or not. If it is determined that the lens barrel error is set, then the flow shifts to S1632. If it is determined that the lens barrel error is not set, then the lens barrel recovery is reset (S1644), the driver ON/OFF terminal CE is set L so that the driver section 219 is placed into the inactive state (S1646), and the flow shifts to S1648.

At S1648, it is determined whether the middle code error is set or not. If it is determined not, then the lens barrel recovery processing operation is terminated. If it is determined that the middle code error is set, by contrast, then an SM close processing operation is carried out (S1650; see FIG. 28), the middle code error is reset (S1652), and a lens barrel error input processing operation is carried out (S1654). Subsequently, the lens barrel recovery processing operation is terminated.

As in the foregoing, when the lens barrel is drawn out or pushed in because of external reasons while the camera 2 is in the standby state, the lens barrel recovery processing operation can return the lens barrel position to the original position or collapse the lens barrel so as to close the barrier 83. Consequently, the camera 2 can be kept from being placed into a failure state when the lens barrel position is considered to be in error in the case where the lens barrel is drawn out or pushed because of external reasons. Therefore, the camera 2 can be prevented from easily failing.

The lens barrel recovery drive processing operation will now be explained.

Figure 50:
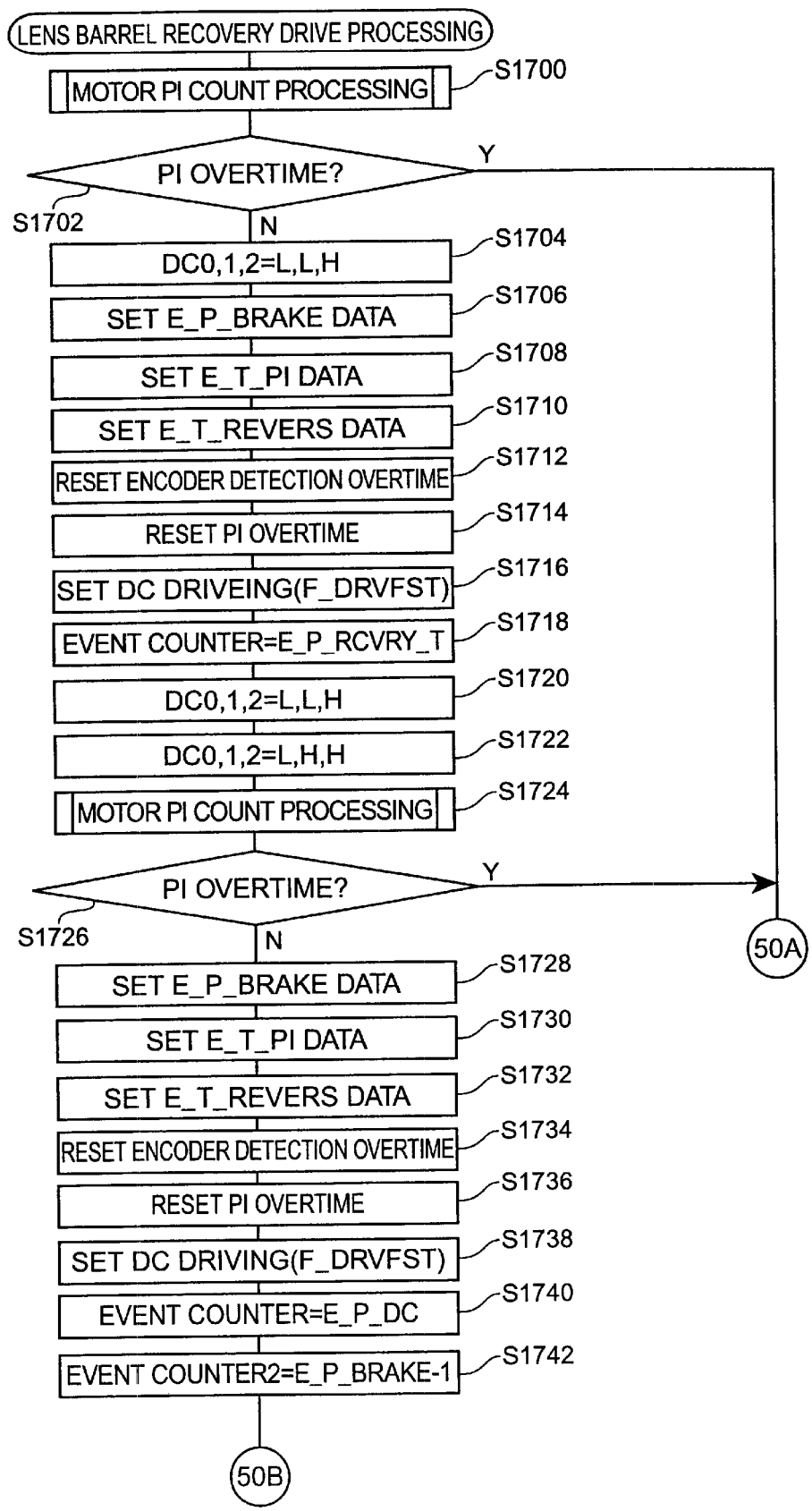
FIG. 50 is a flowchart of a lens barrel recovery drive processing operation of the camera equipped with the lens barrel of FIG. 1.
Figure 51:
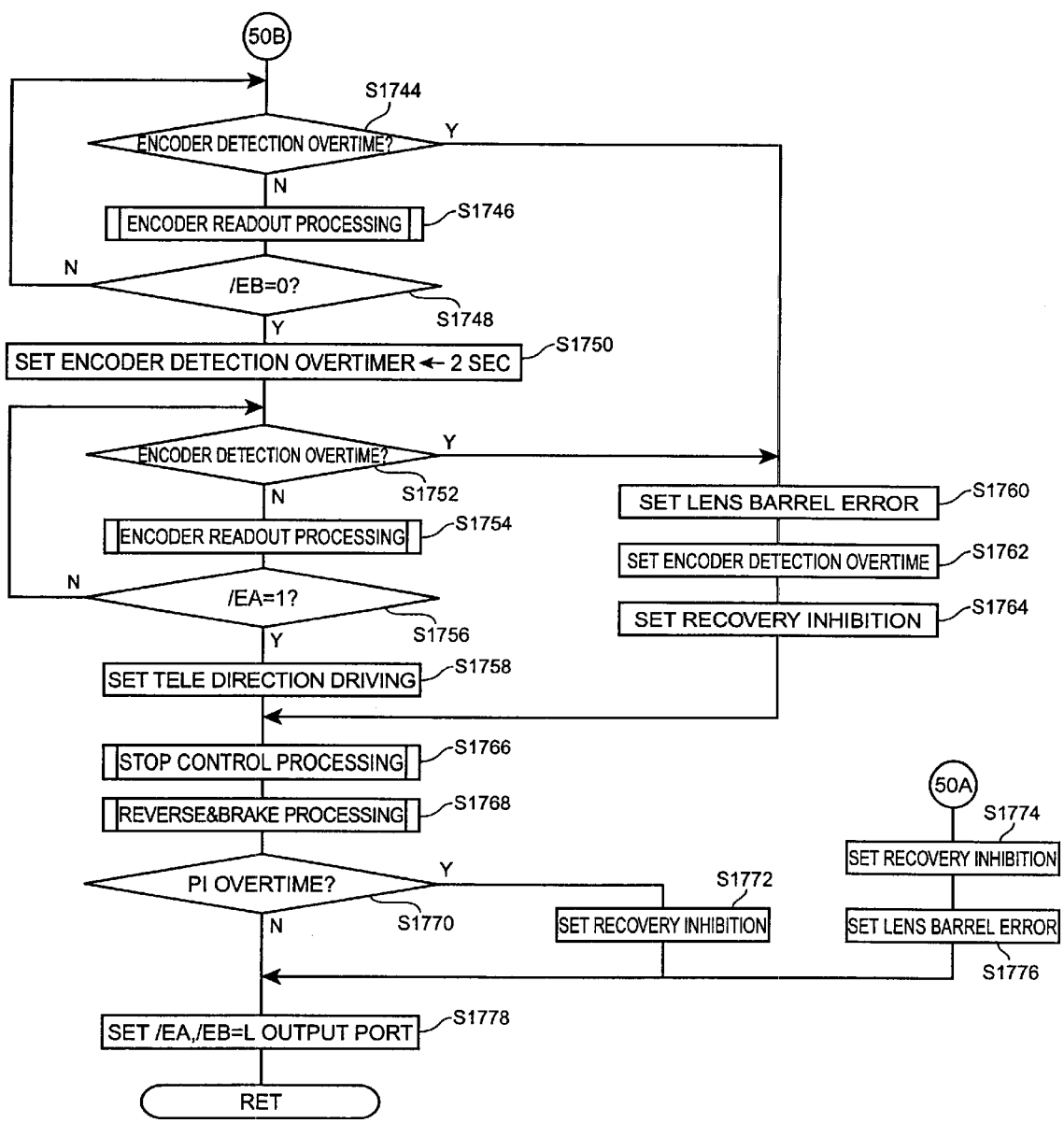
FIG. 51 a flowchart of the lens barrel recovery drive processing operation of the camera equipped with the lens barrel of FIG. 1.

FIGS. 50 and 51 show flowcharts of the lens barrel recovery drive processing operation. The lens barrel recovery drive processing operation is an operation carried out during the lens barrel recovery processing operation (see S1640 in FIG. 48).

As shown at S1700 in FIG. 50, a motor PI count processing operation is carried out. The motor PI count processing operation will be explained later in detail (see FIG. 52). Subsequently, the flow shifts to S1702, where it is determined whether the PI overtime is reached or not. If it is determined that the PI overtime is reached, then the flow shifts to S1774 in FIG. 51. If it is determined that the PI overtime is not reached, by contrast, then the outputs of parallel terminals DC0, DC1, and CD2 are set L, L, and H, respectively, so as to attain the wait state (S1704), brake point data (E_P_BRAKE) is set (S1706), normal rotation width restriction time data (E_T_PI) is set (S1708), and reverse brake time data (E_T_REVERS) is set (S1710).

Subsequently, the encoder detection overtime is reset (S1712), the PI overtime is reset (S1714), the DC driving flag is set (S1716), and WIDE driving TELE direction recovery pulse data (E_P_RCVRY_T) is set as the event counter (S1718).

Subsequently, the flow shifts to S1720, where the outputs of the parallel terminals DC0, DC1, and DC2 are set L, L, and H, respectively, so as to attain the wait state. Then, the outputs of the parallel terminals DC0, DC1, and DC2 are set L, H, and H, respectively, so as to carry out a TELE driving operation (S1722), and the motor PI count processing operation is carried out (S1724).

Subsequently, it is determined whether the PI overtime is reached or not (S1726). If it is determined that the PI overtime is reached, then the flow shifts to S1774 in FIG. 51. If it is determined not, then brake point data (E_P_BRAKE) is set (S1728), normal rotation width restriction time data (E_T_PI) is set (S1730), and reverse brake time data (E_T_REVERS) is set (S1732).

Subsequently, the encoder detection overtime is reset (S1734), the PI overtime is reset (S1736), the DC driving flag is set (S1738), DC drive switching point pulse data (E_P_DC) is set as the event counter (S1740), and brake point pulse data −1 (E_P_BRAKE-1) is set as the event counter 2 (S1742).

Subsequently, the flow shifts to S1744, where it is determined whether the encoder detection overtime is reached or not. If it is determined that the encoder detection overtime is reached, then the lens barrel error is set (S1760), the encoder detection overtime is set (S1762), and the recovery inhibition is set (S1764). Thereafter, the flow shifts to S1766.

If it is determined at S1744 that the encoder detection overtime is not reached, then an encoder readout processing operation is carried out (S1746), and it is determined whether the terminal EB is at 0 or not (S1748). If it is determined that the terminal EB is not at 0, then the flow returns to S1744. If it is determined that the terminal EB is at 0, by contrast, then a time of 2 sec is set as the encoder detection overtime (S1750).

Subsequently, the flow shifts to S1752, where it is determined whether the encoder detection overtime is reached or not. If it is determined that the encoder detection overtime is reached, then the flow shifts to S1760. If it is determined not, by contrast, then an encoder readout processing operation is carried out (S1754), and it is determined whether the terminal EA is at 1 or not (S1756). If it is determined that the terminal EA is not at 1, then the flow returns to S1752. If it is determined that the terminal EA is at 1, then the TELE direction driving is set (S1758).

Subsequently, the flow shifts to S1766, where a stop control processing operation is carried out, and a reverse and brake processing operation is carried out (S1768). Then, the flow shifts to S1770, where it is determined whether the PI overtime is reached or not. If it is determined not, then the flow shifts to S1778. If it is determined that the PI overtime is reached, by contrast, then the recovery inhibition is set (S1772), and the flow shifts to S1778. The recovery inhibition is set at S1774, and the lens barrel error is set (S1776).

Subsequently, the flow shifts to S1778, where the terminals EA, EB are set as the output port, and the lens barrel recovery drive processing operation is terminated.

The motor PI count processing operation will now be explained.

Figure 52:
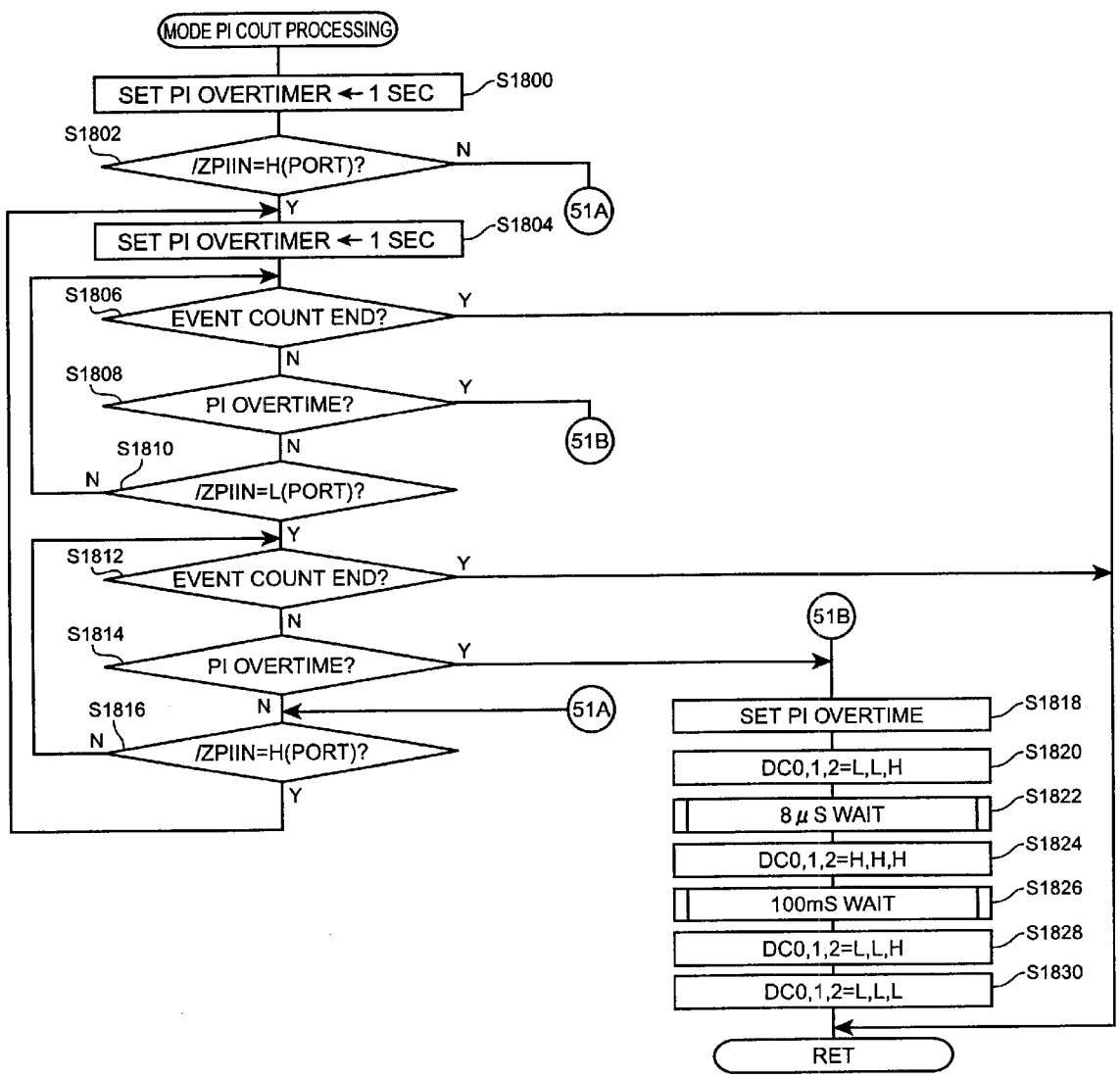
FIG. 52 is a flowchart of a mode PI count processing operation of the camera equipped with the lens barrel of FIG. 1.

FIG. 52 shows a flowchart of the motor PI count processing operation. The motor PI count processing operation is an operation, carried out during the lens barrel recovery drive processing operation (see FIGS. 50 and 51), for counting the amount of rotation of lens barrel driving motor 227 according to the output from the drive detector 228.

As shown at S1800 in FIG. 52, a time of 1 sec is set as the PI overtime. Subsequently, it is determined whether the input of the terminal ZPIIN receiving the output of drive detector 228 is at H (HIGH) or not (S1802). If it is determined not, then the flow shifts to S1816. If it is determined that the terminal ZPIIN is at H, by contrast, then a time of 1 sec is set as the PI overtime (S1804), and it is determined whether the event count is terminated or not (S1806).

If it is determined at S1806 that the event count is terminated, then the motor PI count processing operation is terminated. If it is determined not, by contrast, then it is determined whether the PI overtime is reached or not (S1808).

If it is determined at S1808 that the PI overtime is reached, then the flow shifts to S1818. If it is determined not, then it is determined whether the terminal ZPIIN is at L (LOW) or not (S1810). If it is determined that the terminal ZPIIN is not at L, then the flow shifts to S1806. If it is determined that the terminal ZPIIN is at L, by contrast, then it is determined whether the event count is terminated or not (S1812).

If it is determined at S1812 that the event count is terminated, then the motor PI count processing operation is terminated. If it is determined not, by contrast, then it is determined whether the PI overtime is reached or not (S1814).

If it is determined at S1814 that the PI overtime is reached, then the flow shifts to S1818. If it is determined not, then it is determined whether the terminal ZPIIN is at H or not (S1816). If it is determined that the terminal ZPIIN is not at H, then the flow returns to S1812. If it is determined that the terminal ZPIIN is at H, then the flow returns to S1804.

At S1818, the PI overtime is set. Subsequently, the outputs of parallel terminals DC0, DC1, and DC2 are set L, L, and H, respectively, so as to attain the wait state (S1820). Then, after a wait of 8 .s (S1822), the outputs of parallel terminals DC0, DC1, and DC2 are set H, H, and H, respectively, so as to attain the brake output state (S1824). Subsequently, after a wait of 100 ms (S1826), the outputs of parallel terminals DC0, DC1, and DC2 are set L, L, and H, respectively, so that the camera 2 is placed into the wait state (S1828). Then, the outputs of parallel terminals DC0, DC1, and DC2 are set L, L, and L, respectively, so that the camera 2 is held in the wait state (S1830), and the motor PI count processing operation is terminated.

The lens drive and return processing operations will now be explained.

Figure 53:
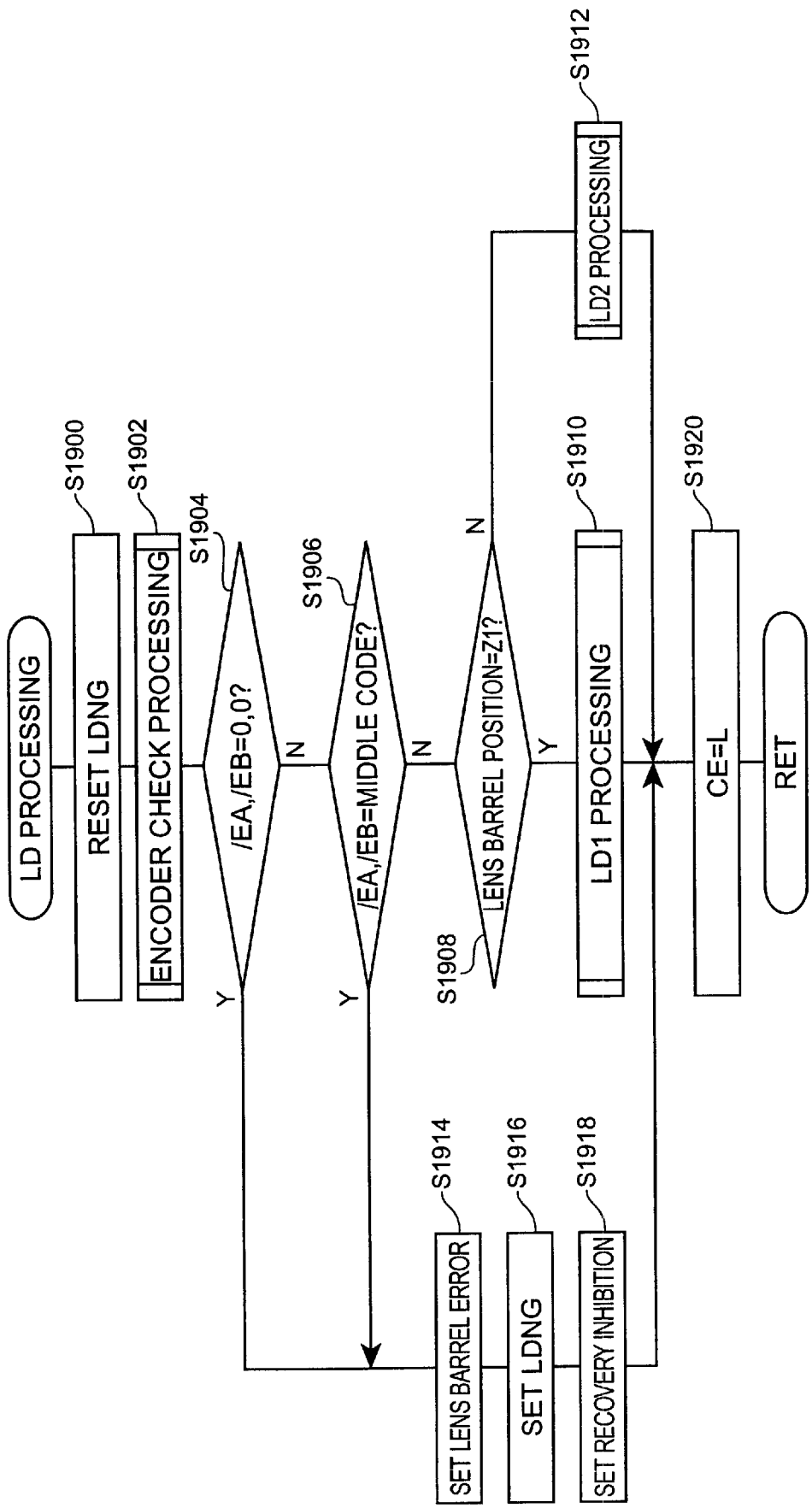
FIG. 53 is a flowchart of a lens drive processing operation of the camera equipped with the lens barrel of FIG. 1.
Figure 54:
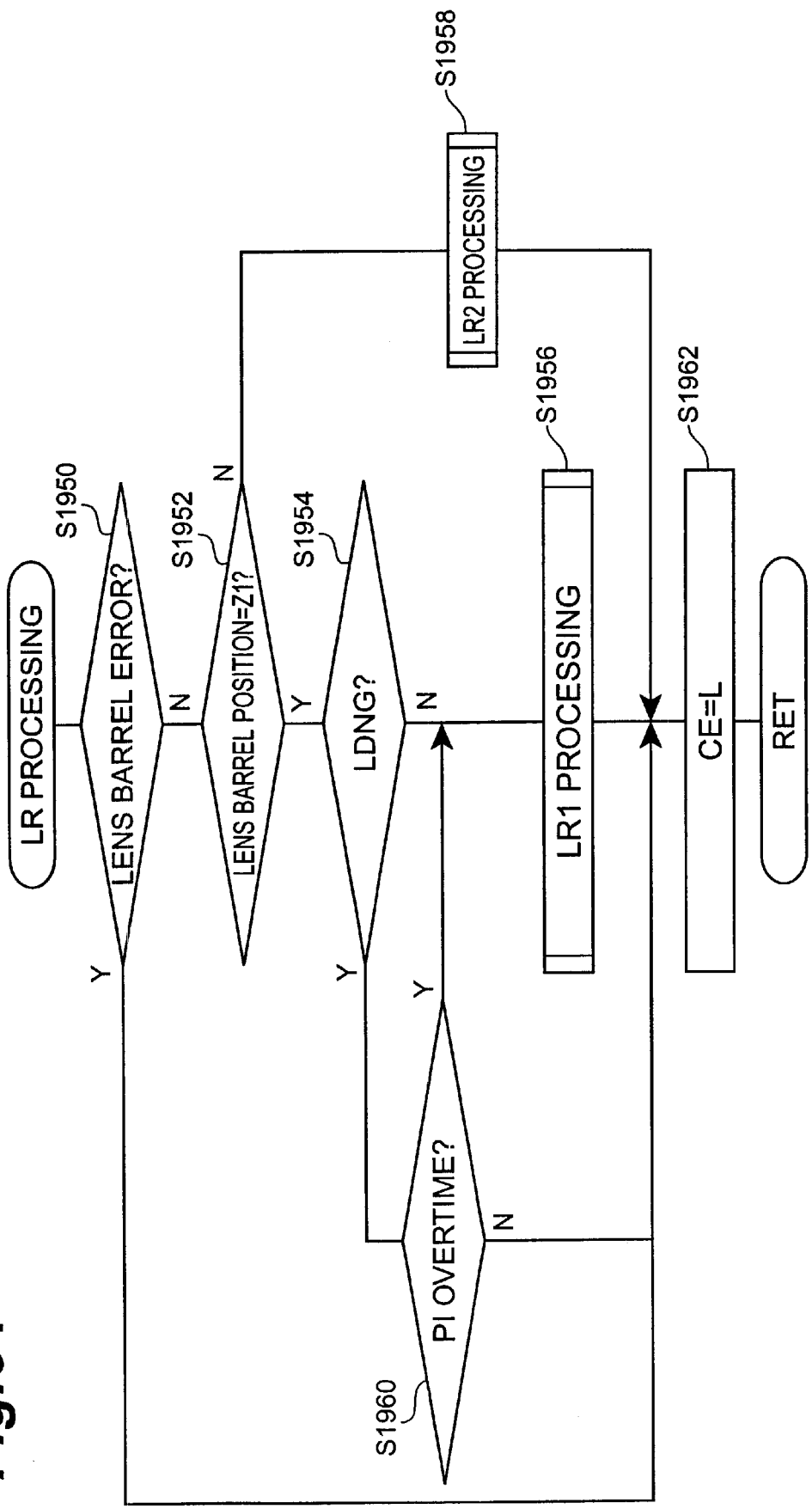
FIG. 54 is a flowchart of a lens return processing operation of the camera equipped with the lens barrel of FIG. 1.

FIGS. 53 and 54 show flowcharts of the lens drive and return processing operations, respectively. The lens drive processing operation is an operation for expanding the lens barrel 1 as a whole or the second lens group 102 (focus) when the shutter button 11 is operated. The lens return processing operation is an operation by which the lens barrel 1 or second lens group 102 expanded by the lens drive processing operation is returned to the wait position.

As shown at S1900 in FIG. 53, the lens drive NG is initially reset in the lens drive processing operation. Subsequently, an encoder check processing operation is carried out (S1902), and it is determined whether the terminals EA, EB are at 0 or not (S1904). If it is determined that the terminals EA, EB are at 0, then the lens barrel error is set (S1914), the lens drive NG is set (S1916), the recovery inhibition is set (S1918), and the flow shifts to S1920.

If it is determined at S1904 that both of the terminals EA, EB are not at 0, by contrast, then it is determined whether the terminals EA, EB are at a middle code or not (S1906). If it is determined that the terminals EA, EB are at the middle code, then the flow shifts to S1914. If it is determined that the terminals EA, EB are not at the middle code, by contrast, then it is determined whether the lens barrel position is at Z1 or not (S1908). If it is determined that the lens barrel position is at Z1, a first lens drive (LD1) processing operation is carried out (S1910).

If it is determined that the lens barrel position is not at Z1, then a second lens drive (LD2) processing operation is carried out (S1912). The first lens drive processing operation is an operation for expanding the lens barrel 1 as a whole. The second lens drive processing operation is an operation for expanding the second lens group 102. The first and second lens drive processing operations will be explained later in detail.

Subsequently, the flow shifts to S1920, where the driver ON/OFF terminal CE is set L, so as to place the driver section 219 into the inactive state, whereby the lens drive processing operation is terminated.

In the lens return processing operation, as shown at S1950 in FIG. 54, it is initially determined whether the lens barrel error is set or not. If it is determined that the lens barrel error is set, then the flow shifts to S1962. If it is determined not, by contrast, then it is determined whether the lens barrel position is at Z1 or not (S1952). If it is determined that the lens barrel position is not at Z1, then a second lens return (LR2) processing operation is carried out (S1958).

The second lens return processing operation is an operation by which the second lens group 102 expanded by the second lens drive processing operation is moved to the wait position. The second lens return processing operation will be explained later in detail. If it is determined at S1952 that the lens barrel position is at Z1, then it is determined whether the lens drive NG is attained or not (S1954). If it is determined that the lens drive NG is attained, then it is determined whether the PI overtime is reached or not (S1960).

If it is determined at S1960 that the PI overtime is not reached, then the flow shifts to S1962. If it is determined that the PI overtime is reached, by contrast, then the flow shifts to S1956.

If it is determined at S1954 that the lens drive NG is not attained, then a first lens return (LR1) processing operation is carried out (S1956). The first lens return processing operation is an operation by which the whole lens barrel 1 expanded by the first lens drive processing operation is moved to the wait position. The first lens return processing operation will be explained later in detail.

Subsequently, the flow shifts to S1962, where the driver ON/OFF terminal CE is set L, so that the driver section 219 is placed into the inactive state, and the lens return processing operation is terminated.

The first lens drive and return processing operations will now be explained.

Figure 55:
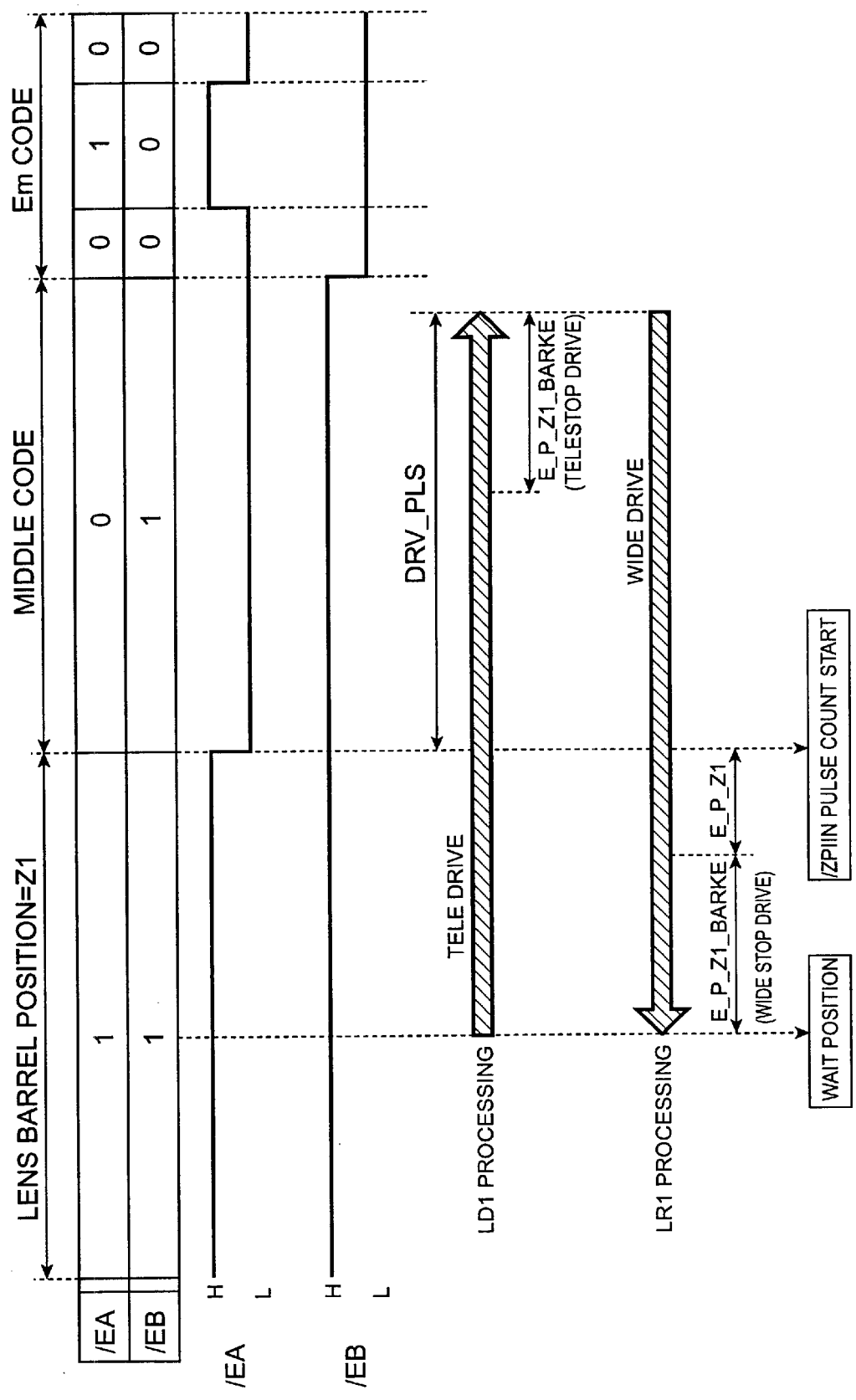
FIG. 55 is a schematic operational chart of a first lens drive processing operation and a first lens return processing operation of the camera equipped with the lens barrel of FIG. 1.

FIG. 55 shows an outline of the first lens drive and return processing operations. Thick arrows in FIG. 55 indicate movements of the lens barrel 1. The first lens drive processing operation is an operation for expanding the lens barrel 1 as a whole upon the TELE driving of the lens barrel driving motor 227. The first lens return processing operation is an operation by which the whole lens barrel 1 expanded by the first lens drive processing operation upon the WIDE driving of the lens barrel driving motor 227 is returned to the wait position.

FIGS. 56 to 59 show flowcharts of the first lens drive (LD1) processing operation.

Figure 56:
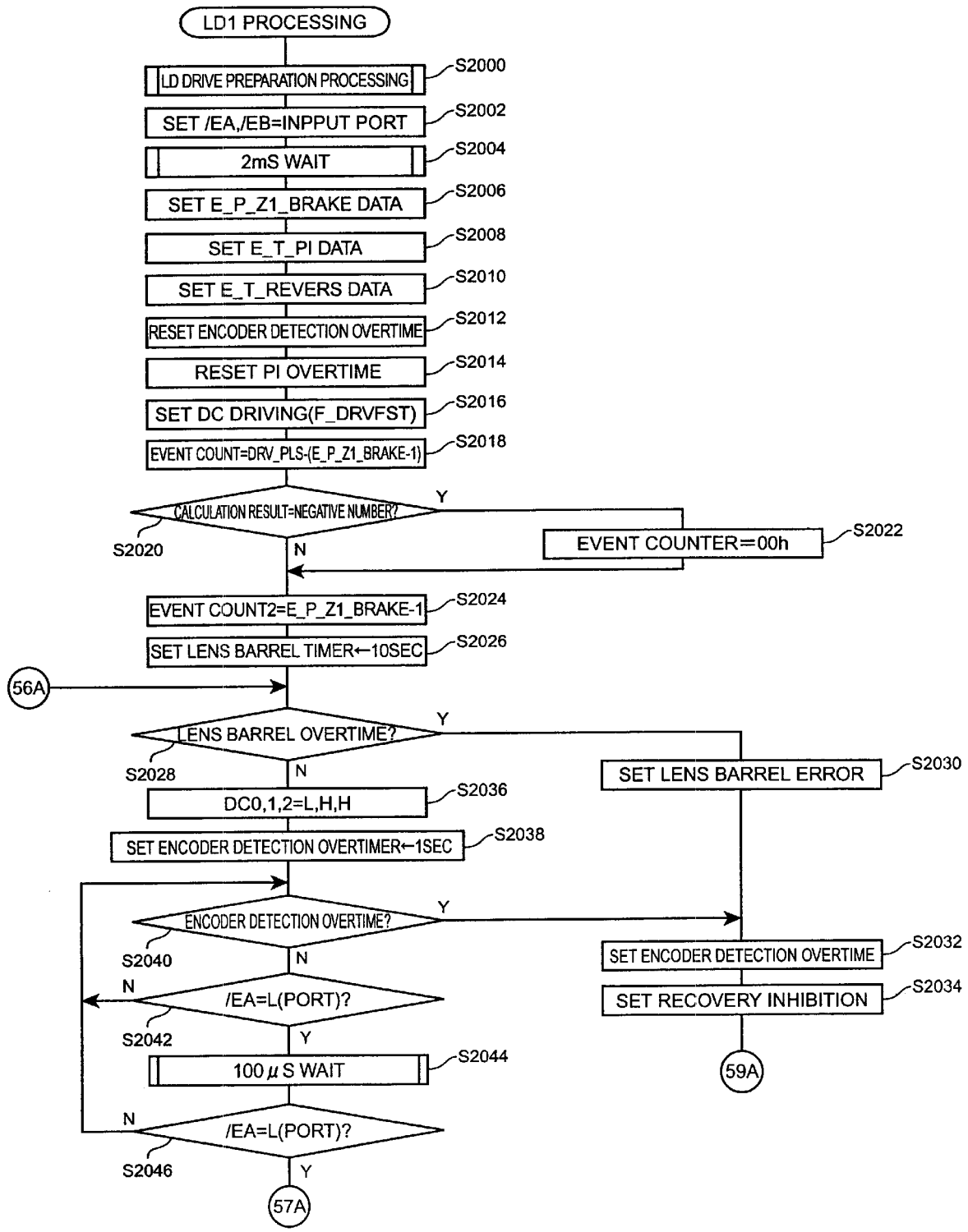
FIG. 56 is a flowchart of the first lens drive processing operation of the camera equipped with the lens barrel of FIG. 1.

As shown at S2000 in FIG. 56, an LD drive preparation processing operation is carried out, so that the motor 227 of the lens barrel driving section 222 is selected as the motor to drive. Subsequently, the flow shifts to S2002, where the terminals EA, EB are set as the input port. Then, after a wait of 2 ms (S2004), Z1 stopping brake point pulse data (E_P_Z1_BRAKE) is set (S2006), normal rotation width restriction time data (E_T_PI) is set (S2008), and reverse brake time data (E_T_REVERS) is set (S2010).

Subsequently, the encoder detection overtime flag is reset (S2012), the PI overtime is reset (S2014), the DC driving flag is set (S2016), and the pulse data (DRV_PLS-(E_P_Z1_BRAKE-1)) obtained when Z1 stopping brake point pulse data -1 is subtracted from the drive pulse data is set as the event count (S2018). The drive pulse data (DRV_PLS) is pulse data determined by an expansion calculating operation.

Subsequently, the flow shifts to S2020, where it is determined whether the result of calculation of event counter is a negative number or not. If it is determined that the result of calculation is a negative number, then 0 is set to the event counter, and the flow shifts to S2024. If it is determined not, by contrast, the flow directly shifts to S2024.

Z1 stopping brake point pulse data -1 (E_P_Z_BRAKE-1) is set as the event count 2 at S2024, and a time of 10 sec is set as the lens barrel timer (S2026). Subsequently, it is determined whether the lens barrel timer is overtime or not (S2028). If it is determined that the lens barrel timer is overtime, then the lens barrel error is set (S2030), the encoder detection overtime is set (S2032), and the recovery inhibition is set (S2034). Thereafter, the flow shifts to S2150 in FIG. 59.

If it is determined at S2028 that the lens barrel timer has not reached overtime, then the outputs of parallel terminals DC0, DC1, and DC2 are set L, H, and H, respectively, so as to carry out TELE driving (S2036), and a time of 1 sec is set as the encoder detection overtime (S2038).

Subsequently, the flow shifts to S2040, where it is determined whether the encoder detection overtime is reached or not. If it is determined that the encoder detection overtime is reached, then the flow shifts to S2032. If it is determined not, then it is determined whether the terminal EA is at L or not (S2042). If it is determined that the terminal EA is not at L, then the flow returns to S2040.

If it is determined that the terminal EA is at L, by contrast, then, after a wait of 100 .s (S2044), it is determined whether the terminal EA is at L or not (S2046). If it is subsequently determined that the terminal EA is not at L, then the flow returns to S2040. If it is determined that the terminal EA is at L, by contrast, then the flow shifts to S2048 in FIG. 57.

A time of 500 ms is set as the PI overtime at S2048, and it is determined whether the terminal ZPIIN is at H or not (S2050). If it is determined not, then the flow shifts to S2080. If it is determined that the terminal ZPIIN is at H, by contrast, then a time of 500 ms is set as the PI overtime (S2052), and it is determined whether the event count is terminated or not (S2064).

If it is determined that the event count is not terminated, then it is determined whether the PI overtime is reached or not (S2066). If it is determined that the PI overtime is reached, then the flow shifts to S2100 in FIG. 58, where the PI overtime is set, the recovery inhibition is set (S2102), and the flow shifts to S2156 in FIG. 59.

Figure 57:
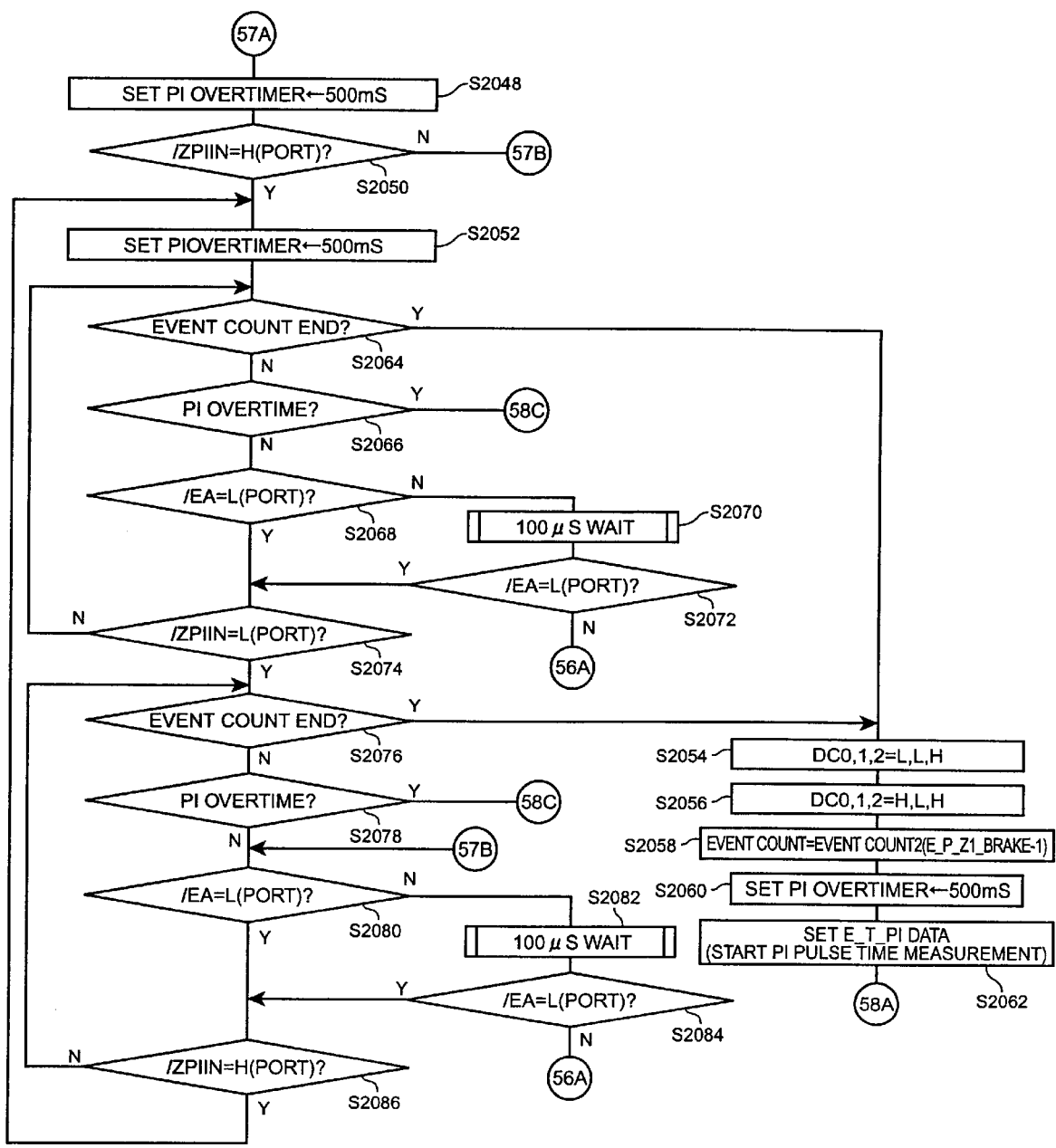
FIG. 57 is a flowchart of the first lens drive processing operation of the camera equipped with the lens barrel of FIG. 1.

If it is determined at S2066 in FIG. 57 that the PI overtime is not reached, then it is determined whether the terminal EA is at L or not (S2068). If it is determined not, then, after a wait of 100 .s (S2070), it is determined whether the terminal EA is at L or not (S2072). If it is determined that the terminal EA is at L, then the flow shifts to S2074. If it is determined not, by contrast, then the flow returns to S2028 in FIG. 56.

If it is determined at S2068 that the terminal EA is at L, by contrast, then it is determined whether the terminal ZPIIN is at L or not (S2074). If it is determined that the terminal ZPIIN is not at L, then the flow returns to S2064.

If it is determined that the terminal ZPIIN is at L, then it is determined whether the event counter is terminated or not (S2076). If it is determined that the event count is terminated, then the flow shifts to S2054. If it is determined that the event count is not terminated, by contrast, then it is determined whether the PI overtime is reached or not (S2078). If it is determined that the PI overtime is reached, then the flow shifts to S2100 in FIG. 58. If it is determined that the PI overtime is not reached, by contrast, then it is determined whether the terminal EA is at L or not (S2080). If it is determined that the terminal EA is not at L, then, after a wait of 100 .s (S2082), it is determined whether the terminal EA is at L or not (S2084). If it is determined that the terminal EA is at L, then the flow shifts to S2086. If it is determined that the terminal EA is not at L, then the flow returns to S2028 in FIG. 56.

If it is determined at S2080 that the terminal EA is at L, then it is determined whether the terminal ZPIIN is at H or not (S2086). If it is determined not, then the flow returns to S2076. If it is determined that the terminal ZPIIN is at H, by contrast, then the flow returns to S2052.

If it is determined at S2064 that the event count is terminated, then the outputs of parallel terminals DC0, DC1, and DC2 are set L, L, and H, respectively, so as to place the camera 2 into the wait state (S2054). Subsequently, the outputs of parallel terminals DC0, DC1, and DC2 are set H, L, and H, respectively, so as to carry out WIDE driving (S2056).

Subsequently, the data of the event counter 2 is set as the event count (S2058), a time of 500 ms is set as the PI overtime (S2060), and the normal rotation width restriction time data (E_T_PI) is set (S2062).

Figure 58:
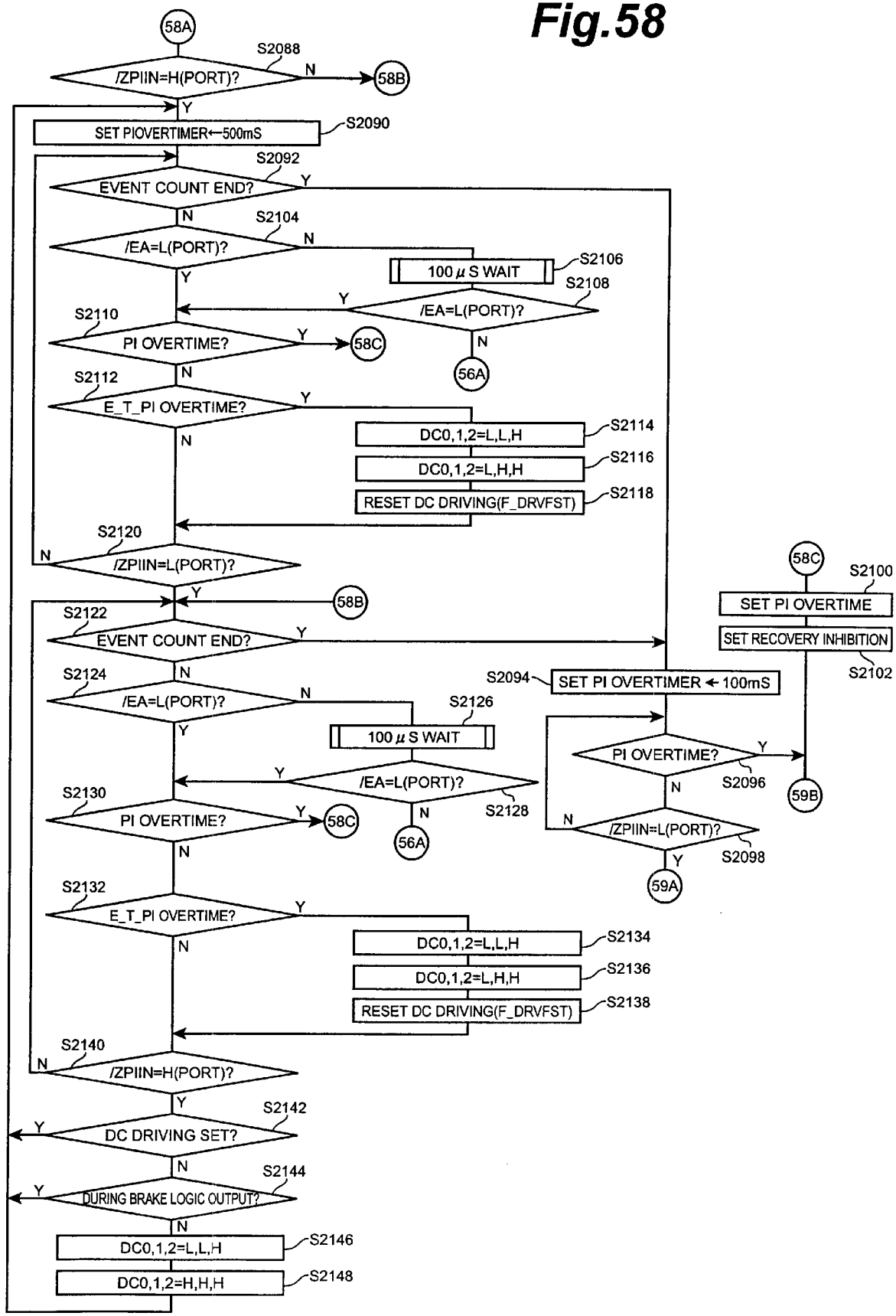
FIG. 58 is a flowchart of the first lens drive processing operation of the camera equipped with the lens barrel of FIG. 1.

Then, the flow shifts to S2088 in FIG. 58, where it is determined whether the terminal ZPIIN is at H or not. If it is determined not, then the flow shifts to S2122. If it is determined that the terminal ZPIIN is at H, then a time of 500 ms is set as the PI overtime (S2090), and it is determined whether the event count is terminated or not (S2092).

If it is determined at S2092 that the event counter is not terminated, then it is determined whether the terminal EA is at L or not (S2104). If it is determined that the terminal EA is not at L, then, after a wait of 100 .s (S2106), it is determined whether the terminal EA is at L or not (S2108). If it is determined that the terminal EA is at L, then the flow shifts to S2110. If it is determined that the terminal EA is not at L, then the flow returns to S2028 in FIG. 56. If it is determined at S2104 that the terminal EA is at L, by contrast, then the flow shifts to S2110.

At S2110, it is determined whether the PI overtime is reached or not. If it is determined that the PI overtime is reached, then the flow shifts to S2100. If it is determined that the PI overtime is not reached, by contrast, then it is determined whether the normal rotation width restriction time (E_T_PI) is overtime or not (S2112).

If it is determined that the normal rotation width restriction time (E_T_PI) is not overtime, then the flow shifts to S2120. If it is determined that normal rotation width restriction time (E_T_PI) is overtime, then the outputs of parallel terminals DC0, DC1, and DC2 are set L, L, and H, respectively, so as to place the motor 95 into the wait state (S2114). Subsequently, the outputs of parallel terminals DC0, DC1, and DC2 are set L, H, and H, respectively, so as to carry out TELE driving (S2116), and the DC driving is reset (S2118). Then, the flow shifts to S2120.

At S2120, it is determined whether the terminal ZPIIN is at L or not. If it is determined not, then the flow returns to S2092. If it is determined that the terminal ZPIIN is at L, by contrast, then it is determined whether the event count is terminated or not (S2122).

If it is determined at S2122 that the event count is terminated, then the flow shifts to S2094. If it is determined not, then it is determined whether the terminal EA is at L or not (S2124). If it is determined that the terminal EA is not at L, then, after a wait of 100 .s (S2126), it is determined whether the terminal EA is at L or not (S2128). If it is determined that the terminal EA is at L, then the flow shifts to S2130. If it is determined that the terminal EA is not at L, by contrast, then the flow returns to S2028 in FIG. 56. If it is determined at S2124 that the terminal EA is at L, then the flow shifts to S2130.

At S2130, it is determined whether the PI overtime is reached or not. If it is determined that the PI overtime is reached, then the flow shifts to S2100. If it is determined that the PI overtime is not reached, by contrast, then it is determined whether the normal rotation width restriction time (E_T_PI) is overtime or not (S2132).

If it is determined that the normal rotation width restriction time (E_T_PI) is not overtime, then the flow shifts to S2140. If it is determined that the normal rotation width restriction time (E_T_PI) is overtime, then the outputs of parallel terminals DC0, DC1, and DC2 are set L, L, and H, respectively, so that the motor 227 is placed into the wait state (S2134). Subsequently, the outputs of parallel terminals DC0, DC1, and DC2 are set L, H, and H, respectively, so as to carry out WIDE driving (S2136), and the DC driving is reset (S2138). Then, the flow shifts to S2140.

At S2140, it is determined whether the terminal ZPIIN is H or not. If it is determined not, then the flow returns to S2092. If it is determined that the terminal ZPIIN is H, by contrast, then it is determined whether the DC driving is set or not (S2142). If it is determined that the DC driving is set, then the flow returns to S2090. If it is determined that the DC driving is not set, then it is determined whether the brake logic is being outputted or not (S2144).

Here, "brake logic is being outputted" refers to a brake output state in which the outputs of parallel terminals DC0, DC1, and DC2 are set H, H, and H, respectively. If it is determined at S2144 that the brake logic is being outputted, then the flow returns to S2090. If it is determined not, then the outputs of parallel terminals DC0, DC1, and DC2 are set L, L, and H, respectively, so that the motor 227 is placed into the wait state (S2146). Subsequently, the outputs of parallel terminals DC0, DC1, and DC2 are set H, H, and H, respectively, so as to attain the brake output state (S2148). Then, the flow returns to S2090.

If it is determined at S2092 that the event count is terminated, then the flow shifts to S2094, where a time of 100 ms is set as the PI overtime, and it is determined whether the PI overtime is reached or not (S2096). If it is determined that the PI overtime is reached, then the flow shifts to S2156 in FIG. 59. If it is determined that the PI overtime is not reached, by contrast, then it is determined whether the terminal ZPIIN is at L or not (S2098). If it is determined that the terminal ZPIIN is not at L, then the flow returns to S2096. If it is determined that the terminal ZPIIN is at L, by contrast, then the flow shifts to S2150 in FIG. 59.

Figure 59:
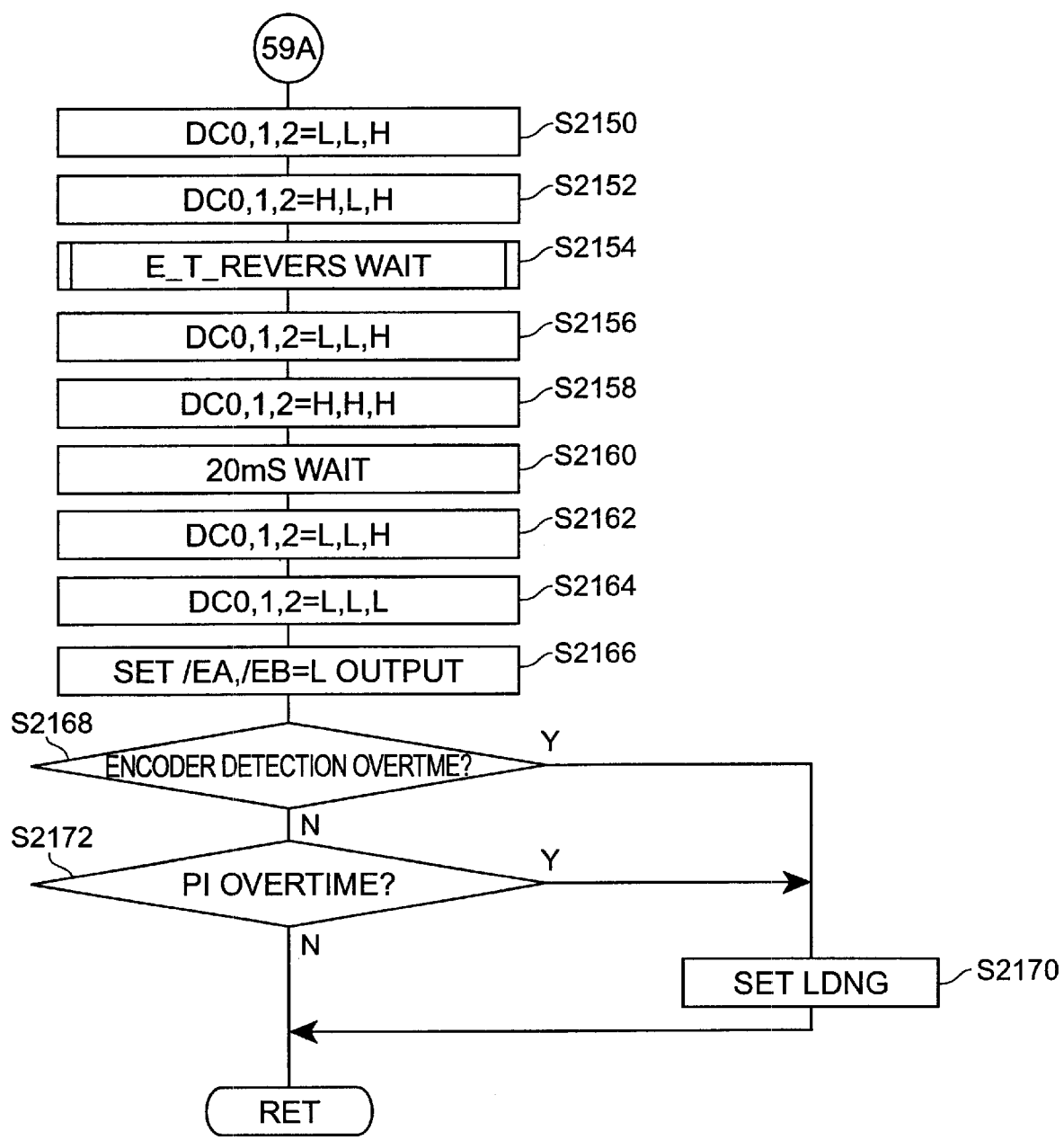
FIG. 59 is a flowchart of the first lens drive processing operation of the camera equipped with the lens barrel of FIG. 1.

At S2150 in FIG. 59, the outputs of parallel terminals DC0, DC1, and DC2 are set L, L, and H, respectively, so that the motor 227 is placed into the wait state. Subsequently, the outputs of parallel terminals DC0, DC1, and DC2 are set H, L, and H, respectively, so as to carry out WIDE driving (S2152), and a wait of rotation brake time (E_T_REVERS) is provided (S2154).

Thereafter, then the flow shifts to S2156, where the outputs of parallel terminals DC0, DC1, and DC2 are set L, L, and H, respectively, so that the motor 227 is placed into the wait state. Subsequently, the outputs of parallel terminals DC0, DC1, and DC2 are set H, H, and H, respectively, so as to attain the brake output state (S2158), and then, after a wait of 20 ms (S2160), the outputs of parallel terminals DC0, DC1, and DC2 are set L, L, and H (S2162). Thereafter, the outputs of parallel terminals DC0, DC1, and DC2 are set L, L, and H, respectively, so that the motor 227 is placed into the wait state (S2164).

Subsequently, the terminals EA, EB are set as the output port (S2166), and it is determined whether the encoder detection overtime is reached or not (S2168). If it is determined that the encoder detection overtime is reached, then the flow shifts to S2170, where the lens drive NG is set, and the first lens drive processing operation is terminated.

If it is determined that the encoder detection overtime is not reached, then it is determined whether the PI overtime is reached or not (S2172). If it is determined that the PI overtime is reached, then the flow shifts to S2170. If it is determined that the PI overtime is not reached, by contrast, then the first lens drive processing operation is directly terminated.

Figure 60:
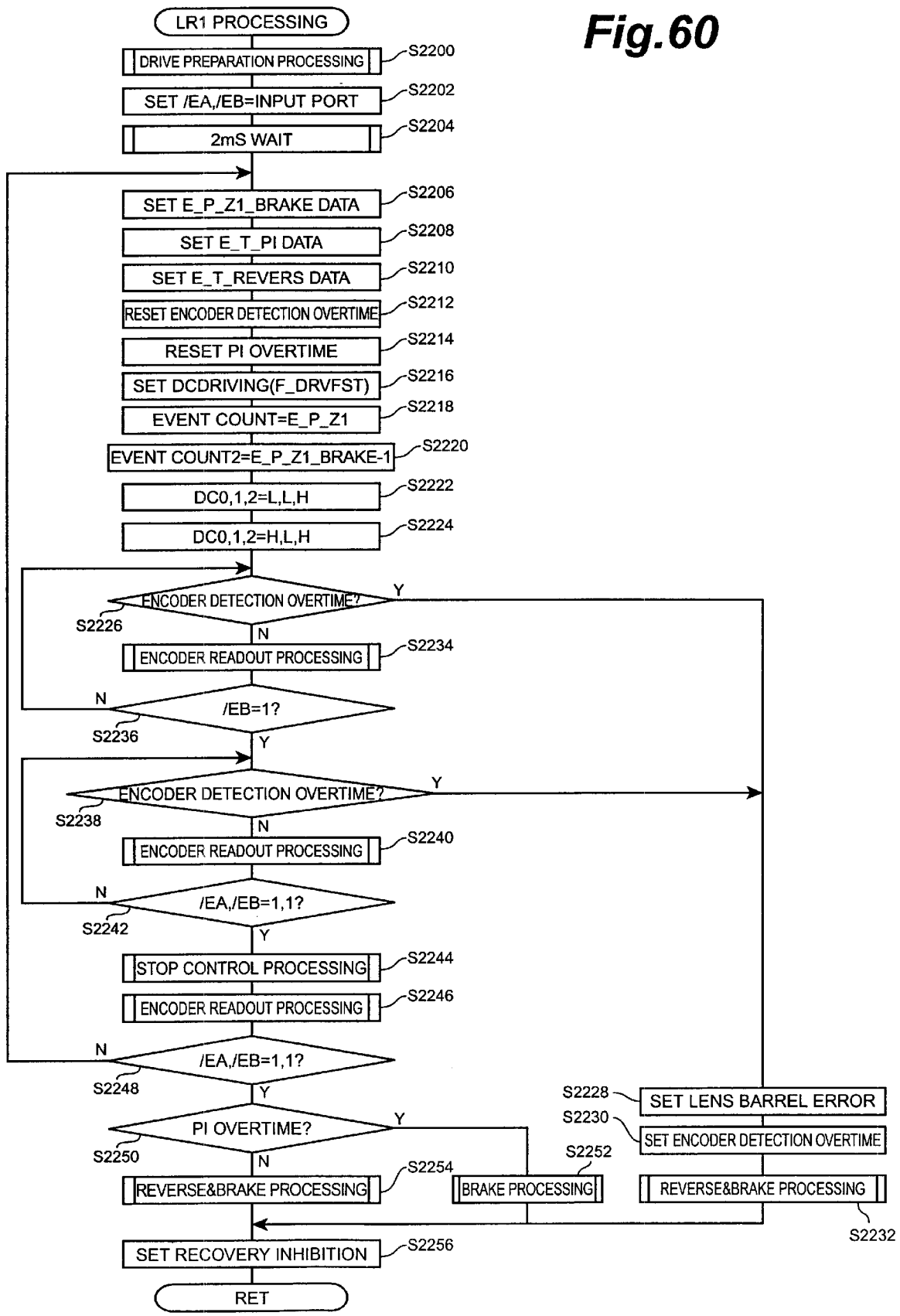
FIG. 60 is a flowchart of the first lens return processing operation of the camera equipped with the lens barrel of FIG. 1.

FIG. 60 shows a flowchart of the first lens return (LR1) processing operation.

As shown at S2200 in FIG. 60, an LD drive preparation processing operation is carried out, whereby the motor 227 (see FIG. 16) of the lens barrel driving section 222 is selected as the motor to drive. Subsequently, the flow shifts to S2202, where the terminals EA, EB are set as the input port. Then, after a wait of 2 ms (S2204), Z1 stopping brake point pulse data (E_P_Z1_BRAKE) is set (S2206), normal rotation width restriction time data (E_T_PI) is set (S2208), and rotation brake time data (E_T_REVERS) is set (S2210).

Subsequently, the encoder detection overtime flag is reset (S2212), the PI overtime is reset (S2214), the DC driving flag is set (S2216), brake point pulse data (E_P_BRAKE) is set as the event count (S2218), and Z1 stopping brake point pulse data −1 (E_P_Z1_BRAKE-1) is set as the event count 2 (S2220).

Then, the flow shifts to S2222, where the outputs of parallel terminals DC0, DC1, and DC2 are set L, L, and H, respectively, so that the motor 227 is placed into the wait state. Subsequently, the outputs of parallel terminals DC0, DC1, and DC2 are set L, H, and H, respectively, so as to carry out TELE driving (S2224), and it is determined whether the encoder detection overtime is reached or not (S2226).

If it is determined that the encoder detection overtime is reached, then the lens barrel error is set (S2228), the encoder detection overtime is set (S2230), and a reverse and brake processing operation is carried out (S2232). Thereafter, the flow shifts to S2256.

If it is determined at S2226 that the encoder detection overtime is not reached, then an encoder readout processing operation is carried out (S2234), and it is determined whether the terminal EB is at 1 (H (HIGH)) or not (S2236). If it is determined that the terminal EB is not at 1, then the flow shifts to S2226. If it is determined that the terminal EB is at 1, then it is determined whether the encoder detection overtime is reached or not (S2238).

If it is determined at S2238 that the encoder detection overtime is reached, then the flow shifts to S2228. If it is determined not, by contrast, then an encoder readout processing operation is carried out (S2240), and it is determined whether the terminals EA, EB are at 1 or not (S2242). If it is determined that both of the terminals EA, EB are not at 1, then the flow shifts to S2238. If it is determined that the terminals EA, EB are at 1, then a stop control processing operation is carried out (S2244).

Subsequently, the flow shifts to S2242, where it is determined whether the terminals EA, EB are at 1 or not. If it is determined that both of the terminals EA, EB are not at 1, then the flow returns to S2206. If it is determined that the terminals EA, EB are at 1, then it is determined whether the PI overtime is reached or not (S2250). If it is determined that the PI overtime is reached, then a brake processing operation is carried out (S2252). If it is determined that the PI overtime is not reached, by contrast, then a reverse and brake processing operation is carried out (S2254). The reverse and brake processing operation is an operation for driving the lens barrel driving motor 227 to rotate in reverse so as to lower its rotating speed and then outputting a brake. The brake processing operation is an operation for outputting a brake without driving to rotate in reverse.

Subsequently, the flow shifts to S2256, where the recovery inhibition is set, and the first lens return processing operation is terminated.

The second lens drive and return processing operations will now be explained.

Figure 61:
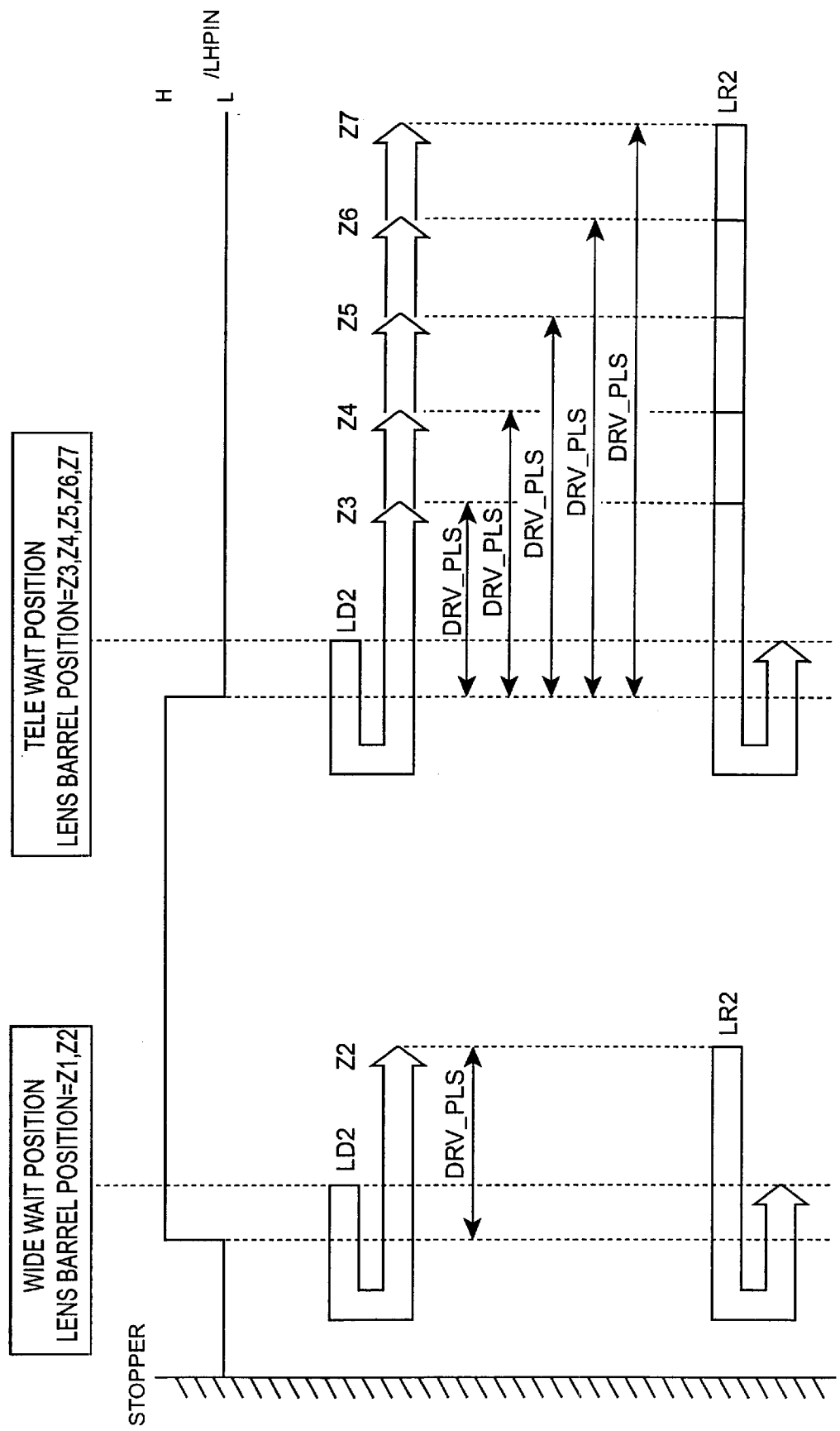
FIG. 61 is a schematic operational chart of a second lens drive processing operation and a second lens return processing operation of the camera equipped with the lens barrel of FIG. 1.

FIG. 61 shows an outline of the second lens drive (LD2) processing operation and second lens return (LR2) processing operation.

In the second lens drive operation, when the lens barrel position is at Z2, the second lens group 102 is initially driven (focus is driven) in reverse (leftward in FIG. 61), the falling of the terminal LHPIN (see FIG. 16) receiving the output of detector 96 is detected, and then the focus is driven by a designated pitch count before being stopped. Subsequently, the focus is driven in the normal rotating direction, the rising of the terminal LHPIN is detected, and then the focus is driven by the drive pulse count determined by the expansion calculation before being stopped.

When the lens barrel position is at Z3 to Z7 in the second lens drive processing operation, the focus is initially driven in the reverse rotating direction, the rising of the terminal LHPIN is detected, and then the focus is driven by the designated pitch count before being stopped. Subsequently, the focus is driven in the normal rotating direction, the falling of the terminal LHPIN is detected, and then the focus is driven by the drive pulse count determined by the expansion calculation before being stopped.

When the lens barrel position is at Z2 in the second lens return processing operation, on the other hand, the focus is driven in the reverse rotating direction by the drive pulse driven by the second lens drive processing plus ., the falling of the terminal LHPIN is detected, and then the focus is driven by the designated pitch count before being stopped. Subsequently, the focus is driven in the normal rotating direction, the rising of the terminal LHPIN is detected, and then the focus is driven by the designated pitch count before being stopped.

When the lens barrel position is at Z3 to Z7 in the lens return processing operation, the focus is driven in the reverse rotating direction by the drive pulse driven by the second lens drive processing plus., the rising of the terminal LHPIN is detected, and then the focus is driven by the designated pitch count before being stopped. Subsequently, the focus is driven in the normal rotating direction, the falling of the terminal LHPIN is detected, and then the focus is driven by the designated pitch count before being stopped.

Figure 62:
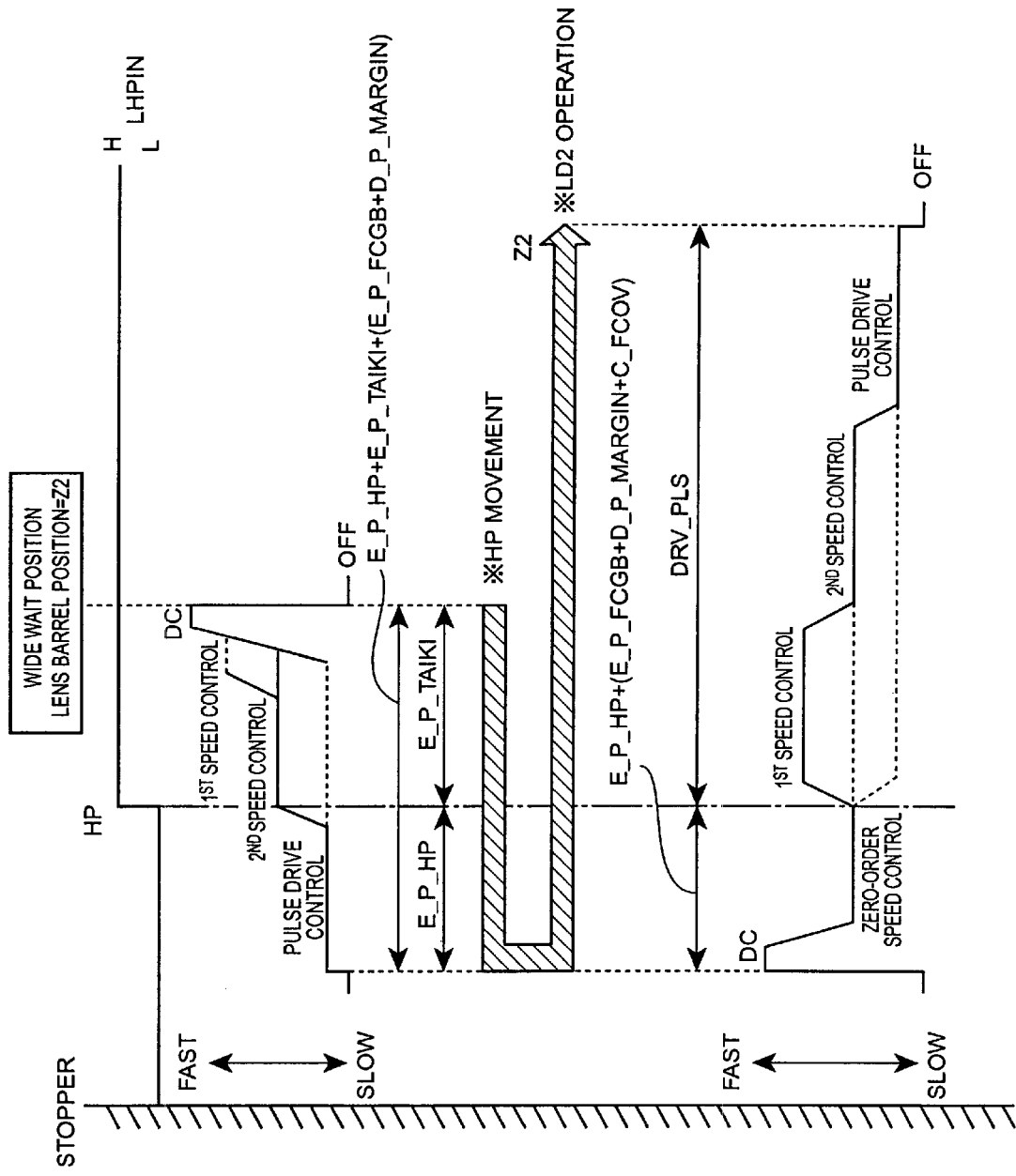
FIG. 62 is an operational chart for explaining the second lens drive processing operation of the camera equipped with the lens barrel of FIG. 1.
Figure 63:
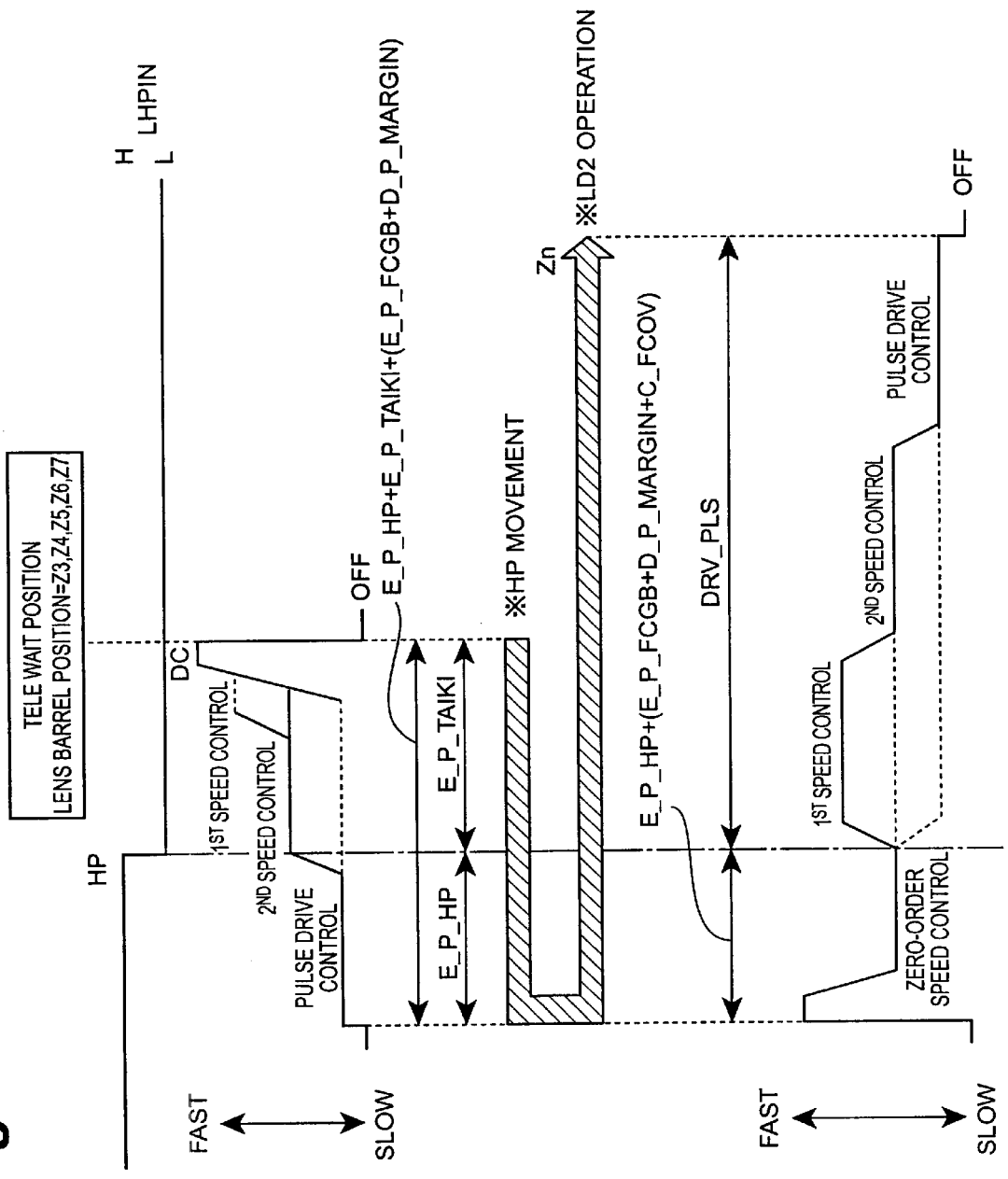
FIG. 63 is an operational chart for explaining the second lens drive processing operation of the camera equipped with the lens barrel of FIG. 1.

FIG. 62 shows an operational chart for explaining the WIDE wait time in the second lens drive processing operation, whereas FIG. 63 shows an operational chart for explaining the TELE wait time in the second lens drive processing operation. FIGS. 64 to 68 are flowcharts of the second lens drive processing operation.

Figure 64:
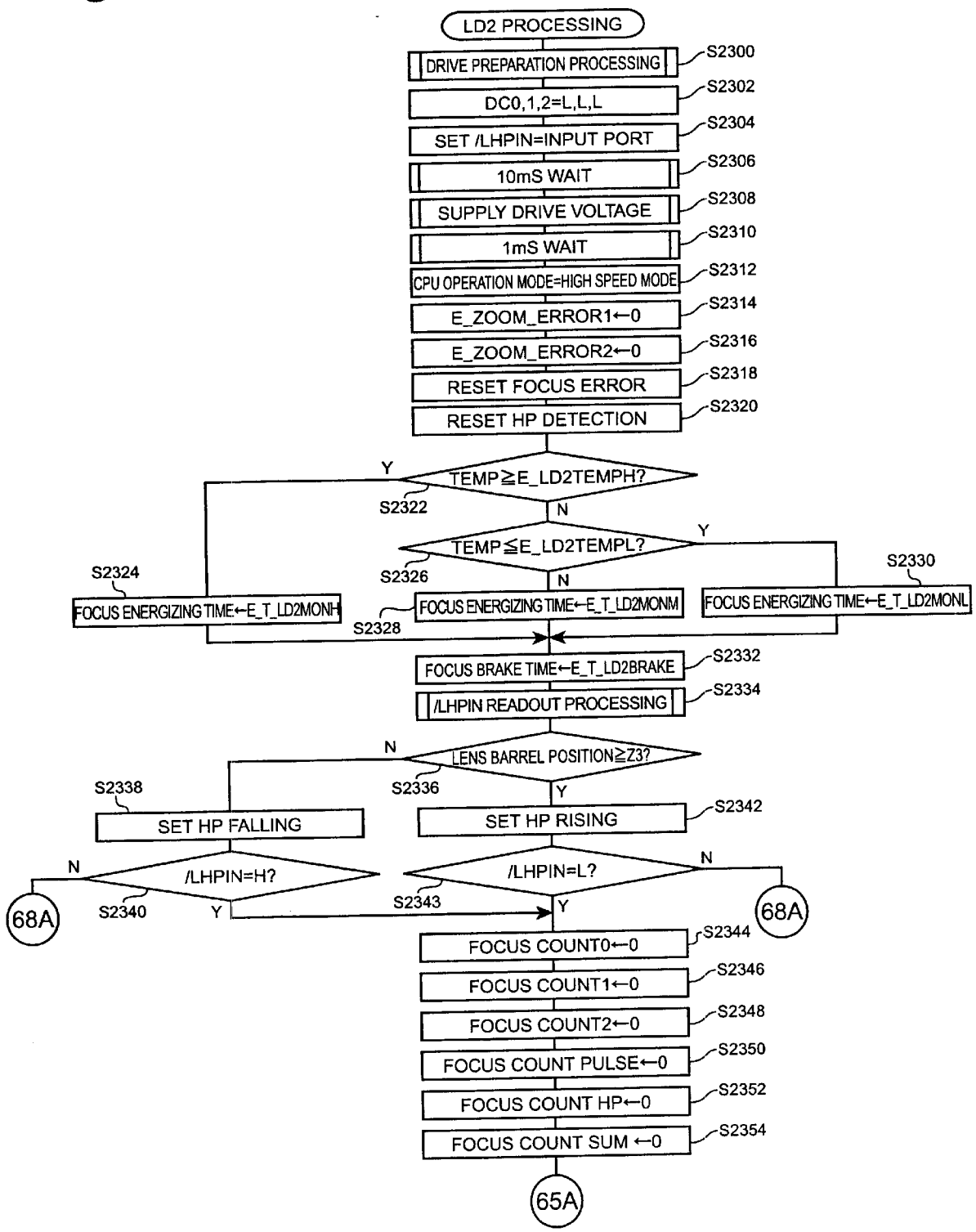
FIG. 64 is a flowchart of the second lens drive processing operation of the camera equipped with the lens barrel of FIG. 1.

In the second lens drive processing operation, as shown at S2300 in FIG. 64, a drive preparation processing operation is initially carried out, so that the motor 95 of the focus driving section 221 (herein after referred to as "focus motor" when appropriate) is selected as the motor to drive. Subsequently, the flow shifts to S2302, where the outputs of parallel terminals DC0, DC1, and DC2 are set L, L, and L, respectively, so that the motor 95 is placed into the wait state. Then, the terminal LHPIN is set as the input port (S2304) and, after a wait of 10 ms (S2306), the voltage output to the focus motor is enabled (S2308).

Subsequently, after a wait of 1 ms (S2310), the operation mode of CPU 200 is set to the high speed mode (S2312). The change of the operation mode to the high speed mode is carried out by changing the base clock of the CPU 200, for example.

Then, lens barrel control error code 1 (E_ZOOM_ERROR1) is reset (S2314), lens barrel control error code 2 (E_ZOOM_ERROR2) is reset (S2316), focus error is reset (S2318), and HP (home position) detection is reset (S2320).

Thereafter, the flow shifts to S2322, where it is determined whether the temperature (TEMP) measured in the power ON/OFF temperature measurement processing operation (see S112 in FIG. 19) is at least a high-temperature set temperature (E_LD2TEMPH) or not. If it is determined that the measured temperature is at least the high-temperature set temperature, then high-temperature focus drive energizing time data (E_T_LD2MONH) is set as the focus energizing time (S2324).

If it is determined at S2322 that the measured temperature is not at least the high-temperature set temperature, then it is determined whether the measured temperature (TEMP) is at most a low-temperature set temperature (E_LD2TEMPL) or not (S2326). If it is determined that the measured temperature is at most the low-temperature set temperature, then low-temperature focus drive energizing time data (E_T_LD2MONL) is set as the focus energizing time (S2330). If it is determined that the measured temperature is not at most the low-temperature set temperature, by contrast, then room-temperature focus drive energizing time data (E_T_LD2MONM) is set as the focus energizing time (S2328).

In the high-temperature focus drive energizing time data (E_T_LD2MONH), a time shorter than that in the room-temperature focus drive energizing time data (E_T_LD2MONM) is set. In the room-temperature focus drive energizing time data (E_T_LD2MONM), a time shorter than that in the low-temperature focus drive energizing time data (E_T_LD2MONL) is set.

Subsequently, the flow shifts to S2332, where focus drive brake time data (E_T_LD2BRAKE) is set as the focus brake time. Then, the input of the terminal LHPIN is read out (S2334). Thereafter, it is determined whether the lens barrel position is at least Z3 or not (S2336). If it is determined not, then it is considered that the lens barrel position is at Z2, whereby HP falling is set (S2338).

Subsequently, it is determined whether the terminal LHPIN is at H or not (S2340). If it is determined that the LHPIN is not at H, then the flow shifts to S2524 in FIG. 68. If it is determined that the terminal LHPIN is at H, by contrast, then the flow shifts to S2344.

If it is determined at S2336 that the lens barrel position is at least Z3, then HP rising is set (S2342). Subsequently, it is determined whether the terminal LHPIN is at L or not (S2343). If it is determined that the terminal is not at L, then the flow shifts to S2524 in FIG. 68. If it is determined that the terminal is at L, then the flow shifts to S2344.

At S2344, 0 is set as the focus count 0. Subsequently, 0 is set as the focus count 1 (S2346), 0 is set as the focus count 2 (S2348), 0 is set as the focus count pulse (S2350), 0 is set as the focus count HP (S2352), and 0 is set as the focus count SUM (S2354).

Here, the "focus count 0" refers to the count (pitch) of the zero-order speed control (see FIGS. 62 and 63). The "focus count 1" refers to the count (pitch) of the first speed control (see FIGS. 62 and 63). The "focus count 2" refers to the count (pitch) of the second speed control (see FIGS. 62 and 63). The "focus count pulse" refers to the count (pitch) of the pulse drive control (see FIGS. 62 and 63).

As shown in FIGS. 62 and 63, speed control for changing the driving speed according to the moving position of the second lens group 102 is carried out in the focus driving (driving of the second lens group). As the speed control, the above-mentioned zero-order speed control, first speed control, second speed control, and pulse drive control are set. The pulse drive control is a control operation at a speed lower than that of the second speed control. The second speed control is a control operation at a speed lower than that of the first speed control. The zero-order speed control and the second speed control are control operations at the same speed.

The "focus count HP" refers to the count (pitch) of the pulse drive control (FIGS. 62 and 63) after the HP detection. The "focus count SUM" refers to the whole pitch number of driving. Here, "pitch" refers to a half of 1 pulse, so that 2 pitches constitute 1 pulse.

Figure 65:
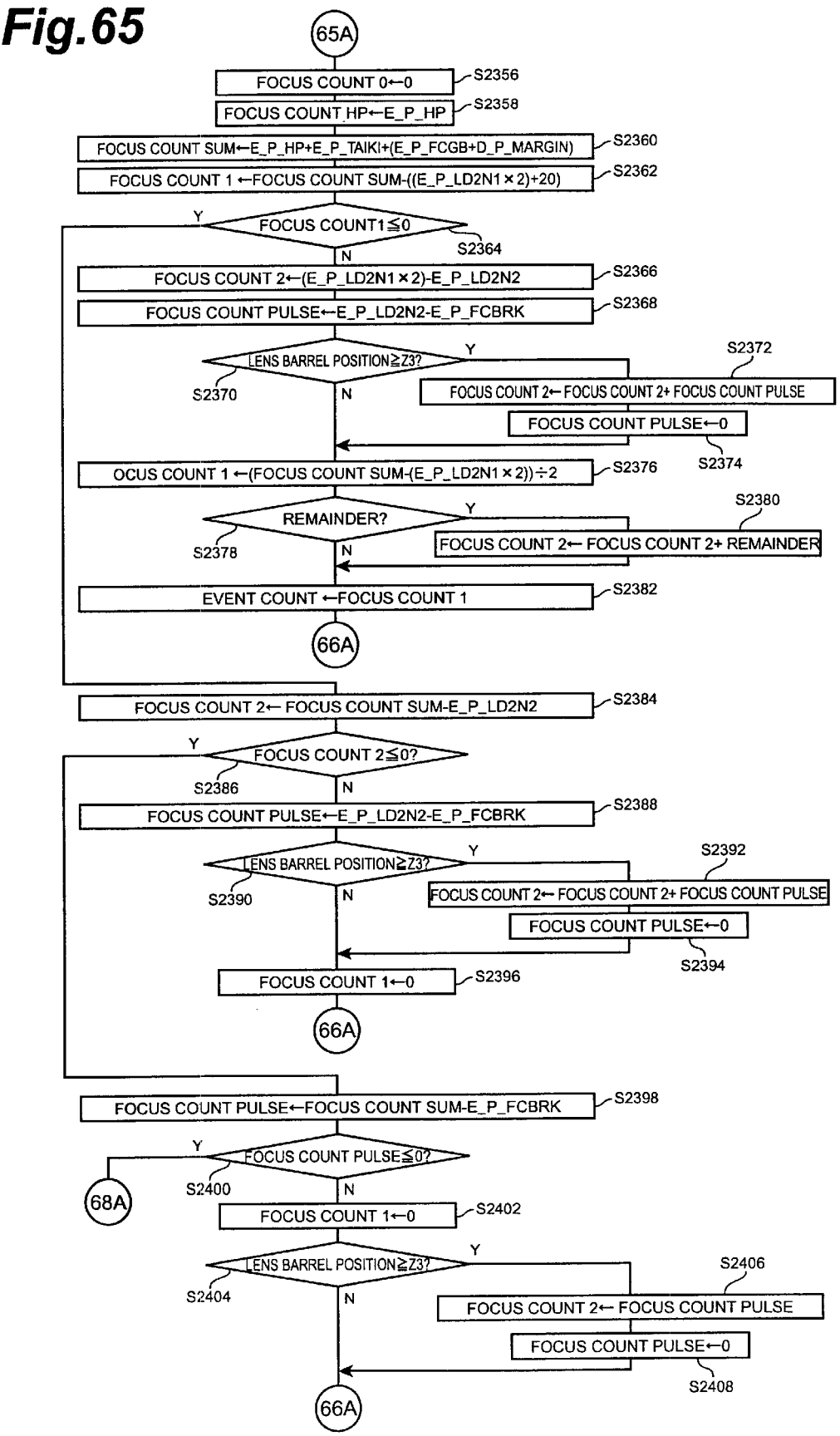
FIG. 65 is a flowchart of the second lens drive processing operation of the camera equipped with the lens barrel of FIG. 1.

Subsequently, the flow shifts to S2356 in FIG. 65, where 0 is set as the focus count 0. Then, focus drive HP count data (E_P_HP) is set as the focus count HP (S2358). Thereafter, the sum of the focus drive HP count data (E_P_HP), focus wait position pitch count data (E_P_TAIKI), focus drive backlash count data (E_P_FCGB), and focus drive HP detection margin pitch count data (D_P_MARGIN) is set as the focus count SUM (S2360).

Subsequently, the focus drive first speed count data (E_P_LD2N1) is doubled, 20 is added thereto, thus obtained value ((E_P_LD2N1*2)+20) is subtracted from the focus count SUM, and the resulting value is set as the focus count 1 (S2362).

Thereafter, it is determined whether the focus count 1 is at most 0 or not (S2364). If it is determined that the focus count 1 is not at most 0, then the focus drive first speed count data (E_P_LD2N1) is doubled, the focus drive second speed count data (E_P_LD2N2) is subtracted therefrom, and thus obtained value is set as the focus count 2 (S2366).

Subsequently, the value obtained when the focus drive brake pitch count data (E_P_FCBRK) is subtracted from the focus drive second speed count data (E_P_LD2N2) is set as the focus count pulse (S2368). Then, it is determined whether the lens barrel position is at least Z3 or not (S2370).

If it is determined at S2370 that the lens barrel position is not at least Z3, then the flow shifts to S2376. If it is determined that the lens barrel position is at least Z3, by contrast, then the sum of the focus count 2 and focus count pulse is set as the focus count 2 (S2372), and 0 is set as the focus count pulse (S2374).

Subsequently, the flow shifts to S2376, where doubled focus drive first speed count data (E_P_LD2N1) is subtracted from the focus count SUM, thus obtained value is divided by 2, and the resulting value is set as the focus count 1. Then, it is determined whether there is a remainder or not (S2378). If it is determined that there is a remainder, then the value obtained when the remainder is added to the focus count 2 is set as the focus count 2 (S2380), and the flow shifts to S2382. If it is determined that there is no remainder, by contrast, then the flow directly shifts to S2382, where the focus count 1 is set as the event count. Then, the flow shifts to S2410 in FIG. 66.

If it is determined at S2364 that the focus count 1 is at most 0, then the value obtained when the focus drive second speed count data (E_P_LD2N2) is subtracted from the focus count SUM is set as the focus count 2 (S2384).

Subsequently, it is determined whether the focus count 2 is at most 0 or not (S2386). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S2388). Thereafter, it is determined whether the lens barrel position is at least Z3 or not (S2390).

If it is determined at S2390 that the lens barrel position is not at least Z3, then the flow shifts to S2396. If it is determined that the lens barrel position is at least Z3, then the sum of the focus count 2 and focus count pulse is set as the focus count 2 (S2392), and 0 is set as the focus count pulse (S2394).

Subsequently, the flow shifts to S2396, where 0 is set as the focus count 1. Then, the flow shifts to S2410 in FIG. 66.

If it is determined at S2386 that the focus count 2 is at most 0, then the value obtained when the focus drive brake pitch count data (E_P_FCBRK) is subtracted from the focus count SUM is set as the focus count pulse (S2398).

Subsequently, the flow shifts to S2400, where it is determined whether the focus count pulse is at most 0 or not. If it is determined that the focus count pulse is not at most 0, then 0 is set as the focus count 1 (S2402). Thereafter, it is determined whether the lens barrel position is at least Z3 or not (S2404).

Figure 66:
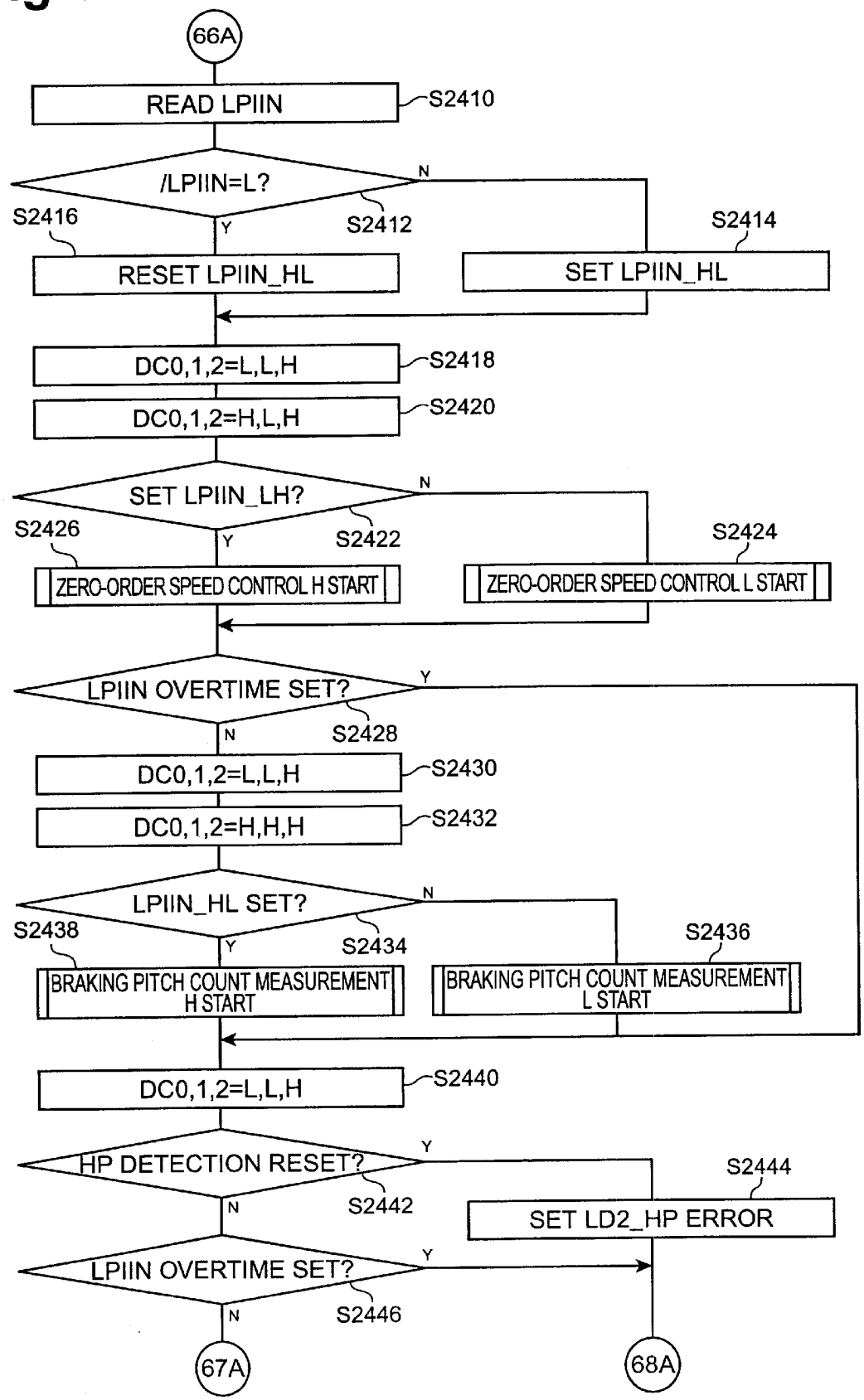
FIG. 66 is a flowchart of the second lens drive processing operation of the camera equipped with the lens barrel of FIG. 1.
Figure 67:
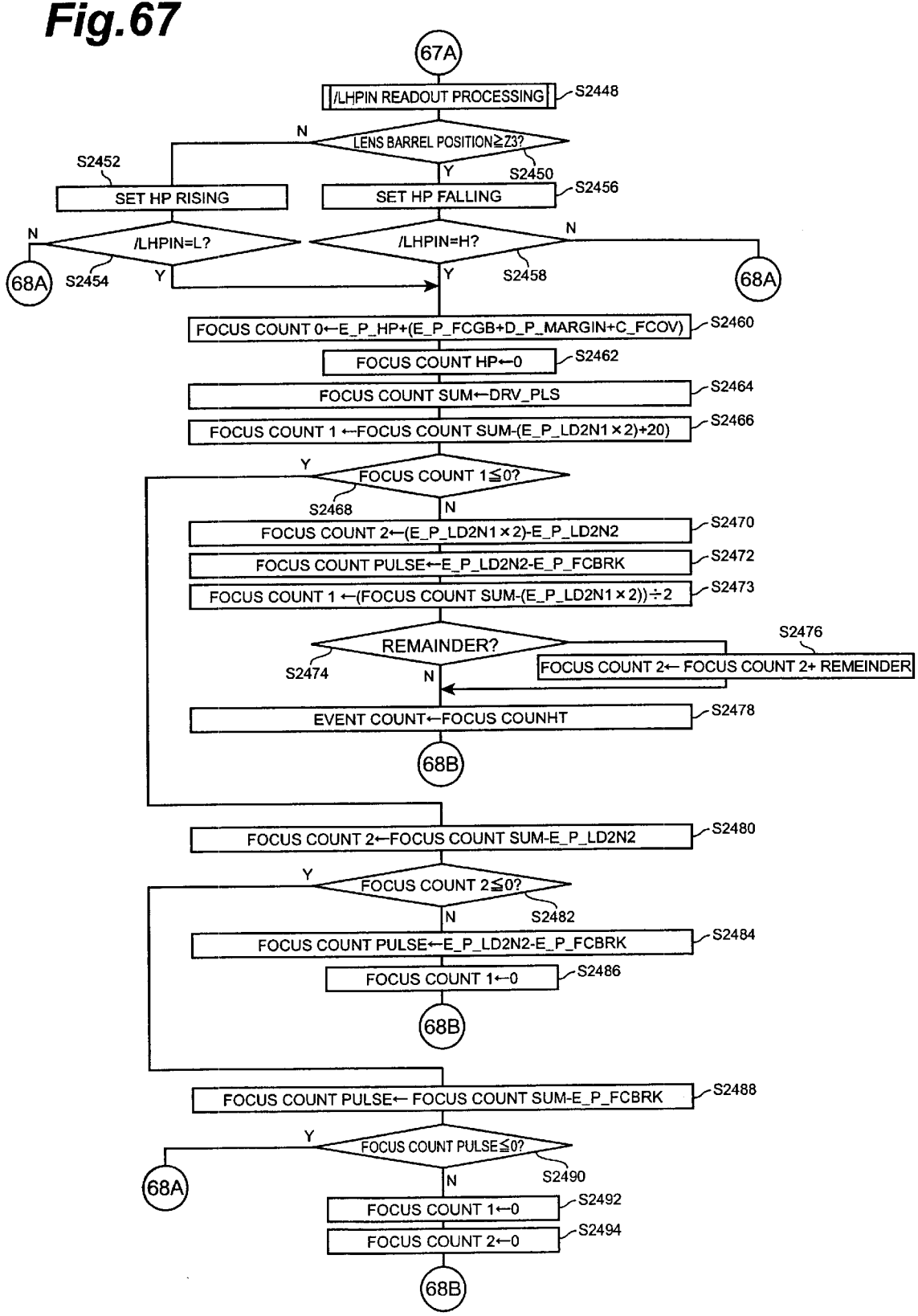
FIG. 67 is a flowchart of the second lens drive processing operation of the camera equipped with the lens barrel of FIG. 1.

If it is determined at S2404 that the lens barrel position is not at least Z3, then the flow shifts to S2410 in FIG. 66. If it is determined that the lens barrel position is at least Z3, by contrast, then the focus count pulse is set as the focus count 2 (S2406), and 0 is set as the focus count pulse (S2408). Subsequently, the flow shifts to S2410 in FIG. 66.

Figure 68:
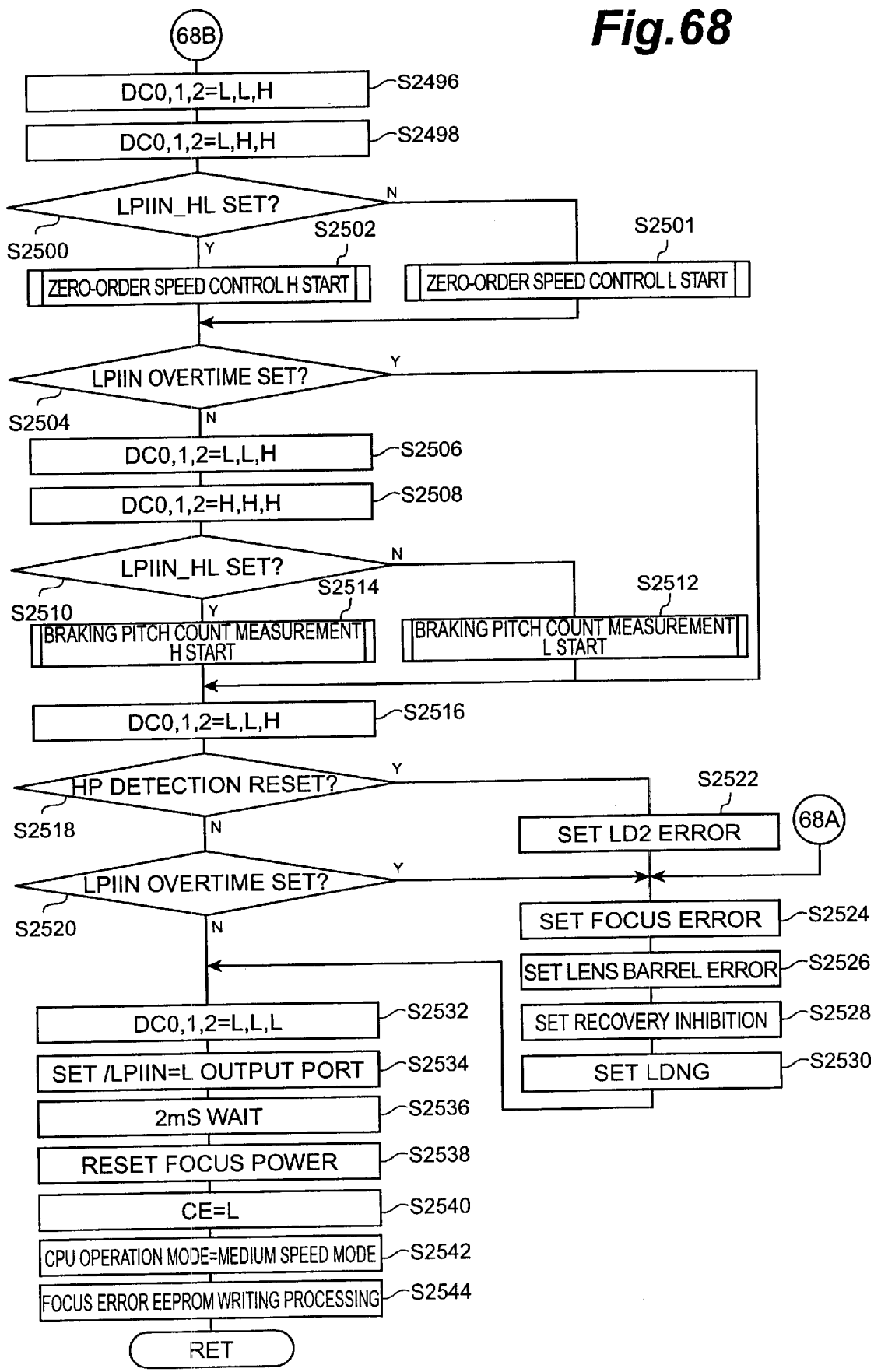
FIG. 68 is a flowchart of the second lens drive processing operation of the camera equipped with the lens barrel of FIG. 1.

If it is determined at S2400 that the focus count pulse is at most 0, then it is considered abnormal, and the flow shifts to S2524 in FIG. 68.

The terminal LPIIN (see FIG. 16) receiving the output of detector 96 is read out at S2410 in FIG. 66, and it is determined whether the terminal LPIIN is at L or not (S2412). If it is determined that the terminal LPIIN is at L, then the HL flag of the terminal LPIIN is reset (S2416). If it is determined that the terminal LPIIN is not at L, by contrast, then the HL flag of the terminal LPIIN is set (S2414).

Subsequently, the flow shifts to S2418, where the outputs of parallel terminals DC0, DC1, and DC2 are set L, L, and H, respectively, so that the motor 95 is placed into the wait state. Then, the outputs of parallel terminals DC0, DC1, and DC2 are set H, L, and H, respectively, so as to carry out driving in reverse (S2320).

Thereafter, it is determined whether the HL flag of the terminal LPIIN is set or not (S2422). If it is determined that the HL flag of the terminal LPIIN is set, then a zero-order speed control H start drive processing operation is carried out (S2426). If it is determined not, by contrast, then a zero-order speed control L start drive processing operation is carried out (S2424). The zero-order speed control H and L start drive processing operations will be explained later in detail.

Subsequently, the flow shifts to S2428, where it is determined whether the LPIIN overtime is set or not. If it is determined that the LPIIN overtime is set, then the flow shifts to S2440. If it is determined not, by contrast, then the outputs of parallel terminals DC0, DC1, and DC2 are set L, L, and H, respectively, so as to place the motor 95 into the wait state (S2430). Thereafter, the outputs of parallel terminals DC0, DC1, and DC2 are set H, H, and H, respectively, so as to attain a brake output state (S2432).

Subsequently, it is determined whether the HL flag of the terminal LPIIN is set or not (S2434). If it is determined that the HL flag of the terminal LPIIN is set, then a braking pitch count measurement H start drive processing operation is carried out (S2438). If it is determined that the HL flag of the terminal LPIIN is not set, then a braking pitch count measurement L start drive processing operation is carried out (S2436). The braking pitch count measurement L and H start drive processing operations will be explained later in detail.

Subsequently, the flow shifts to S2440, where the outputs of parallel terminals DC0, DC1, and DC2 are set L, L, and H, respectively, so that the motor 95 is placed into the wait state. Then, it is determined whether the HP detection flag is reset or not (S2442). If it is determined that the HP detection flag is reset, then the HP error of LD2 is set (S2444), and the flow shifts to S2524 in FIG. 68.

If it is determined at S2442 that the HP detection flag is not reset, by contrast, then it is determined whether the LPIIN overtime is set or not (S2446). If it is determined that the LPIIN overtime is set, then the flow shifts to S2524 in FIG. 68. If it is determined that the LPIIN overtime is not set, by contrast, then the flow shifts to S2448 in FIG. 67.

At S2448, a readout processing operation for the terminal LHPIN is carried out. Subsequently, it is determined whether the lens barrel position is at least Z3 or not (S2450). If it is determined that the lens barrel position is not at least Z3, then it is considered that the lens barrel position is at Z2, and the HP rising is set (S2452).

Subsequently, it is determined whether the terminal LHPIN is at L or not (S2454). If it is determined that the terminal LHPIN is not at L, then the flow shifts to S2524 in FIG. 68. If it is determined that the terminal LHPIN is at L, by contrast, then the flow shifts to S2460.

If it is determined at S2450 that the lens barrel position is at least Z3, then the HP falling is set (S2456). Subsequently, it is determined whether the terminal LHPIN is at H or not (S2458). If it is determined that the terminal LHPIN is not at H, then the flow shifts to S2524 in FIG. 68. If it is determined that the terminal LHPIN is at H, by contrast, then the flow shifts to S2460.

At S2460, the sum of the focus drive HP count data (E_P_HP), focus drive backlash count data (E_P_FCGB), focus drive HP detection margin pitch count data (D_P_MARGIN), and focus driving over-pitch number (C_FCOV) is set as the focus count 0. Subsequently, 0 is set as the focus count HP (S2462), and the drive pulse (DRV_PLS) is set as the focus count SUM (S2464).

Then, doubled focus drive first speed count data (E_P_LD2N1) and 20 pitches are subtracted from the focus count SUM, and thus obtained value is set as the focus count 1 (S2466). Subsequently, it is determined whether the focus count 1 is at most 0 or not (S2468). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S2470).

Subsequently, the value obtained when the focus drive brake pitch count data (E_P_FCBRK) is subtracted from the focus drive second speed count data (E_P_LD2N2) is set as the focus count pulse (S2472). Then, doubled focus drive first speed count data (E_P_LD2N1) is subtracted from the focus count SUM, thus obtained value is divided by 2, and the resulting value is set as the focus count 1 (S2473). Subsequently, it is determined whether there is a remainder or not (S2474). If it is determined that there is a remainder, then the value obtained when the remainder is added to the focus count 2 is set as the focus count 2 (S2476), and the flow shifts to S2478. If it is determined that there is no remainder, by contrast, then the flow directly shifts to S2478, where the focus count 1 is set as the event count. Thereafter, the flow shifts to S2496 in FIG. 68.

If it is determined at S2468 that the focus count 1 is at most 0, then the value obtained when the focus drive second speed count data (E_P_LD2N2) is subtracted from the focus count SUM is set as the focus count 2 (S2480).

Subsequently, it is determined whether the focus count 2 is at most 0 or not (S2482). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S2484). Subsequently, 0 is set as the focus count 1, and the flow shifts to S2496 in FIG. 68.

If it is determined at S2482 that the focus count 2 is at most 0, then the value obtained when the focus drive brake pitch count data (E_P_FCBRK) is subtracted from the focus count SUM is set as the focus count pulse (S2488).

Subsequently, the flow shifts to S2490, where it is determined whether the focus count pulse is at most 0 or not. If it is determined that the focus count pulse is at most 0, then the flow shifts to S2524 in FIG. 68. If it is determined not, by contrast, then 0 is set as the focus count 1 (S2492), and 0 is set as the focus count 2 (S2494). Thereafter, the flow shifts to S2496 in FIG. 68.

At S2496, the outputs of parallel terminals DC0, DC1, and DC2 are set L, L, and H, respectively, so that the motor 95 is placed into the wait state. Subsequently, the outputs of parallel terminals DC0, DC1, and DC2 are set L, H, and H, respectively, so as to carry out normal rotation driving (S2498).

Then, it is determined whether the HL flag of the terminal LPIIN is set or not (S2500). If it is determined that the HL flag of the terminal LPIIN is set, then a zero-order speed control H start drive processing operation is carried out (S2502). If it is determined not, by contrast, then a zero-order speed control L start drive processing operation is carried out (S2501). The zero-order control H and L start drive processing operations will be explained later in detail.

Subsequently, the flow shifts to S2504, where it is determined whether the LPIIN overtime is set or not. If it is determined that the LPIIN overtime is set, then the flow shifts to S2516. If it is determined not, by contrast, then the outputs of parallel terminals DC0, DC1, and DC2 are set L, L, and H, respectively, so that the motor 95 is placed into the wait state (S2506). Thereafter, the outputs of parallel terminals DC0, DC1, and DC2 are set H, H, and H, respectively, so as to attain the brake output state (S2508).

Subsequently, it is determined whether the HL flag of the terminal LPIIN is set or not (S2510). If it is determined that the HL flag of the terminal LPIIN is set, then a braking pitch count measurement H start drive processing operation is carried out (S2514). If it is determined not, by contrast, then a braking pitch count measurement L start drive processing operation is carried out (S2512). The braking pitch count measurement H and L start drive processing operation will be explained later in detail.

Subsequently, the flow shifts to S2516, where the outputs of parallel terminals DC0, DC1, and DC2 are set L, L, and H, respectively, so that the motor 95 is placed into the wait state. Then, it is determined whether the HP detection flag is reset or not (S2518). If it is determined that the HP detection flag is reset, then the HP error of LD2 is set (S2522), and the flow shifts to S2524.

At S2524, the focus error is set. Subsequently, the lens barrel error is set (S2526), the recovery inhibition is set (S2528), and the lens drive NG is set (S2530). Subsequently, the flow shifts to S2352.

If it is determined at S2518 that the HP detection flag is not reset, by contrast, then it is determined whether the LPIIN overtime is set or not (S2520). If it is determined that the LPIIN overtime is set, then the flow shifts to S2524. If it is determined that the LPIIN overtime is not set, then the flow shifts to S2532.

At S2352, the outputs of parallel terminals DC0, DC1, and DC2 are set L, L, and L, respectively, so that the motor 95 is placed into the wait state. Subsequently, the terminal LHPIN is set as the L output port (S2534). Then, after a wait of 2 ms (S2536), the focus power is reset (S2538), the driver ON/OFF terminal CE is set L, so as to place the driver section 219 into the inactive state (S2540), the operation mode of the CPU 200 is set to a medium speed mode (S2542), and a focus error EEPROM writing processing operation is carried out (S2544). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the second lens drive processing operation is terminated.

As in the foregoing, when the second lens group 102 (focus) is driven from the WIDE wait position to rotate in reverse, the pulse drive control at a lower speed is carried out as shown in FIG. 62 after the HP (home position) serving as a reference position is detected. Consequently, the second lens group 102 can be prevented from colliding with the stopper due to its impetus upon movement, whereby gears can be kept from meshing with each other upon the collision and failing to rotate in reverse, which might have become a severe failure, for example.

Also, as shown in FIGS. 62 and 63, the zero-order speed control at a speed lower than that of the first speed control, DC driving, or the like is carried out before the second lens group 102 passes the HP when moved. As a consequence, the HP can be detected precisely. Therefore, the second lens group 102 can be moved precisely upon focusing, whereby the focusing accuracy can be improved.

Figure 69:
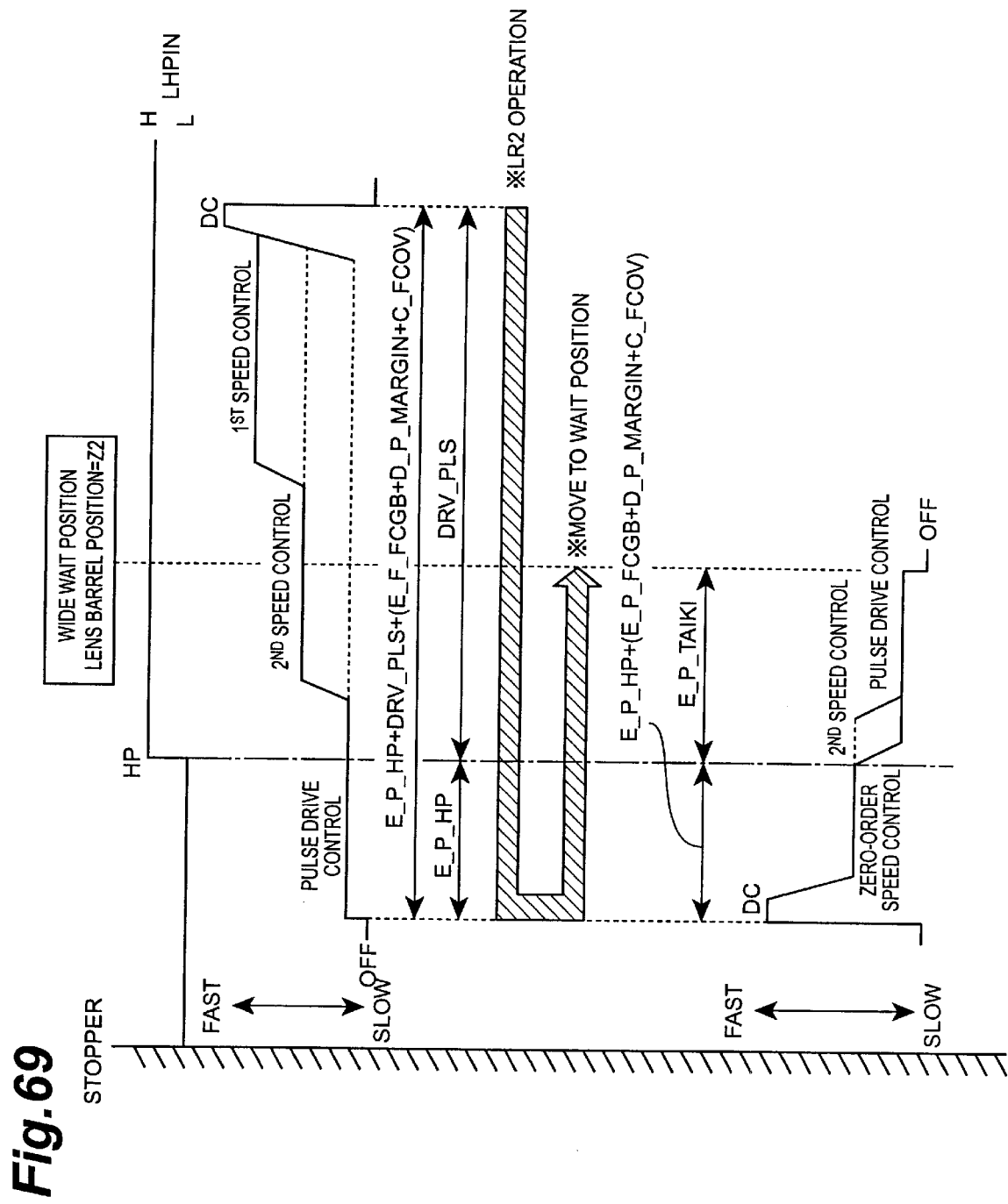
FIG. 69 is an operational chart for explaining the second lens return processing operation of the camera equipped with the lens barrel of FIG. 1.
Figure 70:
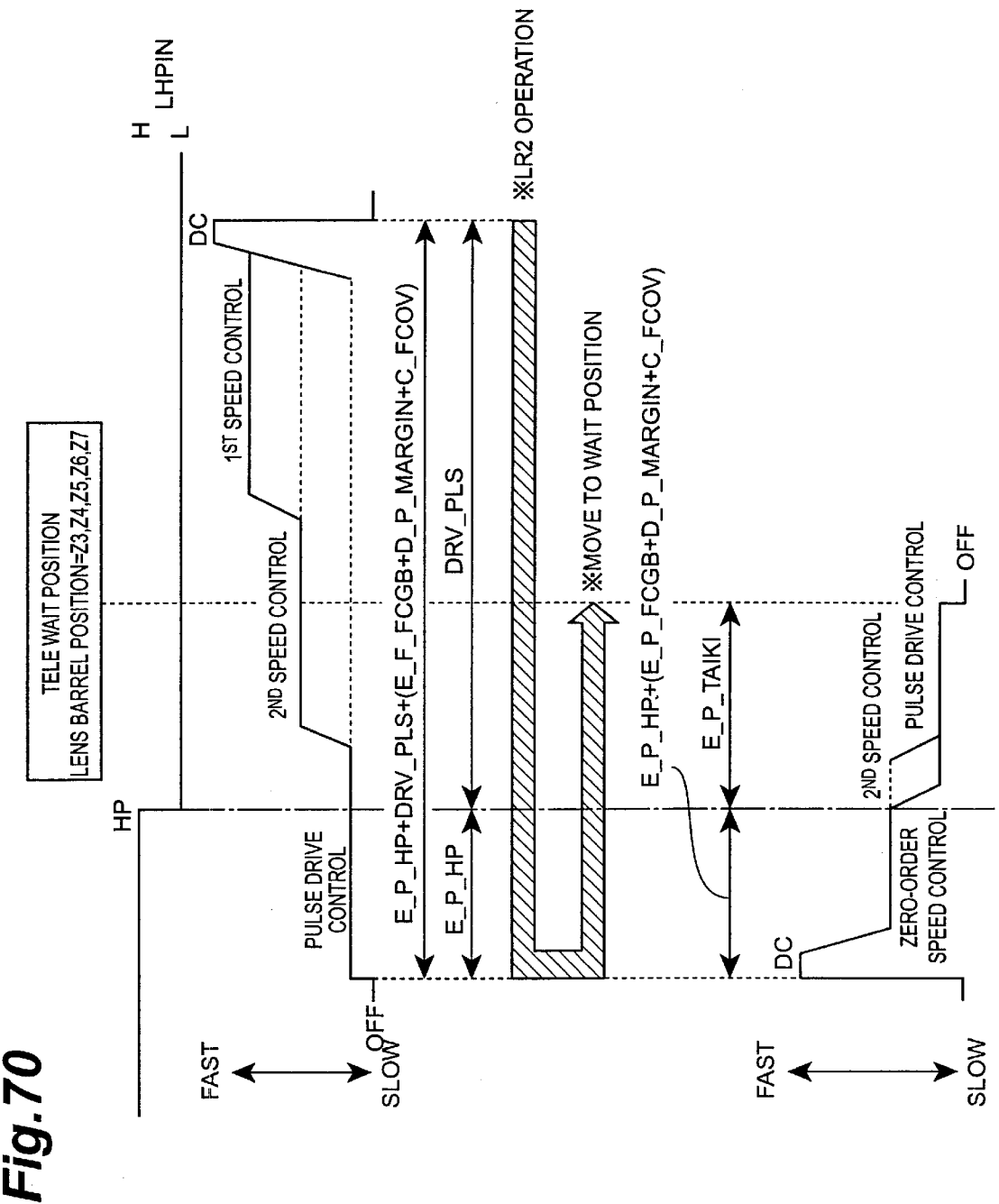
FIG. 70 is an operational chart for explaining the second lens return processing operation of the camera equipped with the lens barrel of FIG. 1.

FIG. 69 shows an operational chart for explaining the second lens return processing operation at the WIDE wait time, whereas FIG. 70 shows an operational chart for explaining the second lens return processing operation at the TELE wait time. FIGS. 71 to 75 show flowcharts of the second lens drive processing operation.

Figure 71:
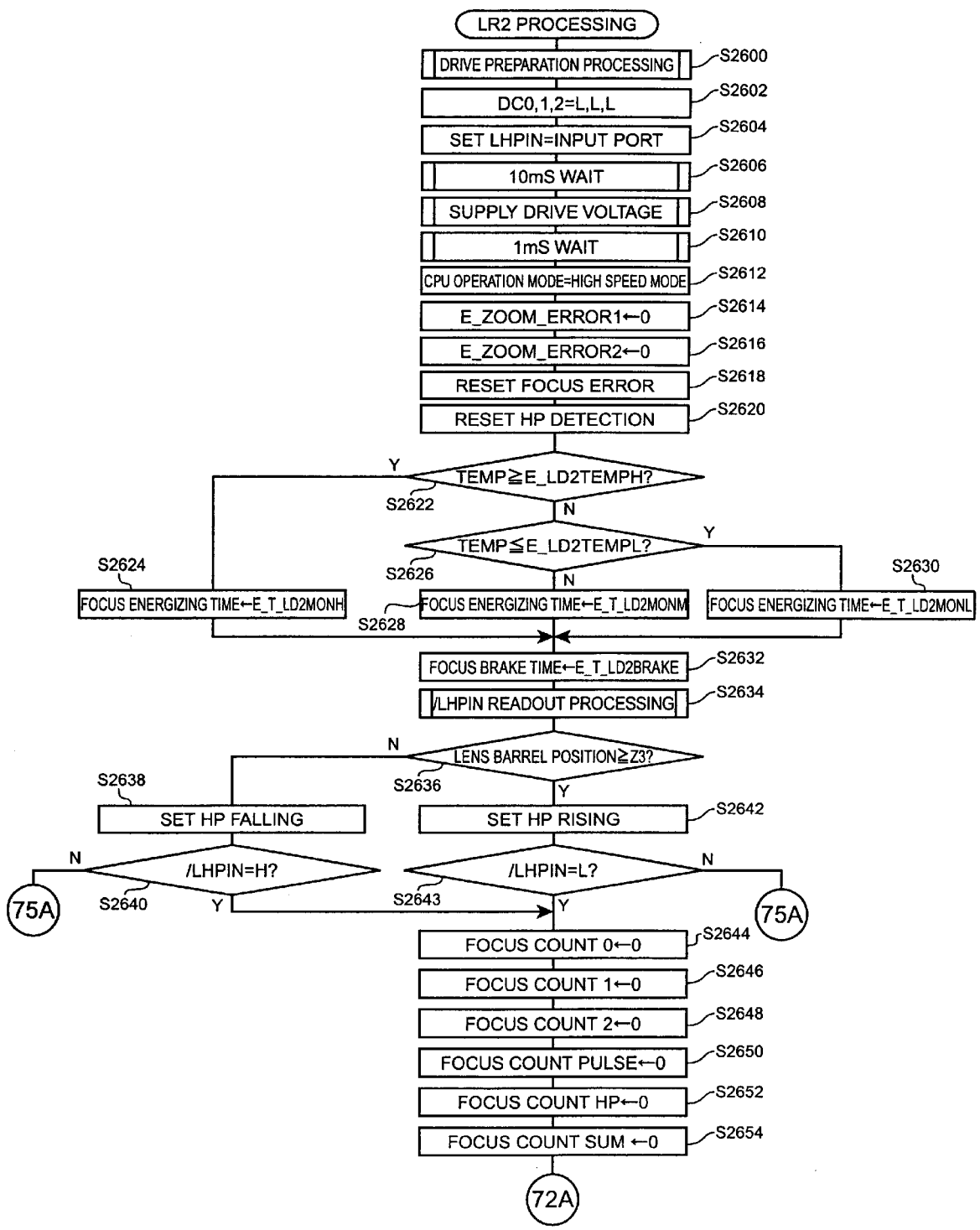
FIG. 71 is a flowchart of the second lens return processing operation of the camera equipped with the lens barrel of FIG. 1.

As shown at S2600 in FIG. 71, a drive preparation processing operation is initially carried out in the second lens drive processing operation, whereby the motor 95 (hereinafter referred to as "focus motor" when appropriate) in the focus driving section 221 is selected as the motor to drive. Subsequently, the flow shifts to S2602, where the outputs of parallel terminals DC0, DC1, and DC2 are set L, L, and L, respectively, so that the motor 95 is placed into the wait state. Then, the terminal LHPIN is set as the input port (S2604) and, after a wait of 10 ms (S2606), the voltage output to the focus motor is enabled (S2608).

Subsequently, after a wait of 1 ms (S2610), the operation mode of CPU 200 is set to the high speed mode (S2612). The change of the operation mode to the high speed mode is carried out by changing the base clock of the CPU 200, for example.

Then, lens barrel control error code 1 (E_ZOOM_ERROR1) is reset (S2614), lens barrel control error code 2 (E_ZOOM_ERROR2) is reset (S2616), focus error is reset (S2618), and HP (home position) detection is reset (S2620).

Thereafter, the flow shifts to S2622, where it is determined whether the temperature (TEMP) measured in the power ON/OFF temperature measurement processing operation (see S112 in FIG. 19) is at least the high-temperature set temperature (E_LD2TEMPH) or not. If it is determined that the measured temperature is at least the high-temperature set temperature, then high-temperature focus drive energizing time data (E_T_LD2MONH) is set as the focus energizing time (S2624).

If it is determined at S2622 that the measured temperature is not at least the high-temperature set temperature, then it is determined whether the measured temperature (TEMP) is at most the low-temperature set temperature (E_LD2TEMPL) or not (S2626). If it is determined that the measured temperature is at most the low-temperature set temperature, then low-temperature focus drive energizing time data (E_T_LD2MONL) is set as the focus energizing time (S2630). If it is determined not, then room-temperature focus drive energizing time data (E_T_LD2MONM) is set as the focus energizing time (S2628).

Subsequently, the flow shifts to S2632, where focus drive brake time data (E_T_LD2BRAKE) is set as the focus brake time. Then, the input of the terminal LHPIN is read out (S2634). Thereafter, it is determined whether the lens barrel position is at least Z3 or not (S2636). If it is determined not, then it is considered that the lens barrel position is at Z2, whereby the HP falling is set (S2638).

Subsequently, it is determined whether the terminal LHPIN is at H or not (S2640). If it is determined not, then the flow shifts to S2810 in FIG. 75. If it is determined that the terminal LHPIN is at H, by contrast, then the flow shifts to S2644.

If it is determined at S2636 that the lens barrel position is at least Z3, then the HP rising is set (S2642). Subsequently, it is determined whether the terminal LHPIN is at L or not (S2643). If it is determined that the terminal is not at L, then the flow shifts to S2810 in FIG. 75. If it is determined that the terminal is at L, by contrast, then the flow shifts to S2644.

At S2644, 0 is set as the focus count 0. Subsequently, 0 is set as the focus count 1 (S2646), 0 is set as the focus count 2 (S2648), 0 is set as the focus count pulse (S2650), 0 is set as the focus count HP (S2652), and 0 is set as the focus count SUM (S2654).

Here, the "focus count 0," "focus count 1," "focus count 2," "focus count pulse," "focus count HP," and "focus count SUM" are similar to those in the above-mentioned first lens drive processing operation.

Figure 72:
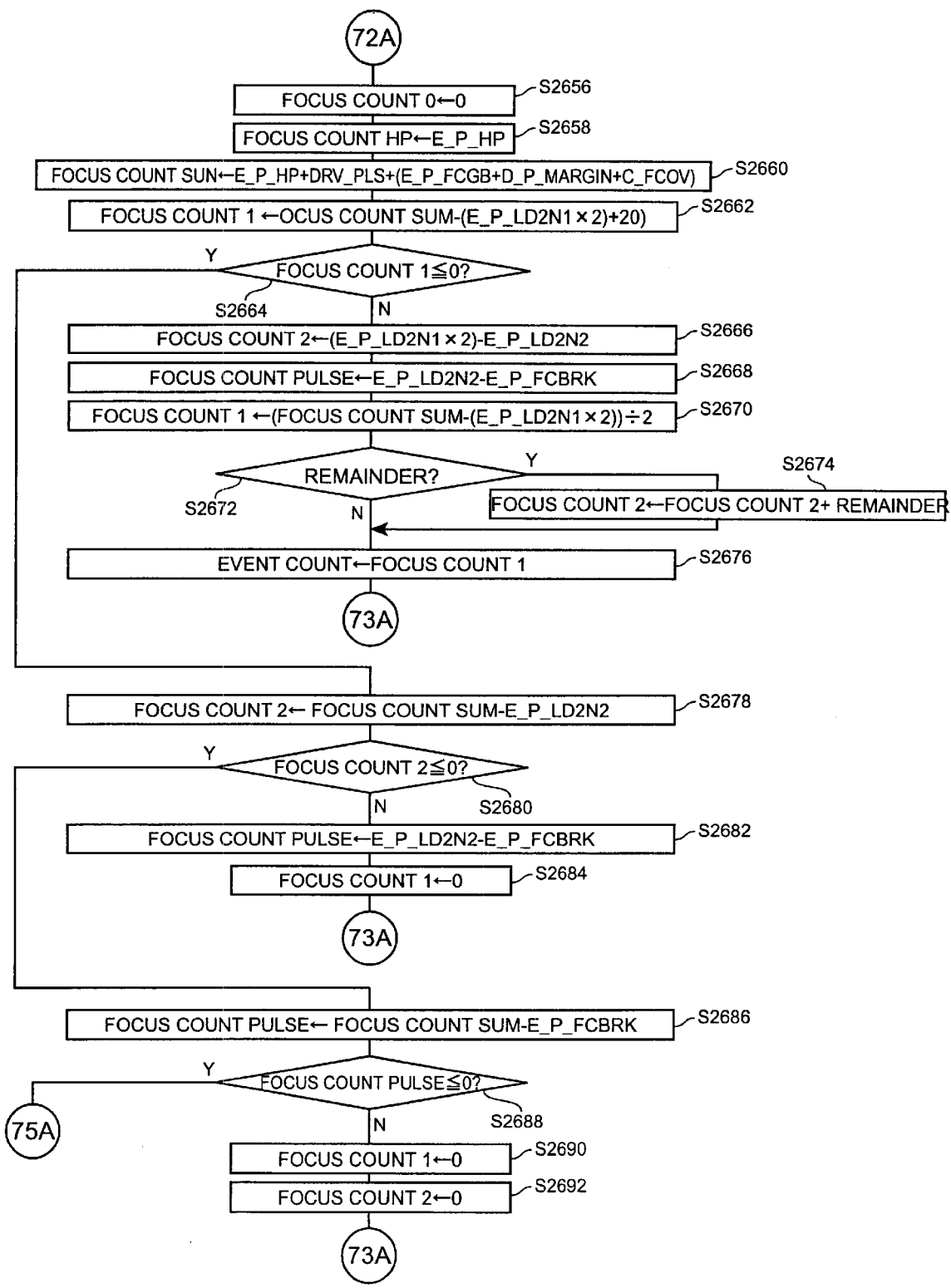
FIG. 72 is a flowchart of the second lens return processing operation of the camera equipped with the lens barrel of FIG. 1.
Figure 73:
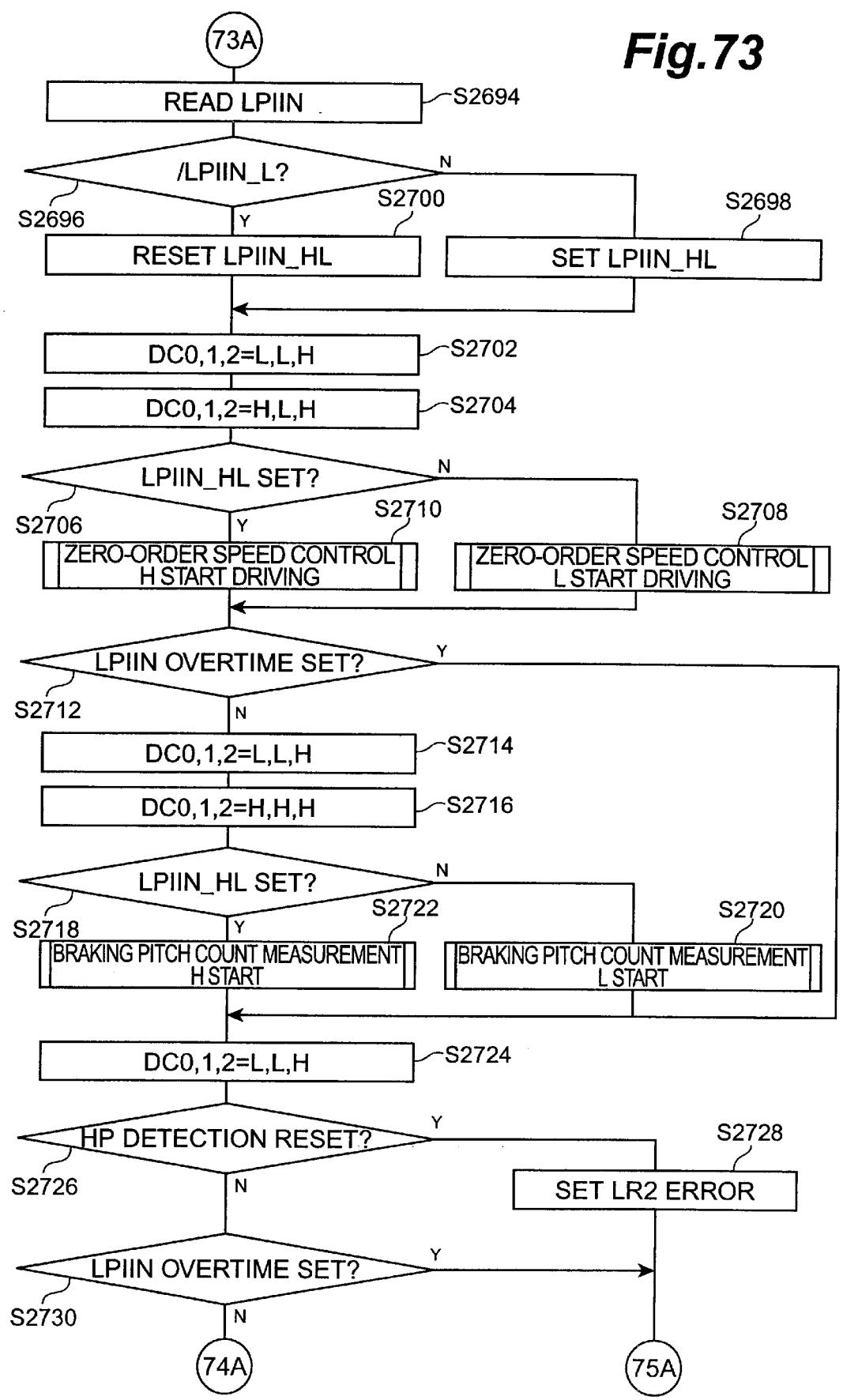
FIG. 73 is a flowchart of the second lens return processing operation of the camera equipped with the lens barrel of FIG. 1.
Figure 74:
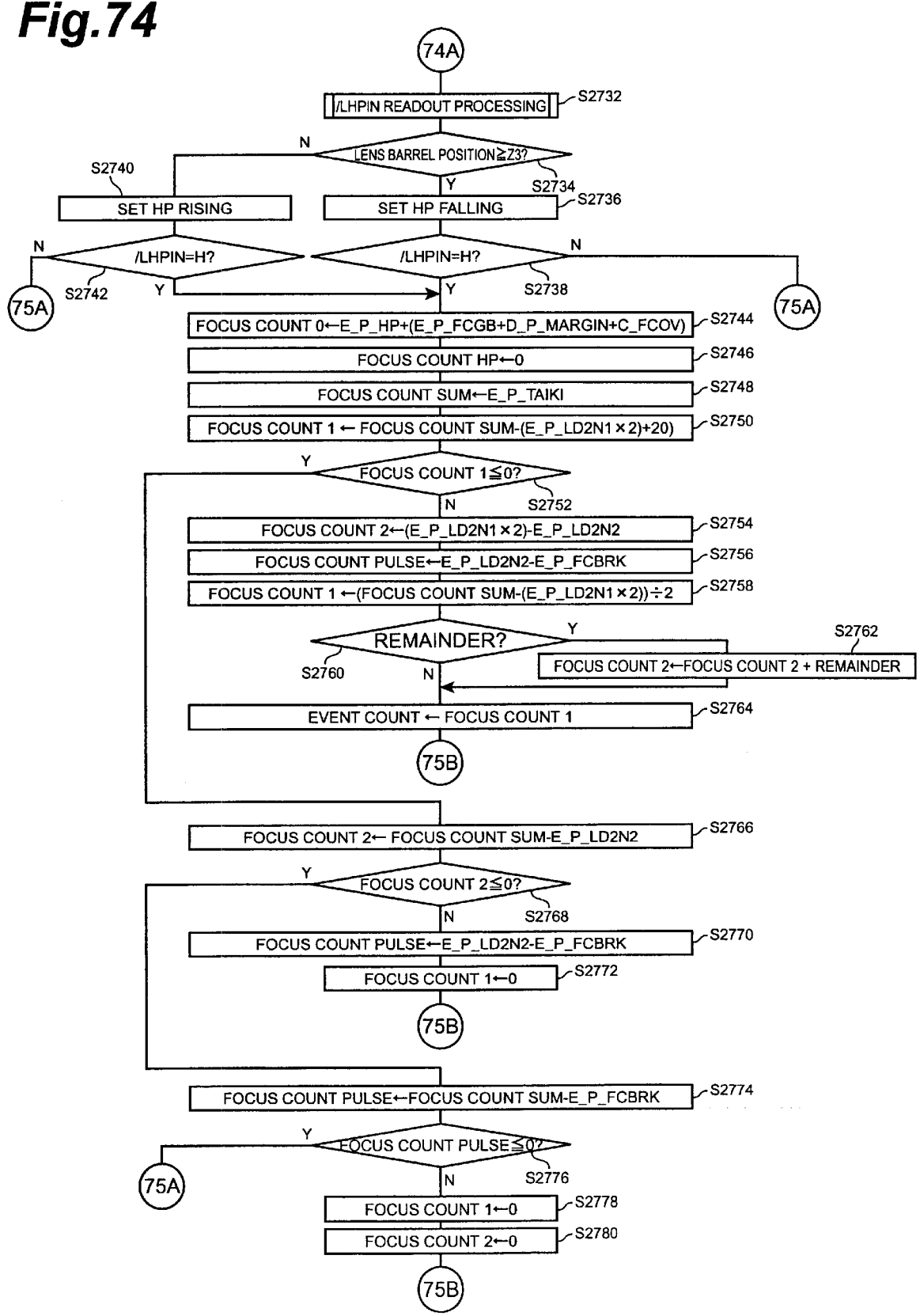
FIG. 74 is a flowchart of the second lens return processing operation of the camera equipped with the lens barrel of FIG. 1.
Figure 75:
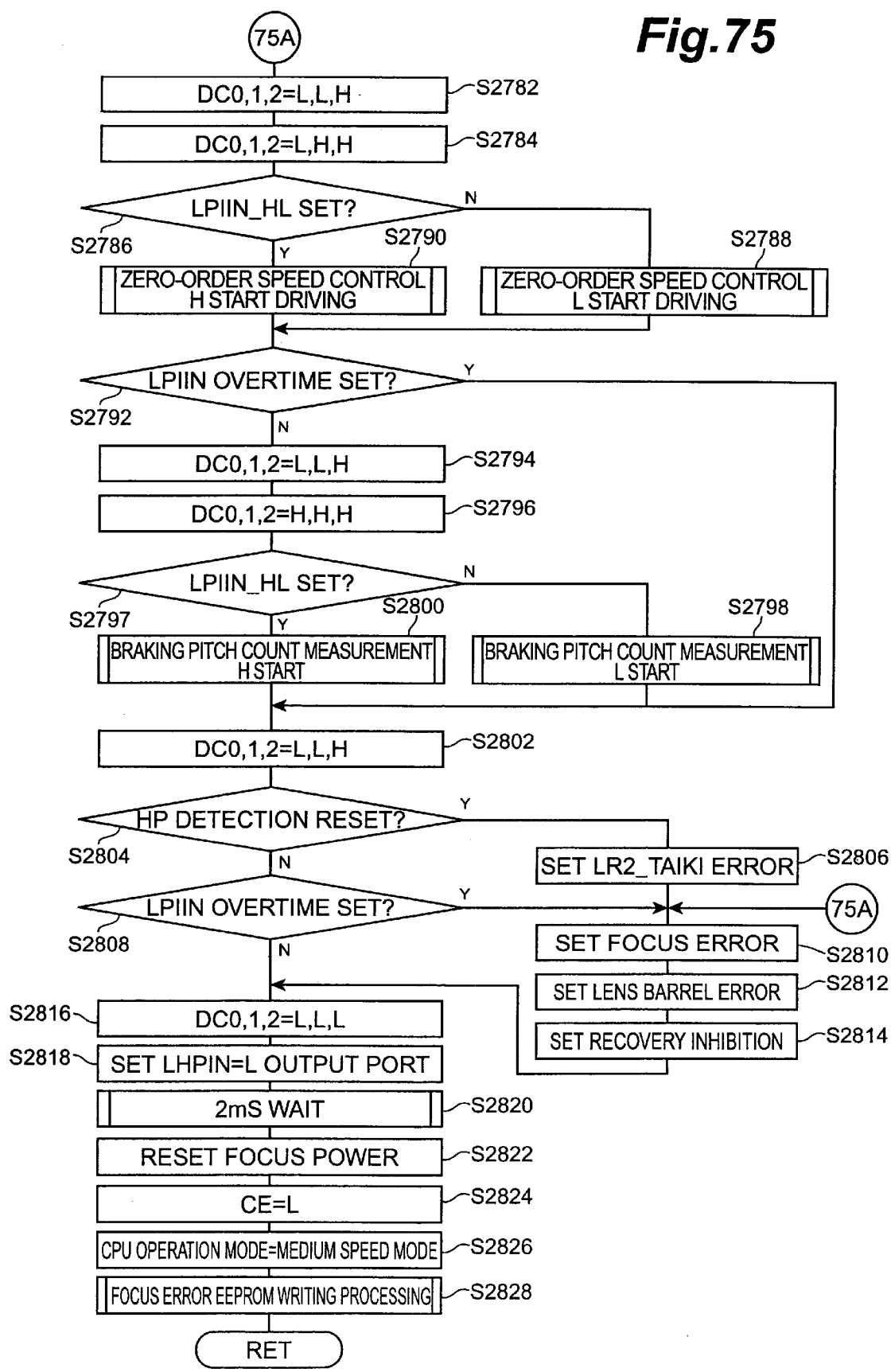
FIG. 75 is a flowchart of the second lens return processing operation of the camera equipped with the lens barrel of FIG. 1.

Subsequently, the flow shifts to S2656 in FIG. 72, where 0 is set as the focus count 0. Then, focus drive HP count data (E_P_HP) is set as the focus count HP (S2658). Thereafter, the sum of the focus drive HP count data (E_P_HP), drive pulse (DRV_PLS), focus drive backlash count data (E_P_FCGB), focus drive HP detection margin pitch count data (D_P_MARGIN), and focus driving over-pitch number (C_FCOV) is set as the focus count SUM (S2660).

Subsequently, the focus drive first speed count data (E_P_LD2N1) is doubled, 20 is added thereto, thus obtained value ((E_P_LD2N1*2)+20) is subtracted from the focus count SUM, and the resulting value is set as the focus count 1 (S2662).

Thereafter, it is determined whether the focus count 1 is at most 0 or not (S2664). If it is determined that the focus count 1 is not at most 0, then the focus drive first speed count data (E_P_LD2N1) is doubled, the focus drive second speed count data (E_P_LD2N2) is subtracted therefrom, and thus obtained value is set as the focus count 2 (S2666).

Subsequently, the value obtained when the focus drive brake pitch count data (E_P_FCBRK) is subtracted from the focus drive second speed count data (E_P_LD2N2) is set as the focus count pulse (S2668). Then, doubled focus drive first speed count data (L_P_LD2N1) is subtracted from the focus count SUM, thus obtained value is divided by 2, and the resulting value is set as the focus count 1 (S2670). Subsequently, it is determined whether there is a remainder or not (S2672). If it is determined that there is a remainder, then the sum of the focus count 1 and the remainder is set as the focus count 2 (S2674), and the flow shifts to S2676. If it is determined that there is no remainder, by contrast, then the flow directly shifts to S2676, where the focus count 1 is set as the event count. Subsequently, the flow shifts to S2694 in FIG. 73.

If it is determined at S2664 that the focus count 1 is at most 0, then the value obtained when the focus drive second speed count data (E_P_LD2N2) is subtracted from the focus count SUM is set as the focus count 2 (S2678).

Subsequently, it is determined whether the focus count 2 is at most 0 or not (S2680). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S2682). Thereafter, 0 is set as the focus count 1, and the flow shifts to S2694 in FIG. 73.

If it is determined at S2680 that the focus count 2 is at most 0, then the value obtained when the focus drive brake pitch count data (E_P_FCBRK) is subtracted from the focus count SUM is set as the focus count pulse (S2686).

Subsequently, the flow shifts to S2688, where it is determined whether the focus count pulse is at most 0 or not. If it is determined that the focus count pulse is at most 0, then the flow shifts to S2810 in FIG. 75. If it is determined not, by contrast, then 0 is set as the focus count 1 (S2690), and 0 is set as the focus count 2 (S2692). Thereafter, the flow shifts to S2694 in FIG. 73.

The terminal LPIIN (see FIG. 16) receiving the output of detector 96 is read out at S2694, and it is determined whether the terminal LPIIN is at L or not (S2696). If it is determined that the terminal LPIIN is at L, then the HL flag of the terminal LPIIN is reset (S2700). If it is determined not, by contrast, then the HL flag of the terminal LPIIN is set (S2698).

Subsequently, the flow shifts to S2702, where the outputs of parallel terminals DC0, DC1, and DC2 are set L, L, and H, respectively, so that the motor 95 is set to the wait state. Then, the outputs of parallel terminals DC0, DC1, and DC2 are set H, L, and H, respectively, so as to carry out reverse rotation driving (S2704).

Subsequently, If it is determined whether the HL flag of the terminal LPIIN is set or not (S2706). If it is determined that the HL flag of the terminal LPIIN is set, then a zero-order speed control H start drive processing operation is carried out (S2710). If it is determined not, by contrast, then a zero-order speed control L start drive processing operation is carried out (S2708). The zero-order speed control H and L start drive processing operations will be explained later in detail.

Subsequently, the flow shifts to S2712, where it is determined whether the LPIIN overtime is set or not. If it is determined that the LPIIN overtime is set, then the flow shifts to S2724. If it is determined not, by contrast, then the outputs of parallel terminals DC0, DC1, and DC2 are set L, L, and H, respectively, so that the motor 95 is set to the wait state (S2714). Then, the outputs of parallel terminals DC0, DC1, and DC2 are set H, H, and H, respectively, so as to attain the brake output state (S2716).

Subsequently, it is determined whether the HL flag of the terminal LPIIN is set or not (S2718). If it is determined that the HL flag of the terminal LPIIN is set, then a braking pitch count measurement H start drive processing operation is carried out (S2722). If it is determined not, by contrast, then a braking pitch count measurement L start drive processing operation is carried out (S2720). The braking pitch count measurement L and H start drive processing operations will be explained later in detail.

Subsequently, the flow shifts to S2724, where the outputs of parallel terminals DC0, DC1, and DC2 are set L, L, and H, respectively, so that the motor 95 is placed into the wait state. Then, it is determined whether the HP detection flag is reset or not (S2726). If it is determined that the HP detection flag is reset, then the HP error of LR2 is set (S2728), and the flow shifts to S2810 in FIG. 75.

If it is determined at S2726 that the HP detection flag is not reset, by contrast, then it is determined whether the LPIIN overtime is set or not (S2730). If it is determined that the LPIIN overtime is set, then the flow shifts to S2810 in FIG. 75. If it is determined that the LPIIN overtime is not set, by contrast, then the flow shifts to S2732 in FIG. 74. At S2732, a readout processing operation for the terminal LHPIN is carried out. Subsequently, it is determined whether the lens barrel position is at least Z3 or not (S2734). If it is determined that the lens barrel position is not at least Z3, then it is considered that the lens barrel position is at Z2, whereby the HP rising is set (S2740).

Subsequently, it is determined whether the terminal LHPIN is at L or not (S2742). If it is determined that the terminal LHPIN is not at L, then the flow shifts to S2810 in FIG. 75. If it is determined that the terminal LHPIN is at L, by contrast, then the flow shifts to S2744.

If it is determined at S2734 that the lens barrel position is at least Z3, then the HP falling is set (S2736). Subsequently, it is determined whether the terminal LHPIN is at H or not (S2738). If it is determined that the terminal LHPIN is not at H, then the flow shifts to S2810 in FIG. 75. If it is determined that the terminal LHPIN is at H, by contrast, then the flow shifts to S2744.

At S2744, the sum of the focus drive HP count data (E_P_HP), focus drive backlash count data (E_P_FCGB), focus drive HP detection margin pitch count data (D_P_MARGIN), and focus driving over-pitch number (C_FCOV) is set as the focus count 0. Subsequently, 0 is set as the focus count HP (S2746), and focus wait position pitch count data (E_P_TAIKI) is set as the focus count SUM (S2748).

Then, doubled focus drive first speed count data (E_P_LD2N1) and 20 pitches are subtracted from the focus count SUM, and thus obtained value is set as the focus count 1 (S2750).

Subsequently, it is determined whether the focus count 1 is at most 0 or not (S2752). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S2754).

Subsequently, the value obtained when the focus drive brake pitch count data (E_P_FCBRK) is subtracted from the focus drive second speed count data (E_P_LD2N2) is set as the focus count pulse (S2756). Then, doubled focus drive first speed count data (E_P_LD2N1) is subtracted from the focus count SUM, thus obtained value is divided by 2, and the resulting value is set as the focus count 1 (S2758). Subsequently, it is determined whether there is a remainder or not (S2760). If it is determined that there is a remainder, then the value obtained when the remainder is added to the focus count 2 is set as the focus count 2 (S2762), and the flow shifts to S2764. If it is determined that there is no remainder, by contrast, then the flow directly shifts to S2764, where the focus count 1 is set as the event count. Thereafter, the flow shifts to S2782 in FIG. 75.

If it is determined at S2752 that the focus count 1 is at most 0, then the value obtained when the focus drive second speed count data (E_P_LD2N2) is subtracted from the focus count SUM is set as the focus count 2 (S2766).

Subsequently, it is determined whether the focus count 2 is at most 0 or not (S2768). If it is determined that the focus count 2 is not at most 0, then the value obtained when the focus drive brake pitch count data (E_P_FCBRK) is subtracted from the focus drive second speed count data (E_P_L2N2) is set as the focus count pulse (S2770). Subsequently, 0 is set as the focus count 1, and the flow shifts to S2782 in FIG. 75.

If it is determined at S2768 that the focus count 2 is at most 0, by contrast, then the value obtained when the focus drive brake pitch count data (E_P_FCBRK) is subtracted from the focus count SUM is set as the focus count pulse (S2774).

Subsequently, the flow shifts to S2776, where it is determined whether the focus count pulse is at most 0 or not. If it is determined that the focus count pulse is at most 0, then the flow shifts to S2810 in FIG. 75. If it is determined not, by contrast, then 0 is set as the focus count 1 (S2778), and 0 is set as the focus count 2 (S2780). Thereafter, the flow shifts to S2782 in FIG. 75.

At S2782, the outputs of parallel terminals DC0, DC1, and DC2 are set L, L, and H, respectively, so that the motor 95 is placed into the wait state. Subsequently, the outputs of parallel terminals DC0, DC1, and DC2 are set L, H, and H, respectively, so as to carry out normal rotation driving (S2784).

Then, it is determined whether the HL flag of the terminal LPIIN is set or not (S2786). If it is determined that the HL flag of the terminal LPIIN is set, then a zero-order speed control H start drive processing operation is carried out (S2790). If it is determined not, by contrast, then a zero-order speed control L start drive processing operation is carried out (S2788). The zero-order control H and L start drive processing operations will be explained later in detail.

Subsequently, the flow shifts to S2792, where it is determined whether the LPIIN overtime is set or not. If it is determined that the LPIIN overtime is set, then the flow shifts to S2802. If it is determined not, by contrast, then the outputs of parallel terminals DC0, DC1, and DC2 are set L, L, and H, respectively, so that the motor 95 is placed into the wait state (S2794). Subsequently, the outputs of parallel terminals DC0, DC1, and DC2 are set H, H, and H, respectively, so as to attain the brake output state (S2796).

Subsequently, it is determined whether the HL flag of the terminal LPIIN is set or not (S2797). If it is determined that the HL flag of the terminal LPIIN is set, then a braking pitch count measurement H start drive processing operation is carried out (S2800). If it is determined not, then a braking pitch count measurement L start drive processing operation is carried out (S2798). The braking pitch count measurement H and L start drive processing operations will be explained later in detail.

Subsequently, the flow shifts to S2802, where the outputs of parallel terminals DC0, DC1, and DC2 are set L, L, and H, respectively, so that the motor 95 is placed into the wait state. Then, it is determined whether the HP detection flag is reset or not (S2804). If it is determined that the HP detection flag is reset, then the TAIKI error of LR2 is set (S2806), and the flow shifts to S2810.

At S2810, the focus error is set. Subsequently, the lens barrel error is set (S2812), and the recovery inhibition is set (S2814). Then, the flow shifts to S2816.

If it is determined at S2804 that the HP detection flag is not reset, by contrast, then it is determined whether the LPIIN overtime is set or not (S2808). If it is determined that the LPIIN overtime is set, then the flow shifts to S2810. If it is determined that the LPIIN overtime is not set, then the flow shifts to S2816.

At S2816, the outputs of parallel terminals DC0, DC1, and DC2 are set L, L, and L, respectively, so that the motor 95 is placed into the wait state. Subsequently, the terminal LHPIN is set as the L output port (S2818). Then, after a wait of 2 ms (S2820), the focus power is reset (S2822), the driver ON/OFF terminal CE is set L, so as to place the driver section 219 into the inactive state (S2824), the operation mode of the CPU 200 is set to a medium speed mode (S2826), and a focus error EEPROM writing processing operation is carried out (S2828). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the second lens return processing operation is terminated.

As in the foregoing, when the second lens group 102 (focus) is driven from the WIDE wait position to rotate in reverse, the pulse drive control at a lower speed is carried out as shown in FIG. 69 after the HP (home position) serving as a reference position is detected. Consequently, the second lens group 102 can be prevented from colliding with the stopper due to its impetus upon movement, whereby gears can be kept from meshing with each other upon the collision and failing to rotate in reverse, which might have become a severe failure, for example.

Also, as shown in FIGS. 69 and 70, the zero-order speed control at a speed lower than that of the first speed control, DC driving, or the like is carried out before the second lens group 102 passes the HP when moved. As a consequence, the HP can be detected precisely. Therefore, the second lens group 102 can be moved precisely upon focusing, whereby the focusing accuracy can be improved.

The barrier close processing operation will now be explained.

The barrier close processing operation is carried out as a part of the SM close processing operation performed upon manipulating the main switch 16 (FIG. 28), and is an operation for driving the motor 95 of the focus driving section 221 for closing the barrier 83.

Figure 76:
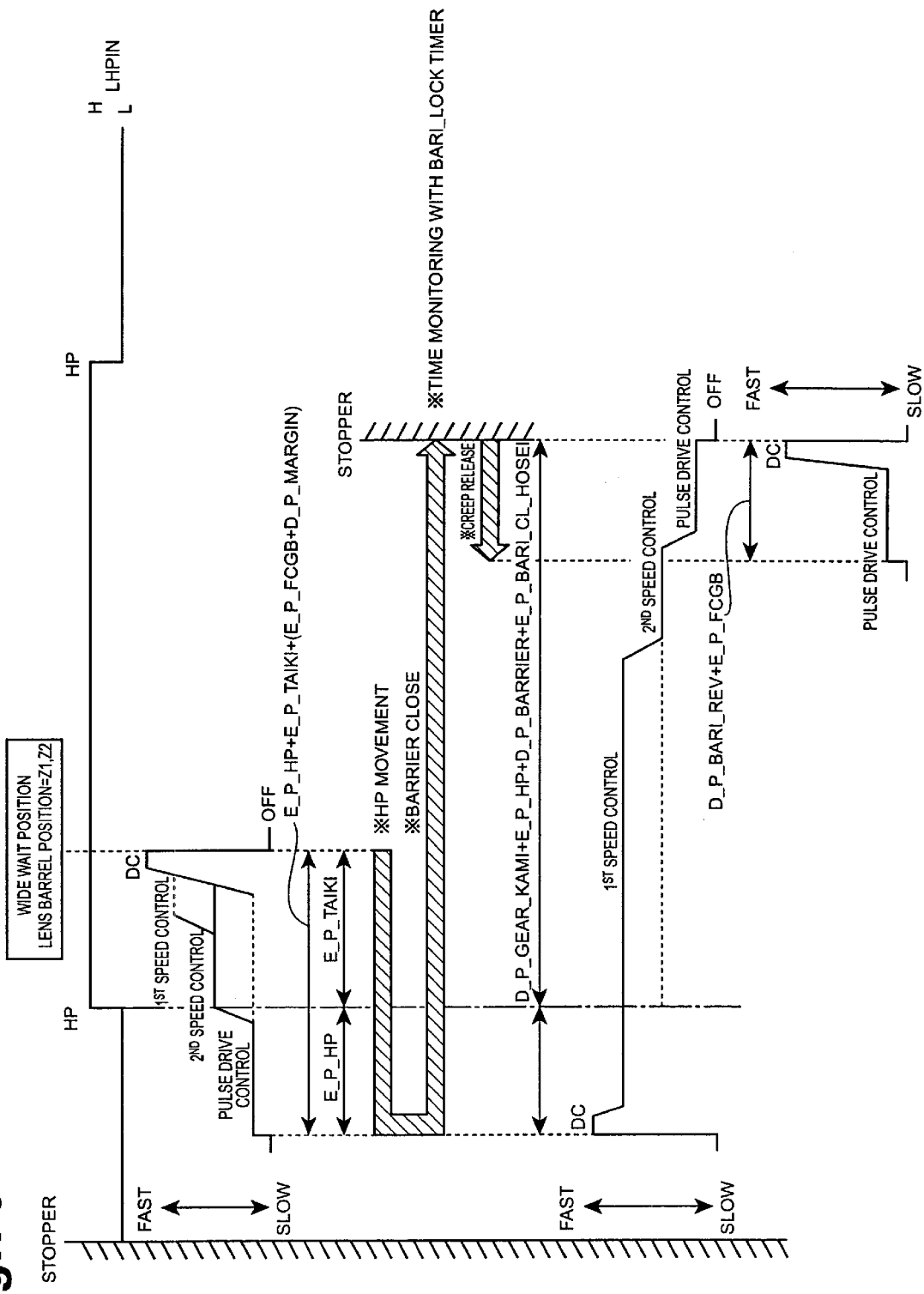
FIG. 76 is an operational chart for explaining a WIDE wait time in a barrier close processing operation of the camera equipped with the lens barrel of FIG. 1.
Figure 77:
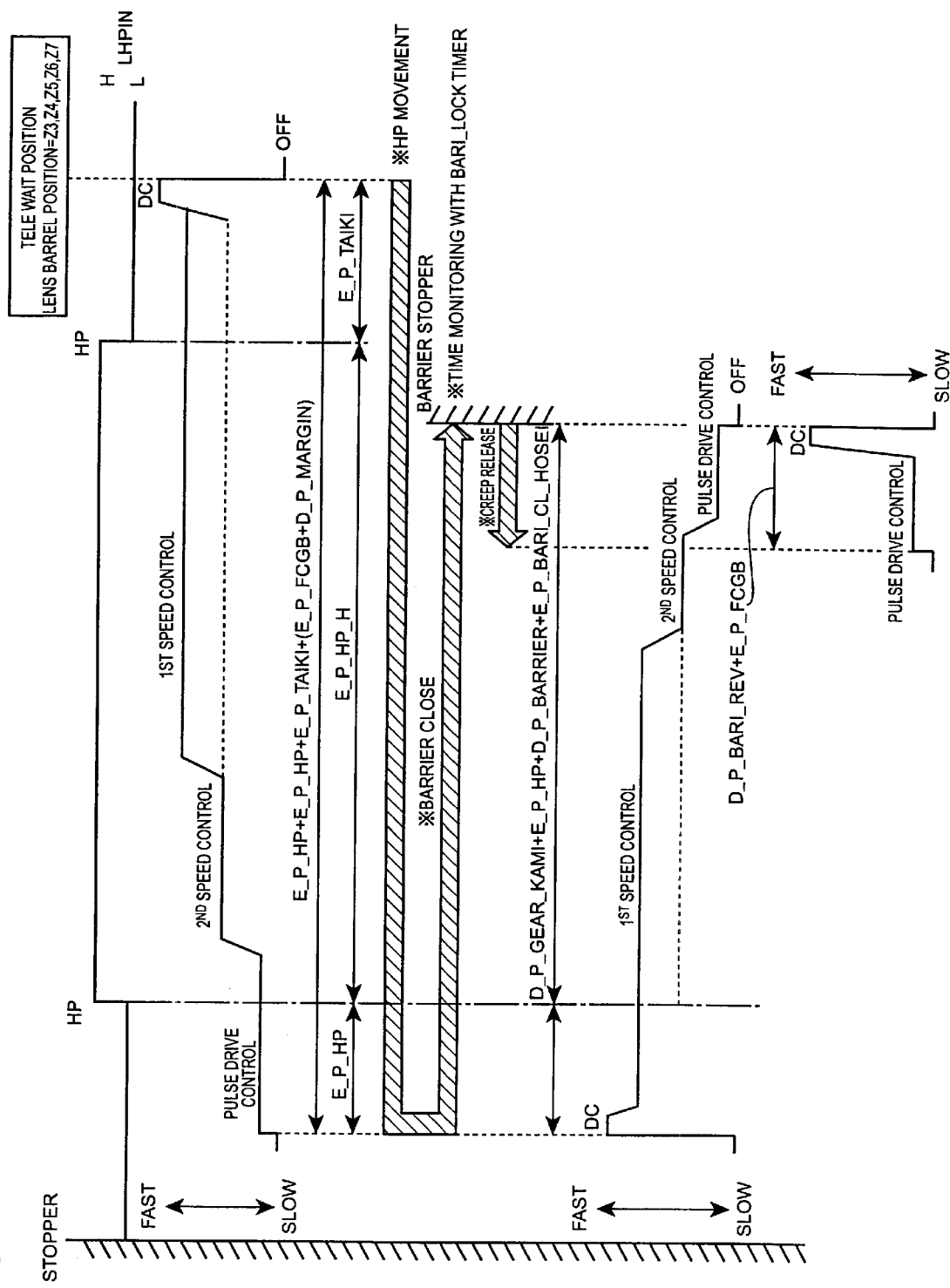
FIG. 77 is an operational chart for explaining a TELE wait time in the barrier close processing operation of the camera equipped with the lens barrel of FIG. 1.

FIG. 76 shows an operational chart for explaining the barrier close processing operation at the time of WIDE wait, whereas FIG. 77 shows an operational chart for explaining the barrier close processing operation at the time of TELE wait. FIGS. 78 to 84 show flowcharts of the barrier close processing operation. FIGS. 85 to 90 show flowcharts of a barrier closing focus drive processing operation in the barrier close processing operation.

Figure 78:
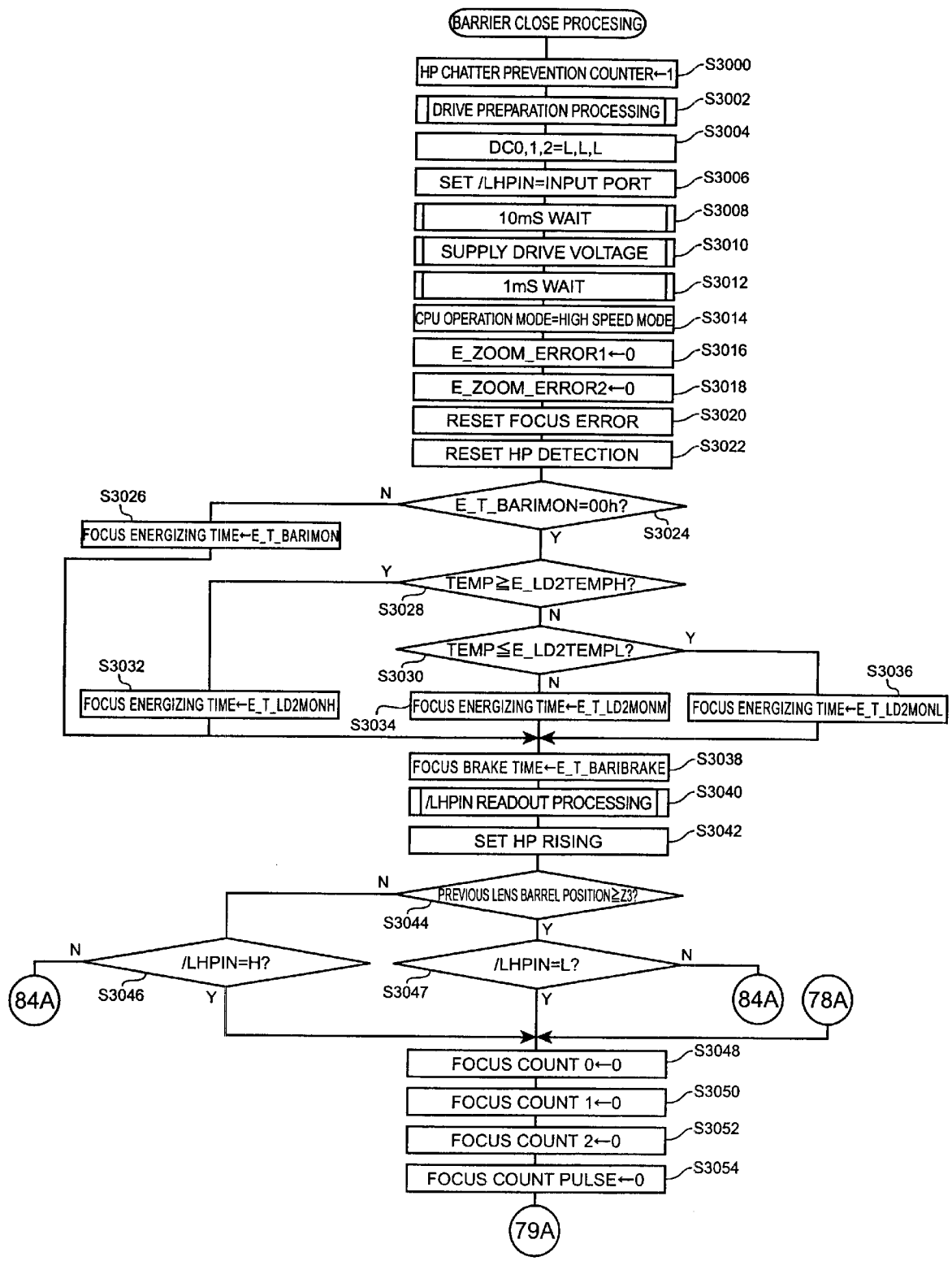
FIG. 78 is a flowchart of the barrier close processing operation of the camera equipped with the lens barrel of FIG. 1.

In the barrier close processing operation, as shown at S3000 in FIG. 78, 1 is initially set as an HP (home position) chatter prevention counter. Subsequently, a drive preparation processing operation is carried out, so that the motor 95 of the focus driving section 221 is selected as the motor to drive (S3002). Then, the flow shifts to S3004, where the outputs of parallel terminals DC0, DC1, and DC2 are set L, L, and L, respectively, so that the motor 95 is placed into the wait state. Thereafter, the terminal LHPIN is set as the input port (S3006) and, after a wait of 10 ms (S3008), the voltage output to the focus motor is enabled (S3010).

Subsequently, after a wait of 1 ms (S3012), the operation mode of CPU 200 is set to the high speed mode (S3014). The change of the operation mode to the high speed mode is carried out by changing the base clock of the CPU 200, for example.

Then, lens barrel control error code 1 (E_ZOOM_ERROR1) is reset (S3016), lens barrel control error code 2 (E_ZOOM_ERROR2) is reset (S3018), focus error is reset (S3020), and HP (home position) detection is reset (S3022).

Thereafter, the flow shifts to S3024, where it is determined whether 00h is set as the barrier operating focus drive energizing time (E_T_BARIMON) or not. If it is determined not, then doubled barrier operating focus drive energizing time (E_T_BARIMON) is set as the focus energizing time (S3026). Subsequently, the flow shifts to S3038.

If it is determined that 00h is set as the barrier operating focus drive energizing time, by contrast, then the flow shifts to S3028, where it is determined whether the temperature (TEMP) measured in the power ON/OFF temperature measurement processing operation (see S112 in FIG. 19) is at least the high-temperature set temperature (E_LD2TEMPH) or not. If it is determined that the measured temperature is at least the high-temperature set temperature, then high-temperature focus drive energizing time data (E_T_LD2MONH) is set as the focus energizing time (S3032).

If it is determined at S3028 that the measured temperature is not at least the high-temperature set temperature, then it is determined whether the measured temperature (TEMP) is at most the low-temperature set temperature (E_LD2TEMPL) or not (S3030). If it is determined that the measured temperature is at most the low-temperature set temperature, then low-temperature focus drive energizing time data (E_T_LD2MONL) is set as the focus energizing time (S3036). If it is determined that the measured temperature is not at most the low-temperature set temperature, by contrast, then room-temperature focus drive energizing time data (E_T_LD2MONM) is set as the focus energizing time (S3034).

In the high-temperature focus drive energizing time data (E_T_LD2MONH), a time shorter than that in the room-temperature focus drive energizing time data (E_T_LD2MONM) is set. In the room-temperature focus drive energizing time data (E_T_LD2MONM), a time shorter than that in the low-temperature focus drive energizing time data (E_T_LD2MONL) is set.

Subsequently, the flow shifts to S3038, where focus drive brake time data (E_T_LD2BRAKE) is set as the focus brake time. Then, the input of the terminal LHPIN is read out (S3040). Thereafter, the HP falling is set (S3042).

Subsequently, it is determined whether the previous lens barrel position is at least Z3 or not (S3044). If it is determined not, then is considered that the previous lens barrel position is at Z2, and it is determined whether the terminal LHPIN is at H or not (S3046). If it is determined that the terminal LHPIN is not at H, then the flow shifts to S3330 in FIG. 84. If it is determined that the terminal LHPIN is at H, by contrast, then the flow shifts to S3048.

If it is determined at S3044 that the lens barrel position is at least Z3, then it is determined whether the terminal LHPIN is at L or not (S3047). If it is determined that the terminal is not at L, then the flow shifts to S3330 in FIG. 84. If it is determined that the terminal is at L, then the flow shifts to S3048.

At S3048, 0 is set as the focus count 0. Subsequently, 0 is set as the focus count 1 (S3050), 0 is set as the focus count 2 (S3052), and 0 is set as the focus count pulse (S3054).

Figure 79:
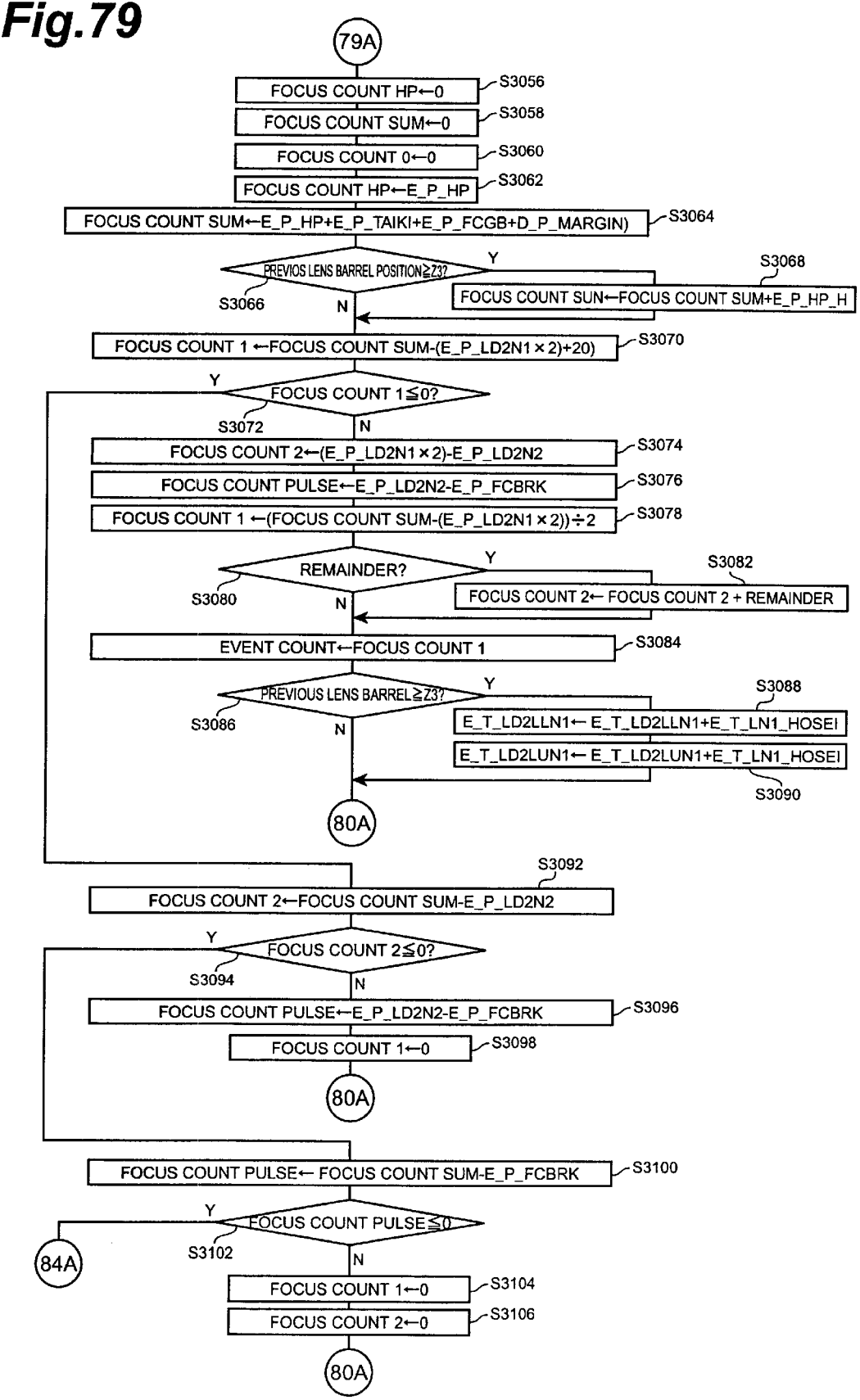
FIG. 79 is a flowchart of the barrier close processing operation of the camera equipped with the lens barrel of FIG. 1.

Then, the flow shifts to S3056 in FIG. 79, where 0 is set as the focus count HP, and 0 is set as the focus count SUM (S3058).

Here, the "focus count 0" refers to the count (pitch) of the zero-order speed control (see FIGS. 76 and 77). The "focus count 1" refers to the count (pitch) of the first speed control (see FIGS. 76 and 77). The "focus count 2" refers to the count (pitch) of the second speed control (see FIGS. 76 and 77). The "focus count pulse" refers to the count (pitch) of the pulse drive control (see FIGS. 76 and 77).

As shown in FIGS. 76 and 77, speed control for changing the driving speed according to the moving position of the second lens group 102 is carried out in the focus driving (driving of the second lens group). As the speed control, the above-mentioned zero-order speed control, first speed control, second speed control, and pulse drive control are set. The pulse drive control is a control operation at a speed lower than that of the second speed control. The second speed control is a control operation at a speed lower than that of the first speed control. The zero-order speed control and the second speed control are control operations at the same speed.

The "focus count HP" refers to the count (pitch) of the pulse drive control (FIGS. 76 and 77) after the HP detection. The "focus count SUM" refers to the whole pitch number of driving. Here, "pitch" refers to a half of 1 pulse, so that 2 pitches constitute 1 pulse.

Subsequently, the flow shifts to S3060 in FIG. 79, where 0 is set as the focus count 0. Then, focus drive HP count data (E_P_HP) is set as the focus count HP (S3062). Thereafter, the sum of the focus drive HP count data (E_P_HP), focus wait position pitch count data (E_P_TAIKI), focus drive backlash count data (E_P_FCGB), and focus drive HP detection margin pitch count data (D_P_MARGIN) is set as the focus count SUM (S3064).

Subsequently, it is determined whether the previous lens barrel position is at least Z3 or not (S3066). If it is determined not, then the flow shifts to S3070. If it is determined that the previous lens barrel position is at least Z3, by contrast, then the value obtained when focus drive HP "H" section pitch count data (E_P_HP_H) is added to the focus count SUM is set as the focus count 1 (S3068), and the flow shifts to S3070.

At S3070, the focus drive first speed count data (E_P_LD2N1) is doubled, 20 is added thereto, thus obtained value ((E_P_LD2N1*2)+20) is subtracted from the focus count SUM, and the resulting value is set as the focus count 1.

Thereafter, it is determined whether the focus count 1 is at most 0 or not (S3072). If it is determined that the focus count 1 is not at most 0, then the focus drive first speed count data (E_P_LD2N1) is doubled, the focus drive second speed count data (E_P_LD2N2) is subtracted therefrom, and thus obtained value is set as the focus count 2 (S3074).

Subsequently, the value obtained when focus drive brake pitch count data (E_P_FCBRK) is subtracted from the focus drive second speed count data (E_P_LD2N2) is set as the focus count pulse (S3076). Then, doubled focus drive first speed count data (E_P_LD2N1) is subtracted from the focus count SUM, thus obtained value is divided by 2, and the resulting value is set as the focus count 1 (S3078). Subsequently, it is determined whether there is a remainder or not (S3080). If it is determined that there is a remainder, then the value obtained when the remainder is added to the focus count 2 is set as the focus count 2 (S3082), and the flow shifts to S3084. If it is determined that there is no remainder, by contrast, then the flow directly shifts to S3084, where the focus count 1 is set as the event count.

Subsequently, it is determined whether the previous lens barrel position is at least Z3 or not (S3086). If it is determined that the previous lens barrel position is at least Z3, then the value obtained when focus drive first speed deceleration time (E_T_LN1_HOSEI) is added to focus drive first speed lower limit pulse time (E_T_LD2LLN1) is set as the focus drive first speed lower limit pulse time (E_T_LD2LLN1) (S3088). Thereafter, the value obtained when the focus drive first speed deceleration time (E_T_LN1_HOSEI) is added to focus drive first speed upper limit pulse time (E_T_LD2LUN1) is set as the focus drive first speed upper limit pulse time (E_T_LD2LUN1) (S3090). Subsequently, the flow shifts to S3108 in FIG. 80.

Figure 80:
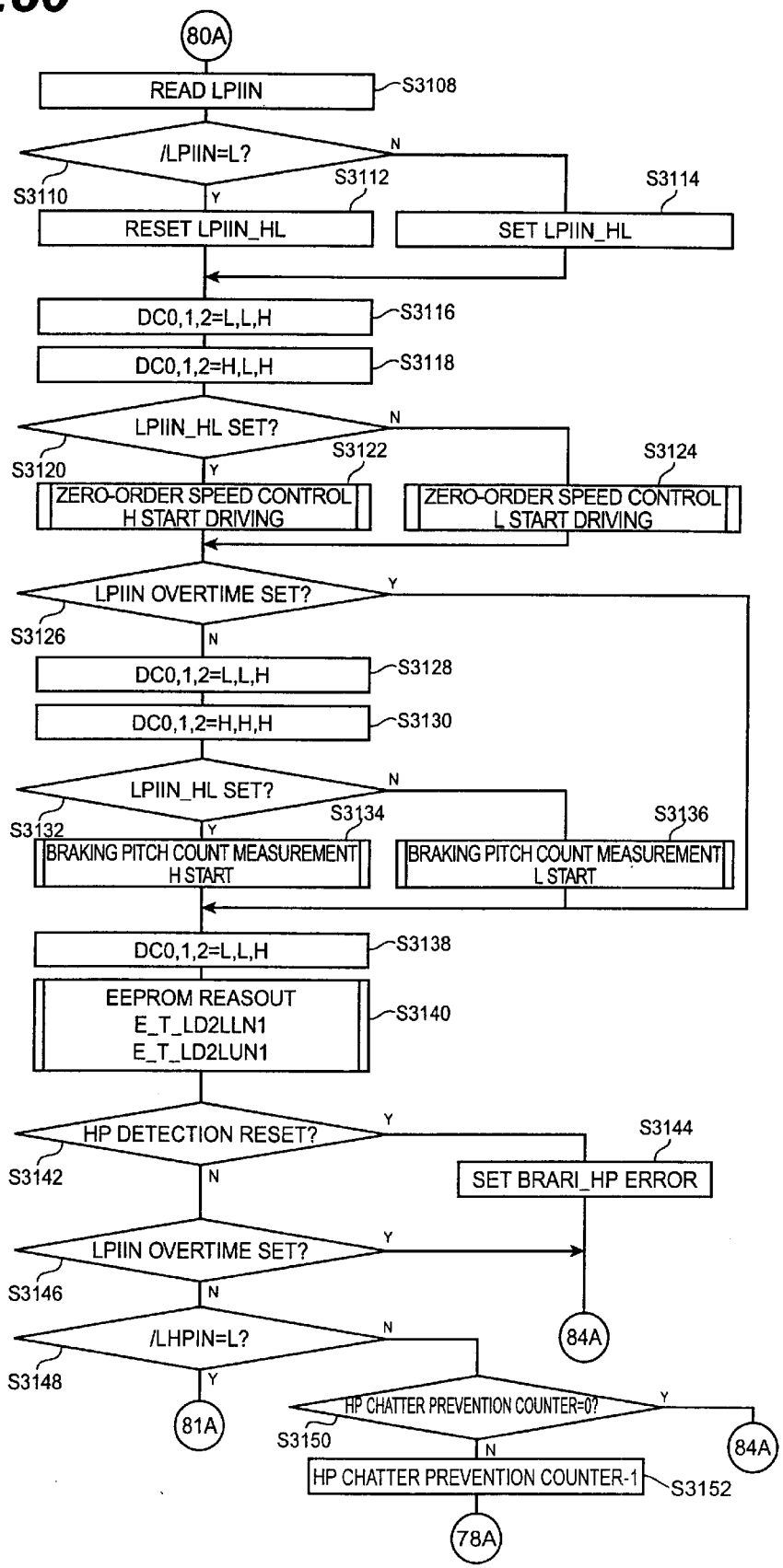
FIG. 80 is a flowchart of the barrier close processing operation of the camera equipped with the lens barrel of FIG. 1.

If it is determined at S3086 that the previous lens barrel position is not at least Z3, then the flow shifts to S3108 in FIG. 80.

If it is determined at S3072 that the focus count 1 is at most 0, then the value obtained when the focus drive second speed count data (E_P_LD2N2) is subtracted from the focus count SUM is set as the focus count 2 (S3092).

Subsequently, it is determined whether the focus count 2 is at most 0 or not (S3094). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S3096). Subsequently, 0 is set as the focus count 1 (S3098), and the flow shifts to S3108 in FIG. 80.

If it is determined at S3094 that the focus count 2 is at most 0, then the value obtained when the focus drive brake pitch count data (E_P_FCBRK) is subtracted from the focus count SUM is set as the focus count pulse (S3100).

Subsequently, the flow shifts to S3102, where it is determined whether the focus count pulse is at most 0 or not. If it is determined that the focus count pulse is not at most 0, then 0 is set as the focus count 1 (S3104). Thereafter, 0 is set as the focus count 2 (S3106), and the flow shifts to S3108 in FIG. 80. If it is determined that the focus count pulse is at most 0, by contrast, then the flow shifts to S3330 in FIG. 84.

The terminal LPIIN (see FIG. 16) receiving the output of detector 96 is read out at S3108 in FIG. 80, and it is determined whether the terminal LPIIN is at L or not (S3110). If it is determined that the terminal LPIIN is at L, then the HL flag of the terminal LPIIN is reset (S3112). If it is determined that the terminal LPIIN is not at L, by contrast, then the HL flag of the terminal LPIIN is set (S3114).

Subsequently, the flow shifts to S3116, where the outputs of parallel terminals DC0, DC1, and DC2 are set L, L, and H, respectively, so that the motor 95 is placed into the wait state. Then, the outputs of parallel terminals DC0, DC1, and DC2 are set H, L, and H, respectively, so as to carry out driving in reverse (S3118).

Thereafter, it is determined whether the HL flag of the terminal LPIIN is set or not (S3120). If it is determined that the HL flag of the terminal LPIIN is set, then a zero-order speed control H start drive processing operation is carried out (S3122). If it is determined not, by contrast, then a zero-order speed control L start drive processing operation is carried out (S3124). The zero-order speed control H and L start drive processing operations will be explained later in detail.

Subsequently, the flow shifts to S3126, where it is determined whether the LPIIN overtime is set or not. If it is determined that the LPIIN overtime is set, then the flow shifts to S3138. If it is determined not, by contrast, then the outputs of parallel terminals DC0, DC1, and DC2 are set L, L, and H, respectively, so as to place the motor 95 into the wait state (S3128). Thereafter, the outputs of parallel terminals DC0, DC1, and DC2 are set H, H, and H, respectively, so as to attain the brake output state (S3130).

Subsequently, it is determined whether the HL flag of the terminal LPIIN is set or not (S3132). If it is determined that the HL flag of the terminal LPIIN is set, then a braking pitch count measurement H start drive processing operation is carried out (S3134). If it is determined that the HL flag of the terminal LPIIN is not set, by contrast, then a braking pitch count measurement L start drive processing operation is carried out (S3136). The braking pitch count measurement L and H start drive processing operations will be explained later in detail.

Subsequently, the flow shifts to S3138, where the outputs of parallel terminals DC0, DC1, and DC2 are set L, L, and H, respectively, so that the motor 95 is placed into the wait state. Then, the flow shifts to S3140, where a readout processing operation for the EEPROM 218 is carried out. In this readout processing operation, the focus drive first speed upper limit pulse time (E_T_LD2LUN1) and focus drive first speed lower limit pulse time (E_T_LD2LLN1) are read out and set to their original values.

Subsequently, it is determined whether the HP detection flag is reset or not (S3142). If it is determined that the HP detection flag is reset, then the barrier (BARI) HP error is set (S3144), and the flow shifts to S3330 in FIG. 84.

If it is determined at S3142 that the HP detection flag is not reset, then it is determined whether the LPIIN overtime is set or not (S3146). If it is determined that the LPIIN overtime is set, then the flow shifts to S3330 in FIG. 84. If it is determined not, by contrast, then it is determined whether the terminal LHPIN is at L or not (S3148). If it is determined that the terminal LHPIN is at L, then the flow shifts to S3154 in FIG. 81. If it is determined that the terminal LHPIN is not at L, by contrast, then it is determined whether the HP chatter prevention counter is at 0 or not (S3150).

Figure 84:
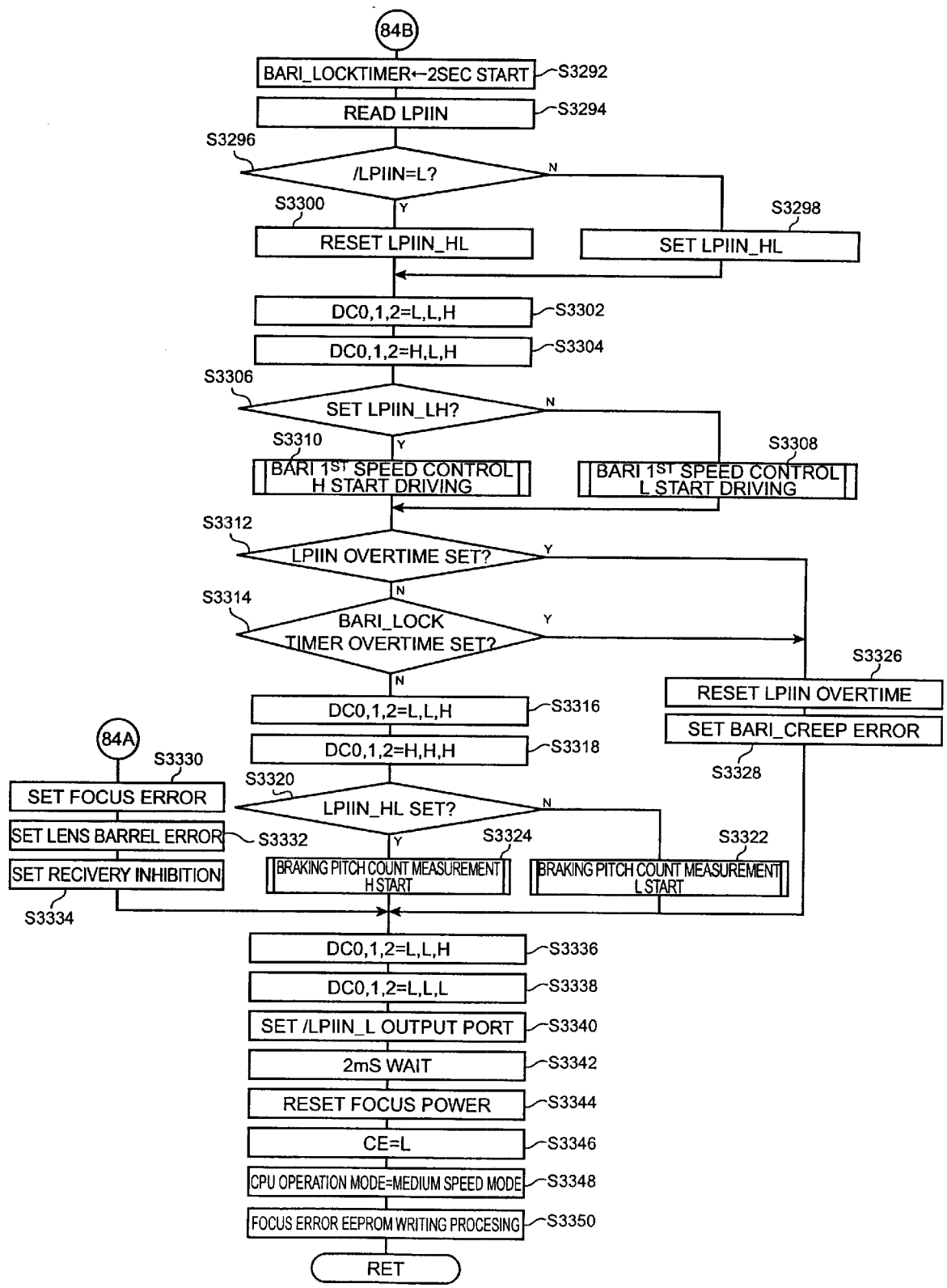
FIG. 84 is a flowchart of the barrier close processing operation of the camera equipped with the lens barrel of FIG. 1.

If it is determined at S3150 that the HP chatter prevention counter is at 0, then the flow shifts to S3330 in FIG. 84. If it is determined that the HP chatter prevention counter is not 0, by contrast, then 1 is subtracted from the value of HP chatter prevention counter, and the flow shifts to S3048 in FIG. 78.

Figure 81:
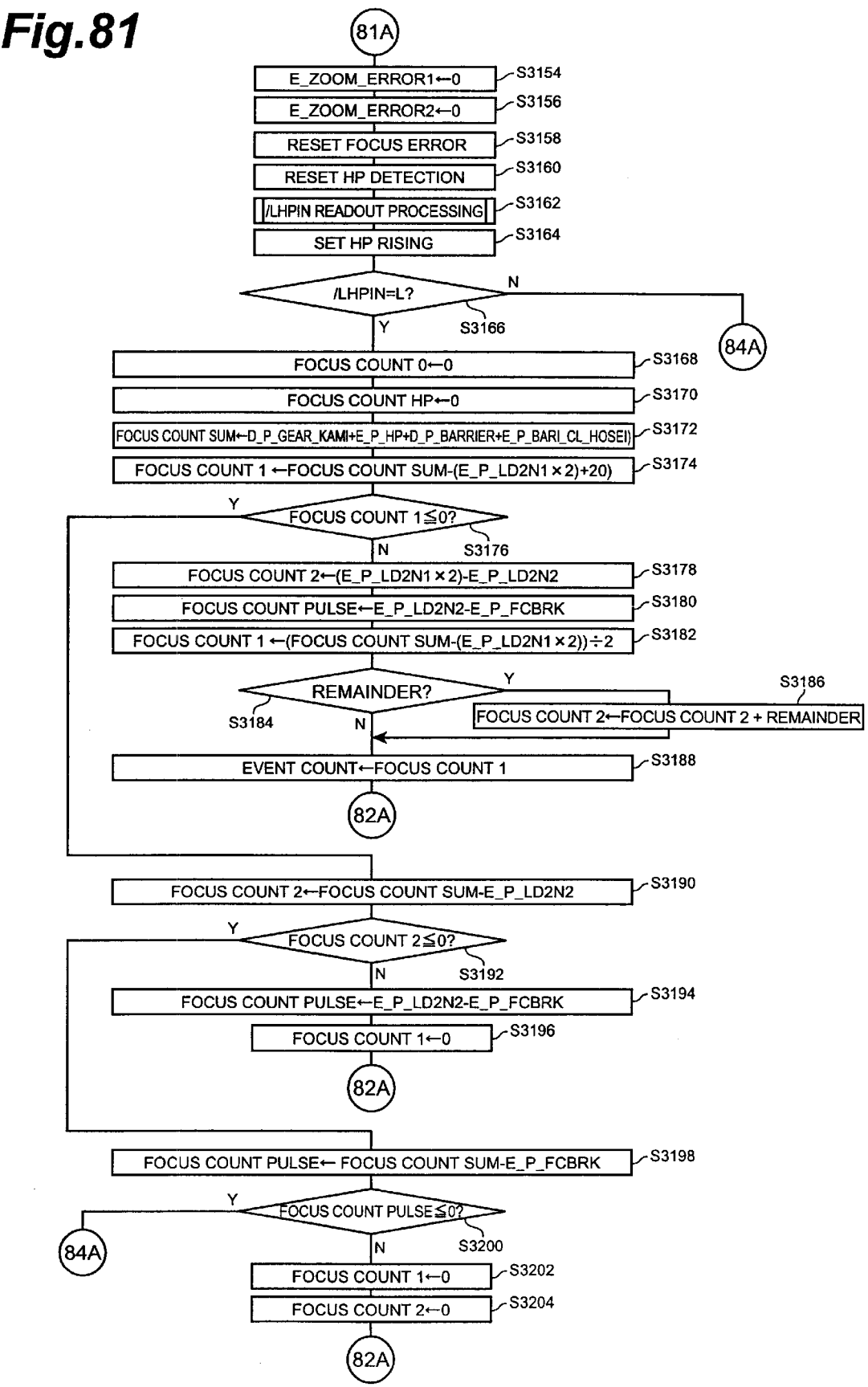
FIG. 81 is a flowchart of the barrier close processing operation of the camera equipped with the lens barrel of FIG. 1.
Figure 82:
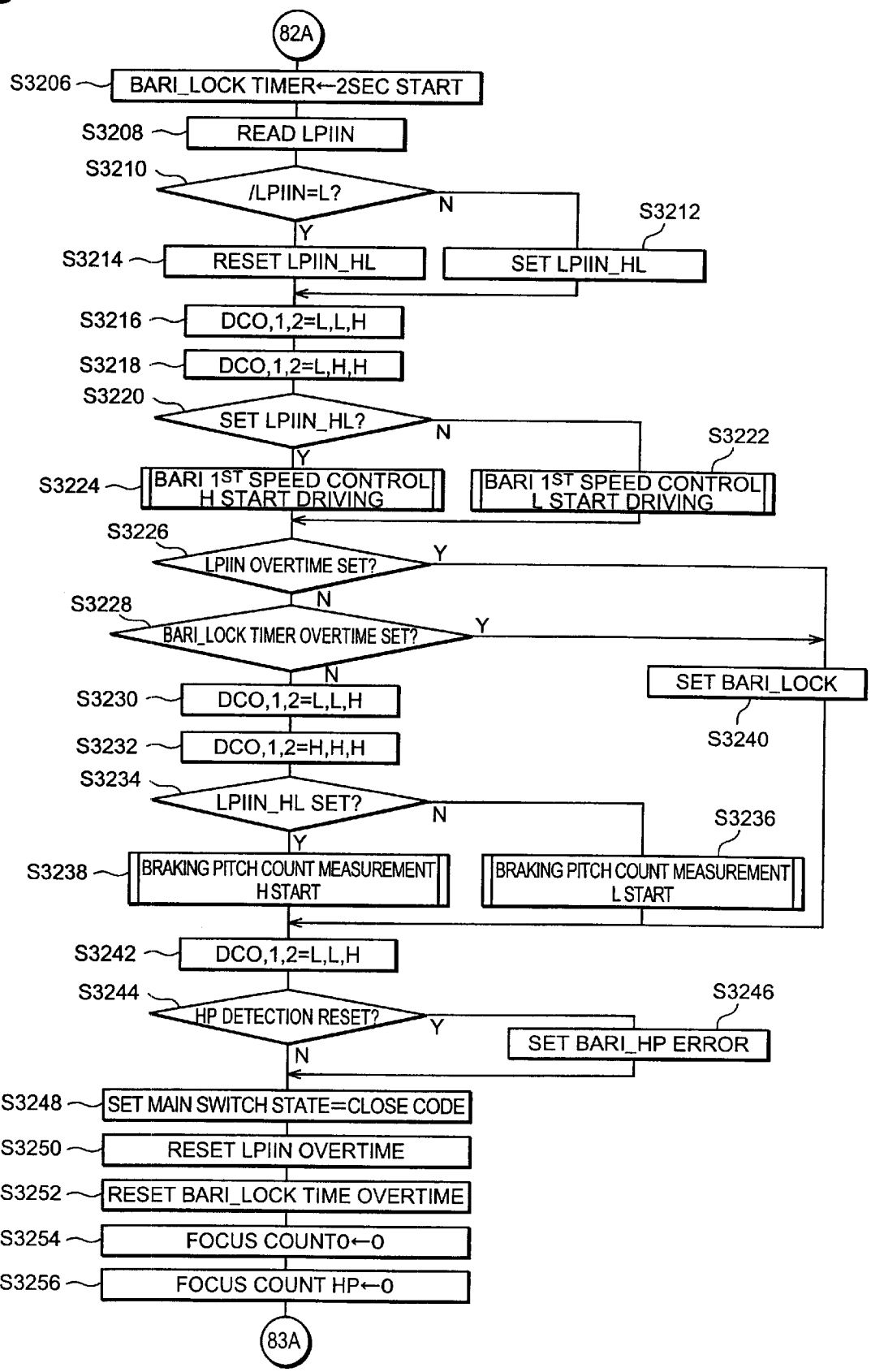
FIG. 82 is a flowchart of the barrier close processing operation of the camera equipped with the lens barrel of FIG. 1.

At S3154 in FIG. 81, lens barrel control error code 1 (E_ZOOM_ERROR1) is reset. Subsequently, lens barrel control error code 2 (E_ZOOM_ERROR2) is reset (S3156), focus error is reset (S3158), and HP (home position) detection is reset (S3160).

Then, a readout processing operation for the terminal LHPIN is carried out (S3162), and the HP rising is set (S3164). Subsequently, it is determined whether the terminal LHPIN is at L or not (S3166). If it is determined that the terminal LHPIN is not at L, then the flow shifts to S3330 in FIG. 84. If it is determined that the terminal LHPIN is at L, by contrast, then the flow shifts to S3168.

At S3168, 0 is set as the focus count 0. Subsequently, 0 is set as the focus count HP (S3170), and the sum of focus reverse rotating gear meshing pitch count data (D_P_GEAR_KAMI), LHPIN rising barrier stopper pitch count data (D_P_BARRIER), and barrier close processing pitch count correction data (E_P_BARI_CL_HOSEI) is set as the focus count SUM (S3172).

Then, doubled focus drive first speed count data (E_P_LD2N1) and 20 pitches are subtracted from the focus count SUM, and thus obtained value is set as the focus count 1 (S3174). Subsequently, it is determined whether the focus count 1 is at most 0 or not (S3176). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S3178).

Subsequently, the value obtained when the focus drive brake pitch count data (E_P_FCBRK) is subtracted from the focus drive second speed count data (E_P_LD2N2) is set as the focus count pulse (S3180). Then, doubled focus drive first speed count data (E_P_LD2N1) is subtracted from the focus count SUM, thus obtained value is divided by 2, and the resulting value is set as the focus count 1 (S3182). Subsequently, it is determined whether there is a remainder or not (S3184). If it is determined that there is a remainder, then the value obtained when the remainder is added to the focus count 2 is set as the focus count 2 (S3186), and the flow shifts to S3188. If it is determined that there is no remainder, by contrast, then the flow directly shifts to S3188, where the focus count 1 is set as the event count. Thereafter, the flow shifts to S3206 in FIG. 82.

If it is determined at S3176 that the focus count 1 is at most 0, then the value obtained when the focus drive second speed count data (E_P_LD2N2) is subtracted from the focus count SUM is set as the focus count 2 (S3190).

Subsequently, it is determined whether the focus count 2 is at most 0 or not (S3192). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S3196). Subsequently, 0 is set as the focus count 1, and the flow shifts to S3206 in FIG. 82.

If it is determined at S3192 that the focus count 2 is at most 0, then the value obtained when the focus drive brake pitch count data (E_P_FCBRK) is subtracted from the focus count SUM is set as the focus count pulse (S3198).

Subsequently, the flow shifts to S3200, where it is determined whether the focus count pulse is at most 0 or not. If it is determined that the focus count pulse is at most 0, then the flow shifts to S3330 in FIG. 84. If it is determined not, by contrast, then 0 is set as the focus count 1 (S3202), and 0 is set as the focus count 2 (S3204). Then, the flow shifts to S3206 in FIG. 82.

At S3206, a time of 2 sec is set as the barrier lock timer. Subsequently, the terminal LPIIN (see FIG. 16) receiving the output of detector 96 is read out (S3208), and it is determined whether the terminal LPIIN is at L or not (S3210). If it is determined that the terminal LPIIN is at L, then the HL flag of the terminal LPIIN is reset (S3214). If it is determined not, by contrast, then the HL flag of the terminal LPIIN is set (S3212).

Subsequently, the flow shifts to S3216, where the outputs of parallel terminals DC0, DC1, and DC2 are set L, L, and H, respectively, so that the motor 95 is placed into the wait state. Then, the outputs of parallel terminals DC0, DC1, and DC2 are set L, H, and H, respectively, so as to carry out normal rotation driving (S3218).

Subsequently, it is determined whether the HL flag of the terminal LPIIN is set or not (S3220). If it is determined that the HL flag of the terminal LPIIN is set, then a barrier (BARI) first speed control H start drive processing operation is carried out (S3224). If it is determined not, by contrast, then a barrier first speed control L start drive processing operation is carried out (S3222). The barrier first speed control H and L start drive processing operations will be explained later in detail.

Thereafter, the flow shifts to S3226, where it is determined whether the LPIIN overtime is set or not. If it is determined that the LPIIN overtime is set, then the flow shifts to S3240, where barrier lock (BARI_LOCK) is set. Subsequently, the flow shifts to S3242. If it is determined not, then it is determined whether the barrier lock timer is overtime or not (S3228). If it is determined that the barrier lock timer is overtime, then the flow shifts to S3240. If it is determined that the barrier lock timer is not overtime, then the flow shifts to S3230.

At S3230, the outputs of parallel terminals DC0, DC1, and DC2 are set L, L, and H, respectively, so that the motor 95 is placed into the wait state. Then, the outputs of parallel terminals DC0, DC1, and DC2 are set H, H, and H, respectively, so as to attain the brake output state (S3232).

Subsequently, it is determined whether the HL flag of the terminal LPIIN is set or not (S3234). If it is determined that the HL flag of the terminal LPIIN is set, then a braking pitch count measurement H start drive processing operation is carried out (S3238). If it is determined that the HL flag of the terminal LPIIN is not set, by contrast, then a braking pitch count measurement L start drive processing operation is carried out (S3236). The braking pitch count measurement L and H start drive processing operations will be explained later in detail.

Subsequently, the flow shifts to S3242, where the outputs of parallel terminals DC0, DC1, and DC2 are set L, L, and H, respectively, so that the motor 95 is placed into the wait state. Then, it is determined whether the HP detection flag is reset or not (S3244). If it is determined that the HP detection flag is reset, then the barrier HP error is set (S3246), and the flow shifts to S3248.

If it is determined at S3244 that the HP detection flag is not reset, then the flow shifts to S3248, where the main switch state is set to the close code. Subsequently, the LPIIN overtime is reset (S3250), the barrier lock timer overtime is reset (S3252), 0 is set as the focus count 0 (S3254), and 0 is set as the focus count HP (S3256).

Figure 83:
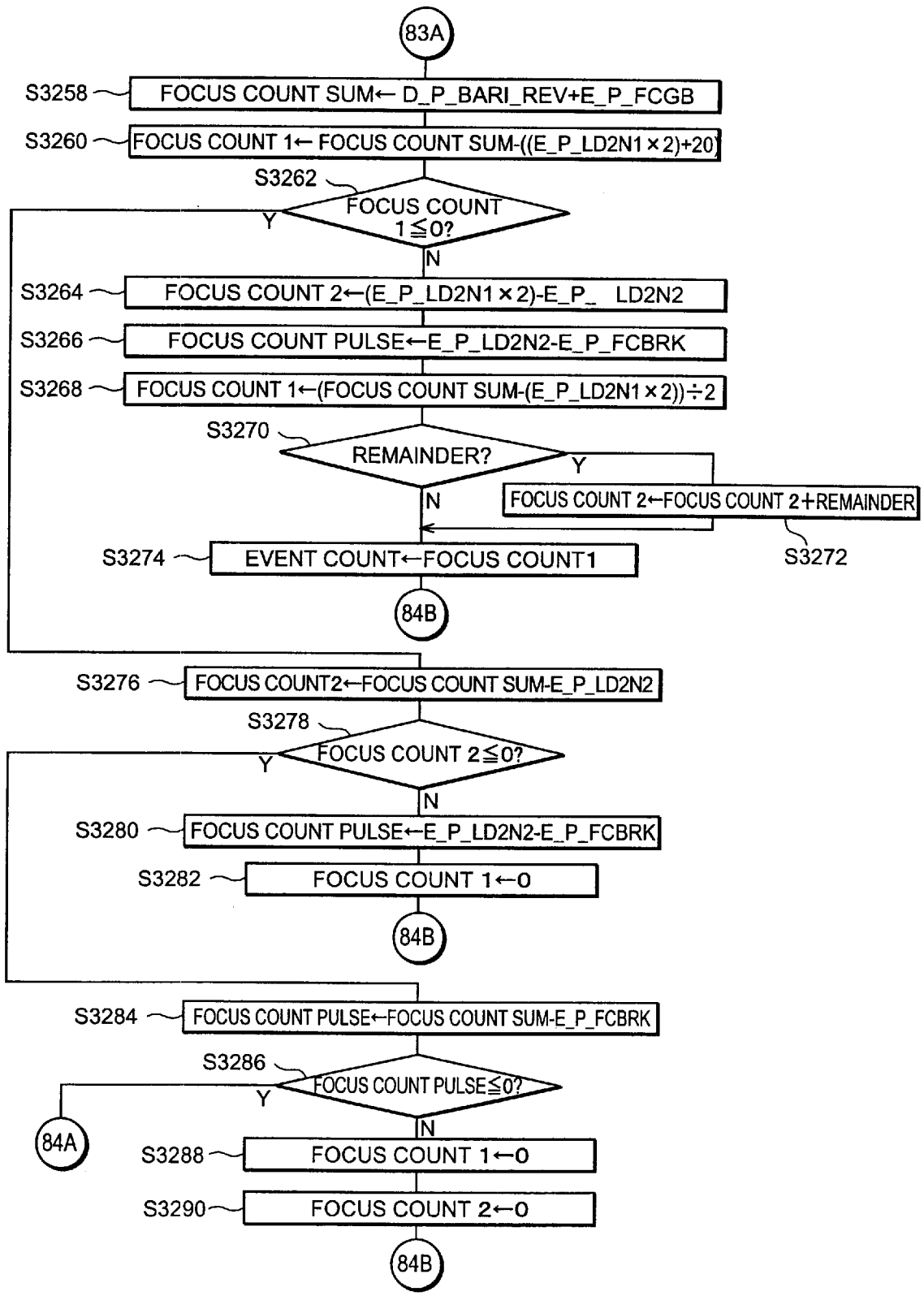
FIG. 83 is a flowchart of the barrier close processing operation of the camera equipped with the lens barrel of FIG. 1.

Then, the flow shifts to S3258 in FIG. 83, where the sum of creep release pitch count data (D_P_BARI_REV) and focus drive brake pitch count data (E_P_FCBRK) is set as the focus count SUM. Subsequently, doubled focus drive first speed count data (E_P_LD2N1) and 20 pitches are subtracted from the focus count SUM, and thus obtained value is set as the focus count 1 (S3260). Thereafter, it is determined whether the focus count 1 is at most 0 or not (S3262). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S3264).

Subsequently, the value obtained when the focus drive brake pitch count data (E_P_FCBRK) is subtracted from the focus drive second speed count data (E_P_LD2N2) is set as the focus count pulse (S3266). Then, doubled focus drive second speed count data (E_P_LD2N2) is subtracted from the focus count SUM, thus obtained value is divided by 2, and the resulting value is set as the focus count 1 (S3268). Thereafter, it is determined whether there is a remainder or not (S3270). If it is determined that there is a remainder, then the value obtained when the remainder is added to the focus count 2 is set as the focus count 2 (S3272), and the flow shifts to S3274. If it is determined that there is no remainder, by contrast, then the flow directly shifts to S3274, where the focus count 1 is set as the event count. Thereafter, the flow shifts to S3292 in FIG. 84.

If it is determined at S3262 that the focus count 1 is at most 0, then the value obtained when the focus drive second speed count data (E_P_LD2N2) is subtracted from the focus count SUM is set as the focus count 2 (S3276).

Subsequently, it is determined whether the focus count 2 is at most 0 or not (S3278). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S3282). Subsequently, 0 is set as the focus count 1, and the flow shifts to S3292 in FIG. 84.

If it is determined at S3278 that the focus count 2 is at most 0, then the value obtained when the focus drive brake pitch count data (E_P_FCBRK) is subtracted from the focus count SUM is set as the focus count pulse (S3284).

Subsequently, the flow shifts to S3286, where it is determined whether the focus count pulse is at most 0 or not. If it is determined that the focus count pulse is at most 0, then the flow shifts to S3330 in FIG. 84. If it is determined not, by contrast, then 0 is set as the focus count 1 (S3288), and 0 is set as the focus count 2 (S3290). Thereafter, the flow shifts to S3292 in FIG. 84.

At S3292 in FIG. 84, a time of 2 sec is set as the barrier lock timer. Subsequently, the terminal LPIIN (see FIG. 16) receiving the output of detector 96 is read out (S3294), and it is determined whether the terminal LPIIN is at L or not (S3296). If it is determined that the terminal LPIIN is at L, then the HL flag of the terminal LPIIN is reset (S3300). If it is determined not, by contrast, then the HL flag of the terminal LPIIN is set (S3298).

Subsequently, the flow shifts to S3302, where the outputs of parallel terminals DC0, DC1, and DC2 are set L, L, and H, respectively, so that the motor 95 is placed into the wait state. Then, the outputs of parallel terminals DC0, DC1, and DC2 are set L, H, and H, respectively, so as to carry out normal rotation driving (S3304).

Subsequently, it is determined whether the HL flag of the terminal LPIIN is set or not (S3306). If it is determined that the HL flag of the terminal LPIIN is set, then a barrier first speed control H start drive processing operation is carried out (S3310). If it is determined not, by contrast, then a barrier first speed control L start drive processing operation is carried out (S3308). The barrier first speed control H and L start drive processing operations will be explained later in detail.

Thereafter, the flow shifts to S3312, where it is determined whether the LPIIN overtime is set or not. If it is determined that the LPIIN overtime is set, then the LPIIN overtime is reset (S3326), the barrier creep (BARI_CREEP) error is set (S3328), and the flow shifts to S3336. If it is determined at S3312 that the LPIIN overtime is not set, by contrast, then it is determined whether the barrier lock timer is overtime or not (S3314). If it is determined that the barrier lock timer is overtime, then the flow shifts to S3326. If it is determined that the barrier lock timer is not overtime, by contrast, then the flow shifts to S3316.

At S3316, the outputs of parallel terminals DC0, DC1, and DC2 are set L, L, and H, respectively, so that the motor 95 is placed into the wait state. Then, the outputs of parallel terminals DC0, DC1, and DC2 are set H, H, and H, respectively, so as to attain the brake output state (S3318).

Subsequently, it is determined whether the HL flag of the terminal LPIIN is set or not (S3320). If it is determined that the HL flag of the terminal LPIIN is set, then a braking pitch count measurement H start drive processing operation is carried out (S3324). If it is determined that the HL flag of the terminal LPIIN is not set, then a braking pitch count measurement L start drive processing operation is carried out (S3322). The braking pitch count measurement L and H start drive processing operations will be explained later in detail.

At S3330, the focus error is set. Subsequently, the lens barrel error is set (S3332), and the recovery inhibition is set (S3334). Subsequently, the flow shifts to S3336.

At S3336, the outputs of parallel terminals DC0, DC1, and DC2 are set L, L, and H, respectively, so that the motor 95 is placed into the wait state. Then, the outputs of parallel terminals DC0, DC1, and DC2 are set L, L, and L, respectively, so as to keep the motor 95 in the wait state (S3338). Subsequently, the terminal LHPIN is set as the output port (S3340) and, after a wait of 2 ms (S3342), the focus power is reset (S3344). Then, the driver ON/OFF terminal CE is set L, so as to place the driver section 219 into the inactive state (S3346), the operation mode of CPU 200 is set to the medium speed mode (S3348), and a focus error EEPROM writing processing operation is carried out (S3350). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the barrier close processing operation is terminated.

As in the foregoing, the speed of the first speed control operation is set lower (S3088 and S3090) in the barrier close processing operation when reverse rotation driving from the TELE wait position toward the stopper (movement from right to left in FIG. 77) is carried out as shown in FIG. 77. Therefore, when the gears 141, 143 (see FIG. 10) are in mesh during the first speed control operation, the sound generated upon meshing can be lowered.

When the focus (second lens group 102) is driven to rotate normally so as to close the barrier, the barrier lock timer (BARI_LOCK timer: 2 seconds) is started, and the focus drive processing operation is terminated if the barrier lock timer is overtime. Therefore, even when there are HIGH and LOW inputs into the terminal LPIIN due to minute vibrations upon normal and reverse rotations in the case where the barrier driving ring 81 abuts against the barrier stopper formed at the leading end part of the third cylinder 6, the processing operation can be terminated reliably.

In the barrier close processing operation, after the barrier is closed by driving the focus to rotate normally, the focus is moved away from the barrier (stopper 6b; see FIG. 9) in order to release the creep as shown in FIGS. 76 and 77. Consequently, the barrier driving ring 81 abutting against the stopper 6b can securely be prevented from being damaged by creeping when pressed by the barrier stopper for a long period of time.

When the terminal LHPIN is at L (S3148) after the focus is driven to rotate in reverse, the focus is driven again to rotate in reverse. Consequently, even in the case where chattering is generated in the output of the terminal LHPIN when passing the HP from the TELE wait position as shown in FIG. 77, for example, the focus can securely be moved toward the stopper. Also, it is not necessary to use a Schmitt circuit having a hysteresis as the output detection circuit for the terminal LHPIN, whereby the output detection circuit can be made inexpensive.

When the second lens group 102 (focus) is driven from the WIDE wait position to rotate in reverse, the pulse drive control at a lower speed is carried out as shown in FIG. 76 after the HP (home position) serving as a reference position is detected. Consequently, the second lens group 102 can be prevented from colliding with the stopper due to its impetus upon movement, whereby gears can be kept from meshing with each other upon the collision and failing to rotate in reverse, which might have become a severe failure, for example.

Though the barrier driving ring 81 is moved away from the stopper 6b after being brought into contact therewith in the above-mentioned barrier processing operation, the camera in accordance with the present invention is not limited thereto, and may prevent creeping damages from occurring when moving movable members other than the barrier driving ring 81. For example, after the lens barrel is brought into contact with the stopper to stop in the course of expanding or collapsing the lens barrel, the lens barrel may be moved in reverse so as to go away from the stopper. In this case, the lens barrel can securely be prevented from being damaged by creeping when pressed by the barrier stopper for a long period of time.

Individual barrier closing focus drive processing operations in the barrier close processing operation will now be explained.

Figure 85:
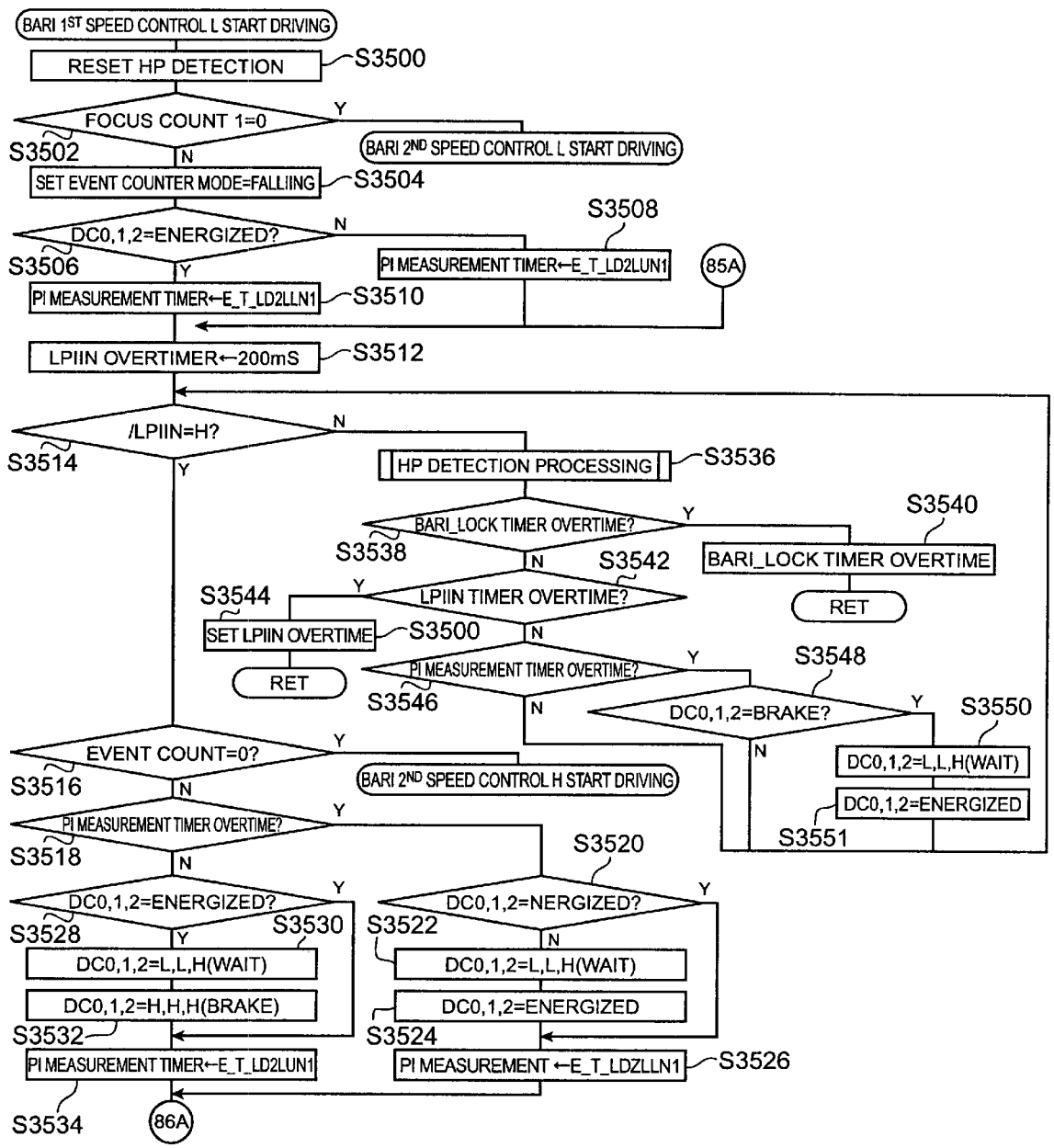
FIG. 85 is a flowchart of a barrier closing focus drive processing operation of the camera equipped with the lens barrel of FIG. 1.

The barrier first speed control L start drive processing operation shown in FIG. 85 is the operation carried out at S3310 in FIG. 84 in the barrier close processing operation. In the barrier first speed control L start drive processing operation, as shown at S3500 in FIG. 85, HP detection is reset. Subsequently, it is determined whether 0 is set as the focus count 1 or not (S3502). If it is determined that 0 is set as the focus count 1, then the flow shifts to the barrier second speed control L start drive processing operation shown in FIG. 87. If it is determined that 0 is not set as the focus count 1, then falling is set as the event counter mode (S3504).

Subsequently, it is determined whether the parallel terminals DC0, DC1, and DC2 are in their energized state or not (S3506). If it is determined not, then focus drive first speed upper limit pulse time (E_T_LD2LUN1) is set as the PI measurement timer (S3508). If it is determined that the parallel terminals DC0, DC1, and DC2 are in their energized state, by contrast, then focus drive first speed lower limit pulse time (E_T_LD2LLN1) is set as the PI measurement timer (S3510).

Subsequently, a time of 200 ms is set as the LPIIN overtime (S3512), and it is determined whether the terminal LPIIN is at H or not (S3514). If it is determined that the terminal LPIIN is at H, then it is determined whether 0 is set as the event count or not (S3516). If it is determined that 0 is set as the event count, then the flow shifts to the barrier second speed control H start drive processing operation in FIG. 88.

If it is determined that 0 is not set as the event count, by contrast, then it is determined whether the PI measurement timer is overtime or not (S3518). If it is determined that the PI measurement timer is overtime, then it is determined whether the parallel terminals DC0, DC1, and DC2 are in their energized state or not (S3520). If it is determined that the parallel terminals DC0, DC1, and DC2 are in their energized state, then the flow shifts to S3526. If it is determined that the parallel terminals DC0, DC1, and DC2 are not in their energized state, by contrast, then the outputs of parallel terminals DC0, DC1, and DC2 are set L, L, and H, respectively, so that the motor 95 is placed into the wait state (S3522).

Subsequently, the parallel terminals DC0, DC1, and DC2 are placed into their energized state (S3524). Then, the flow shifts to S3526, where the focus drive first speed lower limit pulse time (E_T_LD2LLN1) is set as the PI measurement timer, and the flow shifts to S3564 in FIG. 86.

If it is determined at S3518 that the PI measurement timer is not overtime, then it is determined whether the parallel terminals DC0, DC1, and DC2 are in their energized state or not (S3528). If it is determined that the parallel terminals DC0, DC1, and DC2 are not in their energized state, then the flow shifts to S3534. If it is determined that the parallel terminals DC0, DC1, and DC2 are in their energized state, by contrast, then the outputs of parallel terminals DC0, DC1, and DC2 are set L, L, and H, respectively, so that the motor 95 is placed into the wait state (S3530).

Subsequently, the outputs of parallel terminals DC0, DC1, and DC2 are set H, H, and H, respectively, so as to attain the brake output state (S3532). Then, the flow shifts to S3534, where the focus drive first speed upper limit pulse time (E_T_LD2LUN1) is set as the PI measurement timer, and the flow shifts to S3564 in FIG. 86.

If it is determined at S3514 that the terminal LPIIN is not at H, then the flow shifts to S3536, where an HP detection processing operation is carried out. Subsequently, it is determined whether the barrier lock timer is overtime or not (S3538). If it is determined that the barrier lock timer is overtime, then the barrier lock overtime is set (S3540), and the processing operation is terminated.

If it is determined that the barrier lock timer is not overtime, then it is determined whether the LPIIN timer is overtime or not (S3542). If it is determined that the LPIIN timer is overtime, then the LPIIN overtime is set (S3544), and the processing operation is terminated. If it is determined that the LPIIN timer is not overtime, then it is determined whether the PI measurement timer is overtime or not (S3546).

If it is determined at S3546 that the PI measurement timer is not overtime, then the flow returns to S3514. If it is determined that the PI measurement timer is overtime, by contrast, then it is determined whether the outputs of parallel terminals DC0, DC1, and DC2 are set H, H, and H, respectively, so as to attain the brake output state or not (S3548). If it is determined that the brake output state is not attained, then the flow returns to S3514.

If it is determined that the brake output state is attained, then the outputs of parallel terminals DC0, DC1, and DC2 are set L, L, and H, respectively, so that the motor 95 is placed into the wait state (S3550), and the parallel terminals DC0, DC1, and DC2 are set to their energized state (S3551). Subsequently, the flow returns to S3514.

Figure 86:
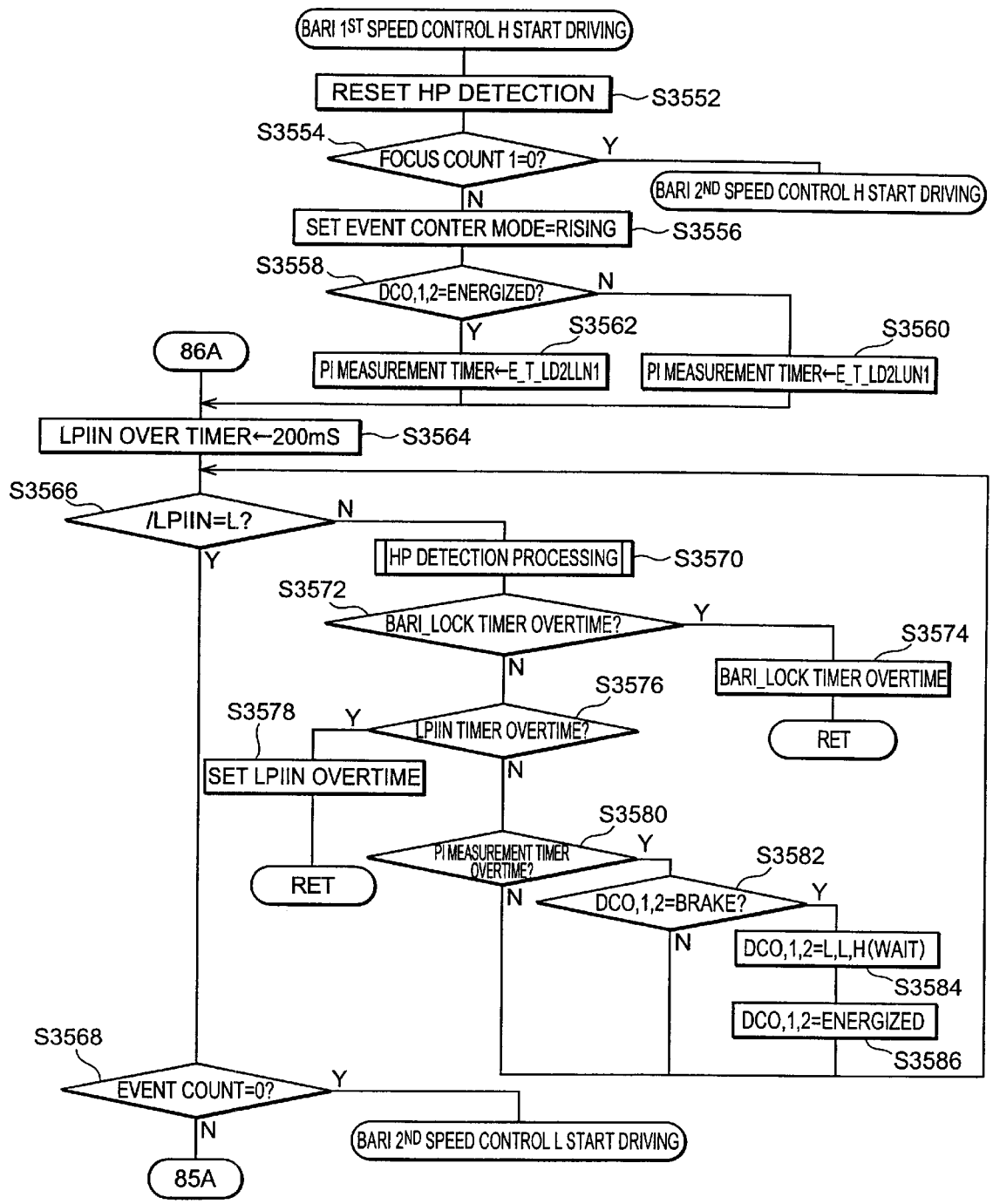
FIG. 86 is a flowchart of the barrier closing focus drive processing operation of the camera equipped with the lens barrel of FIG. 1.

FIG. 86 shows a flowchart of the barrier first speed control H start drive processing operation.

The barrier first speed control H start drive processing is the operation carried out at S3308 in FIG. 84 in the barrier close processing operation. In the barrier first speed control H start drive processing operation, as shown at S3552 in FIG. 86, HP detection is reset. Subsequently, it is determined whether 0 is set as the focus count 1 or not (S3554). If it is determined that 0 is set as the focus count 1, then the flow shifts to the barrier second speed control H start drive processing operation shown in FIG. 88. If it is determined that 0 is not set as the focus count 1, then rising is set as the event counter mode (S3556).

Subsequently, it is determined whether the parallel terminals DC0, DC1, and DC2 are in their energized state or not (S3558). If it is determined not, then focus drive first speed upper limit pulse time (E_T_LD2LUN1) is set as the PI measurement timer (S3560). If it is determined that the parallel terminals DC0, DC1, and DC2 are in their energized state, by contrast, then focus drive first speed lower limit pulse time (E_T_LD2LLN1) is set as the PI measurement timer (S3562).

Subsequently, the flow shifts to S3564, where a time of 200 ms is set as the LPIIN overtime. Thereafter, it is determined whether the terminal LPIIN is at L or not (S3566). If it is determined that the terminal LPIIN is at L, then it is determined whether 0 is set as the event count or not (S3568). If it is determined that 0 is set as the event count, then the flow shifts to the barrier second speed control L start drive processing operation in FIG. 87. If it is determined that 0 is not set as the event count, by contrast, then the flow shifts to S3512 in FIG. 85.

If it is determined at S3566 that the terminal LPIIN is not at L, then the flow shifts to S3570, where an HP detection processing operation is carried out. Subsequently, it is determined whether the barrier lock timer is overtime or not (S3572). If it is determined that the barrier lock timer is overtime, then the barrier lock overtime is set (S3574), and the processing operation is terminated.

If it is determined that the barrier lock timer is not overtime, then it is determined whether the LPIIN timer is overtime or not (S3576). If it is determined that the LPIIN timer is overtime, then the LPIIN overtime is set (S3578), and the processing operation is terminated. If it is determined that the LPIIN timer is not overtime, then it is determined whether the PI measurement timer is overtime or not (S3580).

If it is determined at S3580 that the PI measurement timer is not overtime, then the flow returns to S3566. If it is determined that the PI measurement timer is overtime, by contrast, then it is determined whether the outputs of parallel terminals DC0, DC1, and DC2 are set H, H, and H, respectively, so as to attain the brake output state or not (S3582). If it is determined that the brake output state is not attained, then the flow returns to S3566.

If it is determined that the brake output state is attained, then the outputs of parallel terminals DC0, DC1, and DC2 are set L, L, and H, respectively, so that the motor 95 is placed into the wait state (S3584), and the parallel terminals DC0, DC1, and DC2 are set to their energized state (S3586). Subsequently, the flow returns to S3566.

Figure 87:
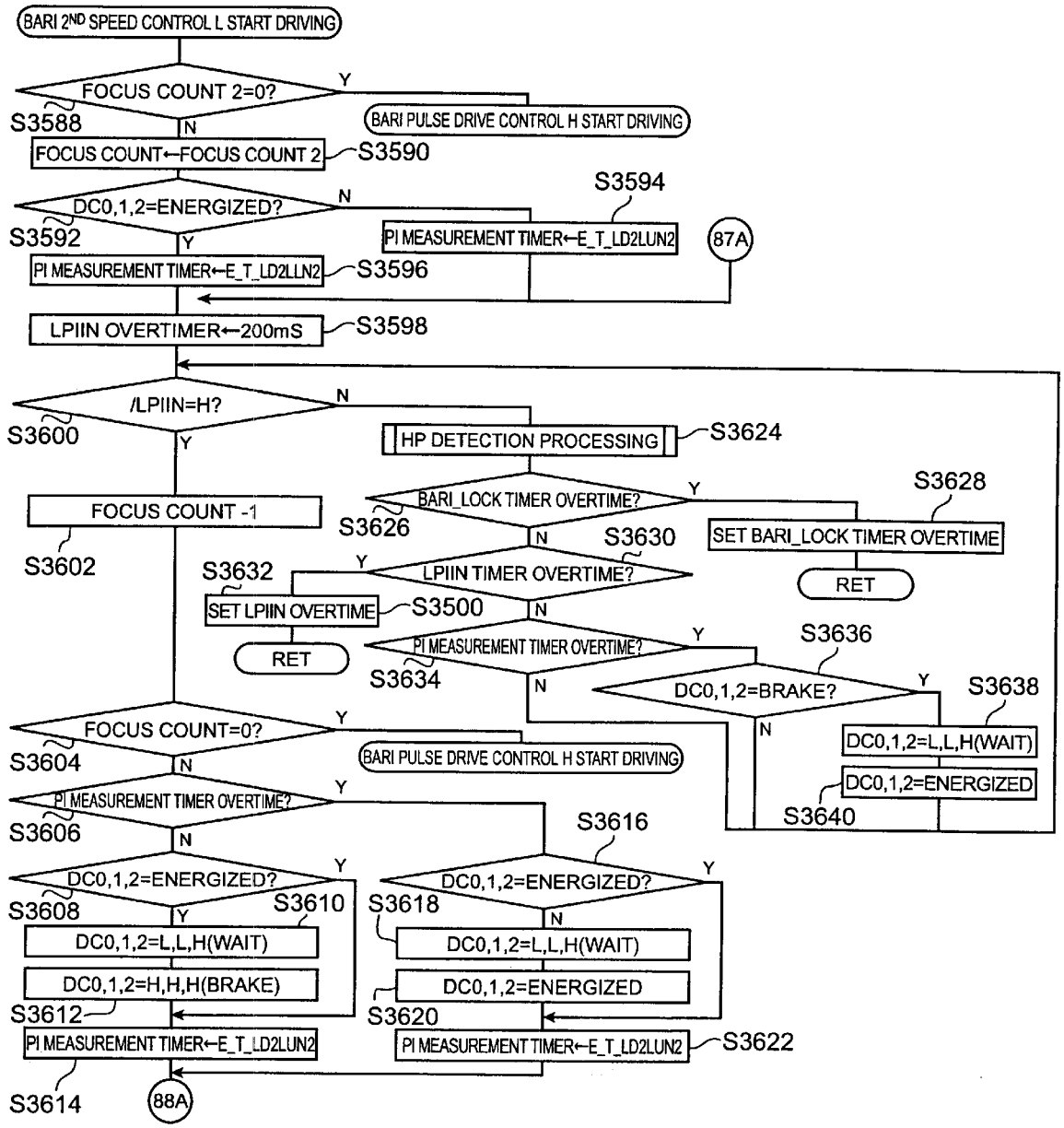
FIG. 87 is a flowchart of the barrier closing focus drive processing operation of the camera equipped with the lens barrel of FIG. 1.

FIG. 87 shows a flowchart of the barrier second speed control L start drive processing operation.

In the barrier second speed control L start drive processing operation, as shown at S3588 in FIG. 87, it is determined whether 0 is set as the focus count 2 or not. If it is determined that 0 is set as the focus count 2, then the flow shifts to the barrier pulse drive control L start drive processing operation in FIG. 89. If it is determined not, by contrast, then the focus count 2 is set as the focus count (S3590).

Subsequently, it is determined whether the parallel terminals DC0, DC1, and DC2 are in their energized state or not (S3592). If it is determined not, then focus drive second speed upper limit pulse time (E_T_LD2LUN2) is set as the PI measurement timer (S3594). If it is determined that the parallel terminals DC0, DC1, and DC2 are in their energized state, by contrast, then focus drive second speed lower limit pulse time (E_T_LD2LLN2) is set as the PI measurement timer (S3596).

Subsequently, a time of 200 ms is set as the LPIIN overtime (S3598), and it is determined whether the terminal LPIIN is at H or not (S3600). If it is determined that the terminal LPIIN is at H, then 1 is subtracted from the focus count (S3602), and it is determined whether 0 is set as the focus count or not (S3604). If it is determined that 0 is set as the focus count, then the flow shifts to the barrier pulse drive control H start drive processing operation in FIG. 90.

If it is determined that 0 is not set as the focus count, by contrast, then it is determined whether the PI measurement timer is overtime or not (S3606). If it is determined that the PI measurement timer is overtime, then it is determined whether the parallel terminals DC0, DC1, and DC2 are in their energized state or not (S3616). If it is determined that the parallel terminals DC0, DC1, and DC2 are in their energized state, then the flow shifts to S3622. If it is determined that the parallel terminals DC0, DC1, and DC2 are not in their energized state, by contrast, then the outputs of parallel terminals DC0, DC1, and DC2 are set L, L, and H, respectively, so that the motor 95 is placed into the wait state (S3618).

Subsequently, the parallel terminals DC0, DC1, and DC2 are placed into their energized state (S3620). Then, the flow shifts to S3622, where the focus drive second speed lower limit pulse time (E_T_LD2LLN2) is set as the PI measurement timer, and the flow shifts to S3652 in FIG. 88.

If it is determined at S3606 that the PI measurement timer is not overtime, then it is determined whether the parallel terminals DC0, DC1, and DC2 are in their energized state or not (S3608). If it is determined that the parallel terminals DC0, DC1, and DC2 are not in their energized state, then the flow shifts to S3614. If it is determined that the parallel terminals DC0, DC1, and DC2 are in their energized state, by contrast, then the outputs of parallel terminals DC0, DC1, and DC2 are set L, L, and H, respectively, so that the motor 95 is placed into the wait state (S3610).

Subsequently, the outputs of parallel terminals DC0, DC1, and DC2 are set H, H, and H, respectively, so as to attain the brake output state (S3612). Then, the flow shifts to S3614, where the focus drive second speed upper limit pulse time (E_T_LD2LUN2) is set as the PI measurement timer, and the flow shifts to S3652 in FIG. 88.

If it is determined at S3600 that the terminal LPIIN is not at H, then the flow shifts to S3624, where an HP detection processing operation is carried out. Subsequently, it is determined whether the barrier lock timer is overtime or not (S3626). If it is determined that the barrier lock timer is overtime, then the barrier lock overtime is set (S3628), and the processing operation is terminated.

If it is determined that the barrier lock timer is not overtime, by contrast, then it is determined whether the LPIIN timer is overtime or not (S3630). If it is determined that the LPIIN timer is overtime, then the LPIIN overtime is set (S3632), and the processing operation is terminated. If it is determined that the LPIIN timer is not overtime, then it is determined whether the PI measurement timer is overtime or not (S3634).

If it is determined at S3634 that the PI measurement timer is not overtime, then the flow returns to S3600. If it is determined that the PI measurement timer is overtime, by contrast, then it is determined whether the outputs of parallel terminals DC0, DC1, and DC2 are set H, H, and H, respectively, so as to attain the brake output state or not (S3636). If it is determined that the brake output state is not attained, then the flow returns to S3600.

If it is determined that the brake output state is attained, then the outputs of parallel terminals DC0, DC1, and DC2 are set L, L, and H, respectively, so that the motor 95 is placed into the wait state (S3638), and the parallel terminals DC0, DC1, and DC2 are set to their energized state (S3640). Subsequently, the flow returns to S3600.

Figure 88:
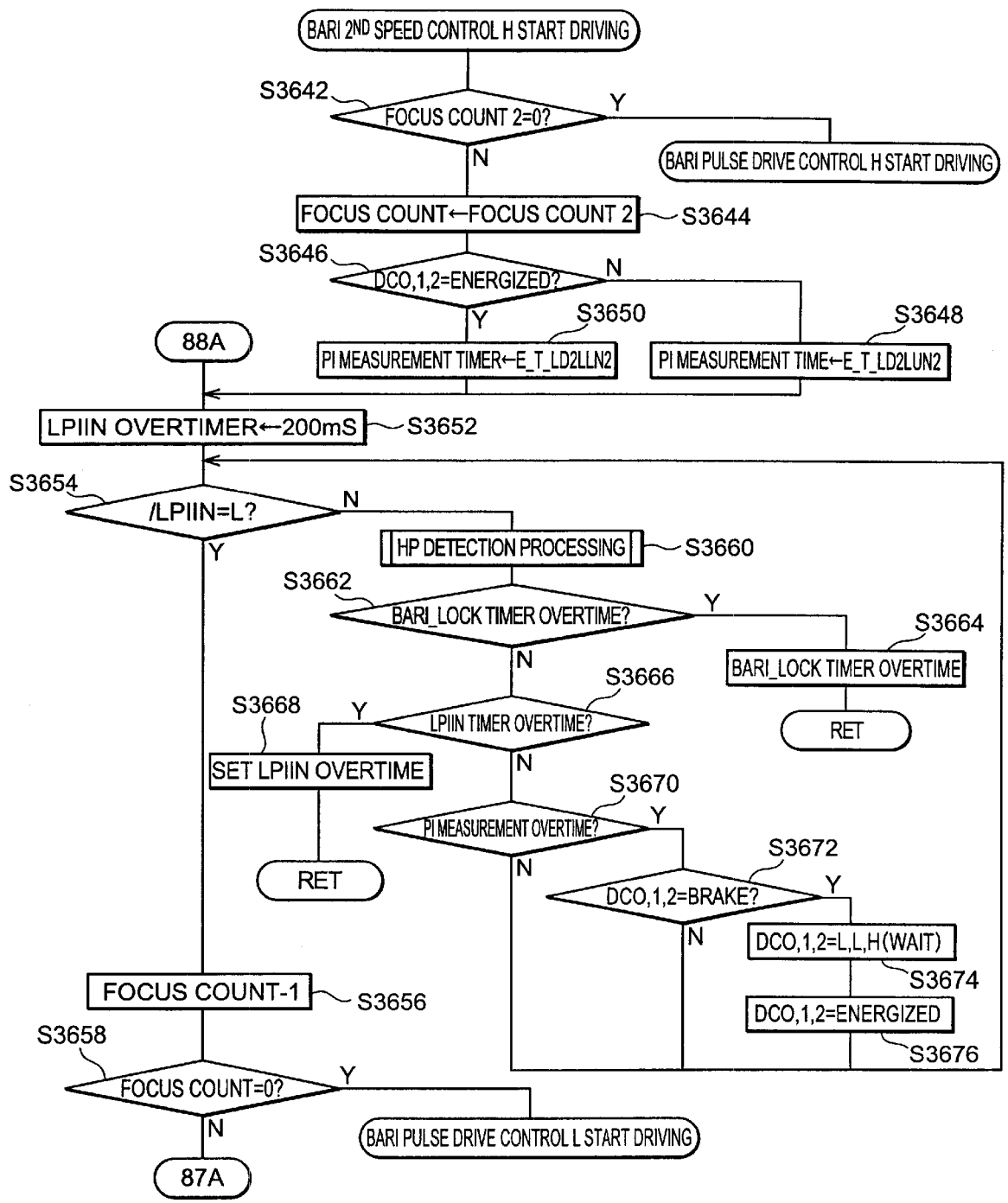
FIG. 88 is a flowchart of the barrier closing focus drive processing operation of the camera equipped with the lens barrel of FIG. 1.

FIG. 88 shows a flowchart of the barrier second speed control H start drive processing operation.

In the barrier second control H start drive processing operation, as shown at S3642 in FIG. 88, it is initially determined whether 0 is set as the focus count 2 or not. If it is determined that 0 is set as the focus count 2, then the flow shifts to the barrier pulse speed control H start drive processing operation shown in FIG. 90. If it is determined that 0 is not set as the focus count 2, by contrast, then the focus count 2 is set as the focus count (S3644).

Subsequently, it is determined whether the parallel terminals DC0, DC1, and DC2 are in their energized state or not (S3646). If it is determined not, then the focus drive second speed upper limit pulse time (E_T_LD2LUN2) is set as the PI measurement timer (S3648). If it is determined that the parallel terminals DC0, DC1, and DC2 are in their energized state, by contrast, then the focus drive second speed lower limit pulse time (E_T_LD2LLN2) is set as the PI measurement timer (S3650).

Subsequently, the flow shifts to S3652, where a time of 200 ms is set as the LPIIN overtime. Then, it is determined whether the terminal LPIIN is at L or not (S3654). If it is determined that the terminal LPIIN is at L, then 1 is subtracted from the focus count (S3656), and it is determined whether 0 is set as the event count or not (S3658). If it is determined that 0 is set as the event count, then the flow shifts to the barrier pulse drive control L start drive processing operation in FIG. 89. If it is determined that 0 is not set as the event count, by contrast, then the flow shifts to S3598 in FIG. 87.

If it is determined at S3654 that the terminal LPIIN is not at L, then the flow shifts to S3660, where an HP detection processing operation is carried out. Subsequently, it is determined whether the barrier lock timer is overtime or not (S3662). If it is determined that the barrier lock timer is overtime, then the barrier lock overtime is set (S3664), and the processing operation is terminated.

If it is determined that the barrier lock timer is not overtime, then it is determined whether the LPIIN timer is overtime or not (S3666). If it is determined that the LPIIN timer is overtime, then the LPIIN overtime is set (S3668), and the processing operation is terminated. If it is determined that the LPIIN timer is not overtime, then it is determined whether the PI measurement timer is overtime or not (S3670).

If it is determined at S3670 that the PI measurement timer is not overtime, then the flow returns to S3654. If it is determined that the PI measurement timer is overtime, by contrast, then it is determined whether the outputs of parallel terminals DC0, DC1, and DC2 are set H, H, and H, respectively, so as to attain the brake output state or not (S3672). If it is determined that the brake output state is not attained, then the flow returns to S3654.

If it is determined that the brake output state is attained, then the outputs of parallel terminals DC0, DC1, and DC2 are set L, L, and H, respectively, so that the motor 95 is placed into the wait state (S3674), and the parallel terminals DC0, DC1, and DC2 are set to their energized state (S3676). Subsequently, the flow returns to S3654.

Figure 89:
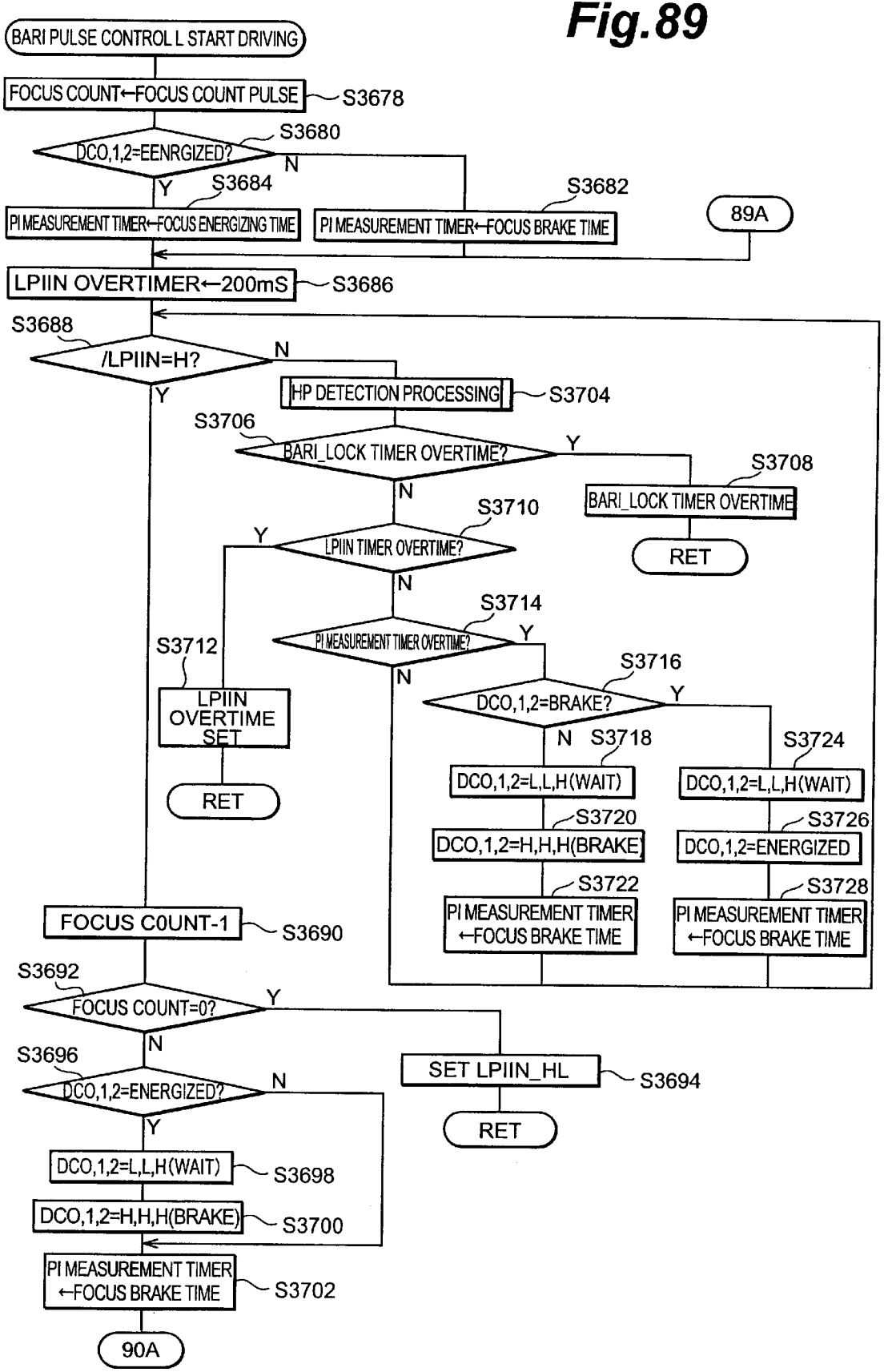
FIG. 89 is a flowchart of the barrier closing focus drive processing operation of the camera equipped with the lens barrel of FIG. 1.

FIG. 89 shows a flowchart of the barrier pulse drive control L start drive processing operation.

In the barrier pulse drive control L start drive processing operation, as shown at S3678 in FIG. 89, focus count pulse is set as the focus count. Subsequently, it is determined whether the parallel terminals DC0, DC1, and DC2 are in their energized state or not (S3680). If it is determined not, then focus brake time (E_T_BARIBRAKE) is set as the PI measurement timer (S3682). If it is determined that the parallel terminals DC0, DC1, and DC2 are in their energized state, by contrast, then the focus drive energizing time (E_T_BARIMON) is set as the PI measurement timer (S3684).

Subsequently, a time of 200 ms is set as the LPIIN overtime (S3686), and it is determined whether the terminal LPIIN is at H or not (S3688). If it is determined that the terminal LPIIN is at H, then 1 is subtracted from the focus count (S3690), and it is determined whether 0 is set as the focus count or not (S3692). If it is determined that 0 is set as the focus count, then the HL flag of LPIIN is set (S3694), and the processing operation is terminated.

If it is determined that 0 is not set as the focus count, by contrast, then it is determined whether the parallel terminals DC0, DC1, and DC2 are in their energized state or not (S3696). If it is determined that the parallel terminals DC0, DC1, and DC2 are in their energized state, then the flow shifts to S3702. If it is determined that the parallel terminals DC0, DC1, and DC2 are not in their energized state, by contrast, then the outputs of parallel terminals DC0, DC1, and DC2 are set L, L, and H, respectively, so that the motor 95 is placed into the wait state (S3698).

Subsequently, the outputs of parallel terminals DC0, DC1, and DC2 are set H, H, and H, respectively, so as to attain the brake output state (S3700). Then, the flow shifts to S3702, where the focus brake time (E_T_BARIBRAKE) is set as the PI measurement timer, and further to S3738 in FIG. 90.

If it is determined at S3688 that the terminal LPIIN is not at H, then the flow shifts to S3704, where an HP detection processing operation is carried out. Subsequently, it is determined whether the barrier lock timer is overtime or not (S3706). If it is determined that the barrier lock timer is overtime, then the barrier lock overtime is set (S3708), and the processing operation is terminated.

If it is determined that the barrier lock timer is not overtime, then it is determined whether the LPIIN timer is overtime or not (S3710). If it is determined that the LPIIN timer is overtime, then the LPIIN overtime is set (S3712), and the processing operation is terminated. If it is determined that the LPIIN timer is not overtime, then it is determined whether the PI measurement timer is overtime or not (S3714).

If it is determined at S3714 that the PI measurement timer is not overtime, then the flow returns to S3688. If it is determined that the PI measurement timer is overtime, by contrast, then it is determined whether the outputs of parallel terminals DC0, DC1, and DC2 are set H, H, and H, respectively, so as to attain the brake output state or not (S3716).

If it is determined at S3716 that the brake output state is not attained, then the outputs of parallel terminals DC0, DC1, and DC2 are set L, L, and H, respectively, so that the motor 95 is placed into the wait state (S3718). Subsequently, the outputs of parallel terminals DC0, DC1, and DC2 are set H, H, and H, respectively, so as to attain the brake output state (S3720), and the focus brake time (E_T_BARIBRAKE) is set as the PI measurement timer (S3722). Then, the flow returns to S3688.

If it is determined at S3716 that the brake output state is attained, then the outputs of parallel terminals DC0, DC1, and DC2 are set L, L, and H, respectively, so that the motor 95 is placed into the wait state (S3724), and the parallel terminals DC0, DC1, and DC2 are set to their energized state (S3726). Subsequently, the focus drive energizing time (E_T_BARIMON) is set as the PI measurement timer (S3728). Thereafter, the flow returns to S3688.

Figure 90:
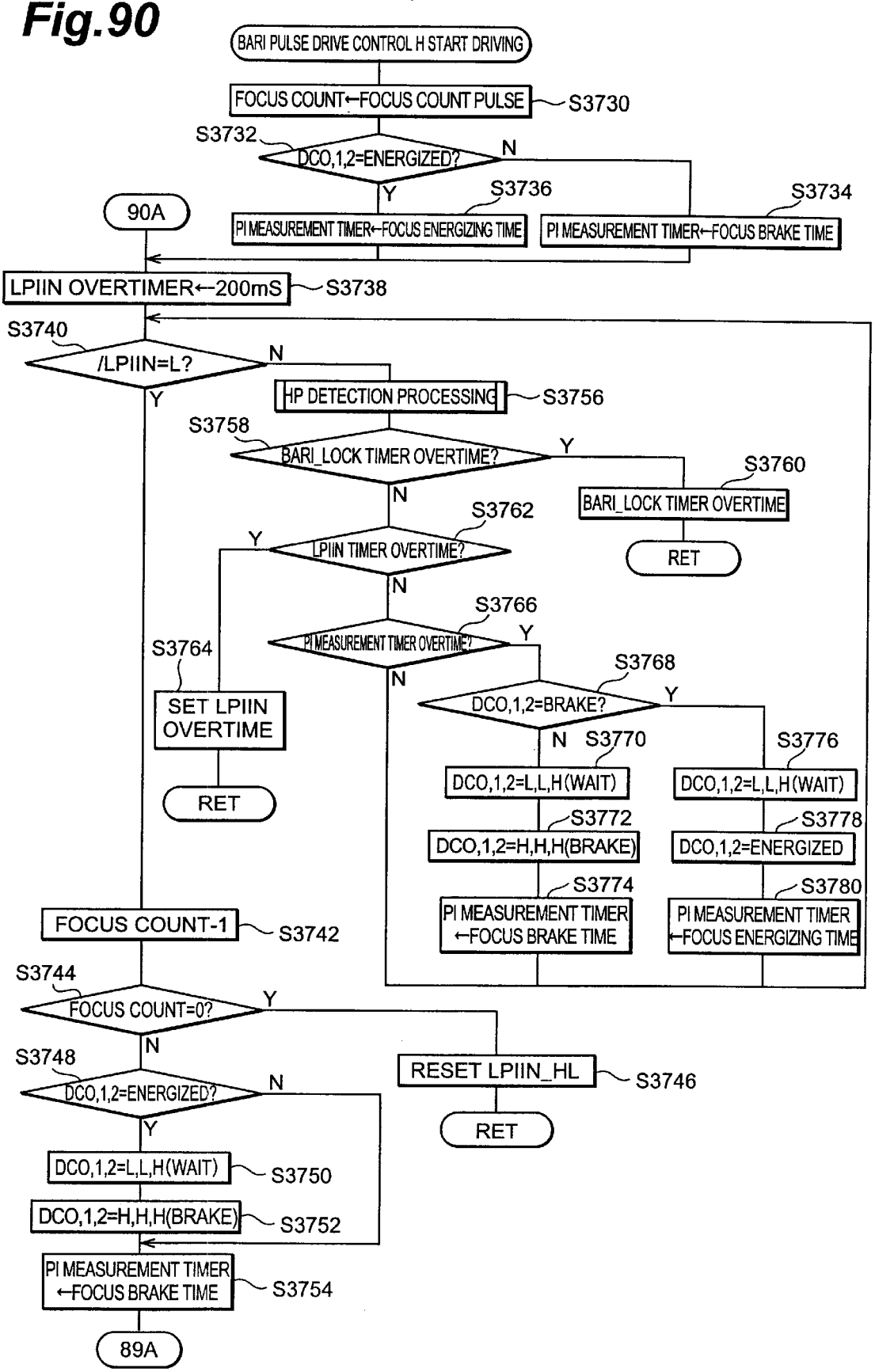
FIG. 90 is a flowchart of the barrier closing focus drive processing operation of the camera equipped with the lens barrel of FIG. 1.

FIG. 90 shows a flowchart of the barrier pulse drive control H start drive processing operation.

In the barrier pulse drive control H start drive processing operation, as shown at S3730 in FIG. 90, the focus count pulse is set as the focus count. Subsequently, it is determined whether the parallel terminals DC0, DC1, and DC2 are in their energized state or not (S3732). If it is determined not, then focus brake time (E_T_BARIBRAKE) is set as the PI measurement timer (S3734). If it is determined that the parallel terminals DC0, DC1, and DC2 are in their energized state, by contrast, then the focus drive energizing time (E_T_BARIMON) is set as the PI measurement timer (S3736).

Subsequently, the flow shifts to S3738, where a time of 200 ms is set as the LPIIN overtime. Then, it is determined whether the terminal LPIIN is at L or not (S3740). If it is determined that the terminal LPIIN is at L, then 1 is subtracted from the focus count (S3742), and it is determined whether 0 is set as the focus count or not (S3744). If it is determined that 0 is set as the focus count, then the HL flag of LPIIN is set (S3746), and the processing operation is terminated.

If it is determined that 0 is not set as the focus count, by contrast, then it is determined whether the parallel terminals DC0, DC1, and DC2 are in their energized state or not (S3748). If it is determined that the parallel terminals DC0, DC1, and DC2 are in their energized state, then the flow shifts to S3754. If it is determined that the parallel terminals DC0, DC1, and DC2 are not in their energized state, by contrast, then the outputs of parallel terminals DC0, DC1, and DC2 are set L, L, and H, respectively, so that the motor 95 is placed into the wait state (S3750).

Subsequently, the outputs of parallel terminals DC0, DC1, and DC2 are set H, H, and H, respectively, so as to attain the brake output state (S3752). Then, the flow shifts to S3754, where the focus brake time (E_T_BARIBRAKE) is set as the PI measurement timer, and further to S3686 in FIG. 89.

If it is determined at S3740 that the terminal LPIIN is not at L, then the flow shifts to S3756, where an HP detection processing operation is carried out. Subsequently, it is determined whether the barrier lock timer is overtime or not (S3758). If it is determined that the barrier lock timer is overtime, then the barrier lock overtime is set (S3760), and the processing operation is terminated.

If it is determined that the barrier lock timer is not overtime, then it is determined whether the LPIIN timer is overtime or not (S3762). If it is determined that the LPIIN timer is overtime, then the LPIIN overtime is set (S3764), and the processing operation is terminated. If it is determined that the LPIIN timer is not overtime, then it is determined whether the PI measurement timer is overtime or not (S3766).

If it is determined at S3766 that the PI measurement timer is not overtime, then the flow returns to S3740. If it is determined that the PI measurement timer is overtime, by contrast, then it is determined whether the outputs of parallel terminals DC0, DC1, and DC2 are set H, H, and H, respectively, so as to attain the brake output state or not (S3768).

If it is determined at S3768 that the brake output state is not attained, then the outputs of parallel terminals DC0, DC1, and DC2 are set L, L, and H, respectively, so that the motor 95 is placed into the wait state (S3770). Subsequently, the outputs of parallel terminals DC0, DC1, and DC2 are set H, H, and H, respectively, so as to attain the brake output state (S3772), and the focus brake time (E_T_BARIBRAKE) is set as the PI measurement timer (S3774). Then, the flow returns to S3740.

If it is determined at S3768 that the brake output state is attained, then the outputs of parallel terminals DC0, DC1, and DC2 are set L, L, and H, respectively, so that the motor 95 is placed into the wait state (S3776), and the parallel terminals DC0, DC1, and DC2 are set to their energized state (S3778). Subsequently, the focus drive energizing time (E_T_BARIMON) is set as the PI measurement timer (S3780). Thereafter, the flow returns to S3740.

The barrier open processing operation will now be explained.

The barrier open processing operation is carried out as an operation of the open processing operation performed upon manipulating the main switch 16 (see FIG. 34), and is an operation for driving the motor 95 of the focus driving section 221 in order to open the barrier 83.

Figure 91:
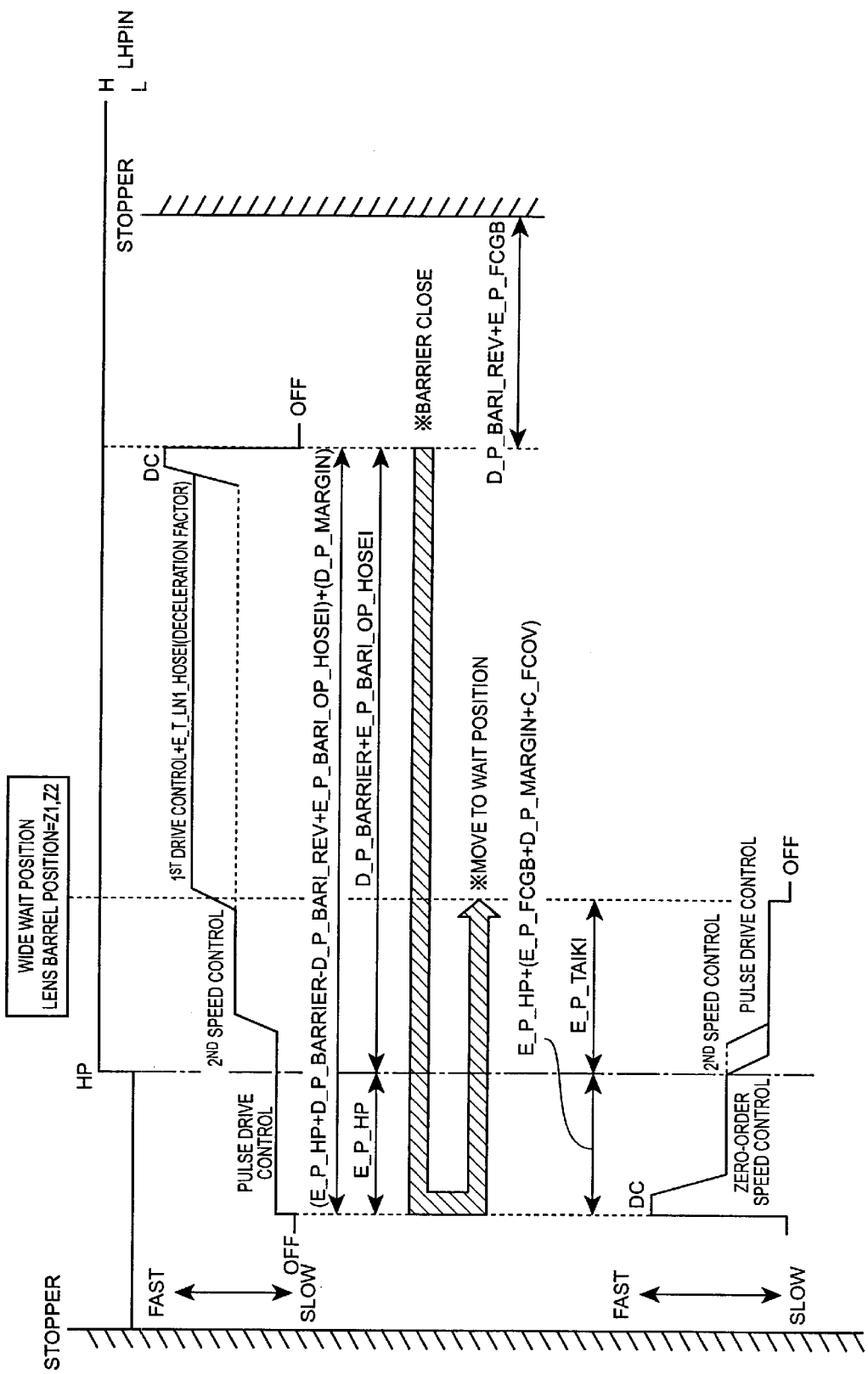
FIG. 91 is an operational chart for explaining a barrier open processing operation of the camera equipped with the lens barrel of FIG. 1.

FIG. 91 shows an operational view for explaining the barrier open processing operation, whereas FIGS. 92 to 96 show flowcharts of the barrier open processing operation.

Figure 92:
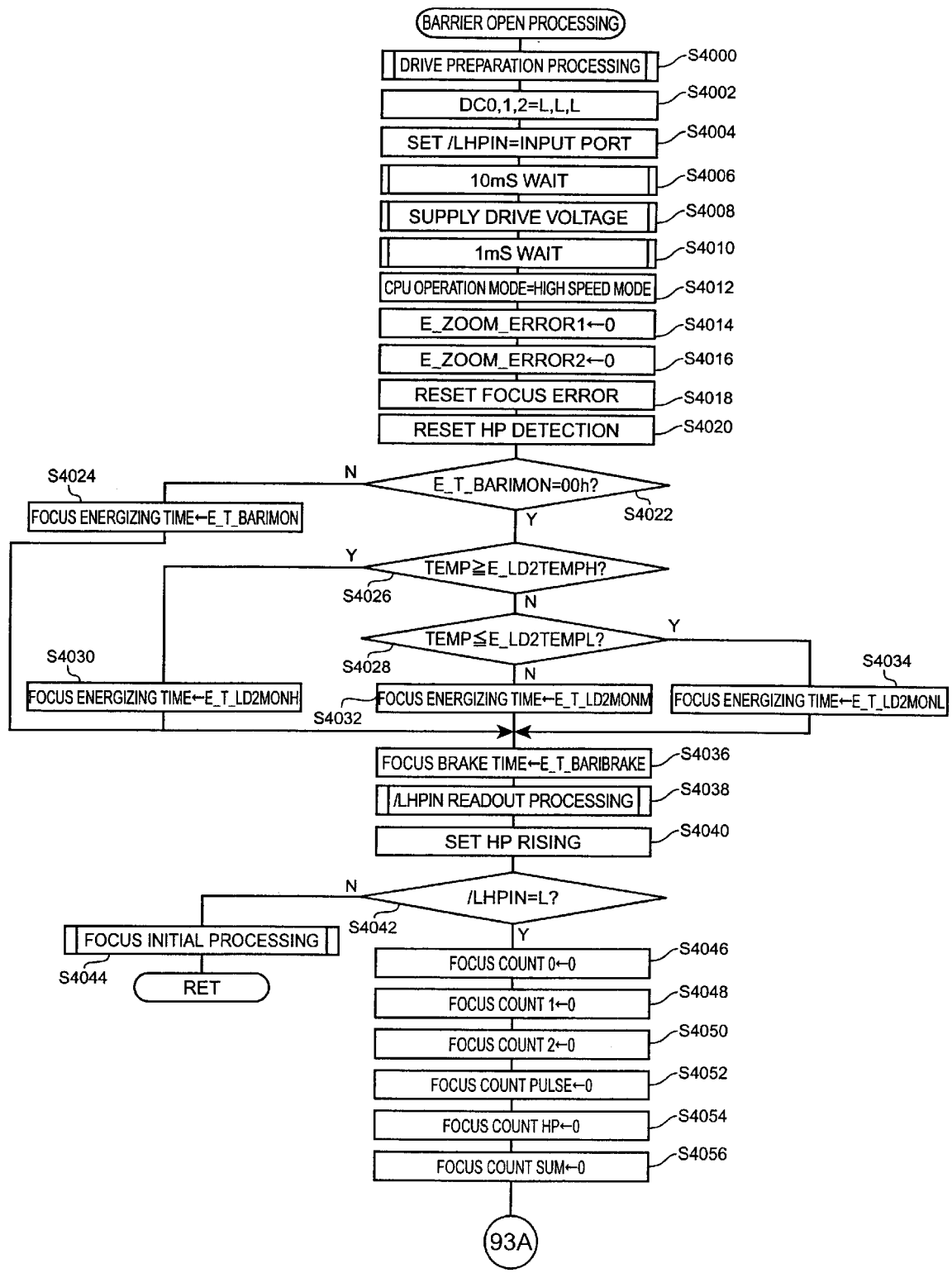
FIG. 92 is a flowchart of the barrier open processing operation of the camera equipped with the lens barrel of FIG. 1.

In the barrier close processing operation, as shown at S4000 in FIG. 92, a drive preparation processing operation is initially carried out, so that the motor 95 of the focus driving section 221 is selected as the motor to drive. Subsequently, the flow shifts to S4002, where the outputs of parallel terminals DC0, DC1, and DC2 are set L, L, and L, respectively, so that the motor 95 is placed into the wait state. Then, the terminal LHPIN is set as the input port (S4004) and, after a wait of 10 ms (S4006), the voltage output to the focus motor is enabled (S4008).

Subsequently, after a wait of 1 ms (S4010), the operation mode of CPU200 is set to the high speed mode (S4012). Then, the lens barrel control error code 1 (E_ZOOM_ERROR1) is reset (S4014), the lens barrel control error code 2 (E_ZOOM_ERROR2) is reset (S4016), the focus error is reset (S4018), and the HP (home position) detection is reset (S4020).

Thereafter, the flow shifts to S4022, where it is determined whether 00h is set as the barrier operating focus drive energizing time (E_T_BARIMON) or not. If it is determined not, then doubled barrier operating focus drive energizing time (E_T_BARIMON) is set as the focus energizing time (S4024). Subsequently, the flow shifts to S4036.

If it is determined that 00h is set as the barrier operating focus drive energizing time, by contrast, then the flow shifts to S4026, where it is determined whether the temperature (TEMP) measured in the power ON/OFF temperature measurement processing operation (see S112 in FIG. 19) is at least the high-temperature set temperature (E_LD2TEMPH) or not. If it is determined that the measured temperature is at least the high-temperature set temperature, then high-temperature focus drive energizing time data (E_T_LD2MONH) is set as the focus energizing time (S4030).

If it is determined at S4026 that the measured temperature is not at least the high-temperature set temperature, by contrast, then it is determined whether the measured temperature (TEMP) is at most the low-temperature set temperature (E_LD2TEMPL) or not (S4028). If it is determined that the measured temperature is at most the low-temperature set temperature, then low-temperature focus drive energizing time data (E_T_LD2MONL) is set as the focus energizing time (S4034). If it is determined not, by contrast, then room-temperature focus drive energizing time data (E_T_LD2MONM) is set as the focus energizing time (S4032).

Subsequently, the flow shifts to S4036, where doubled focus drive brake time data (E_T_LD2BRAKE) is set as the focus brake time. Then, the input of the terminal LHPIN is read out (S4038). Thereafter, the HP falling is set (S4040).

Subsequently, it is determined whether the terminal LHPIN is at H or not (S4042). If it is determined that the terminal LHPIN is not at H, then a focus initial processing operation is carried out (S4044). The focus initial processing operation will be explained later in detail. Then, the barrier open processing operation is terminated.

If it is determined that the terminal LPIIN is at H, then 0 is set as the focus count 0 (S4046). Subsequently, 0 is set as the focus count 1 (S4048), 0 is set as the focus count 2 (S4050), 0 is set as the focus count pulse (S4052), 0 is set as the focus count HP (S4054), and 0 is set as the focus count SUM (S4056).

Here, the "focus count 0," "focus count 1," "focus count 2," "focus count pulse," "focus count HP," and "focus count SUM" are similar to those in the above-mentioned second lens drive processing operation.

Figure 93:
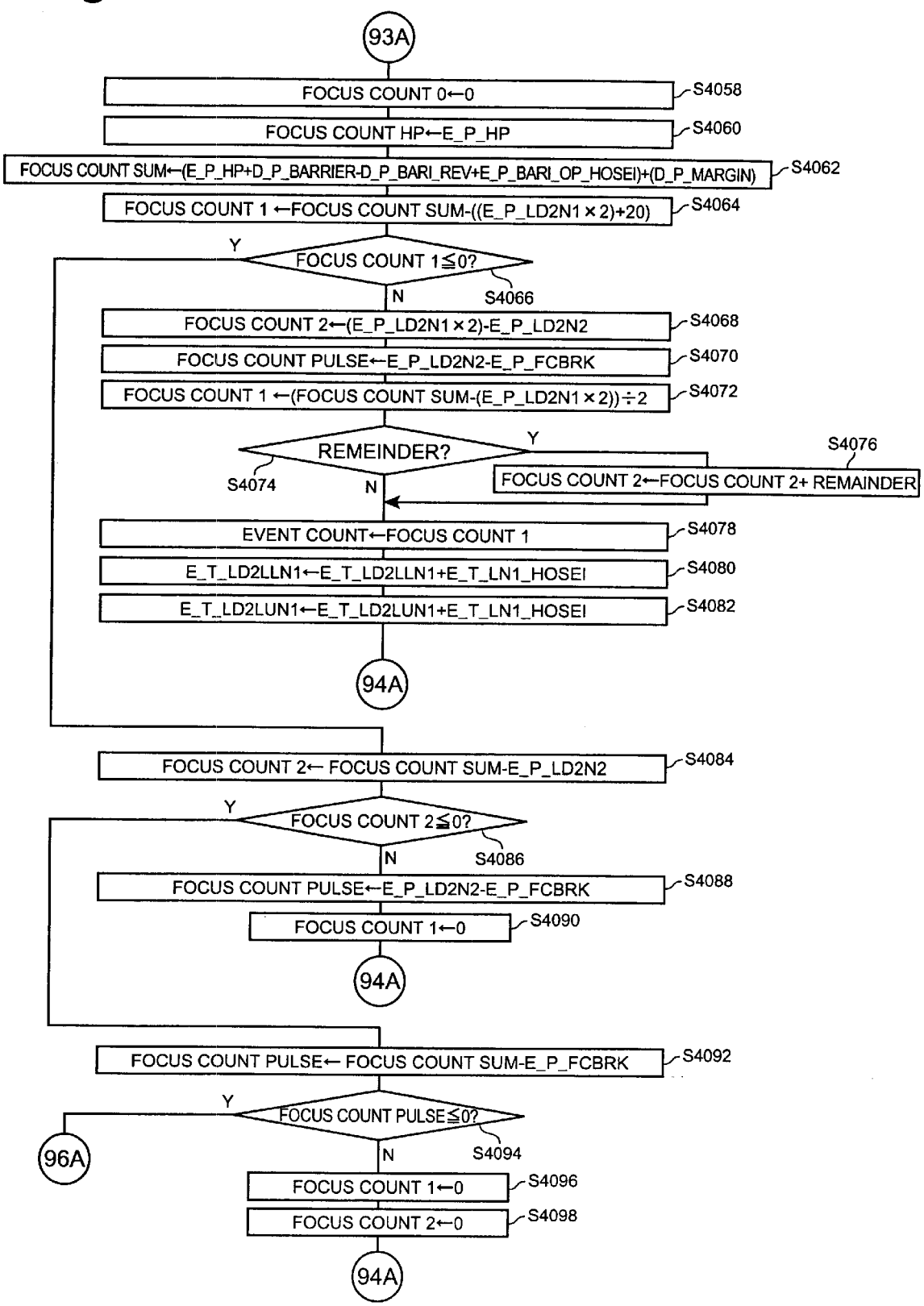
FIG. 93 is a flowchart of the barrier open processing operation of the camera equipped with the lens barrel of FIG. 1.
Figure 94:
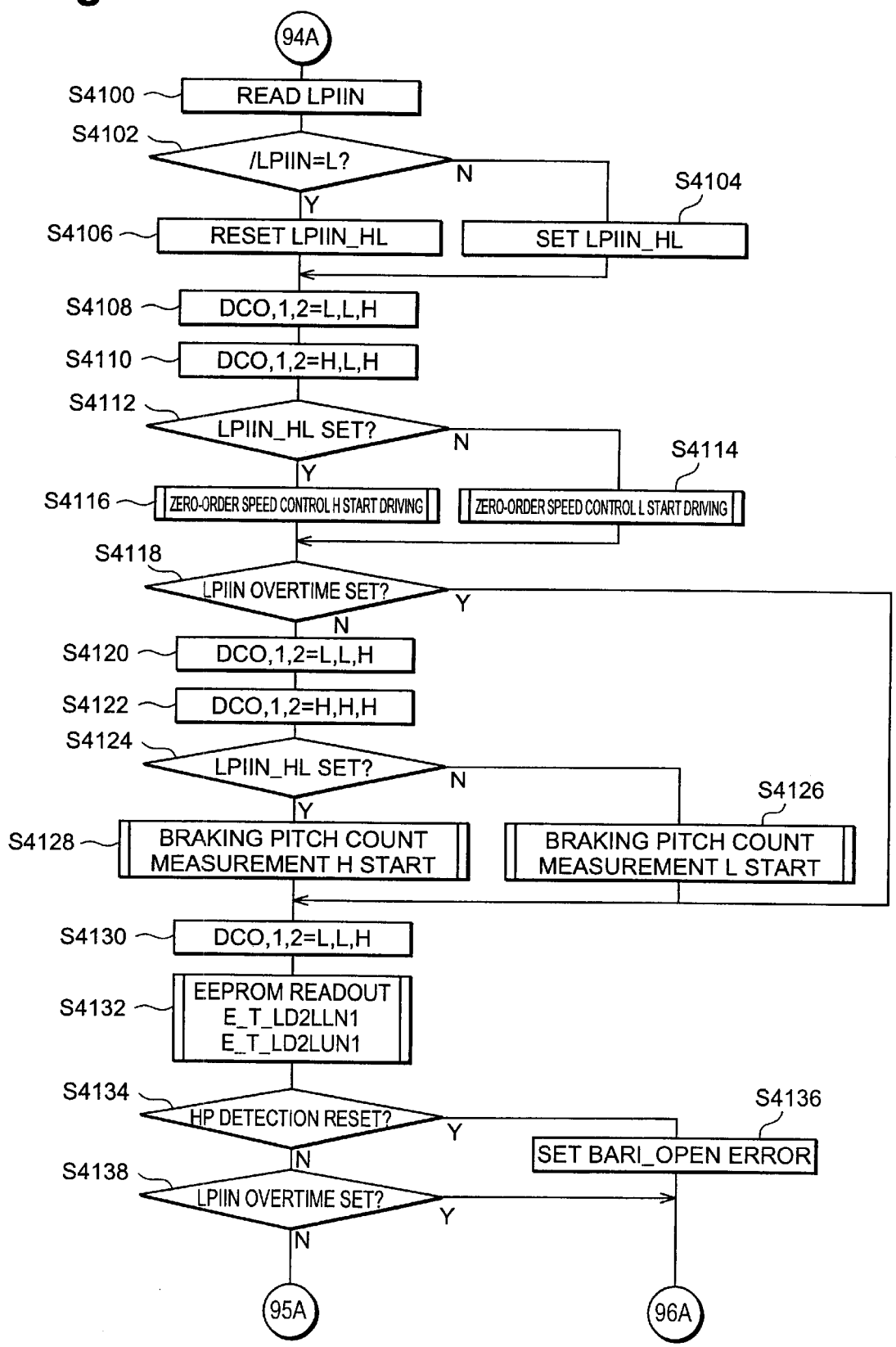
FIG. 94 is a flowchart of the barrier open processing operation of the camera equipped with the lens barrel of FIG. 1.
Figure 95:
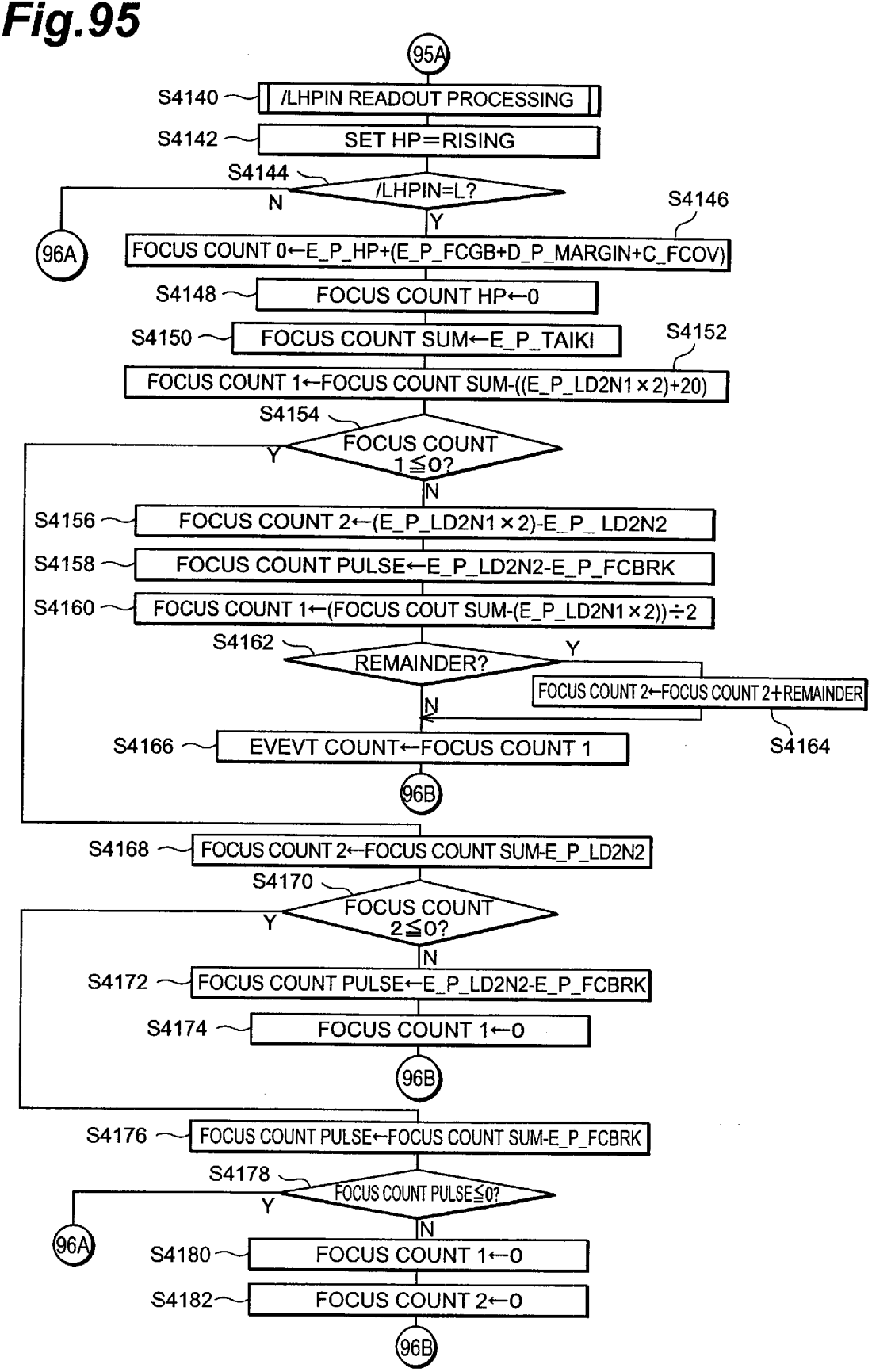
FIG. 95 is a flowchart of the barrier open processing operation of the camera equipped with the lens barrel of FIG. 1.
Figure 96:
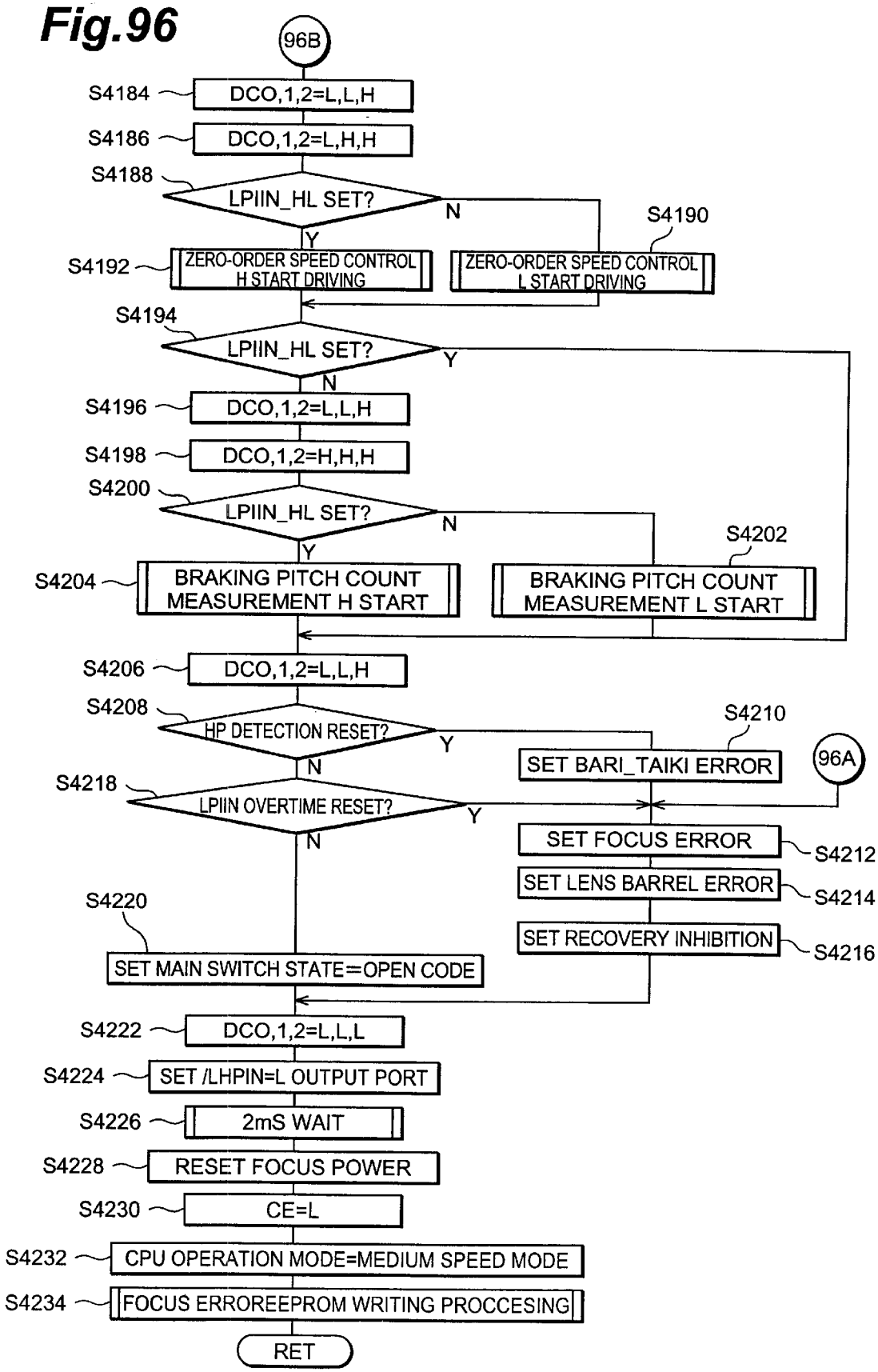
FIG. 96 is a flowchart of the barrier open processing operation of the camera equipped with the lens barrel of FIG. 1.

Subsequently, the flow shifts to S4058 in FIG. 93, where 0 is set as the focus count 0. Then, focus drive HP count data (E_P_HP) is set as the focus count HP (S4060). Thereafter, the sum of the focus drive HP count data (E_P_HP), LHPIN rising barrier stop pitch count data (D_P_BARRIER), barrier open processing pitch count correction data (E_P_BARI_OP_HOSEI), and focus drive HP detection margin pitch count data (D_P_MARGIN) minus creep release pitch count data (D_P_BARI_REV) is set as the focus count SUM (S4062).

Subsequently, the focus drive first speed count data (E_P_LD2N1) is doubled, 20 is added thereto, thus obtained value is subtracted from the focus count SUM, and the resulting value is set as the focus count 1 (S4064).

Thereafter, it is determined whether the focus count 1 is at most 0 or not (S4066). If it is determined that the focus count 1 is not at most 0, then the focus drive first speed count data (E_P_LD2N1) is doubled, the focus drive second speed count data (E_P_LD2N2) is subtracted therefrom, and thus obtained value is set as the focus count 2 (S4068).

Subsequently, the value obtained when the focus drive brake pitch count data (E_P_FCBRK) is subtracted from the focus drive second speed count data (E_P_LD2N2) is set as the focus count pulse (S4070). Then, doubled focus drive first speed count data (L_P_LD2N1) is subtracted from the focus count SUM, thus obtained value is divided by 2, and the resulting value is set as the focus count 1 (S4072). Subsequently, it is determined whether there is a remainder or not (S4074). If it is determined that there is a remainder, then the sum of the focus count 1 and the remainder is set as the focus count 2 (S4076), and the flow shifts to S4078.

If it is determined that there is no remainder, by contrast, then the flow directly shifts to S4078, where the focus count 1 is set as the event count. Subsequently, the value obtained when focus drive first speed deceleration time (E_T_LN1_HOSEI) is added to focus drive first speed lower limit pulse time (E_T_LD2LLN1) is set as the focus drive first speed lower limit pulse time (E_T_LD2LLN1) (S4080). Thereafter, the value obtained when the focus drive first speed deceleration time (E_T_LN1_HOSEI) is added to focus drive first speed upper limit pulse time (E_T_LD2LUN1) is set as the focus drive first speed upper limit pulse time (E_T_LD2LUN1) (S4082). Subsequently, the flow shifts to S4100 in FIG. 94.

If it is determined at S4066 that the focus count 1 is at most 0, then the value obtained when the focus drive second speed count data (E_P_LD2N2) is subtracted from the focus count SUM is set as the focus count 2 (S4084).

Subsequently, it is determined whether the focus count 2 is at most 0 or not (S4086). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S4088). Subsequently, 0 is set as the focus count 1, and the flow shifts to S4100 in FIG. 94.

If it is determined at S4086 that the focus count 2 is at most 0, then the value obtained when the focus drive brake pitch count data (E_P_FCBRK) is subtracted from the focus count SUM is set as the focus count pulse (S4092).

Subsequently, the flow shifts to S4094, where it is determined whether the focus count pulse is at most 0 or not. If it is determined that the focus count pulse is at most 0, then the flow shifts to S4216 in FIG. 96. If it is determined not, by contrast, then 0 is set as the focus count 1 (S4096), and 0 is set as the focus count 2 (S4098). Then, the flow shifts to S4100 in FIG. 94.

At S4100, the terminal LPIIN (see FIG. 16) receiving the output of detector 96 is read out, and it is determined whether the terminal LPIIN is at L or not (S4102). If it is determined that the terminal LPIIN is at L, then the HL flag of the terminal LPIIN is reset (S4106). If it is determined that the terminal LPIIN is not at L, by contrast, then the HL flag of the terminal LPIIN is set (S4104).

Subsequently, the flow shifts to S4108, where the outputs of parallel terminals DC0, DC1, and DC2 are set L, L, and H, respectively, so that the motor 95 is placed into the wait state. Then, the outputs of parallel terminals DC0, DC1, and DC2 are set H, L, and H, respectively, so as to carry out driving in reverse (S4110).

Thereafter, it is determined whether the HL flag of the terminal LPIIN is set or not (S4112). If it is determined that the HL flag of the terminal LPIIN is set, then a zero-order speed control H start drive processing operation is carried out (S4116). If it is determined not, by contrast, then a zero-order speed control L start drive processing operation is carried out (S4114). The zero-order speed control H and L start drive processing operations will be explained later in detail.

Subsequently, the flow shifts to S4118, where it is determined whether the LPIIN overtime is set or not. If it is determined that the LPIIN overtime is set, then the flow shifts to S4130. If it is determined not, by contrast, then the outputs of parallel terminals DC0, DC1, and DC2 are set L, L, and H, respectively, so as to place the motor 95 into the wait state (S4120). Thereafter, the outputs of parallel terminals DC0, DC1, and DC2 are set H, H, and H, respectively, so as to attain the brake output state (S4122).

Subsequently, it is determined whether the HL flag of the terminal LPIIN is set or not (S4124). If it is determined that the HL flag of the terminal LPIIN is set, then a braking pitch count measurement H start drive processing operation is carried out (S4128). If it is determined that the HL flag of the terminal LPIIN is not set, then a braking pitch count measurement L start drive processing operation is carried out (S4126). The braking pitch count measurement L and H start drive processing operations will be explained later in detail.

Subsequently, the flow shifts to S4130, where the outputs of parallel terminals DC0, DC1, and DC2 are set L, L, and H, respectively, so that the motor 95 is placed into the wait state. Then, the flow shifts to S4132, where a readout processing operation for the EEPROM 218 is carried out. In this readout processing operation, the focus drive first speed upper limit pulse time (E_T_LD2LUN1) and focus drive first speed lower limit pulse time (E_T_LD2LLN1) are read out and set to their original values.

Subsequently, it is determined whether the HP detection flag is reset or not (S4134). If it is determined that the HP detection flag is reset, then the barrier open (BARI_OPEN) error is set (S4136), and the flow shifts to S4212 in FIG. 96.

If it is determined at S4134 that the HP detection flag is not reset, by contrast, then it is determined whether the LPIIN overtime is set or not (S4138). If it is determined that the LPIIN overtime is set, then the flow shifts to S4212 in FIG. 96. If it is determined that the LPIIN overtime is not set, by contrast, then the flow shifts to S4140 in FIG. 95.

At S4140, a readout processing operation for the terminal LHPIN is carried out. Subsequently, the HP rising is set (S4142), and it is determined whether the terminal LHPIN is at L or not (S4144). If it is determined that the terminal LHPIN is not at L, by contrast, then the flow shifts to S4212 in FIG. 96. If it is determined that the terminal LHPIN is at L, then the flow shifts to S4146.

At S4146, the sum of the focus drive HP count data (E_P_HP), focus drive backlash count data (E_P_FCGB), focus drive HP detection margin pitch count data (D_P_MARGIN), and focus driving over-pitch number (C_FCOV) is set as the focus count 0. Subsequently, 0 is set as the focus count HP (S4148), and focus wait position pitch count data (EP_TAIKI) is set as the focus count SUM (S4150).

Then, doubled focus drive first speed count data (E_P_LD2N1) and 20 pitches are subtracted from the focus count SUM, and thus obtained value is set as the focus count 1 (S4152).

Subsequently, it is determined whether the focus count 1 is at most 0 or not (S4154). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S4156).

Subsequently, the value obtained when the focus drive brake pitch count data (E_P_FCBRK) is subtracted from the focus drive second speed count data (E_P_LD2N2) is set as the focus count pulse (S4158). Then, doubled focus drive first speed count data (E_P_LD2N1) is subtracted from the focus count SUM, thus obtained value is divided by 2, and the resulting value is set as the focus count 1 (S4160). Subsequently, it is determined whether there is a remainder or not (S4162). If it is determined that there is a remainder, then the value obtained when the remainder is added to the focus count 2 is set as the focus count 2 (S4164), and the flow shifts to S4166. If it is determined that there is no remainder, by contrast, then the flow directly shifts to S4166, where the focus count 1 is set as the event count. Then, the flow shifts to S4184 in FIG. 96.

If it is determined at S4154 that the focus count 1 is at most 0, then the value obtained when the focus drive second speed count data (E_P_LD2N2) is subtracted from the focus count SUM is set as the focus count 2 (S4168).

Subsequently, it is determined whether the focus count 2 is at most 0 or not (S4170). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S4172). Subsequently, 0 is set as the focus count 1 (S4174), and the flow shifts to S4184 in FIG. 96.

If it is determined at S4170 that the focus count 2 is at most 0, then the value obtained when the focus drive brake pitch count data (E_P_FCBRK) is subtracted from the focus count SUM is set as the focus count pulse (S4176).

Subsequently, the flow shifts to S4178, where it is determined whether the focus count pulse is at most 0 or not. If it is determined that the focus count pulse is at most 0, then the flow shifts to S4212 in FIG. 96. If it is determined not, by contrast, then 0 is set as the focus count 1 (S4180), and 0 is set as the focus count 2 (S4182). Then, the flow shifts to S4184 in FIG. 96.

At S4184, the outputs of parallel terminals DC0, DC1, and DC2 are set L, L, and H, respectively, so that the motor 95 is placed into the wait state. Subsequently, the outputs of parallel terminals DC0, DC1, and DC2 are set L, H, and H, respectively, so as to carry out normal rotation driving (S4186).

Then, it is determined whether the HL flag of the terminal LPIIN is set or not (S4188). If it is determined that the HL flag of the terminal LPIIN is set, then a zero-order speed control H start drive processing operation is carried out (S4192). If it is determined not, by contrast, then a zero-order speed control L start drive processing operation is carried out (S4190). The zero-order control H and L start drive processing operations will be explained later in detail.

Subsequently, the flow shifts to S4194, where it is determined whether the LPIIN overtime is set or not. If it is determined that the LPIIN overtime is set, then the flow shifts to S4206. If it is determined not, by contrast, then the outputs of parallel terminals DC0, DC1, and DC2 are set L, L, and H, respectively, so that the motor 95 is placed into the wait state (S4196). Subsequently, the outputs of parallel terminals DC0, DC1, and DC2 are set H, H, and H, respectively, so as to attain the brake output state (S4198).

Subsequently, it is determined whether the HL flag of the terminal LPIIN is set or not (S4200). If it is determined that the HL flag of the terminal LPIIN is set, then a braking pitch count measurement H start drive processing operation is carried out (S4204). If it is determined not, then a braking pitch count measurement L start drive processing operation is carried out (S4202). The braking pitch count measurement H and L start drive processing operation will be explained later in detail.

Subsequently, the flow shifts to S4206, where the outputs of parallel terminals DC0, DC1, and DC2 are set L, L, and H, respectively, so that the motor 95 is placed into the wait state. Then, it is determined whether the HP detection flag is reset or not (S4208). If it is determined that the HP detection flag is reset, then the barrier wait (BARI_TAIKI) error is set (S4210), and the flow shifts to S4212.

At S4212, the focus error is set. Subsequently, the lens barrel error is set (S4214), and the recovery inhibition is set (S4216). Subsequently, the flow shifts to S4222.

If it is determined at S4208 that the HP detection flag is not reset, by contrast, then it is determined whether the LPIIN overtime is set or not (S4218). If it is determined that the LPIIN overtime is set, then the flow shifts to S4212. If it is determined that the LPIIN overtime is not set, then the open code is set as the main switch state (S4220). Subsequently, the flow shifts to S4222.

At S4222, the outputs of parallel terminals DC0, DC1, and DC2 are set L, L, and L, respectively, so that the motor 95 is placed into the wait state. Subsequently, the terminal LHPIN is set as the output port (S4224). Then, after a wait of 2 ms (S4226), the focus power is reset (S4228), the driver ON/OFF terminal CE is set L, so as to place the driver section 219 into the inactive state (S4230), the operation mode of the CPU 200 is set to a medium speed mode (S4232), and a focus error EEPROM writing processing operation is carried out (S4234). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the barrier open processing operation is terminated.

As in the foregoing, when the second lens group 102 (focus) is driven to rotate in reverse, the pulse drive control at a lower speed is carried out in the barrier open processing operation as shown in FIG. 91 after the HP (home position) serving as a reference position is detected. Consequently, the second lens group 102 can be prevented from colliding with the stopper due to its impetus upon movement, whereby gears can be kept from meshing with each other upon the collision and failing to rotate in reverse, which might have become a severe failure, for example.

The focus TELE wait movement processing operation will now be explained.

Figure 97:
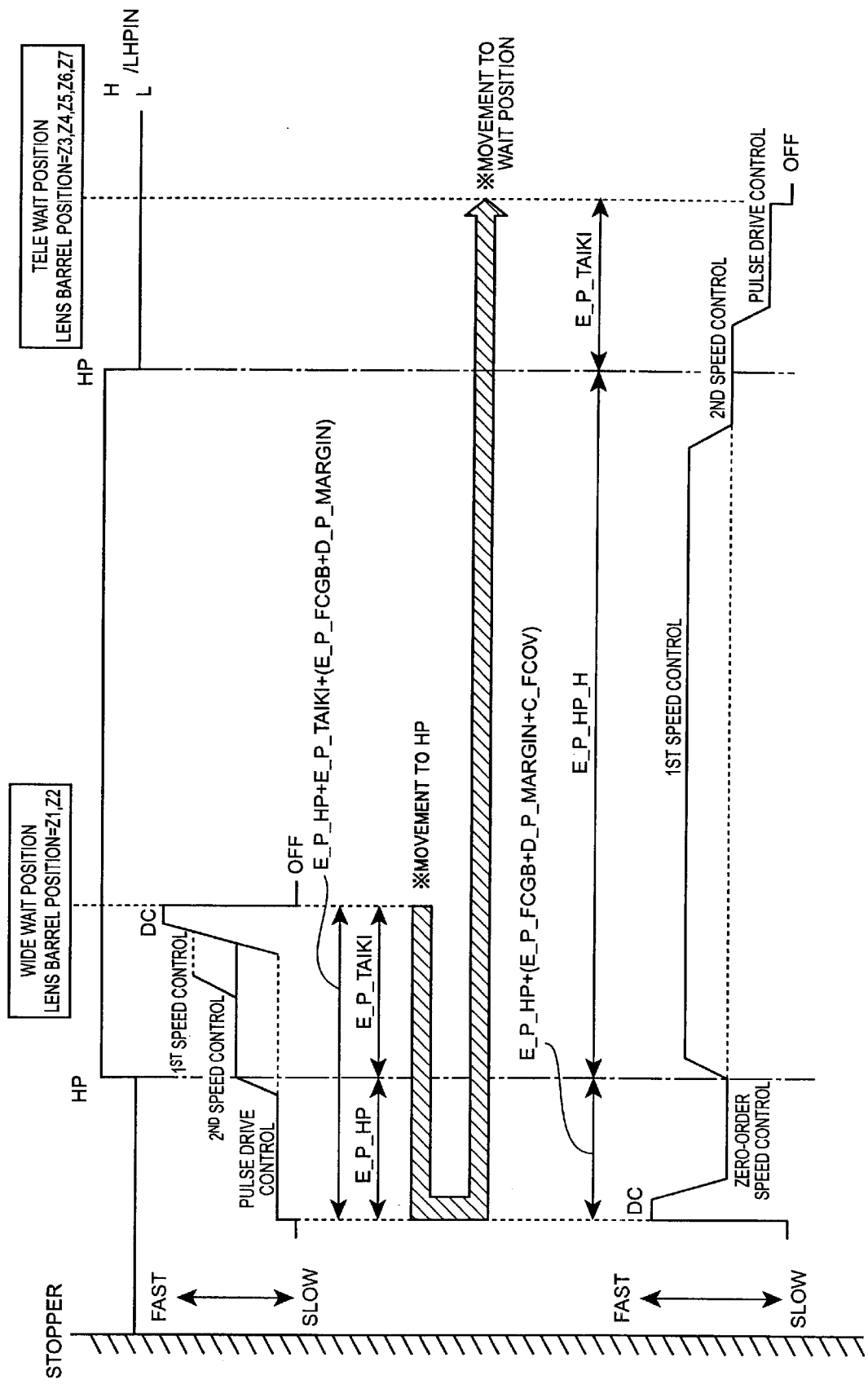
FIG. 97 is an operational chart for explaining a focus TELE wait movement processing operation of the camera equipped with the lens barrel of FIG. 1.

FIG. 97 shows an operational chart for explaining the focus TELE wait movement processing operation. FIGS. 98 to 102 show flowcharts of the focus TELE wait movement processing operation.

As shown in FIG. 97, the focus TELE wait movement processing operation is an operation by which, when the lens barrel position is moved to Z3 or further from Z1 or Z2 upon manipulating the TELE switch 19, the second lens group 102 (focus) is moved from the WIDE wait position to the TELE wait position.

Figure 98:
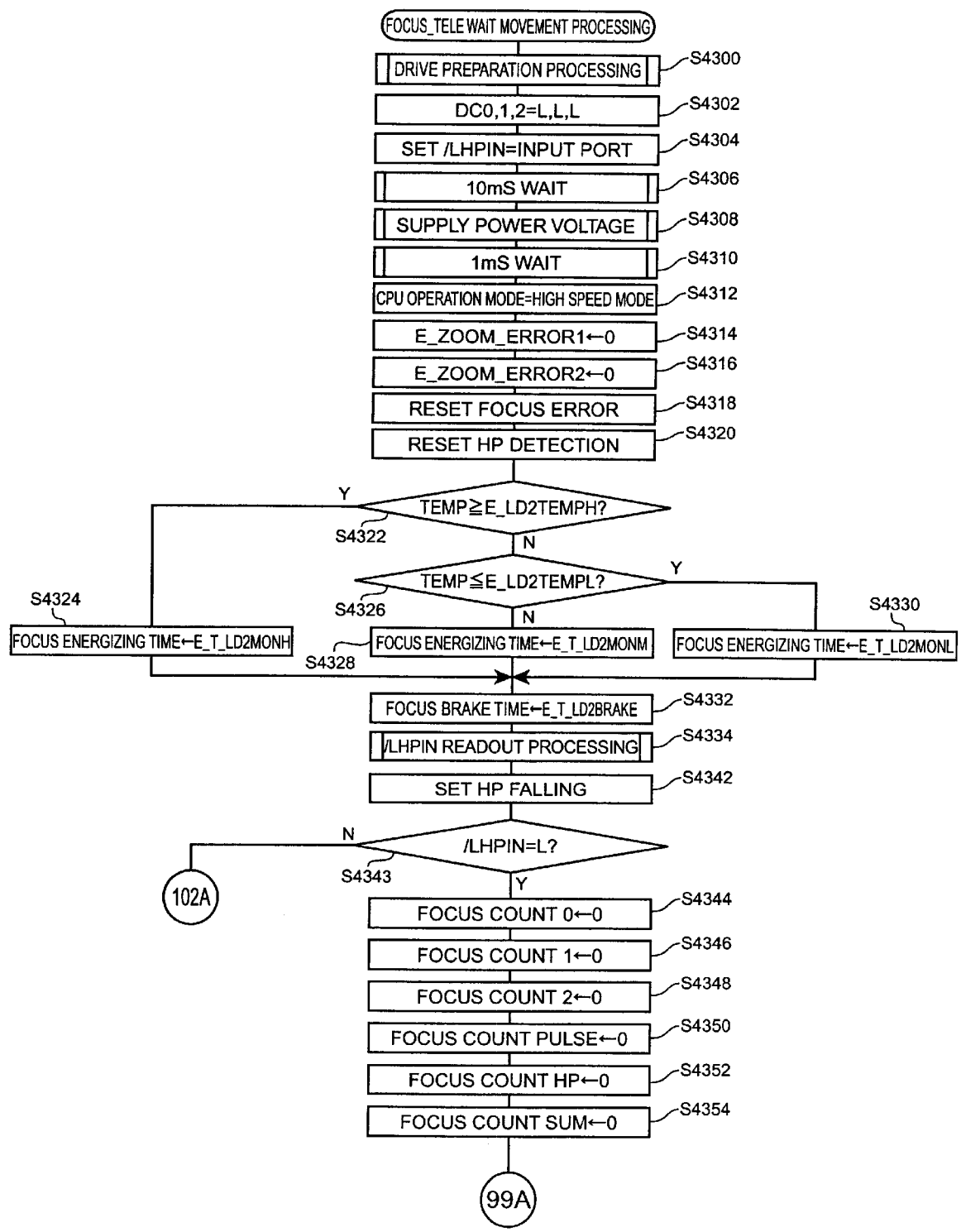
FIG. 98 is a flowchart of the focus TELE wait movement processing operation of the camera equipped with the lens barrel of FIG. 1.

In the focus TELE wait movement processing operation, as shown at S4300 in FIG. 98, a drive preparation processing operation is initially carried out, so that the motor 95 of the focus driving section 221 is selected as the motor to drive. Then, the flow shifts to S4302, where the outputs of parallel terminals DC0, DC1, and DC2 are set L, L, and L, respectively, so that the motor 95 is placed into the wait state. Thereafter, the terminal LHPIN is set as the input port (S4304) and, after a wait of 10 ms (S4306), the voltage output to the focus motor is enabled (S4308).

Subsequently, after a wait of 1 ms (S4310), the operation mode of CPU 200 is set to the high speed mode (S4312). Then, the lens barrel control error code 1 (E_ZOOM_ERROR1) is reset (S4314), the lens barrel control error code 2 (E_ZOOM_ERROR2) is reset (S4316), the focus error is reset (S4318), and the HP (home position) detection is reset (S4320).

Thereafter, the flow shifts to S4322, where it is determined whether the temperature (TEMP) measured in the power ON/OFF temperature measurement processing operation (see S112 in FIG. 19) is at least the high-temperature set temperature (E_LD2TEMPH) or not. If it is determined that the measured temperature is at least the high-temperature set temperature, then high-temperature focus drive energizing time data (E_T_LD2MONH) is set as the focus energizing time (S4324).

If it is determined at S4322 that the measured temperature is not at least the high-temperature set temperature, then it is determined whether the measured temperature (TEMP) is at most the low-temperature set temperature (E_LD2TEMPL) or not (S4326). If it is determined that the measured temperature is at most the low-temperature set temperature, then low-temperature focus drive energizing time data (E_T_LD2MONL) is set as the focus energizing time (S4330). If it is determined that the measured temperature is not at most the low-temperature set temperature, by contrast, then room-temperature focus drive energizing time data (E_T_LD2MONM) is set as the focus energizing time (S4328).

In the high-temperature focus drive energizing time data (E_T_LD2MONH), a time shorter than that in the room-temperature focus drive energizing time data (E_T_LD2MONM) is set. In the room-temperature focus drive energizing time data (E_T_LD2MONM), a time shorter than that in the low-temperature focus drive energizing time data (E_T_LD2MONL) is set.

Subsequently, the flow shifts to S4332, where focus drive brake time data (E_T_LD2BRAKE) is set as the focus brake time. Then, the input of the terminal LHPIN is read out (S4334). Thereafter, HP falling is set (S4342).

Subsequently, it is determined whether the terminal LHPIN is at H or not (S4343). If it is determined that the LHPIN is not at H, then the flow shifts to S4524 in FIG. 102. If it is determined that the terminal LHPIN is at H, by contrast, then the flow shifts to S4344.

At S4344, 0 is set as the focus count 0. Subsequently, 0 is set as the focus count 1 (S4346), 0 is set as the focus count 2 (S4348), 0 is set as the focus count pulse (S4350), 0 is set as the focus count HP (S4352), and 0 is set as the focus count SUM (S4354).

Here, the "focus count 0," "focus count 1," "focus count 2," "focus count pulse," "focus count HP," and "focus count SUM" are similar to those in the above-mentioned second lens drive processing operation.

Figure 99:
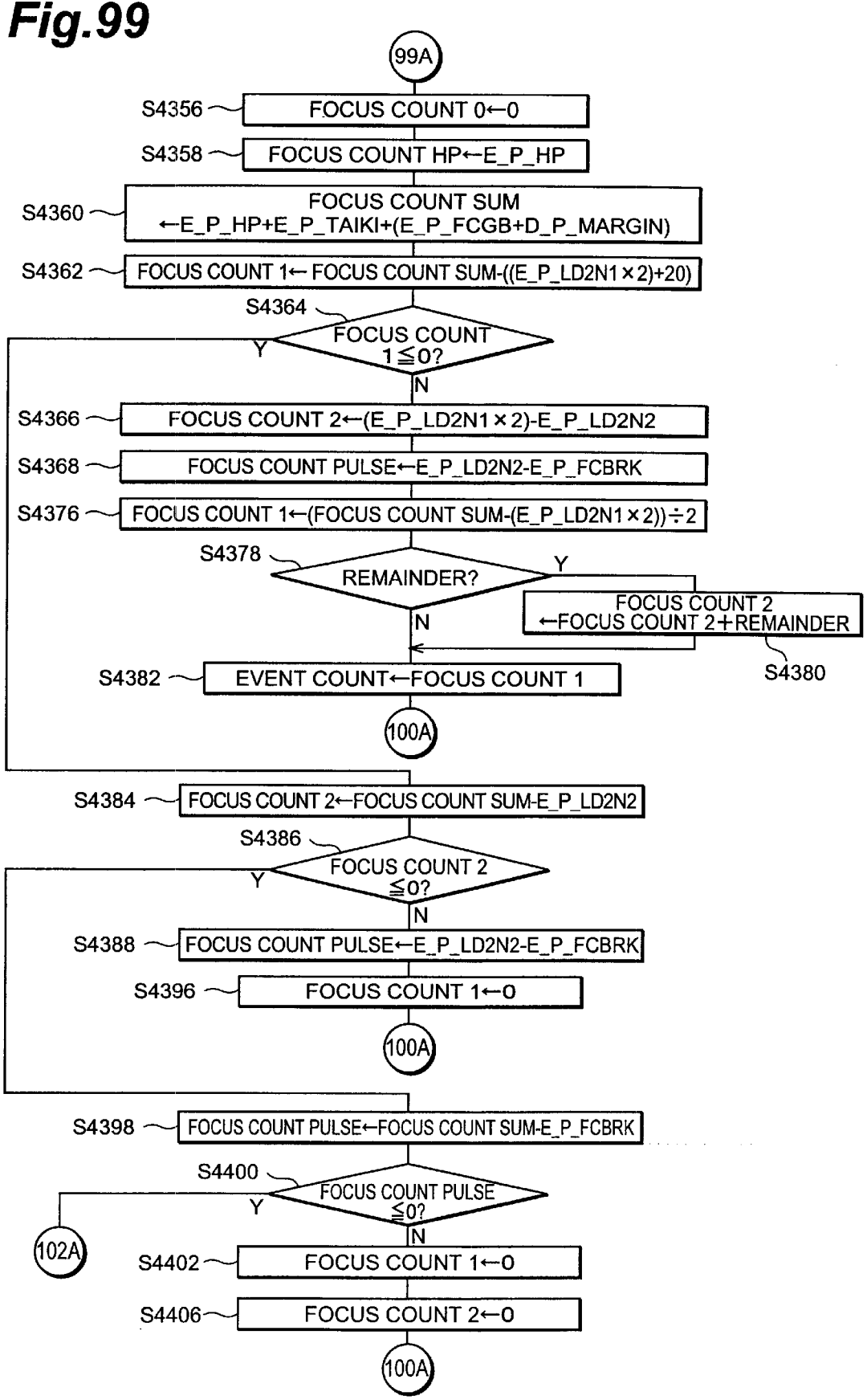
FIG. 99 is a flowchart of the focus TELE wait movement processing operation of the camera equipped with the lens barrel of FIG. 1.

Subsequently, the flow shifts to S4356 in FIG. 99, where 0 is set as the focus count 0. Then, focus drive HP count data (E_P_HP) is set as the focus count HP (S4358). Thereafter, the sum of the focus drive HP count data (E_P_HP), focus wait position pitch count data (E_P_TAIKI), focus drive backlash count data (E_P_FCGB), and focus drive HP detection margin pitch count data (D_P_MARGIN) is set as the focus count SUM (S4360).

Subsequently, the focus drive first speed count data (E_P_LD2N1) is doubled, 20 is added thereto, thus obtained value ((E_P_LD2N1*2)+20) is subtracted from the focus count SUM, and the resulting value is set as the focus count 1 (S4362).

Thereafter, it is determined whether the focus count 1 is at most 0 or not (S4364). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S4366).

Subsequently, the value obtained when the focus drive brake pitch count data (E_P_FCBRK) is subtracted from the focus drive second speed count data (E_P_LD2N2) is set as the focus count pulse (S4368).

Subsequently, the flow shifts to S4376, where doubled focus drive first speed count data (E_P_LD2N1) is subtracted from the focus count SUM, thus obtained value is divided by 2, and the resulting value is set as the focus count 1. Then, it is determined whether there is a remainder or not (S4378). If it is determined that there is a remainder, then the value obtained when the remainder is added to the focus count 2 is set as the focus count 2 (S4380), and the flow shifts to S4382. If it is determined that there is no remainder, by contrast, then the flow directly shifts to S4382, where the focus count 1 is set as the event count. Thereafter, the flow shifts to S4410 in FIG. 100.

If it is determined at S4364 that the focus count 1 is at most 0, then the value obtained when the focus drive second speed count data (E_P_LD2N2) is subtracted from the focus count SUM is set as the focus count 2 (S4384).

Subsequently, it is determined whether the focus count 2 is at most 0 or not (S4386). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S4388). Subsequently, the flow shifts to S4396, where 0 is set as the focus count 1. Then, the flow shifts to S4410 in FIG. 100.

If it is determined at S4386 that the focus count 2 is at most 0, then the value obtained when the focus drive brake pitch count data (E_P_FCBRK) is subtracted from the focus count SUM is set as the focus count pulse (S4398).

Subsequently, the flow shifts to S4400, where it is determined whether the focus count pulse is at most 0 or not. If it is determined that the focus count pulse is not at most 0, then 0 is set as the focus count 1 (S4402). Thereafter, the focus count pulse is set as the focus count 2 (S4406). Subsequently, the flow shifts to S4410 in FIG. 100.

Figure 102:
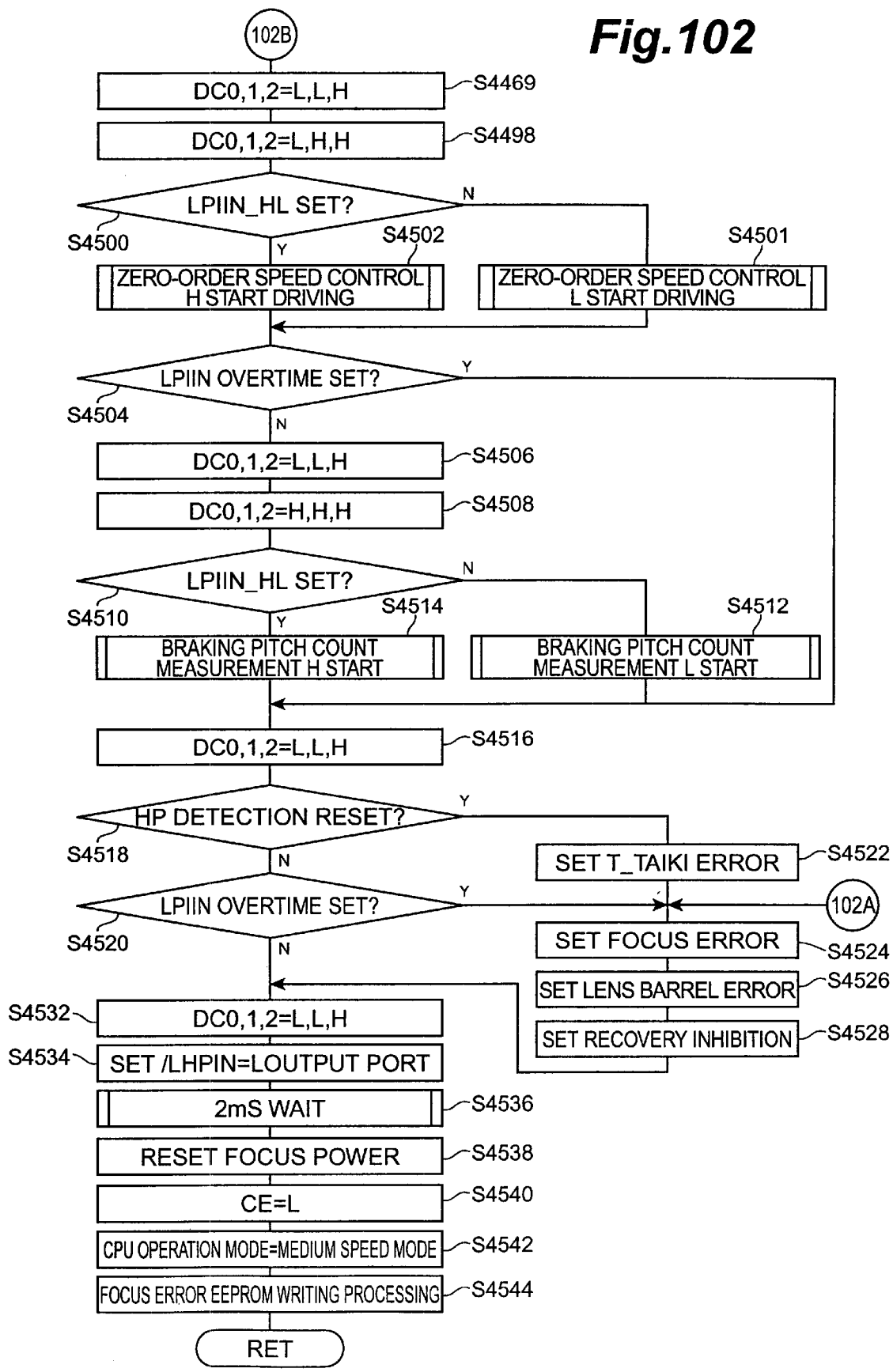
FIG. 102 is a flowchart of the focus TELE wait movement processing operation of the camera equipped with the lens barrel of FIG. 1.

If it is determined at S4400 that the focus count pulse is at most 0, then it is considered abnormal, whereby the flow shifts to S4524 in FIG. 102.

Figure 100:
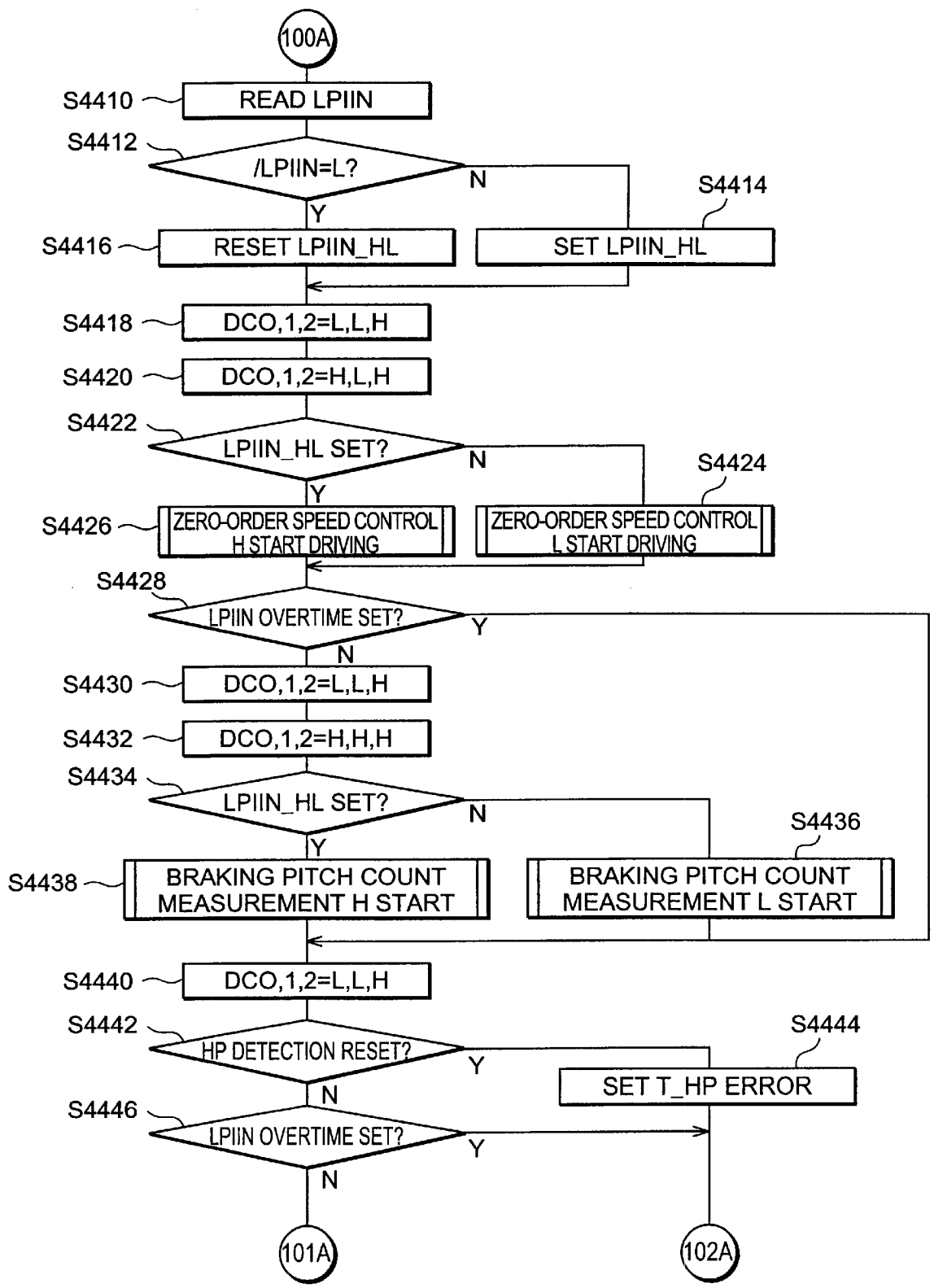
FIG. 100 is a flowchart of the focus TELE wait movement processing operation of the camera equipped with the lens barrel of FIG. 1.
Figure 101:
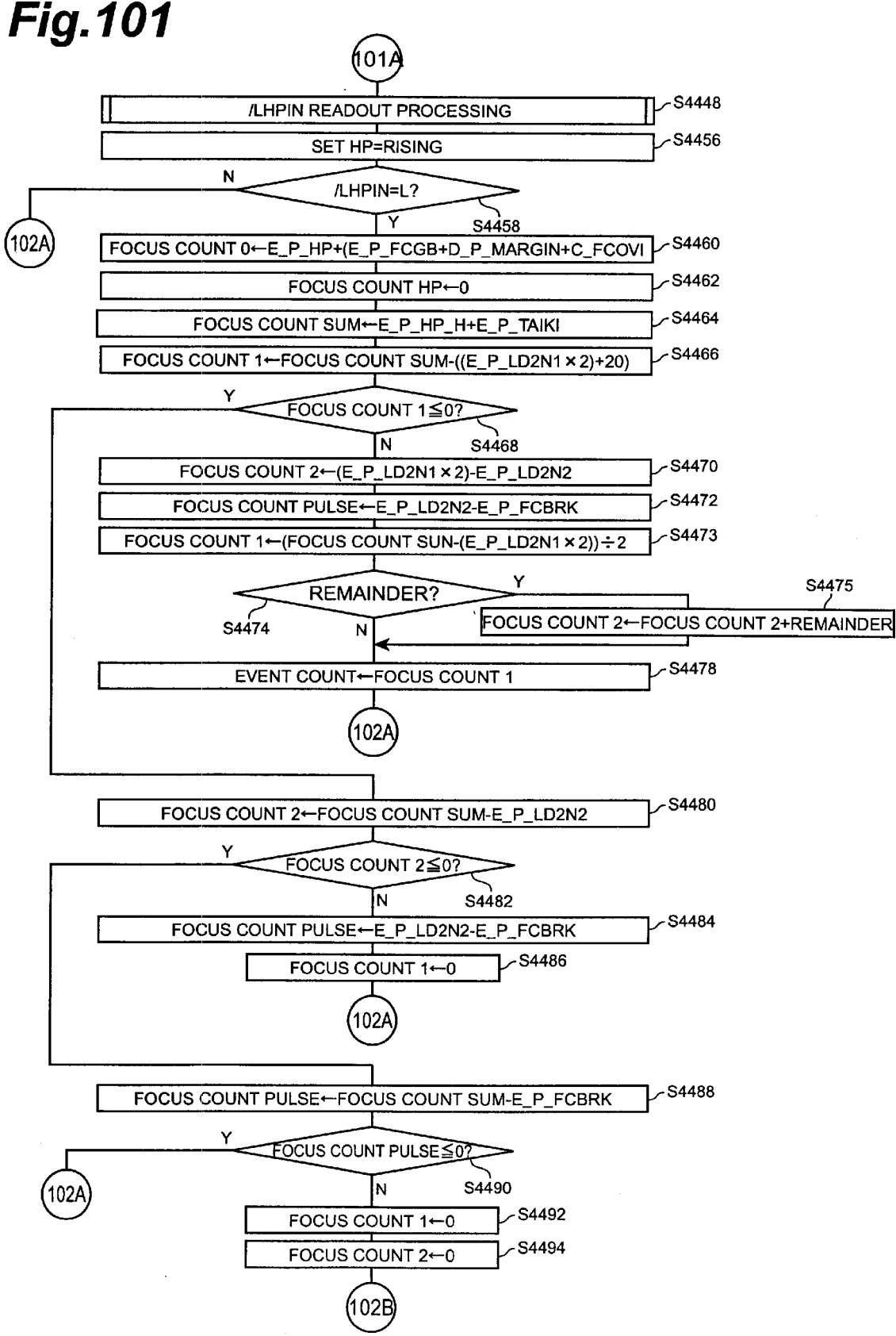
FIG. 101 is a flowchart of the focus TELE wait movement processing operation of the camera equipped with the lens barrel of FIG. 1.

The terminal LPIIN (see FIG. 16) receiving the output of detector 96 is read out at S4410 in FIG. 100, and it is determined whether the terminal LPIIN is at L or not (S4412). If it is determined that the terminal LPIIN is at L, then the HL flag of the terminal LPIIN is reset (S4416). If it is determined that the terminal LPIIN is not at L, by contrast, then the HL flag of the terminal LPIIN is set (S4414).

Subsequently, the flow shifts to S4418, where the outputs of parallel terminals DC0, DC1, and DC2 are set L, L, and H, respectively, so that the motor 95 is placed into the wait state. Then, the outputs of parallel terminals DC0, DC1, and DC2 are set H, L, and H, respectively, so as to carry out driving in reverse (S4420).

Thereafter, it is determined whether the HL flag of the terminal LPIIN is set or not (S4422). If it is determined that the HL flag of the terminal LPIIN is set, then a zero-order speed control H start drive processing operation is carried out (S4426). If it is determined not, by contrast, then a zero-order speed control L start drive processing operation is carried out (S4424). The zero-order speed control H and L start drive processing operations will be explained later in detail.

Subsequently, the flow shifts to S4428, where it is determined whether the LPIIN overtime is set or not. If it is determined that the LPIIN overtime is set, then the flow shifts to S4440. If it is determined not, by contrast, then the outputs of parallel terminals DC0, DC1, and DC2 are set L, L, and H, respectively, so as to place the motor 95 into the wait state (S4430). Thereafter, the outputs of parallel terminals DC0, DC1, and DC2 are set H, H, and H, respectively, so as to attain the brake output state (S4432).

Subsequently, it is determined whether the HL flag of the terminal LPIIN is set or not (S4434). If it is determined that the HL flag of the terminal LPIIN is set, then a braking pitch count measurement H start drive processing operation is carried out (S4438). If it is determined that the HL flag of the terminal LPIIN is not set, then a braking pitch count measurement L start drive processing operation is carried out (S4436). The braking pitch count measurement L and H start drive processing operations will be explained later in detail.

Subsequently, the flow shifts to S4440, where the outputs of parallel terminals DC0, DC1, and DC2 are set L, L, and H, respectively, so that the motor 95 is placed into the wait state. Then, it is determined whether the HP detection flag is reset or not (S4442). If it is determined that the HP detection flag is reset, then the HP error of TELE wait driving is set (S4444), and the flow shifts to S4524 in FIG. 102.

If it is determined at S4442 that the HP detection flag is not reset, by contrast, then it is determined whether the LPIIN overtime is set or not (S4446). If it is determined that the LPIIN overtime is set, then the flow shifts to S4524 in FIG. 102. If it is determined that the LPIIN overtime is not set, by contrast, then the flow shifts to S4448 in FIG. 101.

At S4448, a readout processing operation for the terminal LHPIN is carried out. Subsequently, the HP rising is set (S4456). Then, it is determined whether the terminal LHPIN is at L or not (S4458). If it is determined that the terminal LHPIN is not at L, then the flow shifts to S4524 in FIG. 102. If it is determined that the terminal LHPIN is at L, by contrast, then the flow shifts to S4460.

At S4460, the sum of the focus drive HP count data (E_P_HP), focus drive backlash count data (E_P_FCGB), focus drive HP detection margin pitch count data (D_P_MARGIN), and focus driving over-pitch number (C_FCOV) is set as the focus count 0. Subsequently, 0 is set as the focus count HP (S4462), and the sum of the focus drive HP "H" section pitch count data (E_P_HP_H) and focus wait position pitch count data (E_P_TAIKI) is set as the focus count SUM (S4464).

Then, doubled focus drive first speed count data (E_P_LD2N1) and 20 pitches are subtracted from the focus count SUM, and thus obtained value is set as the focus count 1 (S4466). Subsequently, it is determined whether the focus count 1 is at most 0 or not (S4468). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S4470).

Subsequently, the value obtained when the focus drive brake pitch count data (E_P_FCBRK) is subtracted from the focus drive second speed count data (E_P_LD2N2) is set as the focus count pulse (S4472). Then, doubled focus drive first speed count data (E_P_LD2N1) is subtracted from the focus count SUM, thus obtained value is divided by 2, and the resulting value is set as the focus count 1 (S4473).

Subsequently, it is determined whether there is a remainder or not (S4474). If it is determined that there is a remainder, then the value obtained when the remainder is added to the focus count 2 is set as the focus count 2 (S4476), and the flow shifts to S4478. If it is determined that there is no remainder, by contrast, then the flow directly shifts to S4478, where the focus count 1 is set as the event count. Thereafter, the flow shifts to S4496 in FIG. 102.

If it is determined at S4468 that the focus count 1 is at most 0, then the value obtained when the focus drive second speed count data (E_P_LD2N2) is subtracted from the focus count SUM is set as the focus count 2 (S4480).

Subsequently, it is determined whether the focus count 2 is at most 0 or not (S4482). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S4484). Subsequently, 0 is set as the focus count 1, and the flow shifts to S4496 in FIG. 102.

If it is determined at S4482 that the focus count 2 is at most 0, then the value obtained when the focus drive brake pitch count data (E_P_FCBRK) is subtracted from the focus count SUM is set as the focus count pulse (S4488).

Subsequently, the flow shifts to S4490, where it is determined whether the focus count pulse is at most 0 or not. If it is determined that the focus count pulse is at most 0, then the flow shifts to S4524 in FIG. 102. If it is determined not, by contrast, then 0 is set as the focus count 1 (S4492), and 0 is set as the focus count 2 (S4494). Thereafter, the flow shifts to S4496 in FIG. 102.

At S4496, the outputs of parallel terminals DC0, DC1, and DC2 are set L, L, and H, respectively, so that the motor 95 is placed into the wait state. Subsequently, the outputs of parallel terminals DC0, DC1, and DC2 are set L, H, and H, respectively, so as to carry out normal rotation driving (S4498).

Then, it is determined whether the HL flag of the terminal LPIIN is set or not (S4500). If it is determined that the HL flag of the terminal LPIIN is set, then a zero-order speed control H start drive processing operation is carried out (S4502). If it is determined not, by contrast, then a zero-order speed control L start drive processing operation is carried out (S4501). The zero-order control H and L start drive processing operations will be explained later in detail.

Subsequently, the flow shifts to S4504, where it is determined whether the LPIIN overtime is set or not. If it is determined that the LPIIN overtime is set, then the flow shifts to S4516. If it is determined not, by contrast, then the outputs of parallel terminals DC0, DC1, and DC2 are set L, L, and H, respectively, so that the motor 95 is placed into the wait state (S4506). Subsequently, the outputs of parallel terminals DC0, DC1, and DC2 are set H, H, and H, respectively, so as to attain the brake output state (S4508).

Subsequently, it is determined whether the HL flag of the terminal LPIIN is set or not (S4510). If it is determined that the HL flag of the terminal LPIIN is set, then a braking pitch count measurement H start drive processing operation is carried out (S4514). If it is determined not, then a braking pitch count measurement L start drive processing operation is carried out (S4512). The braking pitch count measurement H and L start drive processing operations will be explained later in detail.

Subsequently, the flow shifts to S4516, where the outputs of parallel terminals DC0, DC1, and DC2 are set L, L, and H, respectively, so that the motor 95 is placed into the wait state. Then, it is determined whether the HP detection flag is reset or not (S4518). If it is determined that the HP detection flag is reset, then the TELE wait error is set (S4522), and the flow shifts to S4524.

At S4524, the focus error is set. Subsequently, the lens barrel error is set (S4526), and the recovery inhibition is set (S4528). Then, the flow shifts to S4532.

If it is determined at S4518 that the HP detection flag is not reset, by contrast, then it is determined whether the LPIIN overtime is set or not (S4520). If it is determined that the LPIIN overtime is set, then the flow shifts to S4524. If it is determined that the LPIIN overtime is not set, by contrast, then the flow shifts to S4532.

At S4532, the outputs of parallel terminals DC0, DC1, and DC2 are set L, L, and L, respectively, so that the motor 95 is placed into the wait state. Subsequently, the terminal LHPIN is set as the output port (S4534). Then, after a wait of 2 ms (S4536), the focus power is reset (S4538), the driver ON/OFF terminal CE is set L, so as to place the driver section 219 into the inactive state (S4540), the operation mode of the CPU 200 is set to a medium speed mode (S4542), and a focus error EEPROM writing processing operation is carried out (S4544). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the focus TELE wait movement processing operation is terminated.

As in the foregoing, the wait position of the second lens group 102 is changed beforehand according to the lens barrel position, whereby the moving distance of the second lens group for focusing can be shortened at the time of photographing in the focus TELE wait movement processing operation. Therefore, the time parallax upon photographing can be reduced.

When the second lens group 102 (focus) is driven from the WIDE wait position to rotate in reverse, the pulse drive control at a lower speed is carried out as shown in FIG. 97 after the HP (home position) serving as a reference position is detected. Consequently, the second lens group 102 can be prevented from colliding with the stopper due to its impetus upon movement, whereby gears can be kept from meshing with each other upon the collision and failing to rotate in reverse, which might have become a severe failure, for example.

Also, as shown in FIG. 97, the zero-order speed control at a speed lower than that of the first speed control, DC driving, or the like is carried out before the second lens group 102 passes the HP when moved. As a consequence, the HP can be detected precisely. Therefore, the second lens group 102 can be moved precisely upon focusing, whereby the focusing accuracy can be improved.

The focus WIDE wait movement processing operation will now be explained.

Figure 103:
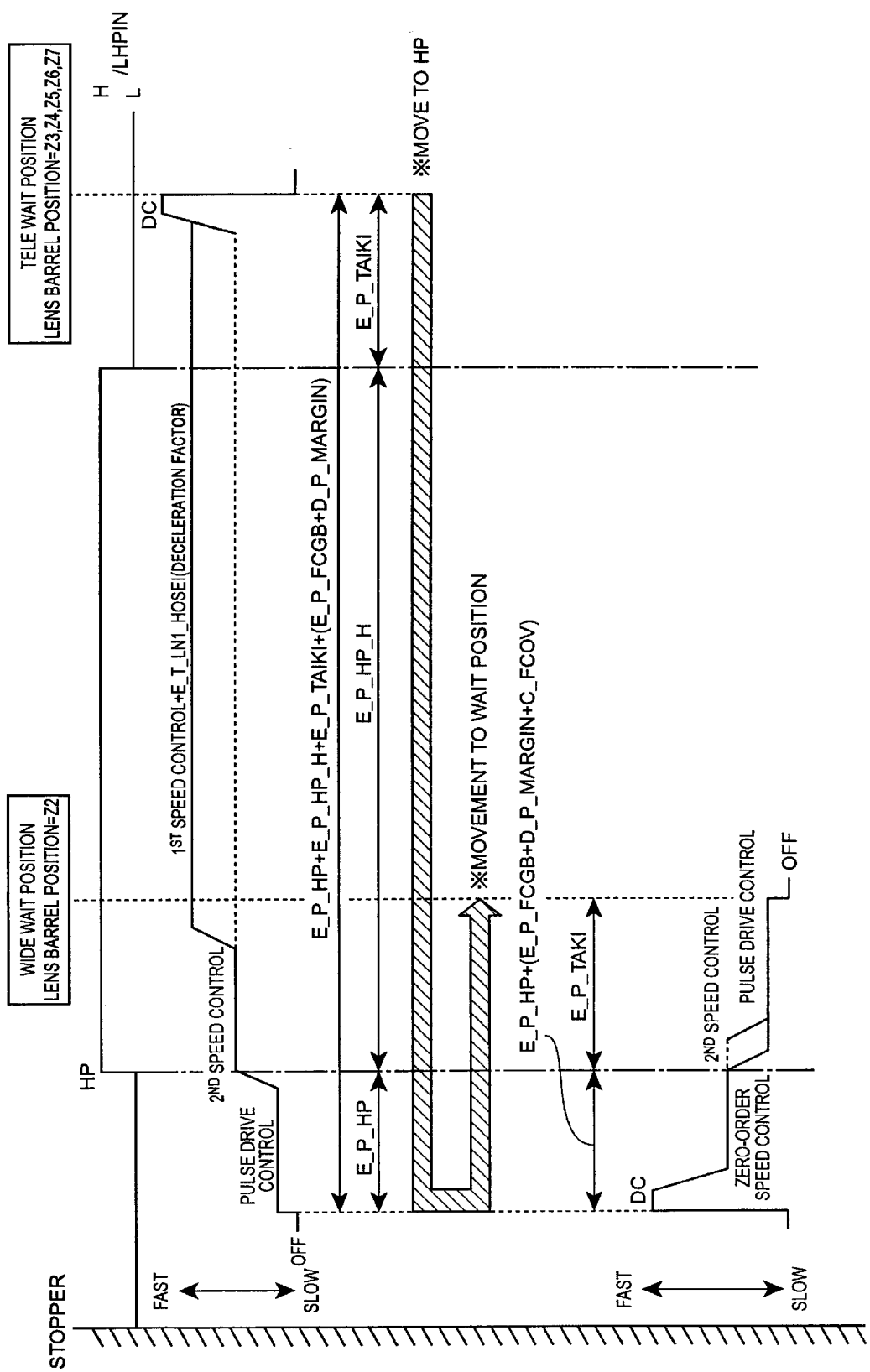
FIG. 103 is an operational chart for explaining a focus WIDE wait movement processing operation of the camera equipped with the lens barrel of FIG. 1.

FIG. 103 shows an operational chart for explaining the focus WIDE wait movement processing operation. FIGS. 104 to 108 show flowcharts of the focus WIDE wait movement processing operation.

As shown in FIG. 103, the focus WIDE wait movement processing operation is an operation by which, when the lens barrel position is moved to Z1 or Z2 from Z3 to Z7 upon manipulating the WIDE switch 20, the second lens group 102 (focus) is moved from the TELE wait position to the WIDE wait position.

Figure 104:
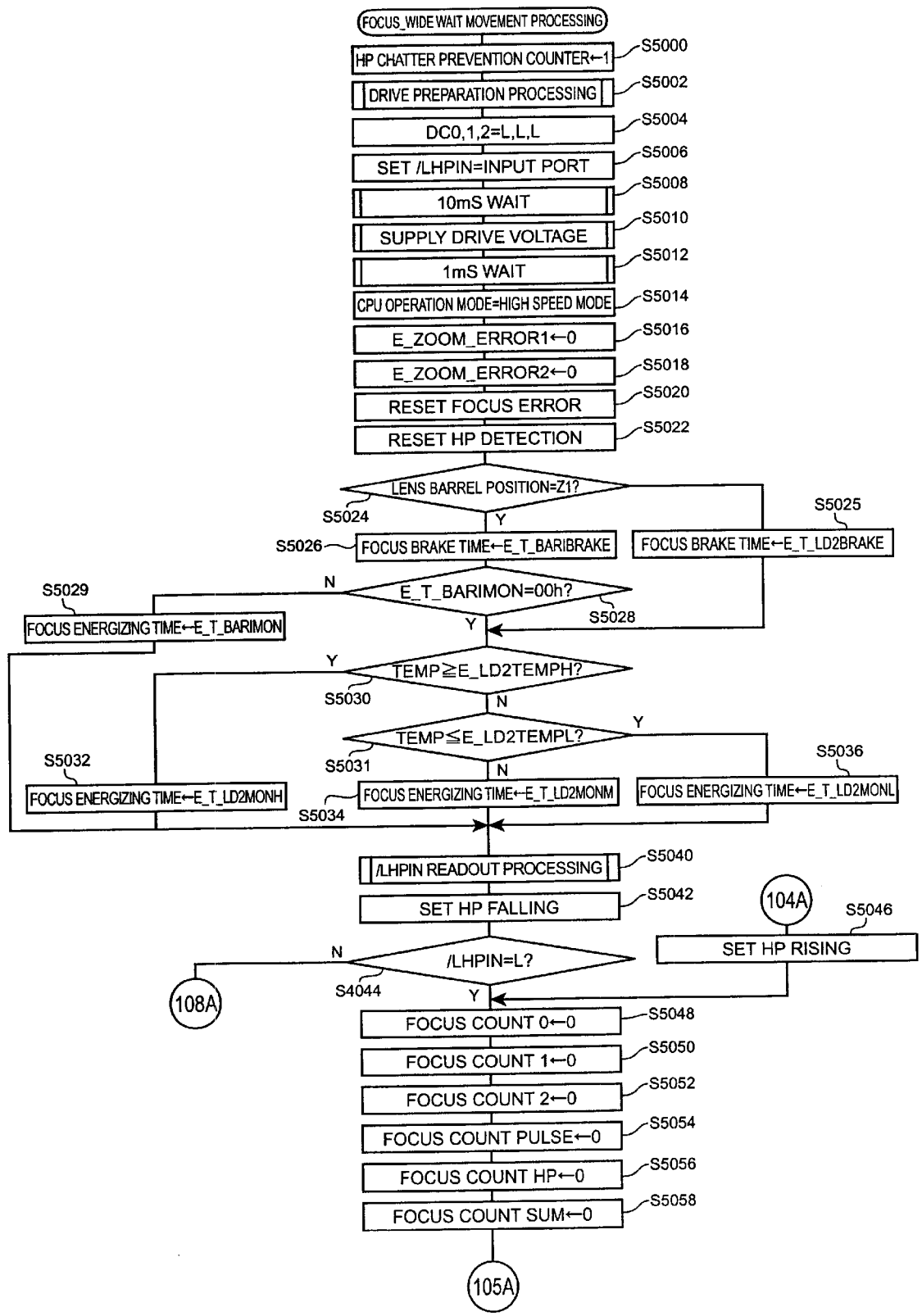
FIG. 104 is a flowchart for explaining the focus WIDE wait movement processing operation of the camera equipped with the lens barrel of FIG. 1.

In the focus WIDE wait movement processing operation, as shown at S5000 in FIG. 104, 1 is initially set as the HP (home position) chatter prevention counter. Subsequently, a drive preparation processing operation is carried out, so that the motor 95 of the focus driving section 221 is selected as the motor to drive (S5002). Then, the flow shifts to S5004, where the outputs of parallel terminals DC0, DC1, and DC2 are set L, L, and L, respectively, so that the motor 95 is placed into the wait state. Thereafter, the terminal LHPIN is set as the input port (S5006) and, after a wait of 10 ms (S5008), the voltage output to the focus motor is enabled (S5010).

Subsequently, after a wait of 1 ms (S5012), the operation mode of CPU 200 is set to the high speed mode (S5014). The change of the operation mode to the high speed mode is carried out by changing the base clock of the CPU 200, for example.

Then, the lens barrel control error code 1 (E_ZOOM_ERROR1) is reset (S5016), the lens barrel control error code 2 (E_ZOOM_ERROR2) is reset (S5018), the focus error is reset (S5020), and the HP (home position) detection is reset (S5022).

Subsequently, the flow shifts to S5024, where it is determined whether the lens barrel position is set at Z1 or not. If it is determined not, then focus drive brake time data (E_T_LD2BRAKE) is set as the focus brake time (S5025).

Thereafter, the flow shifts to S5030. If it is determined at S5024 that the lens barrel position is set at Z1, then barrier operating focus brake time (E_T_BARIBRAKE) is set as the focus brake time (S5026). As the barrier operating focus brake time (E_T_BARIBRAKE), a time shorter than the focus drive brake time data (E_T_LD2BRAKE) is set.

Subsequently, the flow shifts to S5028, where it is determined whether 00h is set as the barrier operating focus drive energizing time (E_T_BARIMON) or not. If it is determined not, then doubled barrier operating focus drive energizing time (E_T_BARIMON) is set as the focus energizing time (S5029). Subsequently, the flow shifts to S5040.

If it is determined that 00h is set as the barrier operating focus drive energizing time, by contrast, then the flow shifts to S5030, where it is determined whether the temperature (TEMP) measured in the power ON/OFF temperature measurement processing operation (see S112 in FIG. 19) is at least the high-temperature set temperature (E_LD2TEMPH) or not. If it is determined that the measured temperature is at least the high-temperature set temperature, then high-temperature focus drive energizing time data (E_T_LD2MONH) is set as the focus energizing time (S5032).

If it is determined at S5030 that the measured temperature is not at least the high-temperature set temperature, then it is determined whether the measured temperature (TEMP) is at most the low-temperature set temperature (E_LD2TEMPL) or not (S5031). If it is determined that the measured temperature is at most the low-temperature set temperature, then low-temperature focus drive energizing time data (E_T_LD2MONL) is set as the focus energizing time (S5036). If it is determined that the measured temperature is not at most the low-temperature set temperature, by contrast, then room-temperature focus drive energizing time data (E_T_LD2MONM) is set as the focus energizing time (S5034).

In the high-temperature focus drive energizing time data (E_T_LD2MONH), a time shorter than that in the room-temperature focus drive energizing time data (E_T_LD2MONM) is set. In the room-temperature focus drive energizing time data (E_T_LD2MONM), a time shorter than that in the low-temperature focus drive energizing time data (E_T_LD2MONL) is set.

Subsequently, the flow shifts to S5040, where the input of the terminal LHPIN is read out (S5042). Thereafter, the HP falling is set (S5042). Subsequently, it is determined whether the terminal LHPIN is at L or not. If it is determined that the terminal LHPIN is not at L, then the flow shifts to S5250 in FIG. 108. If it is determined that the terminal LHPIN is at L, by contrast, then the flow shifts to S5048.

At S5048, 0 is set as the focus count 0. Subsequently, 0 is set as the focus count 1 (S5050), 0 is set as the focus count 2 (S5052), and 0 is set as the focus count pulse (S5054). Then, the flow shifts to S5056, where 0 is set as the focus count HP, and 0 is set as the focus count SUM (S5058).

Here, the "focus count 0," "focus count 1," "focus count 2," "focus count pulse," "focus count HP," and "focus count SUM" are similar to those in the above-mentioned second lens drive processing operation.

Figure 105:
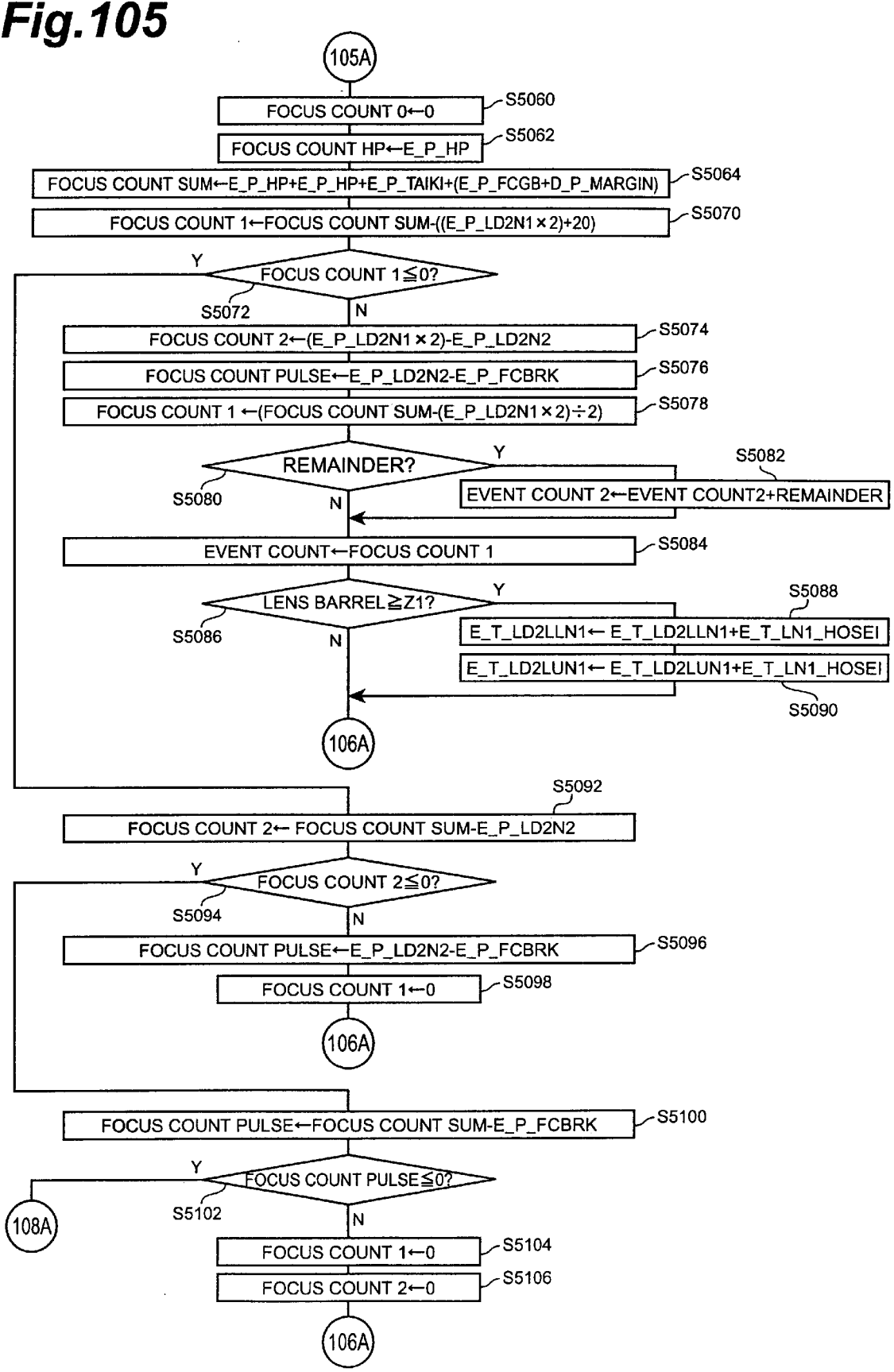
FIG. 105 is a flowchart for explaining the focus WIDE wait movement processing operation of the camera equipped with the lens barrel of FIG. 1.

Subsequently, the flow shifts to S5060 in FIG. 105, where 0 is set as the focus count 0. Then, focus drive HP count data (E_P_HP) is set as the focus count HP (S5062). Thereafter, the sum of the focus drive HP count data (E_P_HP), focus drive HP "H" section pitch count data (E_P_HP_H), focus drive HP focus wait position pitch count data (E_P_TAIKI), focus drive backlash count data (E_P_FCGB), and focus drive HP detection margin pitch count data (D_P_MARGIN) is set as the focus count SUM (S5064).

Subsequently, the focus drive first speed count data (E_P_LD2N1) is doubled, 20 is added thereto, thus obtained value ((E_P_LD2N1*2)+20) is subtracted from the focus count SUM, and the resulting value is set as the focus count 1 (S5070).

Thereafter, it is determined whether the focus count 1 is at most 0 or not (S5072). If it is determined that the focus count 1 is not at most 0, then the focus drive first speed count data (E_P_LD2N1) is doubled, the focus drive second speed count data (E_P_LD2N2) is subtracted therefrom, and thus obtained value is set as the focus count 2 (S5074).

Subsequently, the value obtained when focus drive brake pitch count data (E_P_FCBRK) is subtracted from the focus drive second speed count data (E_P_LD2N2) is set as the focus count pulse (S5076). Then, doubled focus drive first speed count data (E_P_LD2N1) is subtracted from the focus count SUM, thus obtained value is divided by 2, and the resulting value is set as the focus count 1 (S5078). Subsequently, it is determined whether there is a remainder or not (S5080). If it is determined that there is a remainder, then the value obtained when the remainder is added to the focus count 2 is set as the focus count 2 (S5082), and the flow shifts to S5084. If it is determined that there is no remainder, by contrast, then the flow directly shifts to S5084, where the focus count 1 is set as the event count.

Subsequently, it is determined whether the lens barrel position is at Z1 or not (S5086). If it is determined that the lens barrel position is at Z1, then the value obtained when focus drive first speed deceleration time (E_T_LN1_HOSEI) is added to the focus drive first speed lower limit pulse time (E_T_LD2LLN1) is set as the focus drive first speed lower limit pulse time (E_T_LD2LLN1) (S5088). Thereafter, the value obtained when the focus drive first speed deceleration time (E_T_LN1_HOSEI) is added to the focus drive first speed upper limit pulse time (E_T_LD2LUN1) is set as the focus drive first speed upper limit pulse time (E_T_LD2LUN1) (S5090). Subsequently, the flow shifts to S5108 in FIG. 106.

Figure 106:
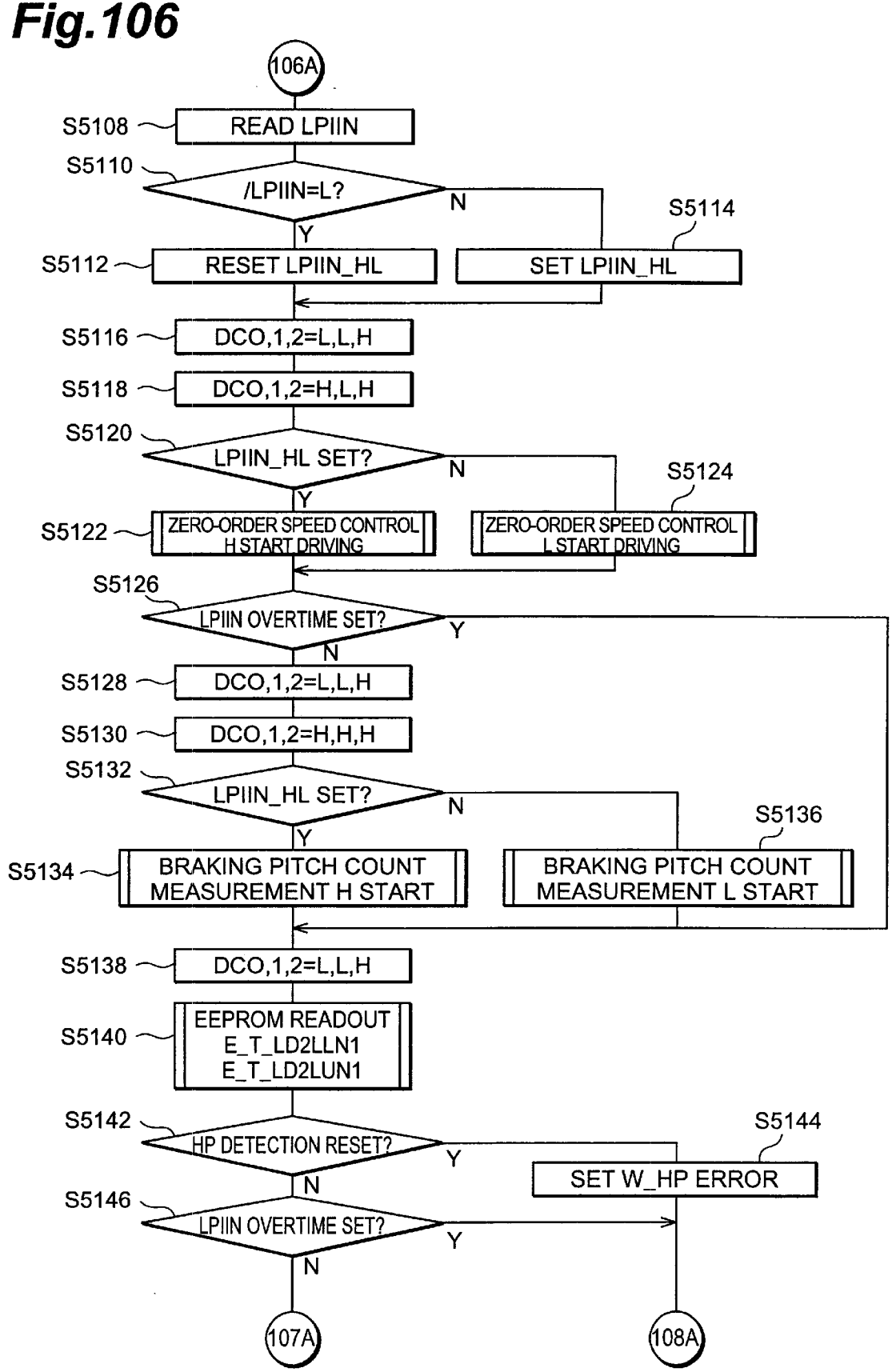
FIG. 106 is a flowchart for explaining the focus WIDE wait movement processing operation of the camera equipped with the lens barrel of FIG. 1.

If it is determined at S5086 that the previous lens barrel position is not at Z1, then the flow shifts to S5108 in FIG. 106.

If it is determined at S5072 that the focus count 1 is at most 0, then the value obtained when the focus drive second speed count data (E_P_LD2N2) is subtracted from the focus count SUM is set as the focus count 2 (S5092).

Subsequently, it is determined whether the focus count 2 is at most 0 or not (S5094). If it is determined that the focus count 2 is not at most 0, then the value obtained when the focus drive brake pitch count data (E_P_FCBRK) is subtracted from the focus drive second speed count data (E_P_L2N2) is set as the focus count pulse (S5096). Subsequently, 0 is set as the focus count 1 (S5098), and the flow shifts to S5108 in FIG. 106.

If it is determined at S5094 that the focus count 2 is at most 0, then the value obtained when the focus drive brake pitch count data (E_P_FCBRK) is subtracted from the focus count SUM is set as the focus count pulse (S5100).

Subsequently, the flow shifts to S5102, where it is determined whether the focus count pulse is at most 0 or not. If it is determined that the focus count pulse is not at most 0, then 0 is set as the focus count 1 (S5104). Thereafter, 0 is set as the focus count 2 (S5106), and the flow shifts to S5108 in FIG. 106. If it is determined that the focus count pulse is at most 0, by contrast, then the flow shifts to S5250 in FIG. 108.

The terminal LPIIN (see FIG. 16) receiving the output of detector 96 is read out at S5108 in FIG. 106, and it is determined whether the terminal LPIIN is at L or not (S5110). If it is determined that the terminal LPIIN is at L, then the HL flag of the terminal LPIIN is reset (S5112). If it is determined that the terminal LPIIN is not at L, by contrast, then the HL flag of the terminal LPIIN is set (S5114).

Subsequently, the flow shifts to S5116, where the outputs of parallel terminals DC0, DC1, and DC2 are set L, L, and H, respectively, so that the motor 95 is placed into the wait state. Then, the outputs of parallel terminals DC0, DC1, and DC2 are set H, L, and H, respectively, so as to carry out driving in reverse (S5118).

Thereafter, it is determined whether the HL flag of the terminal LPIIN is set or not (S5120). If it is determined that the HL flag of the terminal LPIIN is set, then a zero-order speed control H start drive processing operation is carried out (S5122). If it is determined not, by contrast, then a zero-order speed control L start drive processing operation is carried out (S5124). The zero-order speed control H and L start drive processing operations will be explained later in detail.

Subsequently, the flow shifts to S5126, where it is determined whether the LPIIN overtime is set or not. If it is determined that the LPIIN overtime is set, then the flow shifts to S5138. If it is determined not, by contrast, then the outputs of parallel terminals DC0, DC1, and DC2 are set L, L, and H, respectively, so as to place the motor 95 into the wait state (S5128). Thereafter, the outputs of parallel terminals DC0, DC1, and DC2 are set H, H, and H, respectively, so as to attain the brake output state (S5130).

Subsequently, it is determined whether the HL flag of the terminal LPIIN is set or not (S5132). If it is determined that the HL flag of the terminal LPIIN is set, then a braking pitch count measurement H start drive processing operation is carried out (S5134). If it is determined that the HL flag of the terminal LPIIN is not set, by contrast, then a braking pitch count measurement L start drive processing operation is carried out (S5136). The braking pitch count measurement L and H start drive processing operations will be explained later in detail.

Subsequently, the flow shifts to S5138, where the outputs of parallel terminals DC0, DC1, and DC2 are set L, L, and H, respectively, so that the motor 95 is placed into the wait state. Then, the flow shifts to S5140, where a readout processing operation for the EEPROM 218 is carried out. In this readout processing operation, the focus drive first speed upper limit pulse time (E_T_LD2LUN1) and focus drive first speed lower limit pulse time (E_T_LD2LLN1) are read out and set to their original values.

Subsequently, it is determined whether the HP detection flag is reset or not (S5142). If it is determined that the HP detection flag is reset, then the HP error of WIDE wait driving is set (S5144), and the flow shifts to S5250 in FIG. 108.

If it is determined at S5142 that the HP detection flag is not reset, then it is determined whether the LPIIN overtime is set or not (S5146). If it is determined that the LPIIN overtime is set, then the flow shifts to S5250 in FIG. 108. If it is determined not, by contrast, then the flow shifts to S5162 in FIG. 107.

Figure 107:
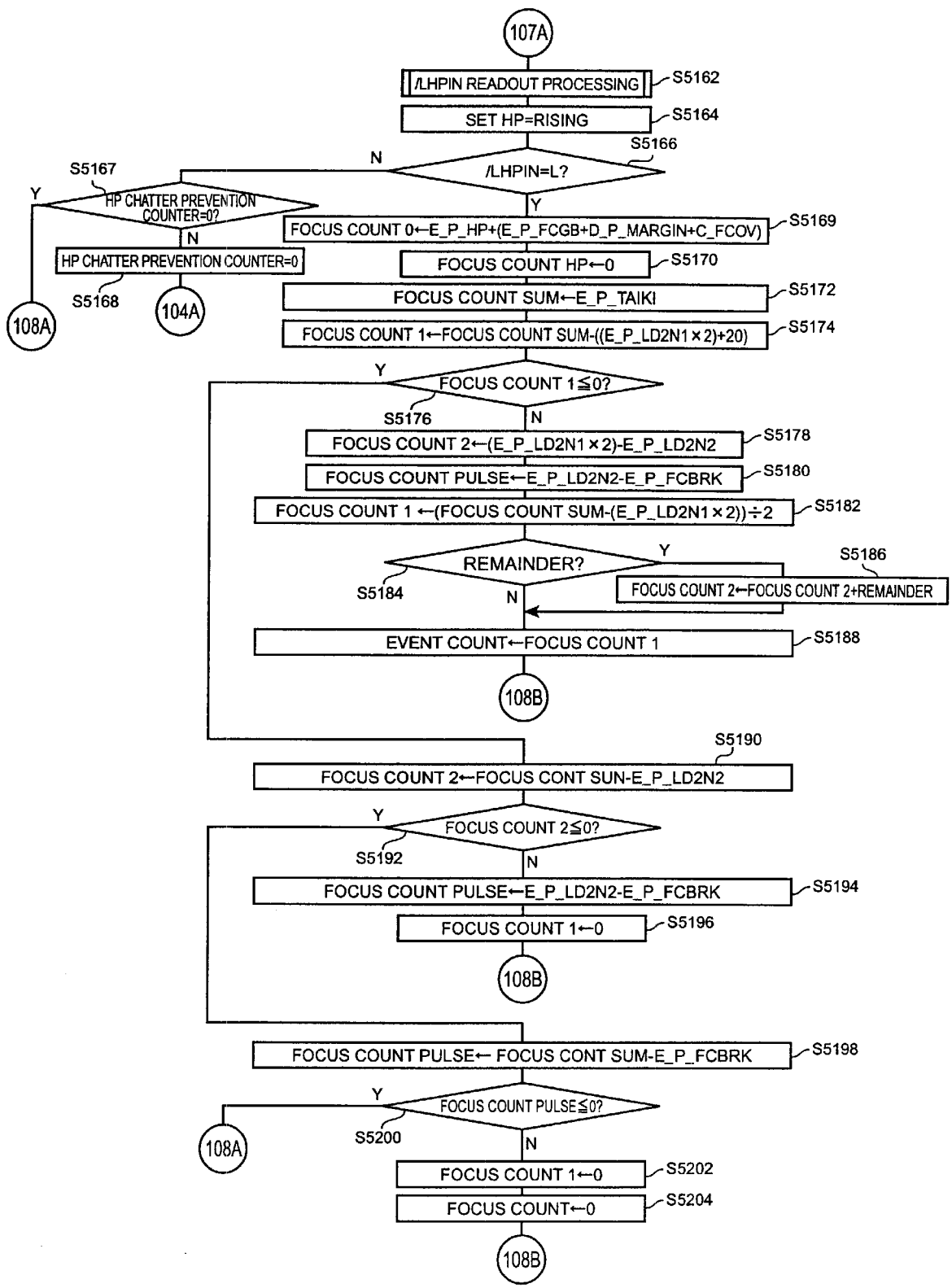
FIG. 107 is a flowchart for explaining the focus WIDE wait movement processing operation of the camera equipped with the lens barrel of FIG. 1.
Figure 108:
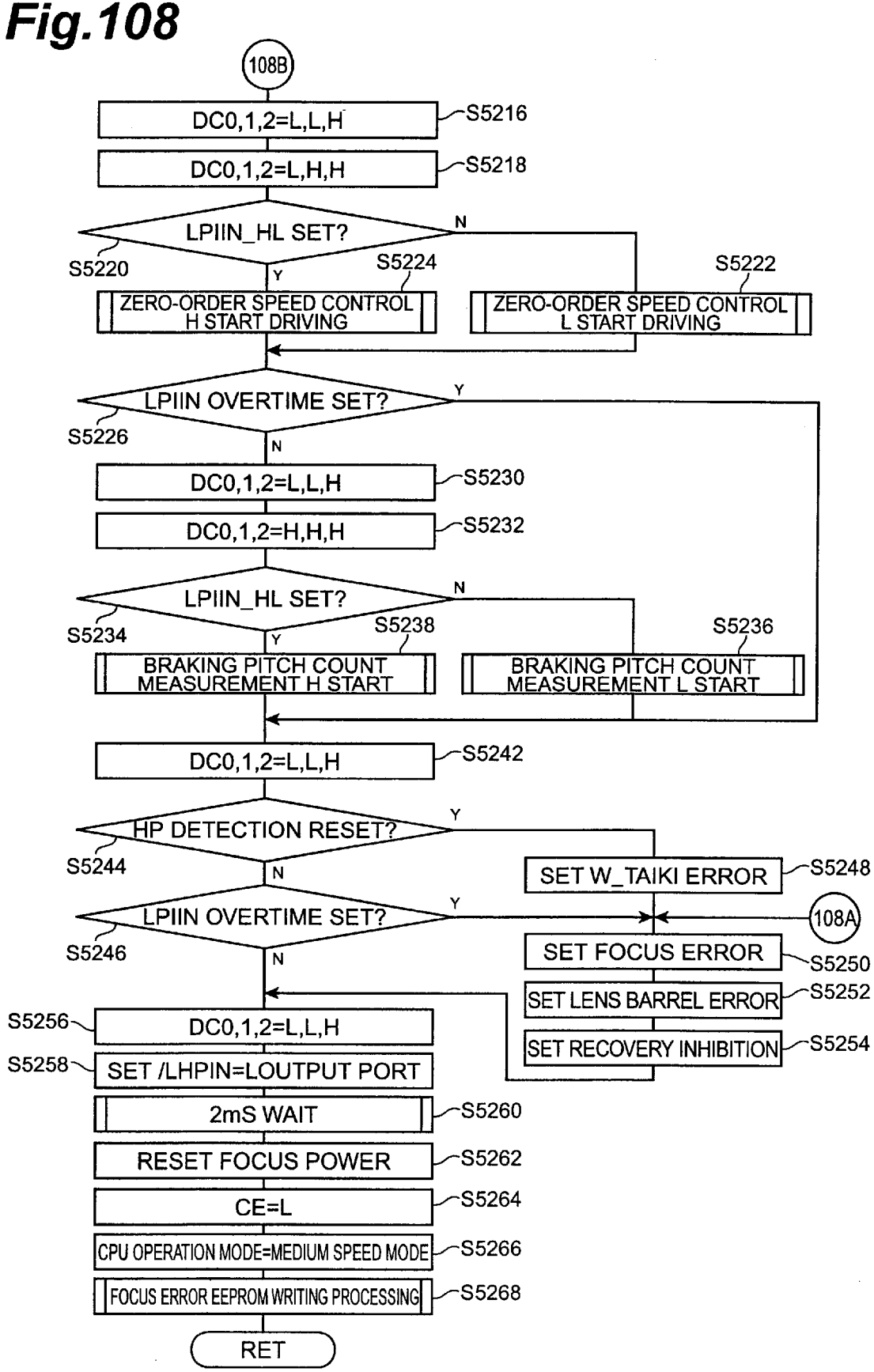
FIG. 108 is a flowchart for explaining the focus WIDE wait movement processing operation of the camera equipped with the lens barrel of FIG. 1.

At S5162 in FIG. 107, a readout processing operation for the terminal LHPIN is carried out. Subsequently, the HP rising is set (S5164), and it is determined whether the terminal LHPIN is at L or not (S5166). If it is determined that the terminal LHPIN is not at L, then it is determined whether the HP chatter prevention counter is at 0 or not (S5167). If it is determined that the HP chatter prevention counter is at 0, then the flow shifts to S5250 in FIG. 108. If it is determined that the HP chatter prevention counter is not at 0, by contrast, then 1 is subtracted from the value of HP chatter prevention counter, and the flow shifts to S5046 in FIG. 104. If it is determined at S5166 that the terminal LHPIN is at L, then the flow shifts to S5169.

At S5169, the sum of the focus drive HP count data (E_P_HP), focus drive backlash count data (E_P_FCGB), focus drive HP detection margin pitch count data (D_P_MARGIN), and focus driving over-pitch number (C_FCOV) is set as the focus count 0. Subsequently, 0 is set as the focus count HP (S5170), and focus wait position pitch count data (EP_TAIKI) is set as the focus count SUM (S5172).

Then, doubled focus drive first speed count data (E_P_LD2N1) and 20 pitches are subtracted from the focus count SUM, and thus obtained value is set as the focus count 1 (S5174). Subsequently, it is determined whether the focus count 1 is at most 0 or not (S5176). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S5178).

Subsequently, the value obtained when the focus drive brake pitch count data (E_P_FCBRK) is subtracted from the focus drive second speed count data (E_P_LD2N2) is set as the focus count pulse (S5180). Then, doubled focus drive first speed count data (E_P_LD2N1) is subtracted from the focus count SUM, thus obtained value is divided by 2, and the resulting value is set as the focus count 1 (S5182). Subsequently, it is determined whether there is a remainder or not (S5184). If it is determined that there is a remainder, then the value obtained when the remainder is added to the focus count 2 is set as the focus count 2 (S5186), and the flow shifts to S5188. If it is determined that there is no remainder, by contrast, then the flow directly shifts to S5188, where the focus count 1 is set as the event count. Thereafter, the flow shifts to S5216 in FIG. 108.

If it is determined at S5176 that the focus count 1 is at most 0, then the value obtained when the focus drive second speed count data (E_P_LD2N2) is subtracted from the focus count SUM is set as the focus count 2 (S5190).

Subsequently, it is determined whether the focus count 2 is at most 0 or not (S5192). If it is determined that the focus count 2 is not at most 0, then the value obtained when the focus drive brake pitch count data (E_P_FCBRK) is subtracted from the focus drive second speed count data (E_P_L2N2) is set as the focus count pulse (S5196). Subsequently, 0 is set as the focus count 1, and the flow shifts to S5216 in FIG. 108.

If it is determined at S5192 that the focus count 2 is at most 0, then the value obtained when the focus drive brake pitch count data (E_P_FCBRK) is subtracted from the focus count SUM is set as the focus count pulse (S5198).

Subsequently, the flow shifts to S5200, where it is determined whether the focus count pulse is at most 0 or not. If it is determined that the focus count pulse is at most 0, then the flow shifts to S5250 in FIG. 108. If it is determined not, by contrast, then 0 is set as the focus count 1 (S5202), and 0 is set as the focus count 2 (S5204). Thereafter, the flow shifts to S5216 in FIG. 108.

At S5216, the outputs of parallel terminals DC0, DC1, and DC2 are set L, L, and H, respectively, so that the motor 95 is placed into the wait state. Subsequently, the outputs of parallel terminals DC0, DC1, and DC2 are set L, H, and H, respectively, so as to carry out normal rotation driving (S5218).

Then, it is determined whether the HL flag of the terminal LPIIN is set or not (S5220). If it is determined that the HL flag of the terminal LPIIN is set, then a zero-order speed control H start drive processing operation is carried out (S5224). If it is determined not, by contrast, then a zero-order speed control L start drive processing operation is carried out (S5222). The zero-order control H and L start drive processing operations will be explained later in detail.

Subsequently, the flow shifts to S5226, where it is determined whether the LPIIN overtime is set or not. If it is determined that the LPIIN overtime is set, then the flow shifts to S5242. If it is determined not, by contrast, then the outputs of parallel terminals DC0, DC1, and DC2 are set L, L, and H, respectively, so that the motor 95 is placed into the wait state (S5230). Subsequently, the outputs of parallel terminals DC0, DC1, and DC2 are set H, H, and H, respectively, so as to attain the brake output state (S5232).

Subsequently, it is determined whether the HL flag of the terminal LPIIN is set or not (S5234). If it is determined that the HL flag of the terminal LPIIN is set, then a braking pitch count measurement H start drive processing operation is carried out (S5238). If it is determined not, by contrast, then a braking pitch count measurement L start drive processing operation is carried out (S5236). The braking pitch count measurement H and L start drive processing operation will be explained later in detail.

Subsequently, the flow shifts to S5242, where the outputs of parallel terminals DC0, DC1, and DC2 are set L, L, and H, respectively, so that the motor 95 is placed into the wait state. Then, it is determined whether the HP detection flag is reset or not (S5244). If it is determined that the HP detection flag is reset, then the WIDE wait (W_TAIKI) error is set (S5248).

Thereafter, the flow shifts to S5250, where the focus error is set. Subsequently, the lens barrel error is set (S5252), and the recovery inhibition is set (S5254). Then, the flow shifts to S5256.

If it is determined at S5244 that the HP detection flag is not reset, by contrast, then it is determined whether the LPIIN overtime is set or not (S5246). If it is determined that the LPIIN overtime is set, then the flow shifts to S5250. If it is determined that the LPIIN overtime is not set, then the flow shifts to S5256.

At S5256, the outputs of parallel terminals DC0, DC1, and DC2 are set L, L, and L, respectively, so that the motor 95 is placed into the wait state. Subsequently, the terminal LHPIN is set as the L output port (S5258). Then, after a wait of 2 ms (S5260), the focus power is reset (S5262), the driver ON/OFF terminal CE is set L, so as to place the driver section 219 into the inactive state (S5264), the operation mode of the CPU 200 is set to the medium speed mode (S5266), and a focus error EEPROM writing processing operation is carried out (S5268). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the focus WIDE wait movement processing operation is terminated.

As in the foregoing, the wait position of the second lens group 102 is changed beforehand according to the lens barrel position, whereby the moving distance of the second lens group for focusing can be shortened at the time of photographing in the focus WIDE wait movement processing operation. Therefore, the time parallax upon photographing can be reduced.

When the second lens group 102 (focus) is driven from the TELE wait position to rotate in reverse, the pulse drive control at a lower speed is carried out as shown in FIG. 103 after the HP (home position) serving as a reference position is detected. Consequently, the second lens group 102 can be prevented from colliding with the stopper due to its impetus upon movement, whereby gears can be kept from meshing with each other upon the collision and failing to rotate in reverse, which might have become a severe failure, for example.

Also, as shown in FIG. 103, the zero-order speed control at a speed lower than that of the first speed control, DC driving, or the like is carried out before the second lens group 102 passes the HP when moved. As a consequence, the HP can be detected precisely. Therefore, the second lens group 102 can be moved precisely upon focusing, whereby the focusing accuracy can be improved.

The focus initial processing operation will now be explained.

Figure 109:
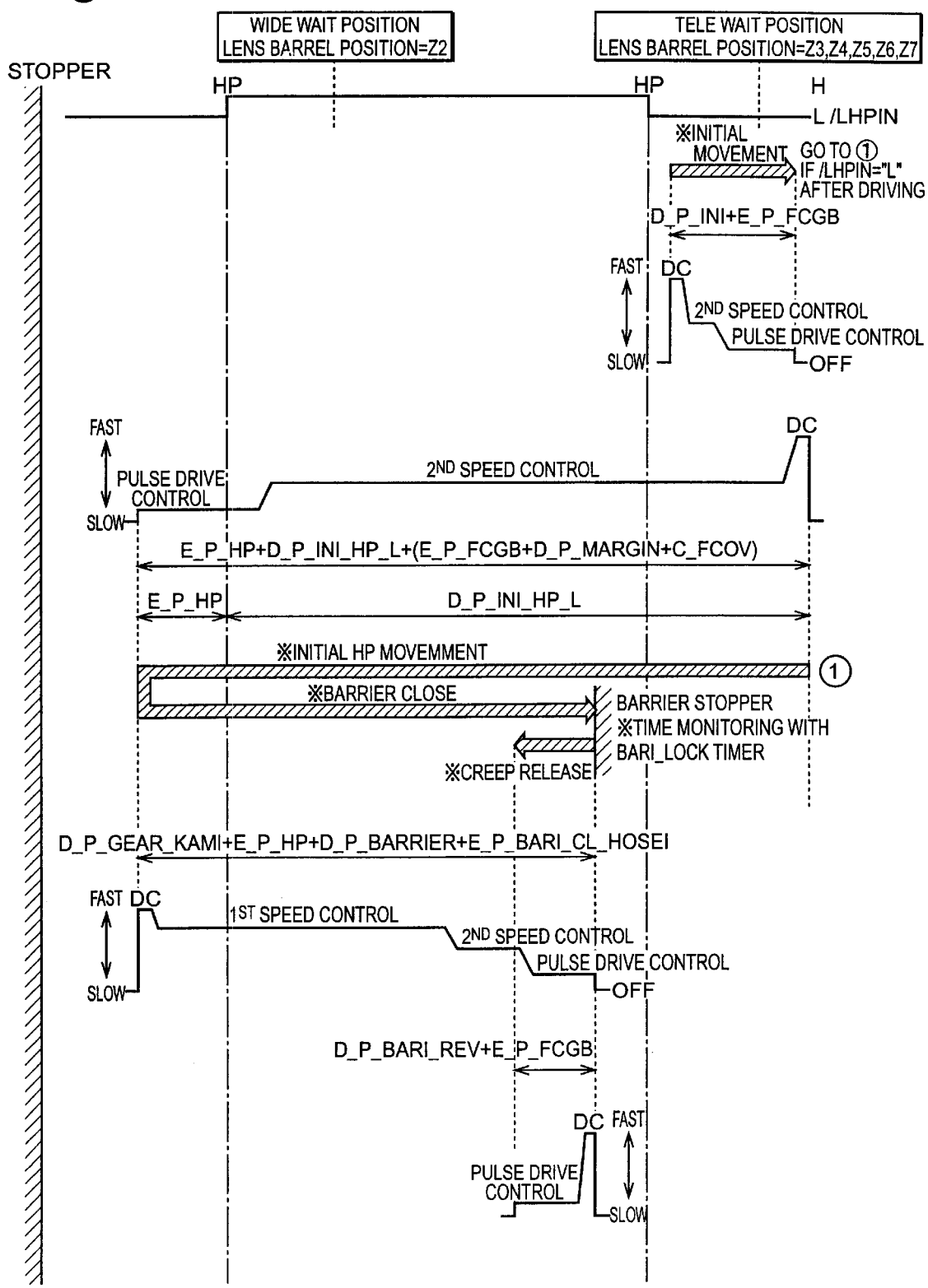
FIG. 109 is an operational chart for explaining a focus initial processing operation of the camera equipped with the lens barrel of FIG. 1.
Figure 110:
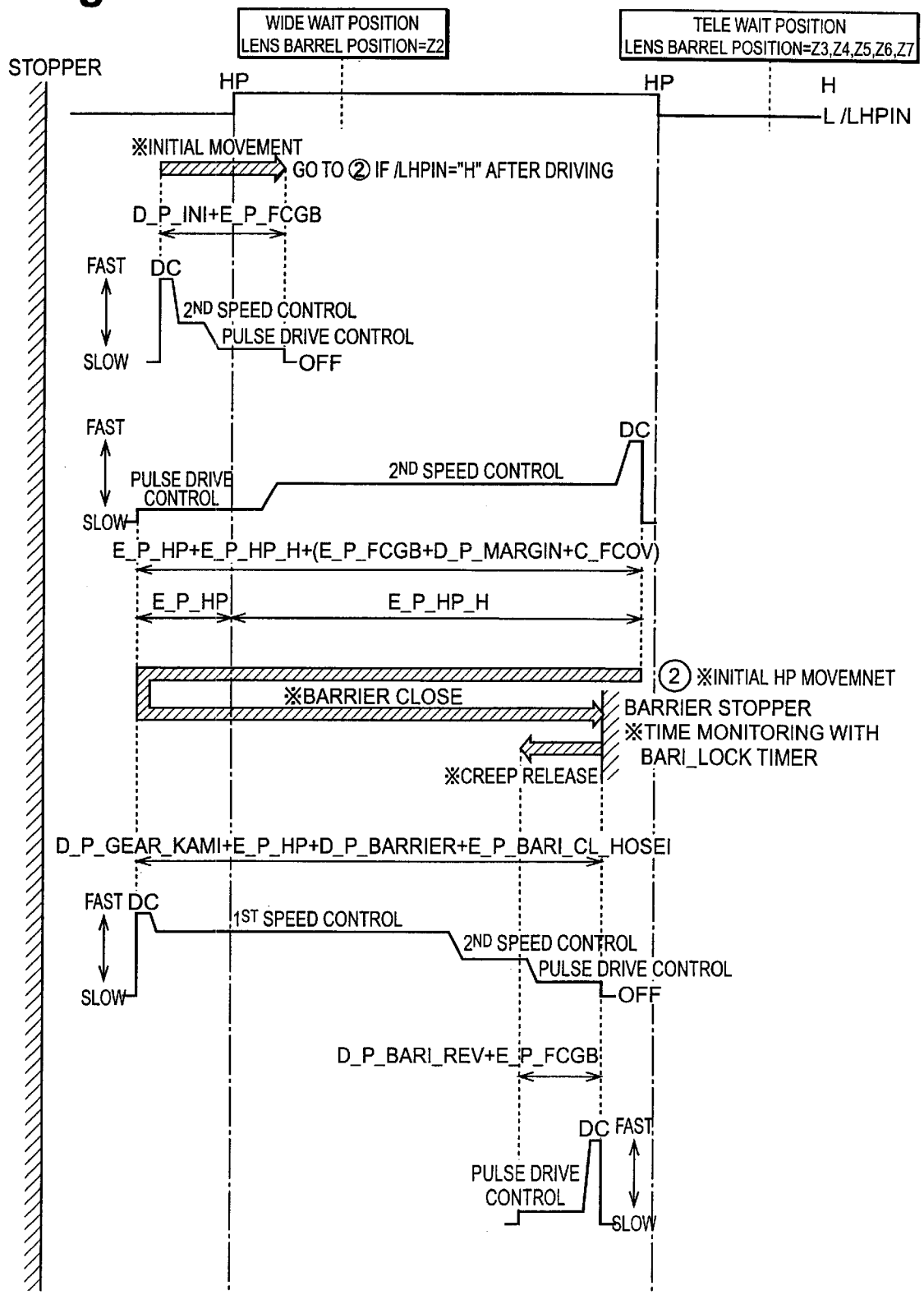
FIG. 110 is an operational chart for explaining a focus initial processing operation of the camera equipped with the lens barrel of FIG. 1.
Figure 111:
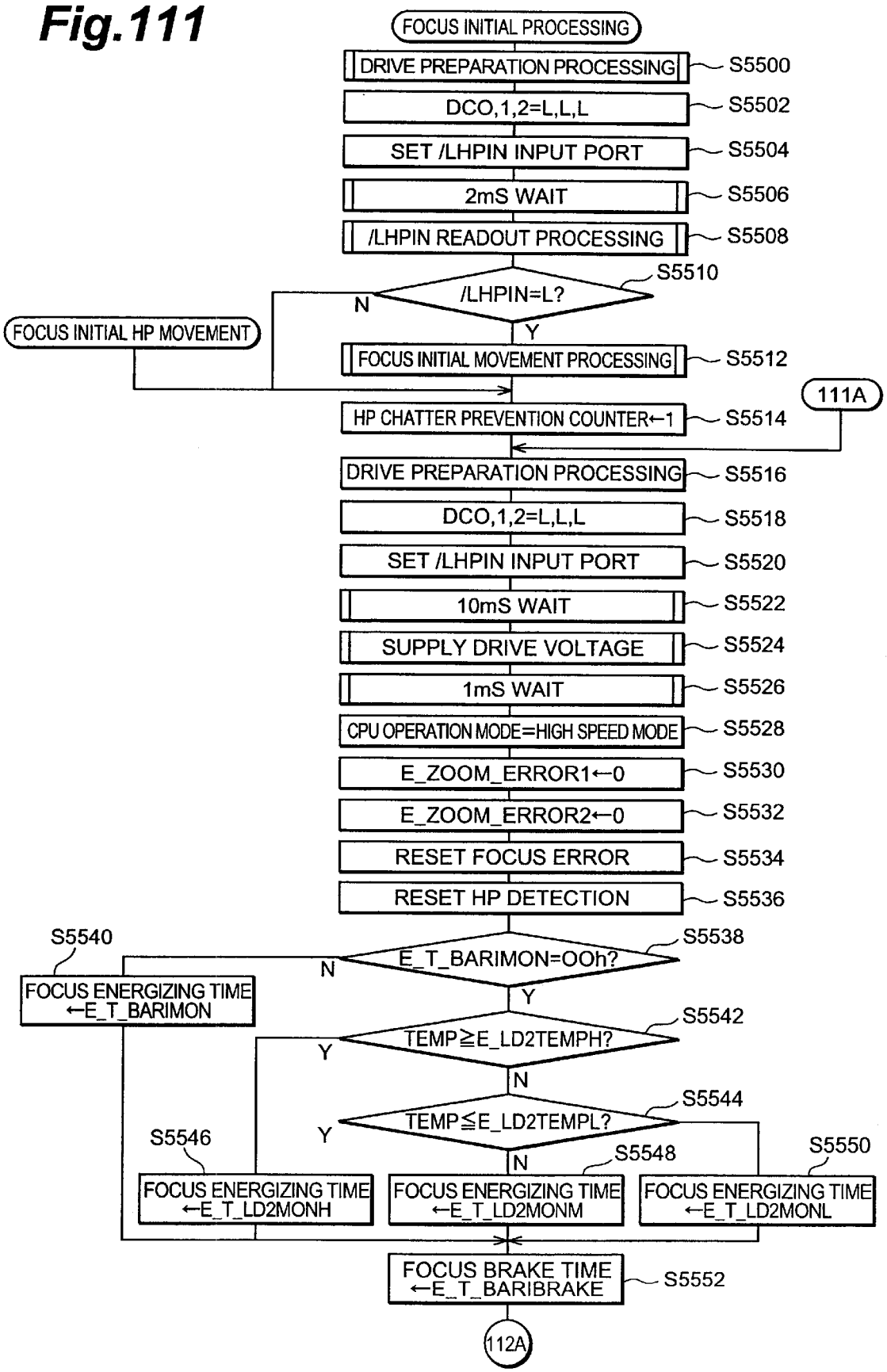
FIG. 111 is a flowchart of the focus initial processing operation of the camera equipped with the lens barrel of FIG. 1.
Figure 112:
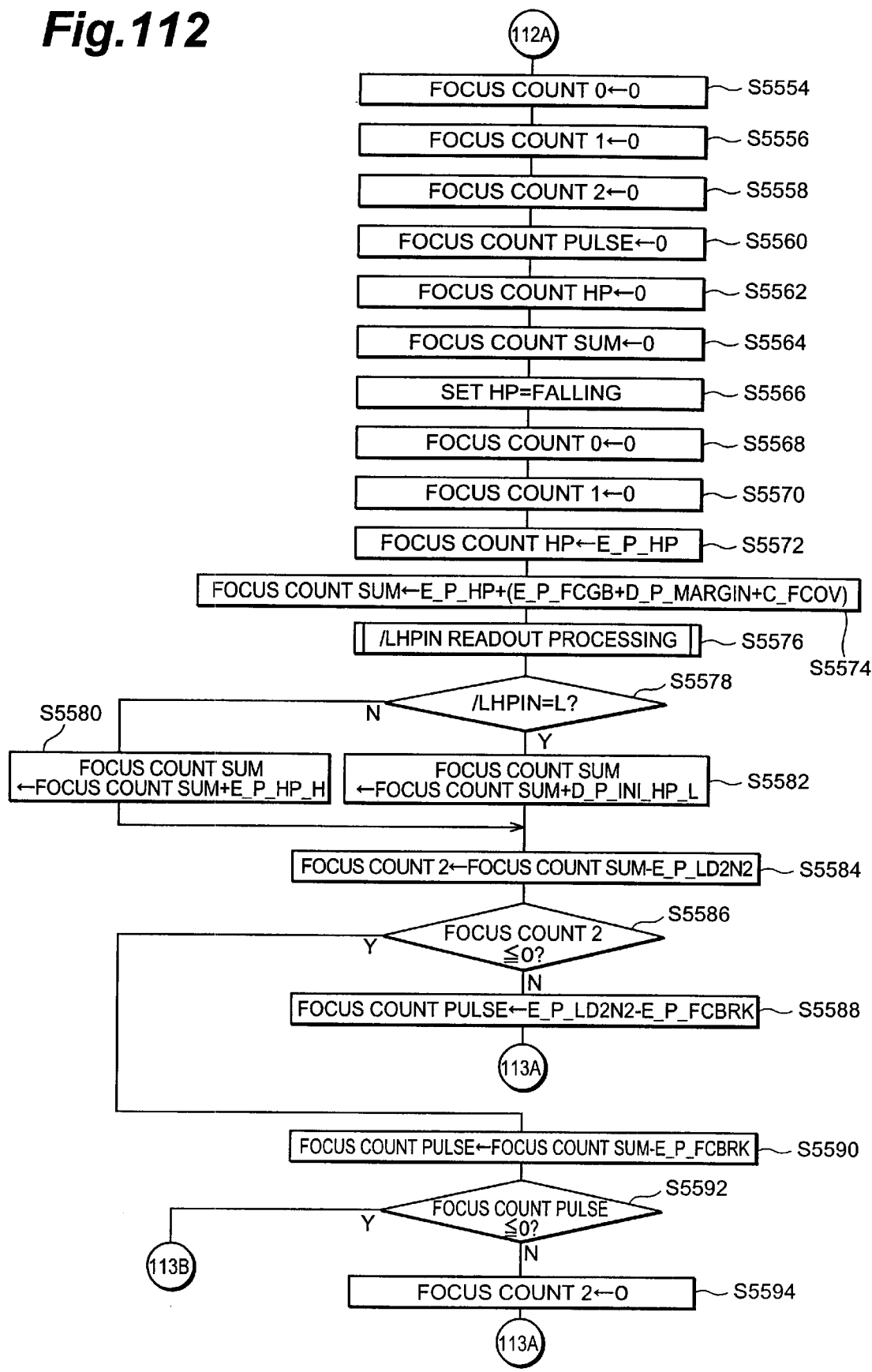
FIG. 112 is a flowchart of the focus initial processing operation of the camera equipped with the lens barrel of FIG. 1.
Figure 113:
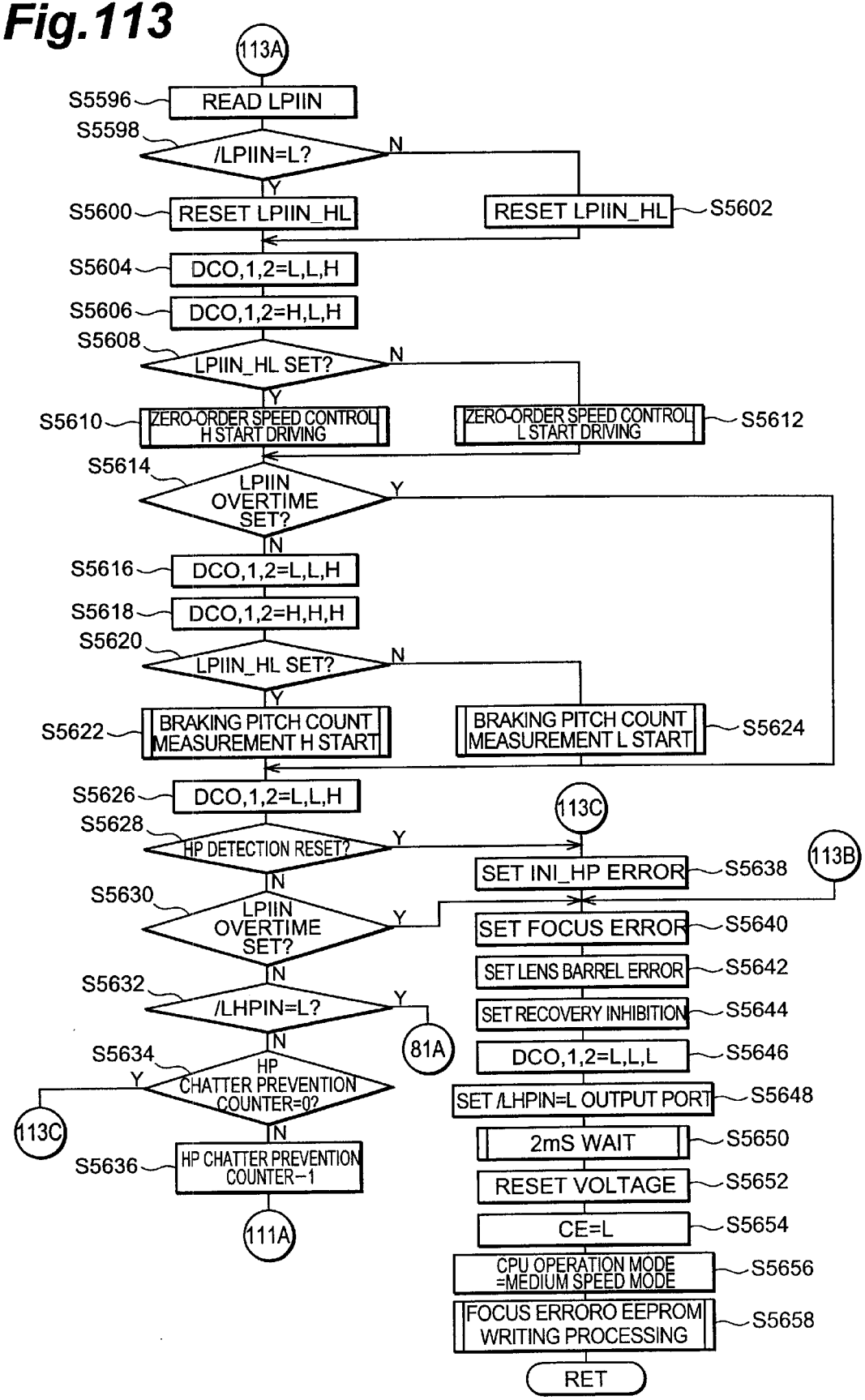
FIG. 113 is a flowchart of the focus initial processing operation of the camera equipped with the lens barrel of FIG. 1.
Figure 114:
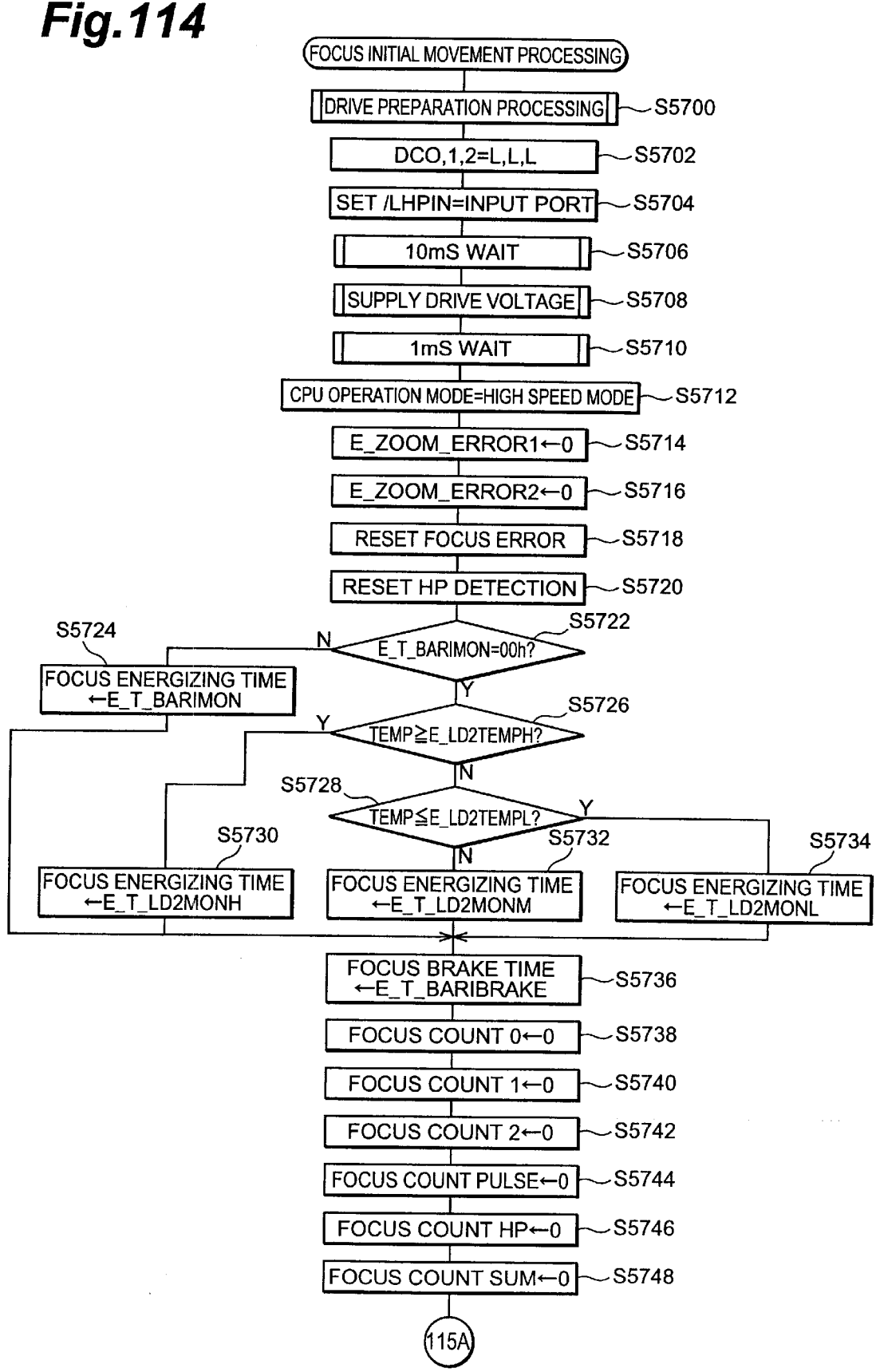
FIG. 114 is a flowchart of a focus initial movement processing operation of the camera equipped with the lens barrel of FIG. 1.
Figure 115:
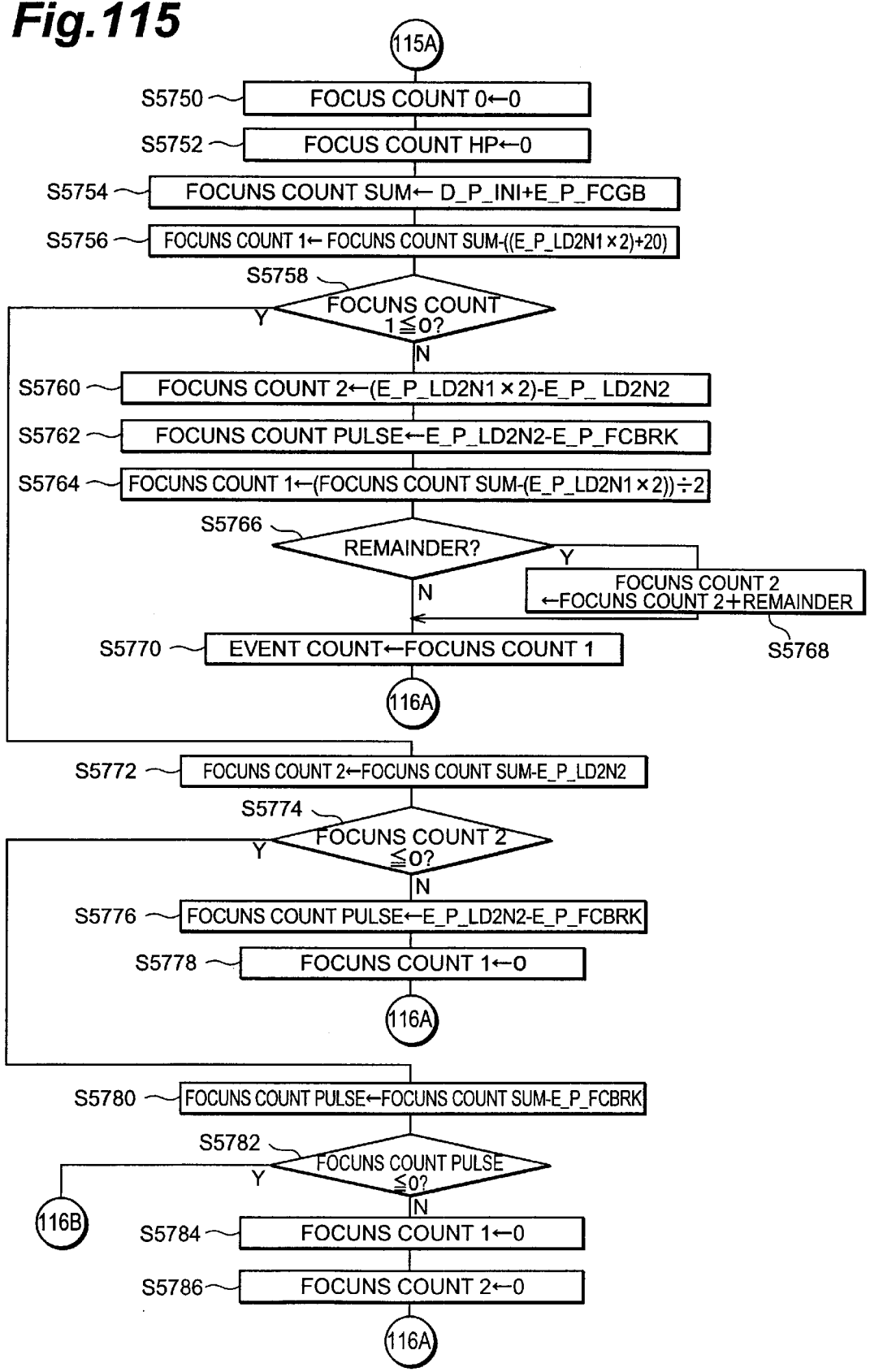
FIG. 115 is a flowchart of the focus initial movement processing operation of the camera equipped with the lens barrel of FIG. 1.
Figure 116:
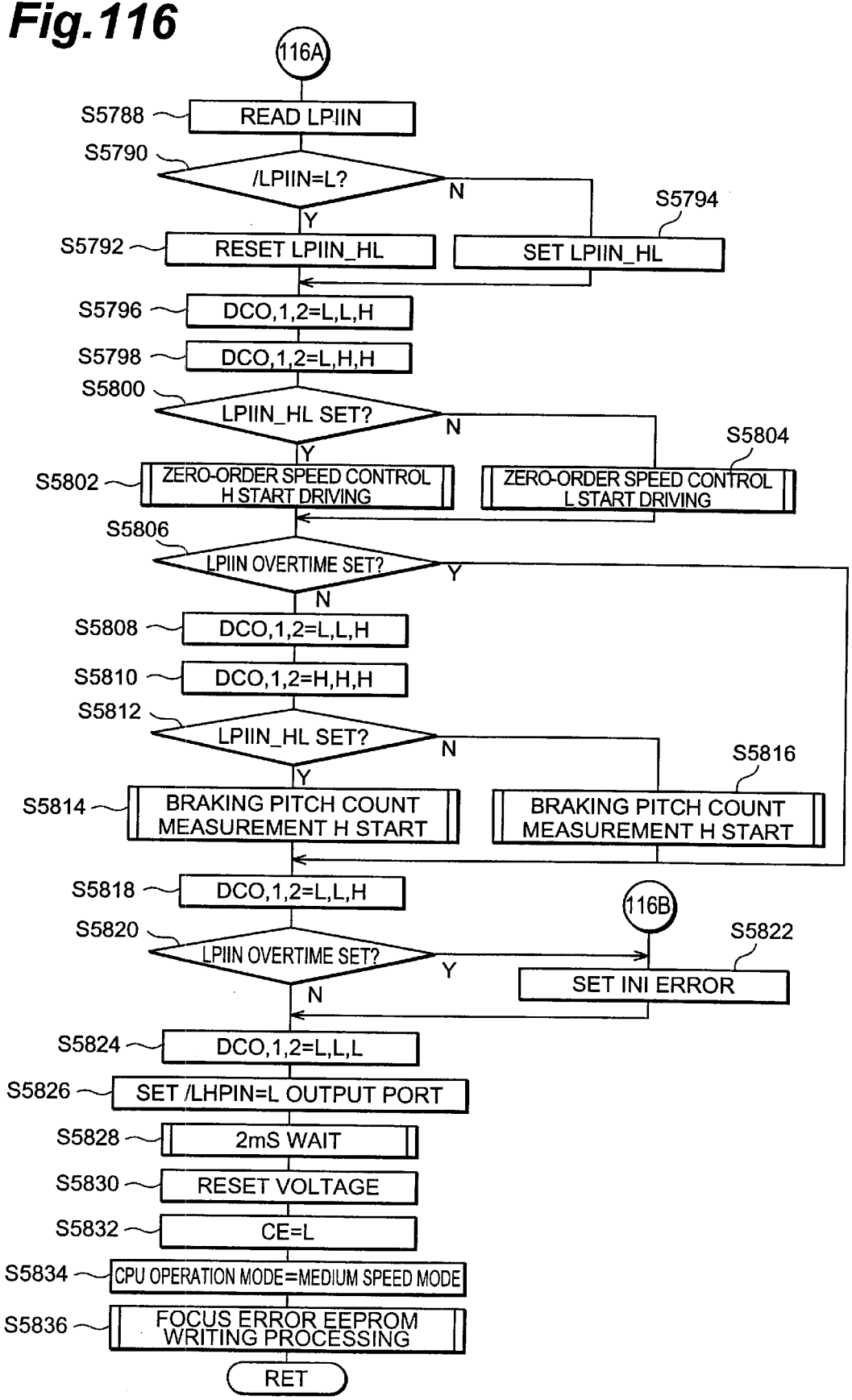
FIG. 116 is a flowchart of the focus initial movement processing operation of the camera equipped with the lens barrel of FIG. 1.

FIGS. 109 and 110 show operational views for explaining the focus initial processing operation, whereas FIGS. 111 to 113 show flowcharts of the focus initial processing operation. FIGS. 114 to 116 show flowcharts of a focus initial movement processing operation which is an operation carried out during the focus initial processing operation.

The focus initial processing operation is an operation (see FIG. 19), carried out in the initial processing upon battery loading, for detecting the position of the second lens group 102 (focus) and driving the motor 95 of the focus driving section 221, thereby closing the barrier.

In the focus initial processing operation, as shown at S5500 in FIG. 111, a drive preparation processing operation is initially carried out, so that the motor 95 of the focus driving section 221 is selected as the motor to drive. Then, the flow shifts to S5502, where the outputs of parallel terminals DC0, DC1, and DC2 are set L, L, and L, respectively, so that the motor 95 is placed into the wait state. Thereafter, the terminal LHPIN is set as the input port (S5504) and, after a wait of 10 ms (S5506), an LHPIN readout processing operation is carried out (S5508).

Subsequently, it is determined whether the terminal LPIIN is at L or not (S5510). If it is determined that the terminal LPIIN is at L, then a focus initial movement processing operation is carried out (S5512). The focus initial movement processing operation will be explained later in detail. Then, the flow shifts to S5514. If it is determined not, by contrast, then the flow directly shifts to S5514.

At S5514, 1 is initially set as the HP (home position) chatter prevention counter. Subsequently, a drive preparation processing operation is carried out, so that the motor 95 of the focus driving section 221 is selected as the motor to drive (S5516). Then, the flow shifts to S5518, where the outputs of parallel terminals DC0, DC1, and DC2 are set L, L, and L, respectively, so that the motor 95 is placed into the wait state. Thereafter, the terminal LHPIN is set as the input port (S5520) and, after a wait of 10 ms (S5522), the voltage output to the focus motor is enabled (S5524).

Subsequently, after a wait of 1 ms (S5526), the operation mode of CPU 200 is set to the high speed mode (S5528). Then, the lens barrel control error code 1 (E_ZOOM_ERROR1) is reset (S5530), the lens barrel control error code 2 (E_ZOOM_ERROR2) is reset (S5532), the focus error is reset (S5534), and the HP (home position) detection is reset (S5536).

Thereafter, the flow shifts to S5538, where it is determined whether 00h is set as the barrier operating focus drive energizing time (E_T_BARIMON) or not. If it is determined not, then doubled barrier operating focus drive energizing time (E_T_BARIMON) is set as the focus energizing time (S5540). Subsequently, the flow shifts to S5552.

If it is determined that 00h is set as the barrier operating focus drive energizing time, by contrast, then the flow shifts to S5542, where it is determined whether the temperature (TEMP) measured in the power ON/OFF temperature measurement processing operation (see S112 in FIG. 19) is at least the high-temperature set temperature (E_LD2TEMPH) or not. If it is determined that the measured temperature is at least the high-temperature set temperature, then high-temperature focus drive energizing time data (E_T_LD2MONH) is set as the focus energizing time (S5546).

If it is determined at S5542 that the measured temperature is not at least the high-temperature set temperature, then it is determined whether the measured temperature (TEMP) is at most the low-temperature set temperature (E_LD2TEMPL) or not (S5544). If it is determined that the measured temperature is at most the low-temperature set temperature, then low-temperature focus drive energizing time data (E_T_LD2MONL) is set as the focus energizing time (S5550). If it is determined that the measured temperature is not at most the low-temperature set temperature, by contrast, then room-temperature focus drive energizing time data (E_T_LD2MONM) is set as the focus energizing time (S5548).

In the high-temperature focus drive energizing time data (E_T_LD2MONH), a time shorter than that in the room-temperature focus drive energizing time data (E_T_LD2MONM) is set. In the room-temperature focus drive energizing time data (E_T_LD2MONM), a time shorter than that in the low-temperature focus drive energizing time data (E_T_LD2MONL) is set.

Subsequently, the flow shifts to S5552, where focus drive brake time data (E_T_LD2BRAKE) is set as the focus brake time. Then, the flow shifts to S5554 in FIG. 112, where 0 is set as the focus count 0. Subsequently, 0 is set as the focus count 1 (S5556), 0 is set as the focus count 2 (S5558), and 0 is set as the focus count pulse (S5560).

Thereafter, the HP falling is set (S5566), 0 is set as the focus count 0 (S5568), and 0 is set as the focus count 1 (S5570). Subsequently, focus drive HP count data (E_P_HP) is set as the focus count HP (S5572). Then, the sum of the focus drive HP count data (E_P_HP), focus drive backlash count data (E_P_FCGB), focus drive HP detection margin pitch count data (D_P_MARGIN), and focus driving over-pitch number (C_FCOV) is set as the focus count SUM (S5574).

Subsequently, an LHPIN readout processing operation is carried out (S5576), and it is determined whether the terminal LHPIN is at L or not (S5578). If it is determined that the terminal LHPIN is at L, then the value obtained when pitch count data (D_P_INI_HP_L) at the time of HP detection L is added to the focus count SUM is set as the focus count SUM (S5582).

If it is determined that the terminal LHPIN is not L, by contrast, then the value obtained when focus drive HP "H" section pitch count data (E_P_HP_H) is added to the focus count SUM is set as the focus count SUM (S5580).

Subsequently, the value obtained when the focus drive second speed count data (E_P_LD2N2) is subtracted from the focus count SUM is set as the focus count 2 (S5584). Thereafter, it is determined whether the focus count 2 is at most 0 or not (S5586). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S5588). Subsequently, the flow shifts to S5596 in FIG. 113.

If it is determined at S5586 that the focus count 2 is at most 0, then the value obtained when the focus drive brake pitch count data (E_P_FCBRK) is subtracted from the focus count SUM is set as the focus count pulse (S5590).

Subsequently, the flow shifts to S5592, where it is determined whether the focus count pulse is at most 0 or not. If it is determined that the focus count pulse is not at most 0, then 0 is set as the focus count 2 (S5594), and the flow shifts to S5596 in FIG. 113. If it is determined that the focus count pulse is at most 0, by contrast, then the flow shifts to S5640 in FIG. 113.

The terminal LPIIN is read out at S5596 in FIG. 113, and it is determined whether the terminal LPIIN is at L or not (S5598). If it is determined that the terminal LPIIN is at L, then the HL flag of the terminal LPIIN is reset (S5600). If it is determined that the terminal LPIIN is not at L, by contrast, then the HL flag of the terminal LPIIN is set (S5602).

Subsequently, the flow shifts to S5604, where the outputs of parallel terminals DC0, DC1, and DC2 are set L, L, and H, respectively, so that the motor 95 is placed into the wait state. Then, the outputs of parallel terminals DC0, DC1, and DC2 are set H, L, and H, respectively, so as to carry out driving in reverse (S5606).

Thereafter, it is determined whether the HL flag of the terminal LPIIN is set or not (S5608). If it is determined that the HL flag of the terminal LPIIN is set, then a zero-order speed control H start drive processing operation is carried out (S5610). If it is determined not, by contrast, then a zero-order speed control L start drive processing operation is carried out (S5612). The zero-order speed control H and L start drive processing operations will be explained later in detail.

Subsequently, the flow shifts to S5614, where it is determined whether the LPIIN overtime is set or not. If it is determined that the LPIIN overtime is set, then the flow shifts to S5626. If it is determined not, by contrast, then the outputs of parallel terminals DC0, DC1, and DC2 are set L, L, and H, respectively, so as to place the motor 95 into the wait state (S5616). Thereafter, the outputs of parallel terminals DC0, DC1, and DC2 are set H, H, and H, respectively, so as to attain the brake output state (S5618).

Subsequently, it is determined whether the HL flag of the terminal LPIIN is set or not (S5620). If it is determined that the HL flag of the terminal LPIIN is set, then a braking pitch count measurement H start drive processing operation is carried out (S5622). If it is determined that the HL flag of the terminal LPIIN is not set, by contrast, then a braking pitch count measurement L start drive processing operation is carried out (S5624). The braking pitch count measurement L and H start drive processing operations will be explained later in detail.

Subsequently, the flow shifts to S5626, where the outputs of parallel terminals DC0, DC1, and DC2 are set L, L, and H, respectively, so that the motor 95 is placed into the wait state. Thereafter, it is determined whether the HP detection flag is reset or not (S5628). If it is determined that the HP detection flag is reset, then the barrier initial (INI) HP error is set (S5638). Subsequently, the flow shifts to S5640.

If it is determined at S5628 that the HP detection flag is not reset, then it is determined whether the LPIIN overtime is set or not (S5630). If it is determined that the LPIIN overtime is not set, then it is determined whether the terminal LHPIN is at L or not (S5632). If it is determined that the terminal LHPIN is at L, then the flow shifts to S3154 in FIG. 81, whereby a barrier close operation is carried out.

If it is determined that the terminal LHPIN is not at L, then it is determined whether the HP chatter prevention counter is at 0 or not (S5634).

If it is determined at S5634 that the HP chatter prevention counter is at 0, then the flow shifts to S5638. If it is determined not, by contrast, then 1 is subtracted from the HP chatter prevention counter, and the flow shifts to S5516 in FIG. 111.

If it is determined at S5630 that the LPIIN overtime is set, then the flow shifts to S5640.

At S5640, the focus error is set. Subsequently, the lens barrel error is set (S5642), and the recovery inhibition is set (S5644). Then, the outputs of parallel terminals DC0, DC1, and DC2 are set L, L, and L, respectively, so that the motor 95 is placed into the wait state (S5646). Subsequently, the terminal LHPIN is set as the L output port (S5648). Then, after a wait of 2 ms (S5650), the focus power is reset (S5652).

Subsequently, the driver ON/OFF terminal CE is set L, so as to place the driver section 219 into the inactive state (S5654), the operation mode of the CPU 200 is set to the medium speed mode (S5656), and a focus error EEPROM writing processing operation is carried out (S5658). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the focus initial processing operation is terminated.

The focus initial movement processing operation will now be explained.

In the focus initial movement processing operation, as shown at S5700 in FIG. 114, a drive preparation processing operation is initially carried out, so that the motor 95 of the focus driving section 221 is selected as the motor to drive. Then, the flow shifts to S5702, where the outputs of parallel terminals DC0, DC1, and DC2 are set L, L, and L, respectively, so that the motor 95 is placed into the wait state. Thereafter, the terminal LHPIN is set as the input port (S5704) and, after a wait of 10 ms (S5706), the voltage output to the focus motor is enabled (S5708).

Subsequently, after a wait of 1 ms (S5710), the operation mode of CPU 200 is set to the high speed mode (S5712). Then, the lens barrel control error code 1 (E_ZOOM_ERROR1) is reset (S5714), the lens barrel control error code 2 (E_ZOOM_ERROR2) is reset (S5716), the focus error is reset (S5718), and the HP (home position) detection is reset (S5720).

Thereafter, the flow shifts to S5722, where it is determined whether 00h is set as the barrier operating focus drive energizing time (E_T_BARIMON) or not. If it is determined not, then the barrier operating focus drive energizing time (E_T_BARIMON) is set as the focus energizing time (S5724). Subsequently, the flow shifts to S5736.

If it is determined that 00h is set as the barrier operating focus drive energizing time, by contrast, then the flow shifts to S5726, where it is determined whether the temperature (TEMP) measured in the power ON/OFF temperature measurement processing operation (see S112 in FIG. 19) is at least the high-temperature set temperature (E_LD2TEMPH) or not. If it is determined that the measured temperature is at least the high-temperature set temperature, then high-temperature focus drive energizing time data (E_T_LD2MONH) is set as the focus energizing time (S5730).

If it is determined at S5726 that the measured temperature is not at least the high-temperature set temperature, then it is determined whether the measured temperature (TEMP) is at most the low-temperature set temperature (E_LD2TEMPL) or not (S5728). If it is determined that the measured temperature is at most the low-temperature set temperature, then low-temperature focus drive energizing time data (E_T_LD2MONL) is set as the focus energizing time (S5734). If it is determined that the measured temperature is not at most the low-temperature set temperature, by contrast, then room-temperature focus drive energizing time data (E_T_LD2MONM) is set as the focus energizing time (S5732).

In the high-temperature focus drive energizing time data (E_T_LD2MONH), a time shorter than that in the room-temperature focus drive energizing time data (E_T_LD2MONM) is set. In the room-temperature focus drive energizing time data (E_T_LD2MONM), a time shorter than that in the low-temperature focus drive energizing time data (E_T_LD2MONL) is set.

Subsequently, the flow shifts to S5736, where doubled focus drive brake time data (E_T_LD2BRAKE) is set as the focus brake time. Then, the flow shifts to S5738, where 0 is set as the focus count 0. Subsequently, 0 is set as the focus count 1 (S5740), 0 is set as the focus count 2 (S5742), 0 is set as the focus count pulse (S5744), 0 is set as the focus count HP (S5746), and 0 is set as the focus count SUM (S5748).

Thereafter, the flow shifts to S5750 in FIG. 115, where 0 is set as the focus count 0. Then, 0 is set as the focus count HP (S5752).

Subsequently, the value obtained when focus drive backlash count data (E_P_FCGB) is added to focus initial movement pitch count data (D_P_INI) is set as the focus count SUM. Then, doubled focus drive first speed count data (E_P_L2N1) and 20 pitches are subtracted from the focus count SUM, and thus obtained value is set as the focus count 1 (S5756).

Subsequently, it is determined whether the focus count 1 is at most 0 or not (S5758). If it is determined that the focus count 1 is not at most 0, then the value obtained when the focus drive second speed count data (E_P_LD2N2) is subtracted from doubled focus drive first speed count data (E_P_LD2N1) is set as the focus count 2 (S5760).

Subsequently, the value obtained when the focus drive brake pitch count data (E_P_FCBRK) is subtracted from the focus drive second speed count data (E_P_LD2N2) is set as the focus count pulse (S5762). Then, doubled focus drive first speed count data (E_P_LD2N1) is subtracted from the focus count SUM, thus obtained value is divided by 2, and the resulting value is set as the focus count 1 (S5764).

Subsequently, it is determined whether there is a remainder or not (S5766). If it is determined that there is a remainder, then the value obtained when the remainder is added to the focus count 2 is set as the focus count 2 (S5768), and the flow shifts to S5770. If it is determined that there is no remainder, by contrast, then the flow directly shifts to S5770, where the focus count 1 is set as the event count. Thereafter, the flow shifts to S5788 in FIG. 116.

If it is determined at S5758 that the focus count 1 is at most 0, then the value obtained when the focus drive second speed count data (E_P_LD2N2) is subtracted from the focus count SUM is set as the focus count 2 (S5772). Subsequently, it is determined whether the focus count 2 is at most 0 or not (S5774). If it is determined that the focus count 2 is not at most 0, then the value obtained when the focus drive brake pitch count data (E_P_FCBRK) is subtracted from the focus drive second speed count data (E_P_LD2N2) is set as the focus count pulse (S5776). Subsequently, 0 is set as the focus count 1 (S5778), and the flow shifts to S5788 in FIG. 116.

If it is determined at S5744 that the focus count 2 is at most 0, then the value obtained when the focus drive brake pitch count data (E_P_FCBRK) is subtracted from the focus count SUM is set as the focus count pulse (S5780).

Subsequently, the flow shifts to S5782, where it is determined whether the focus count pulse is at most 0 or not. If it is determined not, then 0 is set as the focus count 1 (S5784). Then, 0 is set as the focus count 2 (S5786), and the flow shifts to S5788 in FIG. 116. If it is determined that the focus count pulse is at most 0, then the flow shifts to S5822 in FIG. 116.

At S5788 in FIG. 116, the terminal LPIIN is read out. Subsequently, it is determined whether the terminal LPIIN is at L or not (S5790). If it is determined that the terminal LPIIN is at L, then the HL flag of the terminal LPIIN is reset (S5792). If it is determined not, then the HL flag of the terminal LPIIN is set (S5794).

Subsequently, the flow shifts to S5796, where the outputs of parallel terminals DC0, DC1, and DC2 are set L, L, and H, respectively, so that the motor 95 is placed into the wait state. Then, the outputs of parallel terminals DC0, DC1, and DC2 are set L, H, and H, respectively, so as to carry out normal rotation driving (S5798).

Then, it is determined whether the HL flag of the terminal LPIIN is set or not (S5800). If it is determined that the HL flag of the terminal LPIIN is set, then a zero-order speed control H start drive processing operation is carried out (S5802). If it is determined not, by contrast, then a zero-order speed control L start drive processing operation is carried out (S5804). The zero-order control H and L start drive processing operations will be explained later in detail.

Subsequently, the flow shifts to S5806, where it is determined whether the LPIIN overtime is set or not. If it is determined that the LPIIN overtime is set, then the flow shifts to S5818. If it is determined not, by contrast, then the outputs of parallel terminals DC0, DC1, and DC2 are set L, L, and H, respectively, so that the motor 95 is placed into the wait state (S5808). Subsequently, the outputs of parallel terminals DC0, DC1, and DC2 are set H, H, and H, respectively, so as to attain the brake output state (S5810).

Subsequently, it is determined whether the HL flag of the terminal LPIIN is set or not (S5812). If it is determined that the HL flag of the terminal LPIIN is set, then a braking pitch count measurement H start drive processing operation is carried out (S5814). If it is determined not, then a braking pitch count measurement L start drive processing operation is carried out (S5816). The braking pitch count measurement H and L start drive processing operation will be explained later in detail.

Subsequently, the flow shifts to S5818, where the outputs of parallel terminals DC0, DC1, and DC2 are set L, L, and H, respectively, so that the motor 95 is placed into the wait state. Then, it is determined whether the LPIIN overtime is set or not (S5820). If it is determined that the LPIIN overtime is set, then the flow shifts to S5822.

At S5822, the initial (INI) error is set. Subsequently, the flow shifts to S5824. If it is determined at S5820 that the LPIIN overtime is set, then the flow shifts to S5824. At S5824, the outputs of parallel terminals DC0, DC1, and DC2 are set L, L, and L, respectively, so that the motor 95 is placed into the wait state Subsequently, the terminal LHPIN is set as the L output port (S5826). Then, after a wait of 2 ms (S5828), the focus power is reset (S5830).

Thereafter, the driver ON/OFF terminal CE is set L, so as to place the driver section 219 into the inactive state (S5832), the operation mode of the CPU 200 is set to the medium speed mode (S5834), and a focus error EEPROM writing processing operation is carried out (S5836). The focus error EEPROM writing processing operation is an operation for writing the focus error into the EEPROM 218 after the focus driving. When this operation is carried out, it can easily be seen that an error has occurred upon the focus driving, whereby the camera 2 can be repaired easily.

After the focus error EEPROM writing processing operation, the focus initial movement processing operation is terminated.

As in the foregoing, the position of second lens group 102 (focus) can be detected in the focus initial processing operation according to the input at the terminal LHPIN, whereby the barrier close processing operation can be carried out appropriately according to the position. Here, when the input of terminal LHPIN is at L, it can be detected on which side the second lens group 102 is located if the initial movement (focus initial movement processing operation) is carried out. Therefore, appropriate barrier close processing is possible even when there is no sensor for directly detecting the second lens group 102.

When moving the second lens group 102 (focus) from the TELE wait position side toward the stopper (from the right side to the left side in FIG. 109), without using the first speed control, the second speed control at a moving speed lower than that of the second speed control is used in the focus initial processing operation as shown in FIGS. 109 and 110. Consequently, the HP can be detected accurately at the terminal LHPIN, whereby the position of second lens group 102 can be detected accurately. Therefore, the accuracy in the focusing thereafter can be improved.

The focus error recovery processing operation will now be explained.

Figure 117:
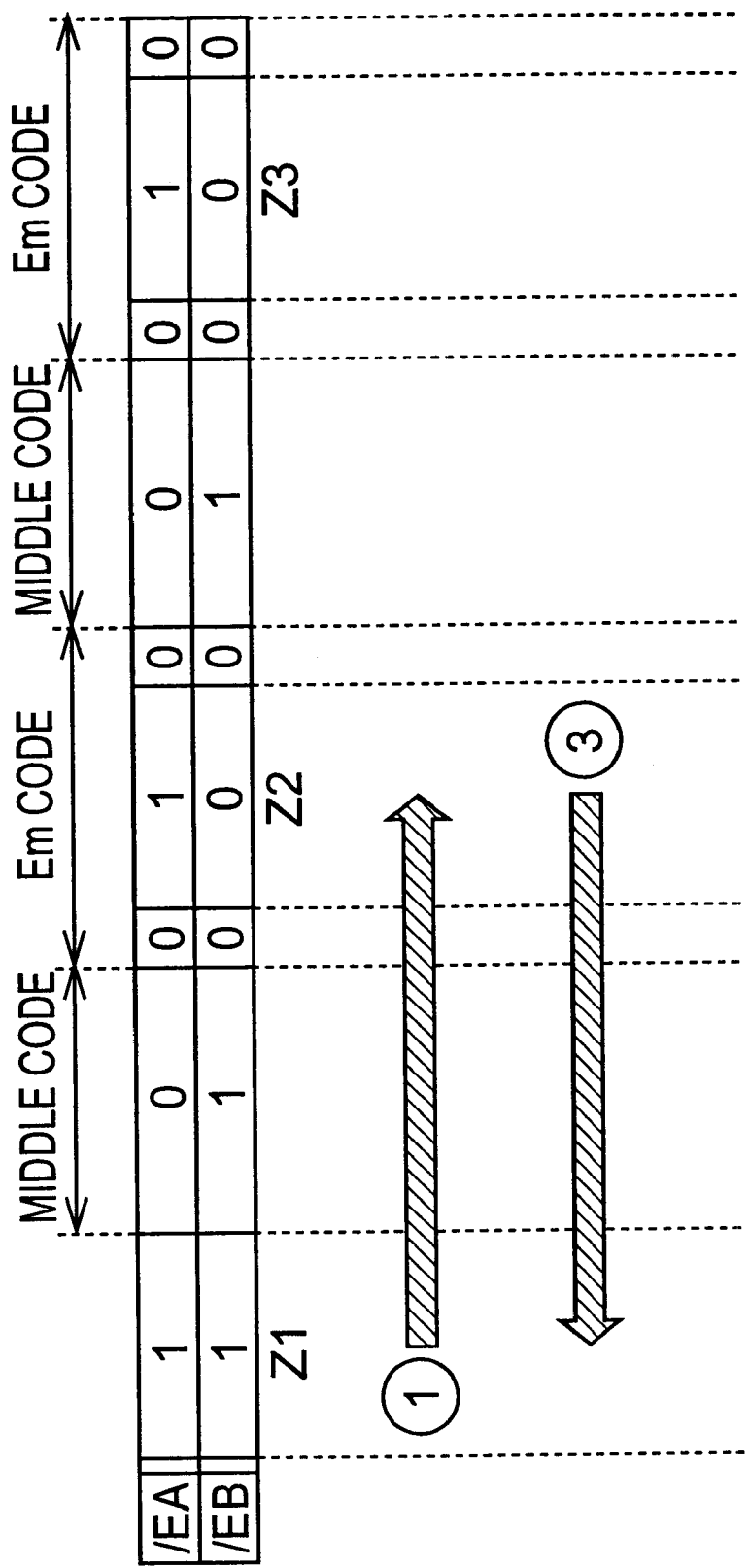
FIG. 117 is an operational chart for explaining a focus error recovery processing operation of the camera equipped with the lens barrel of FIG. 1.
Figure 118:
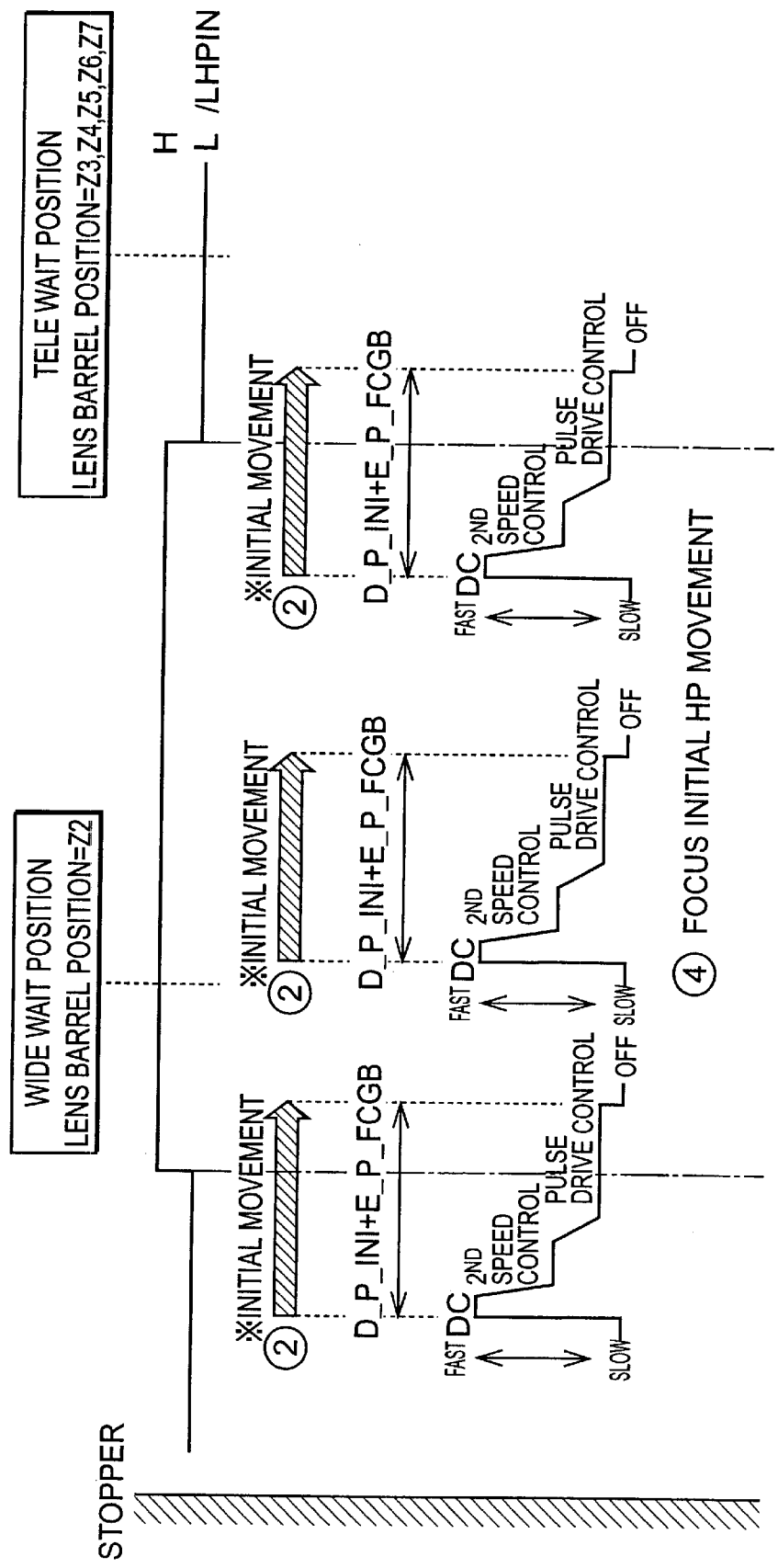
FIG. 118 is an operational chart for explaining the focus error recovery processing operation of the camera equipped with the lens barrel of FIG. 1.
Figure 119:
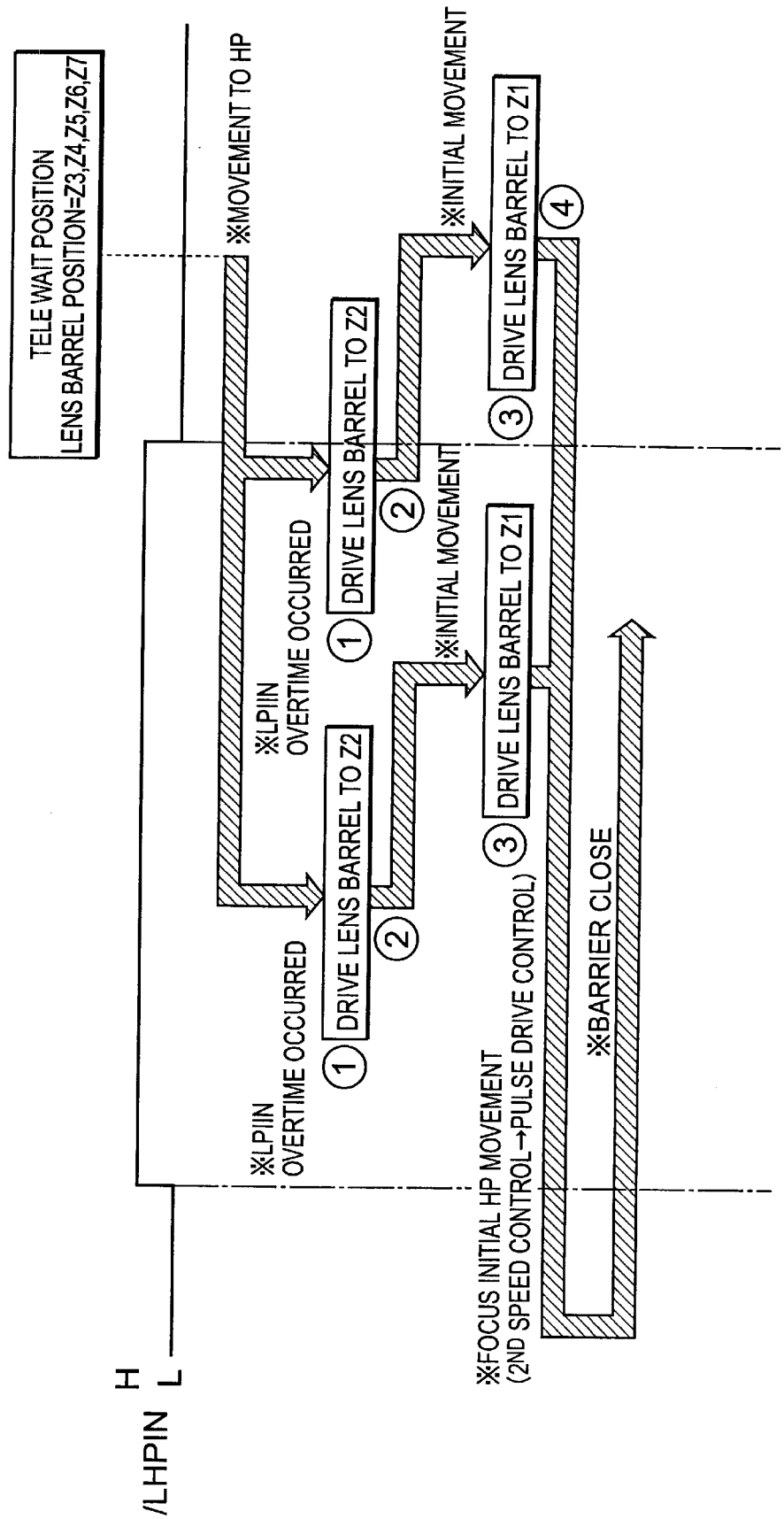
FIG. 119 is an operational chart for explaining the focus error recovery processing operation of the camera equipped with the lens barrel of FIG. 1.
Figure 120:
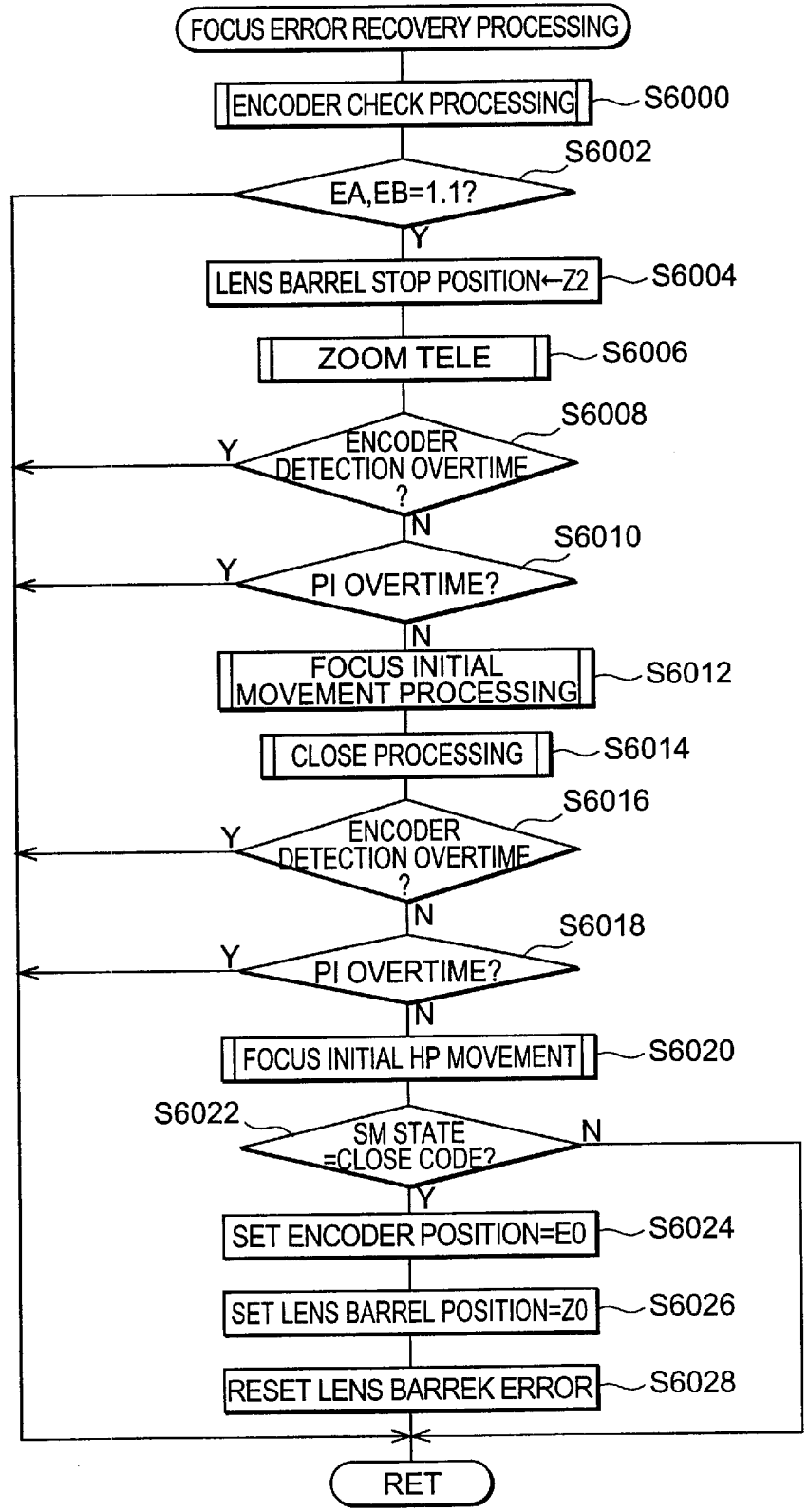

FIGS. 117 to 119 show operational charts for explaining the focus error recovery processing operation. FIG. 120 shows a flowchart of the focus error recovery processing operation.

The focus error recovery processing operation is an operation for recovering from the state where the gears 141, 143 (see FIG. 10) are not favorably in mesh when the second lens group 102 is moved to the WIDE wait position and the like.

In the focus error recovery processing operation, as shown at S6000 in FIG. 120, an encoder check processing operation is initially carried out. Subsequently, it is determined whether the terminals EA, EB are at 1 or not (S6002). If it is determined not, then the processing operation is terminated. If it is determined that both of the terminals EA, EB are at 1, by contrast, then Z2 is set as the lens barrel stop position (S6004).

Subsequently, a zoom TELE driving operation is carried out, so as to expand the lens barrel 1 from Z1 to Z2. Then, it is determined whether the encoder detection overtime is reached or not (S6008). If it is determined that the PI overtime is reached, then the processing operation is terminated. If it is determined that the encoder detection overtime is not reached, by contrast, then it is determined whether the PI overtime is reached or not (S6010).

If it is determined that the PI overtime is reached, then the processing operation is terminated. If it is determined not, by contrast, then a focus initial movement processing operation is carried out (S6012). The focus initial movement processing operation is an operation for TELE-driving the second lens group 102 (focus) according to predetermined pulse data as shown in FIG. 118. In the focus initial movement processing operation, one of the two gears to be in mesh rotates as the second lens group 102 moves.

Subsequently, the flow shifts to S6014 in FIG. 120, where a close processing operation is carried out. As mentioned above, the close processing operation is an operation for collapsing the lens barrel 1 to Z1 (see FIGS. 35 and 36). Thereafter, it is determined whether the encoder detection overtime is reached or not (S6016). If it is determined that the encoder detection overtime is reached, then the processing operation is terminated. If it is determined not, by contrast, then it is determined whether the PI overtime is reached or not (S6018).

If it is determined that the PI overtime is reached, then the processing operation is terminated. If it is determined not, by contrast, then a focus initial HP processing operation is carried out (S6020). The focus initial HP processing operation is a focus initial processing operation without the focus initial movement processing. The focus initial HP processing operation initializes the focus, thereby closing the barrier 83.

Subsequently, it is determined whether the close code is set as the main switch state (SM state) or not (S6022). If it is determined not, then the processing operation is terminated. If it is determined that the close code is set as the main switch state, by contrast, then E0 is set as the encoder position (S6024), Z0 is set as the lens barrel position (S6026), and the lens barrel error is reset (S6028). Thereafter, the processing operation is terminated.

As in the foregoing, when the gears 141, 143 (see FIG. 10) are not favorably in mesh upon collapsing the lens barrel 1, the lens barrel 1 is expanded as shown in FIG. 117, the second lens group 102 is moved upon driving the motor 95 as shown in FIG. 118, and then the lens barrel 1 is collapsed as shown in FIG. 117, whereby the gears 141, 143 can be caused to mesh with each other again in the focus error recovery processing operation. Consequently, when the gears 141, 143 are not favorably in mesh with each other, they can recover from malfunctions in operations without being processed as an error, whereby failures of the camera can be reduced.

The focus drive processing operation will now be explained.

Figure 121:
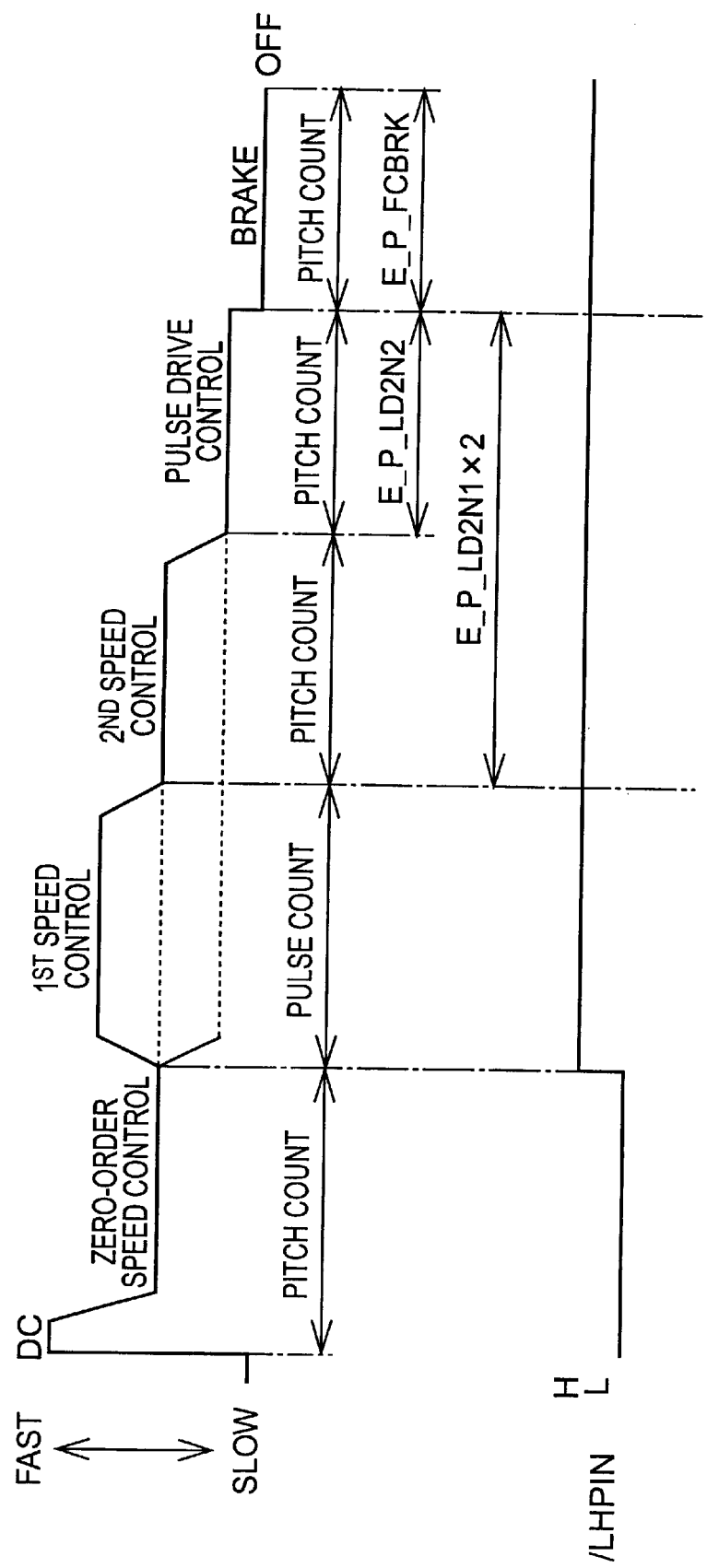

FIG. 121 shows a relationship between the species of driving control and the speed in the focus drive processing operation. FIGS. 122 to 131 show flowcharts of the focus drive processing operation.

The focus drive processing operation is a processing operation for driving the motor 95 so as to move the second lens group 102, in which a zero-order speed control L start drive processing operation, a zero-order speed control H start drive processing operation, a first speed control L start drive processing operation, a first speed control H start drive processing operation, a second speed control L start drive processing operation, a second speed control H start drive processing operation, a pulse drive control L start drive processing operation, a pulse drive control H start drive processing operation, an HP-detection-free pulse drive control L start drive processing operation, and an HP-detection-free pulse drive control H start drive processing operation are carried out.

Figure 122:
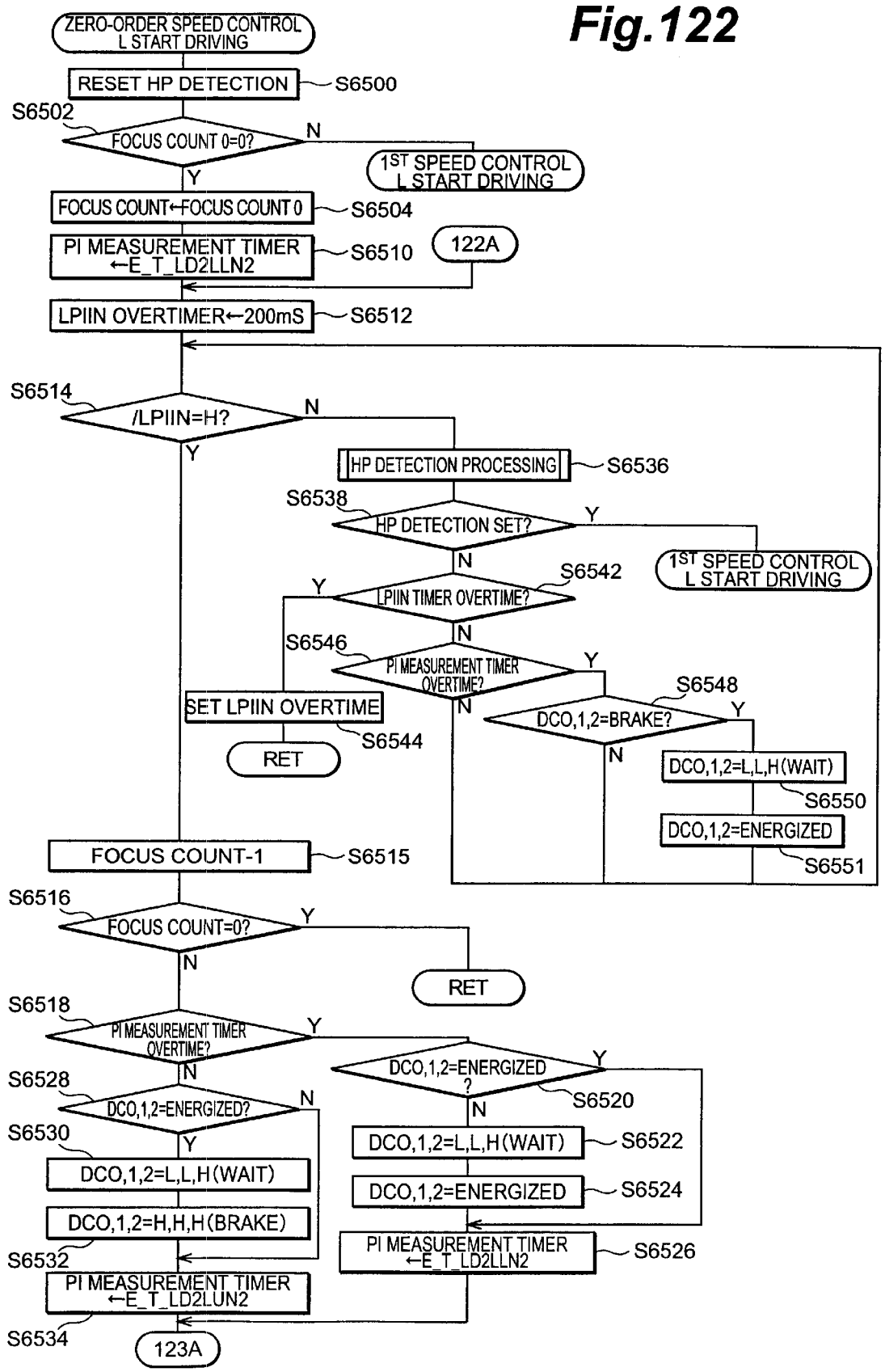

In the zero-order speed control L start drive processing operation in the focus drive processing operation, as shown at S6500 in FIG. 122, the HP detection is initially reset. Subsequently, it is determined whether 0 is set as the focus count 0 or not (S6502). If it is determined that 0 is set as the focus count 0, then the flow shifts to the first speed control L start drive processing operation in FIG. 124. If it is determined not, by contrast, then the focus count 0 is set as the focus count (S6504). Thereafter, the focus drive second speed lower limit pulse time (E_T_LD2LLN2) is set as the PI measurement timer (S6510).

Subsequently, the flow shifts to S6512, where a time of 200 ms is set as the LPIIN overtime. Then, it is determined whether the terminal LPIIN is at H or not (S6514). If it is determined that the terminal LPIIN is at H, then 1 is subtracted from the focus count (S6515).

Thereafter, it is determined whether 0 is set as the focus count or not (S6516). If it is determined that 0 is set as the focus count, then the processing operation is terminated.

If it is determined that 0 is set as the focus count, then it is determined whether the PI measurement timer is overtime or not (S6518). If it is determined that the PI measurement timer is overtime, then it is determined whether the parallel terminals DC0, DC1, and DC2 are in their energized state or not (S6520). If it is determined that the parallel terminals DC0, DC1, and DC2 are in their energized state, then the flow shifts to S6526. If it is determined that the parallel terminals DC0, DC1, and DC2 are not in their energized state, by contrast, then the outputs of parallel terminals DC0, DC1, and DC2 are set L, L, and H, respectively, so that the motor 95 is placed into the wait state (S6522).

Subsequently, the parallel terminals DC0, DC1, and DC2 are set to their energized state (S6524). Then, the flow shifts to S6526, where the focus drive second speed lower limit pulse time (E_T_LD2LLN2) is set as the PI measurement timer, and the flow shifts to S6564 in FIG. 123.

If it is determined at S6518 that the PI measurement timer is not overtime, by contrast, then it is determined whether the parallel terminals DC0, DC1, and DC2 are in their energized state or not (S6528). If it is determined that the parallel terminals DC0, DC1, and DC2 are not in their energized state, then the outputs of parallel terminals DC0, DC1, and DC2 are set L, L, and H, respectively, so that the motor 95 is placed into the wait state (S6530).

Subsequently, the outputs of parallel terminals DC0, DC1, and DC2 are set H, H, and H, respectively, so as to attain the brake output state (S6532). Then, the flow shifts to S6534, where the focus drive second speed upper limit pulse time (E_T_LD2LUN2) is set as the PI measurement timer, and the flow shifts to S6564 in FIG. 123.

If it is determined at S6514 that the terminal LPIIN is not at H, then the flow shifts to S6536, where an HP detection processing operation is carried out. Subsequently, it is determined whether the HP detection is set or not (S6538). If it is determined that the HP detection is set, then the flow shifts to the first speed control L start drive processing operation in FIG. 124.

If it is determined that the HP detection is not set, by contrast, then it is determined whether the LPIIN timer is overtime or not (S6542). If it is determined that the LPIIN timer is overtime, then the LPIIN overtime is set (S6544), and the processing operation is terminated. If it is determined that the LPIIN timer is not overtime, by contrast, then it is determined whether the PI measurement timer is overtime or not (S6546).

If it is determined at S6546 that the PI measurement timer is not overtime, then the flow returns to S6514. If it is determined that the PI measurement timer is overtime, by contrast, then it is determined whether the outputs of parallel terminals DC0, DC1, and DC2 are set H, H, and H, respectively, so as to attain the brake output state or not (S6548). If it is determined that the brake output state is not attained, then the flow returns to S6514.

If it is determined that the brake output state is attained, then the outputs of parallel terminals DC0, DC1, and DC2 are set L, L, and H, respectively, so that the motor 95 is placed into the wait state (S6550), and the parallel terminals DC0, DC1, and DC2 are set to their energized state (S6551). Subsequently, the flow returns to S6514.

Figure 123:
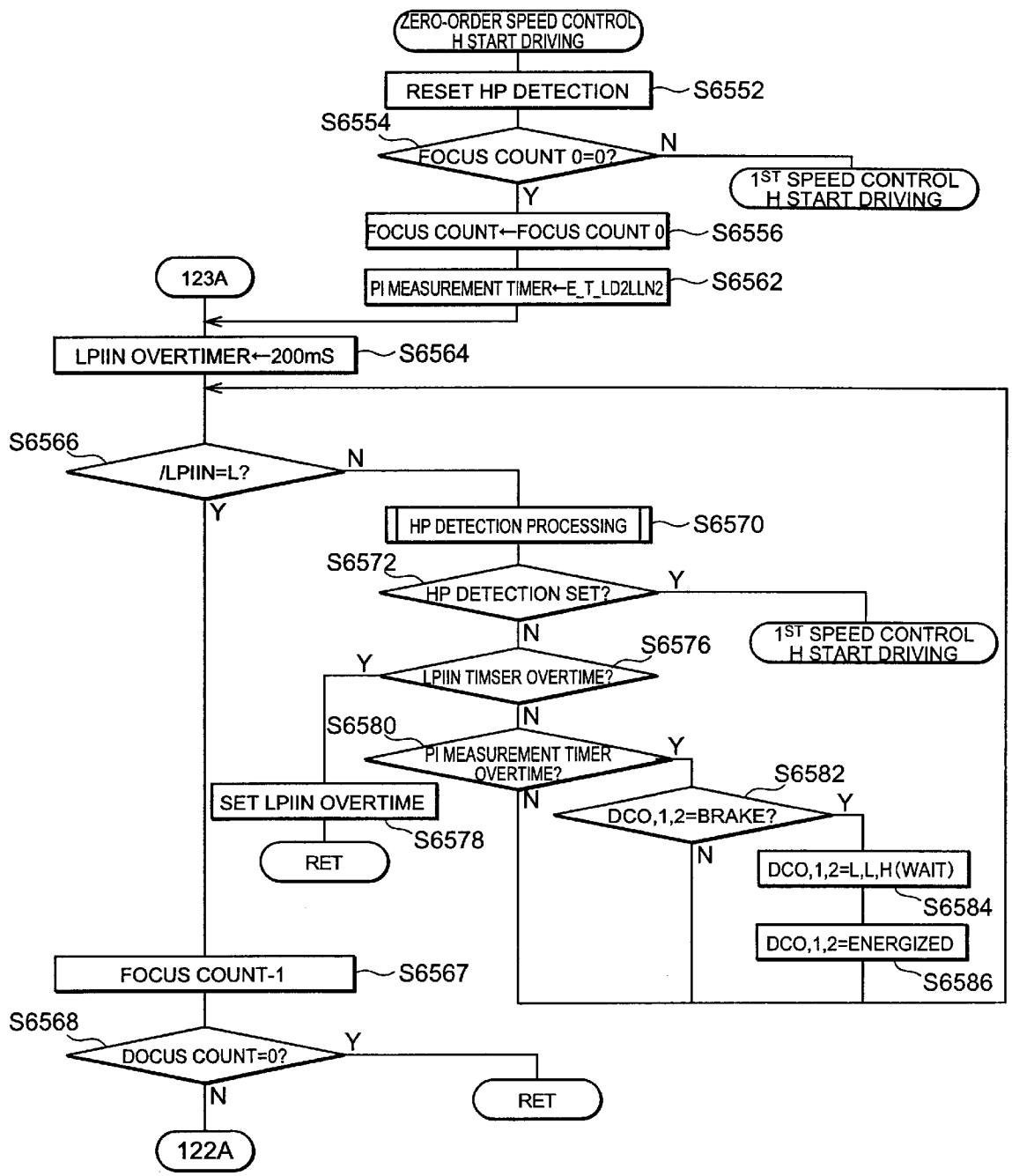

FIG. 123 shows a flowchart of the zero-order speed control H start drive processing operation.

In the zero-order speed control H start drive processing operation, as shown at S6552 in FIG. 123, the HP detection is initially reset. Subsequently, it is determined whether 0 is set as the focus count 0 or not (S6554). If it is determined that 0 is set as the focus count 0, then the flow shifts to the first speed control H start drive processing operation in FIG. 125. If it is determined not, by contrast, then the focus count 0 is set as the focus count (S6556). Thereafter, the focus drive second speed lower limit pulse time (E_T_LD2LLN2) is set as the PI measurement timer (S6562).

Subsequently, the flow shifts to S6564, where a time of 200 ms is set as the LPIIN overtime. Then, it is determined whether the terminal LPIIN is at L or not (S6566). If it is determined that the terminal LPIIN is at L, then 1 is subtracted from the focus count (S6567).

Thereafter, it is determined whether 0 is set as the focus count or not (S6568). If it is determined that 0 is set as the focus count, then the processing operation is terminated. If it is determined not, by contrast, then the flow shifts to S6512 in FIG. 122.

If it is determined at S6566 that the terminal LPIIN is not at L, then the flow shifts to S6570, where an HP detection processing operation is carried out. Subsequently, it is determined whether the HP detection is set or not (S6572). If it is determined that the HP detection is set, then the flow shifts to the first speed control H start drive processing operation in FIG. 125.

If it is determined that the HP detection is not set, by contrast, then it is determined whether the LPIIN timer is overtime or not (S6576). If it is determined that the LPIIN timer is overtime, then the LPIIN overtime is set (S6578), and the processing operation is terminated. If it is determined that the LPIIN timer is not overtime, by contrast, then it is determined whether the PI measurement timer is overtime or not (S6580).

If it is determined at S6580 that the PI measurement timer is not overtime, then the flow returns to S6566. If it is determined that the PI measurement timer is overtime, by contrast, then it is determined whether the outputs of parallel terminals DC0, DC1, and DC2 are set H, H, and H, respectively, so as to attain the brake output state or not (S6582). If it is determined that the brake output state is not attained, then the flow returns to S6566.

If it is determined that the brake output state is attained, then the outputs of parallel terminals DC0, DC1, and DC2 are set L, L, and H, respectively, so that the motor 95 is placed into the wait state (S6584), and the parallel terminals DC0, DC1, and DC2 are set to their energized state (S6586). Subsequently, the flow returns to S6566.

Figure 124:
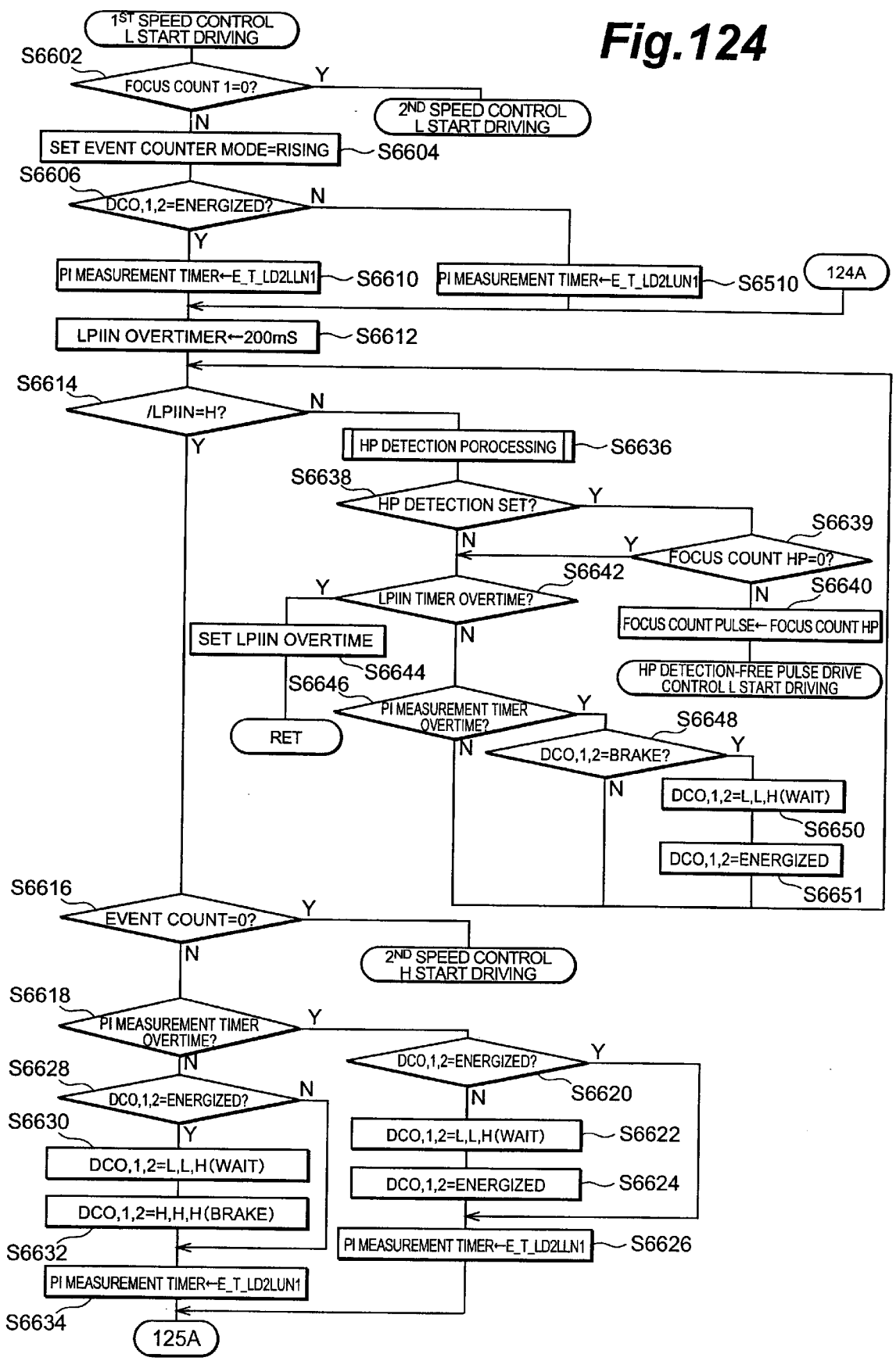

FIG. 124 shows a flowchart of the first speed control L start drive processing operation.

In the first speed control L start drive processing operation, as shown at S6602 in FIG. 124, it is initially determined whether 0 is set as the focus count 1 or not. If it is determined that 0 is set as the focus count 1, then the flow shifts to the second speed control L start drive processing operation in FIG. 126. If it is determined not, by contrast, then the falling is set as the event counter mode (S6604).

Subsequently, it is determined whether the parallel terminals DC0, DC1, and DC2 are in their energized state or not (S6606). If it is determined not, then the focus drive first speed upper limit pulse time (E_T_LD2LUN1) is set as the PI measurement timer (S6608). If it is determined that the parallel terminals DC0, DC1, and DC2 are in their energized state, by contrast, then the focus drive first speed lower limit pulse time (E_T_LD2LLN1) is set as the PI measurement timer (S6610).

Subsequently, the flow shifts to S6612, where a time of 200 ms is set as the LPIIN overtime. Then, it is determined whether the terminal LPIIN is at H or not (S6614). If it is determined that the terminal LPIIN is at H, then it is determined whether 0 is set as the event count or not (S6616). If it is determined that 0 is set as the event count, then the flow shifts to the second speed control H start drive processing operation in FIG. 127.

If it is determined that 0 is not set as the event count, by contrast, then it is determined whether the PI measurement timer is overtime or not (S6618). If it is determined that the PI measurement timer is overtime, then it is determined whether the parallel terminals DC0, DC1, and DC2 are in their energized state or not (S6620). If it is determined that the parallel terminals DC0, DC1, and DC2 are in their energized state, then the flow shifts to S6626. If it is determined that the parallel terminals DC0, DC1, and DC2 are not in their energized state, then the outputs of parallel terminals DC0, DC1, and DC2 are set L, L, and H, respectively, so that the motor 95 is placed into the wait state (S6622).

Subsequently, the parallel terminals DC0, DC1, and DC2 are set to their energized state (S6624). Then, the flow shifts to S6626, where the focus drive first speed lower limit pulse time (E_T_LD2LLN1) is set as the PI measurement timer, and the flow shifts to S6664 in FIG. 125.

If it is determined at S6618 that the PI measurement timer is not overtime, then it is determined whether the parallel terminals DC0, DC1, and DC2 are in their energized state or not (S6628). If it is determined that the parallel terminals DC0, DC1, and DC2 are not in their energized state, then the flow shifts to S6634. If it is determined that parallel terminals DC0, DC1, and DC2 are in their energized state, by contrast, then the outputs of parallel terminals DC0, DC1, and DC2 are set L, L, and H, respectively, so that the motor 95 is placed into the wait state (S6630).

Subsequently, the outputs of parallel terminals DC0, DC1, and DC2 are set H, H, and H, respectively, so as to attain the brake output state (S6632). Then, the flow shifts to S6634, where the focus drive first speed upper limit pulse time (E_T_LD2LUN1) is set as the PI measurement timer, and further to S6664 in FIG. 125.

If it is determined at S6614 that the terminal LPIIN is not at H, then the flow shifts to S6636, where an HP detection processing operation is carried out. Subsequently, it is determined whether the HP detection is set or not (S6638). If it is determined that the HP detection is set, then it is determined whether the focus count HP is at 0 or not (S6639). If it is determined that the focus count HP is at 0, then the flow shifts to S6642. If it is determined that the focus count HP is not at 0, by contrast, then the focus count HP is set as the focus count pulse (S6640). Subsequently, the flow shifts to the HP detection-free pulse drive control L start drive processing operation in FIG. 130.

If it is determined at S6638 that the HP detection is not set, then it is determined whether the LPIIN timer is overtime or not (S6642). If it is determined that the LPIIN timer is overtime, then the LPIIN overtime is set (S6644), and the processing operation is terminated. If it is determined that the LPIIN timer is not overtime, by contrast, then it is determined whether the PI measurement timer is overtime or not (S6646).

If it is determined at S6646 that the PI measurement timer is not overtime, then the flow returns to S6614. If it is determined that the PI measurement timer is overtime, then it is determined whether the outputs of parallel terminals DC0, DC1, and DC2 are set H, H, and H, respectively, so as to attain the brake output state or not (S6648). If it is determined that the brake output state is not attained, then the flow returns to S6614.

If it is determined that the brake output state is attained, then the outputs of parallel terminals DC0, DC1, and DC2 are set L, L, and H, respectively, so that the motor 95 is placed into the wait state (S6650), and the parallel terminals DC0, DC1, and DC2 are set to their energized state (S6650). Subsequently, the flow returns to S6614.

Figure 125:
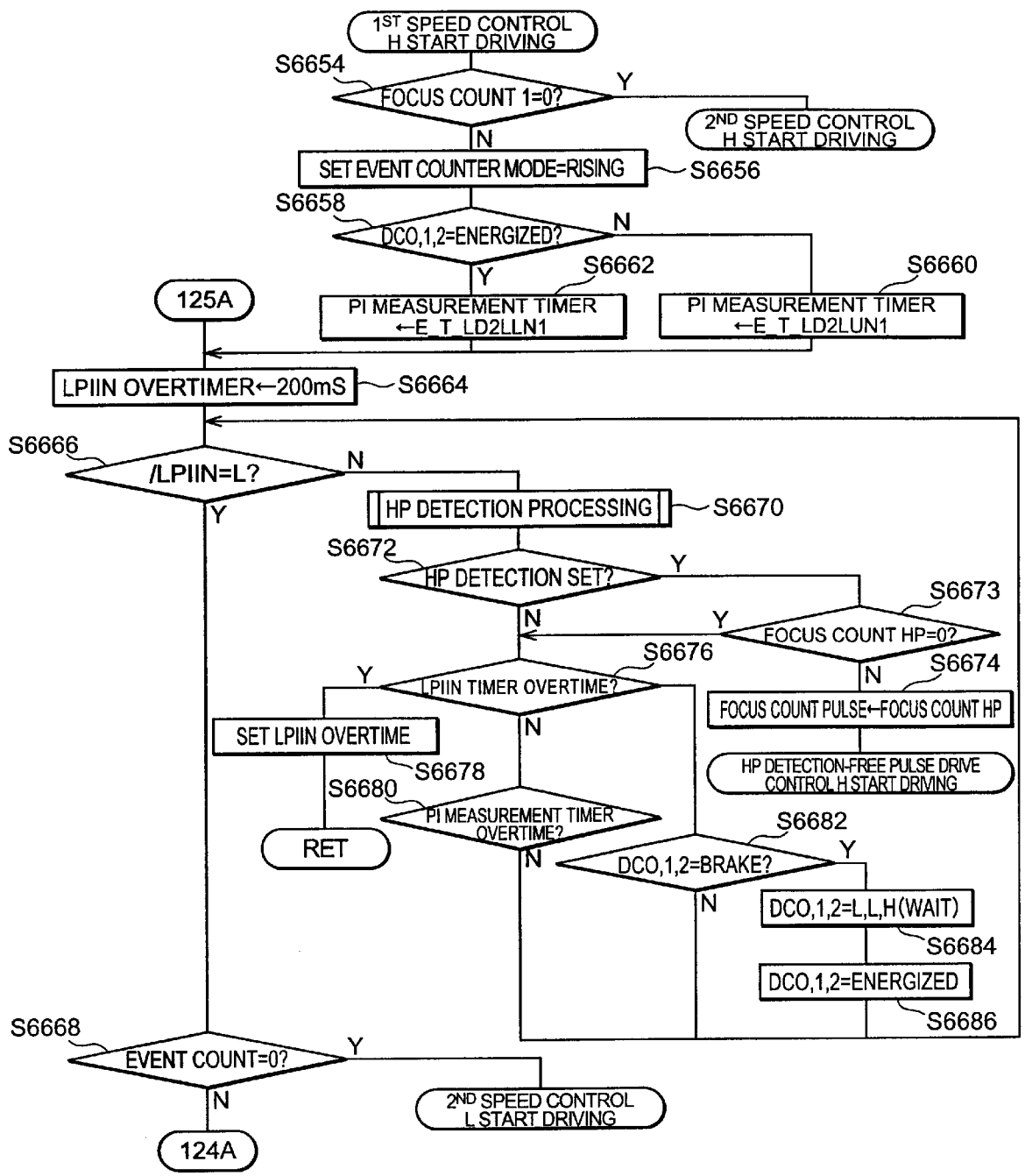

FIG. 125 shows a flowchart of the first speed control H start drive processing operation.

In the first speed control H start drive processing operation, it is initially determined whether the focus count 1 is at 0 or not (S6654). If it is determined that the focus count 1 at 0, then the flow shifts to the second speed control H start drive processing operation in FIG. 127. If it is determined not, by contrast, then the rising is set as the event counter mode (S6656).

Subsequently, it is determined whether the parallel terminals DC0, DC1, and DC2 are in their energized state or not (S6658). If it is determined not, then the focus drive first speed upper limit pulse time (E_T_LD2LUN1) is set as the PI measurement timer (S6660). If it is determined that the parallel terminals DC0, DC1, and DC2 are in their energized state, by contrast, then the focus drive first speed lower limit pulse time (E_T_LD2LLN1) is set as the PI measurement timer (S6662).

Subsequently, the flow shifts to S6664, where a time of 200 ms is set as the LPIIN overtime. Then, it is determined whether the terminal LPIIN is at L or not (S6666). If it is determined that the terminal LPIIN is at L, then it is determined whether 0 is set as the event count or not (S6668). If it is determined that 0 is set as the event count, then the flow shifts to the second speed control H start drive processing operation in FIG. 126. If it is determined that 0 is not set as the event count, by contrast, then the flow shifts to S6612 in FIG. 124.

If it is determined at S6666 that the terminal LPIIN is not at L, then the flow shifts to S6670, where an HP detection processing operation is carried out. Subsequently, it is determined whether the HP detection is set or not (S6672). If it is determined that the HP detection is set, then it is determined whether the focus count HP is at 0 or not (S6673). If it is determined that the focus count HP is at 0, then the flow shifts to S6676. If it is determined that the focus count HP is not at 0, then the focus count HP is set as the focus count pulse (S6674). Subsequently, the flow shifts to the HP detection-free pulse drive control H start drive processing operation in FIG. 131.

If it is determined that the HP detection is not set, then it is determined whether the LPIIN timer is overtime or not (S6676). If it is determined that the LPIIN timer is overtime, then the LPIIN overtime is set (S6678), and the processing operation is terminated. If it is determined that the LPIIN timer is not overtime, by contrast, then it is determined whether the PI measurement timer is overtime or not (S6680).

If it is determined at S6680 that the PI measurement timer is not overtime, then the flow returns to S6666. If it is determined that the PI measurement timer is overtime, by contrast, then it is determined whether the outputs of parallel terminals DC0, DC1, and DC2 are set H, H, and H, respectively, so as to attain the brake output state or not (S6682). If it is determined that the brake output state is not attained, then the flow returns to S6666.

If it is determined that the brake output state is attained, then the outputs of parallel terminals DC0, DC1, and DC2 are set L, L, and H, respectively, so that the motor 95 is placed into the wait state (S6684), and the parallel terminals DC0, DC1, and DC2 are set to their energized state (S6686). Subsequently, the flow returns to S6666.

Figure 126:
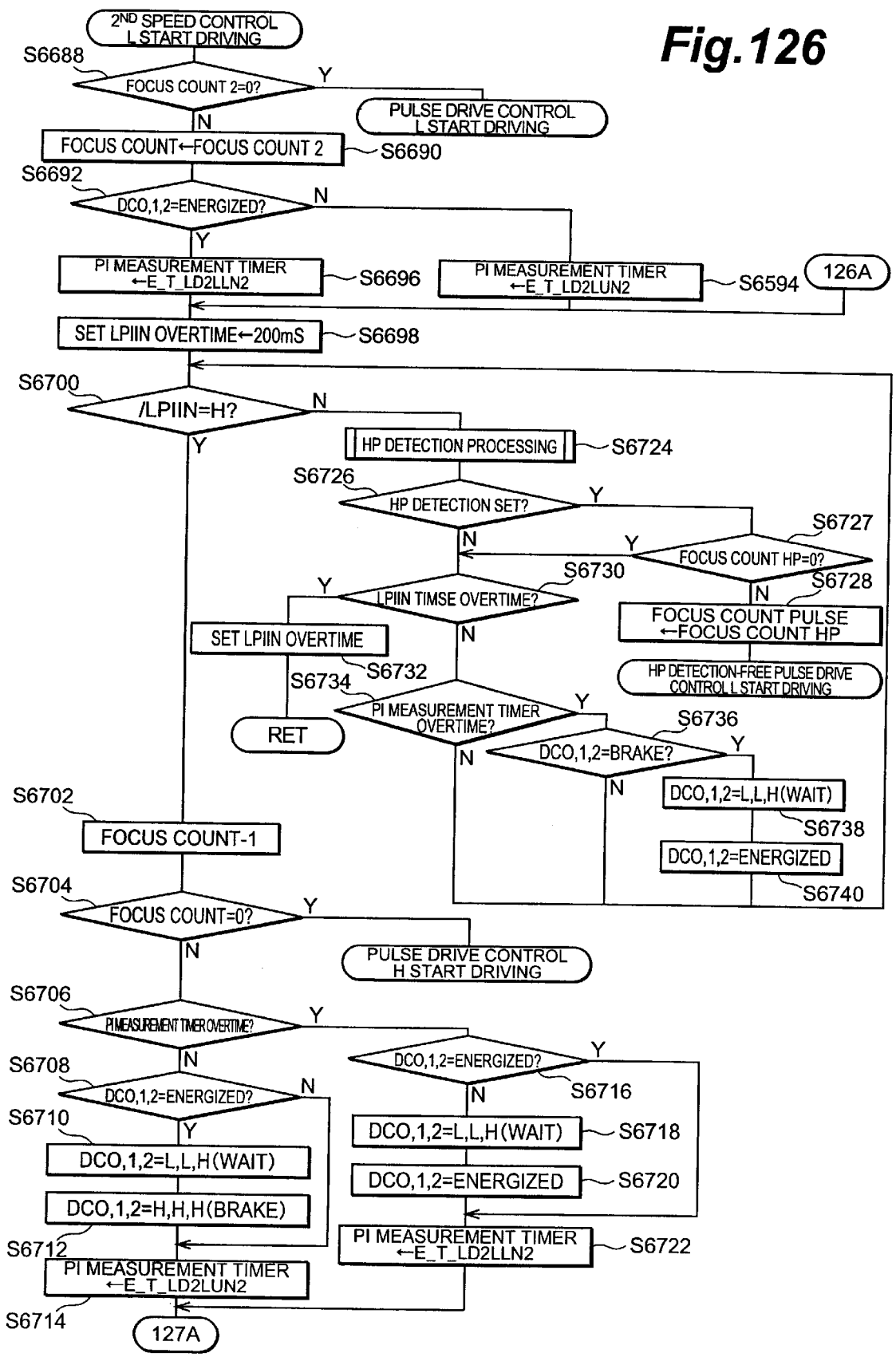

FIG. 126 shows a flowchart of the second speed control L start drive processing operation.

In the second speed control L start drive processing operation, as shown at S6688 in FIG. 126, it is initially determined whether 0 is set as the focus count 2 or not. If it is determined that 0 is set as the focus count 2, then the flow shifts to the pulse drive control L start drive processing operation in FIG. 128. If it is determined not, by contrast, then the focus count 2 is set as the focus count (S6690).

Subsequently, it is determined whether the parallel terminals DC0, DC1, and DC2 are in their energized state or not (S6692). If it is determined not, then the focus drive second speed upper limit pulse time (E_T_LD2LUN2) is set as the PI measurement timer (S6694). If it is determined that the parallel terminals DC0, DC1, and DC2 are in their energized state, by contrast, then the focus drive second speed lower limit pulse time (E_T_LD2LLN2) is set as the PI measurement timer (S6696).

Thereafter, a time of 200 ms is set as the LPIIN overtime (S6698), and it is determined whether the terminal LPIIN is at H or not (S6700). If it is determined that the terminal LPIIN is at H, then 1 is subtracted from the focus count (S6702), and it is determined whether 0 is set as the focus count or not (S6704). If it is determined that 0 is set as the focus count, then the flow shifts to the pulse drive control H start drive processing operation in FIG. 129.

If it is determined that 0 is not set as the focus count, by contrast, then it is determined whether the PI measurement timer is overtime or not (S6706). If it is determined that the PI measurement timer is overtime, then it is determined whether the parallel terminals DC0, DC1, and DC2 are in their energized state or not (S6716). If it is determined that the parallel terminals DC0, DC1, and DC2 are in their energized state, then the flow shifts to S6722. If it is determined that the parallel terminals DC0, DC1, and DC2 are not in their energized state, then the outputs of parallel terminals DC0, DC1, and DC2 are set L, L, and H, respectively, so that the motor 95 is placed into the wait state (S6718).

Subsequently, the parallel terminals DC0, DC1, and DC2 are set to their energized state (S6720). Then, the flow shifts to S6722, where the focus drive second speed lower limit pulse time (E_T_LD2LLN2) is set as the PI measurement timer, and the flow shifts to S6752 in FIG. 127.

If it is determined at S6706 that the PI measurement timer is not overtime, then it is determined whether the parallel terminals DC0, DC1, and DC2 are in their energized state or not (S6708). If it is determined that the parallel terminals DC0, DC1, and DC2 are not in their energized state, then the flow shifts to S6714. If it is determined that the parallel terminals DC0, DC1, and DC2 are in their energized state, then the outputs of parallel terminals DC0, DC1, and DC2 are set L, L, and H, respectively, so that the motor 95 is placed into the wait state (S6710).

Subsequently, the outputs of parallel terminals DC0, DC1, and DC2 are set H, H, and H, respectively, so as to attain the brake output state (S6712). Then, the flow shifts to S6714, where the focus drive second speed upper limit pulse time (E_T_LD2LUN2) is set as the PI measurement timer, and further to S6752 in FIG. 127.

If it is determined at S6700 that the terminal LPIIN is not at H, then the flow shifts to S6724, where an HP detection processing operation is carried out. Subsequently, it is determined whether the HP detection is set or not (S6726). If it is determined that the HP detection is set, then it is determined whether the focus count HP is at 0 or not (S6727). If it is determined that the focus count HP is at 0, then the flow shifts to S6730. If it is determined that the focus count HP is not at 0, by contrast, then the focus count HP is set as the focus count pulse (S6728). Subsequently, the flow shifts to the HP detection-free pulse drive control L start drive processing operation in FIG. 130.

If it is determined that the HP detection is not set, then it is determined whether the LPIIN timer is overtime or not (S6730). If it is determined that the LPIIN timer is overtime, then the LPIIN overtime is set (S6732), and the processing operation is terminated. If it is determined that the LPIIN timer is not overtime, by contrast, then it is determined whether the PI measurement timer is overtime or not (S6734).

If it is determined at S6734 that the PI measurement timer is not overtime, then the flow returns to S6700. If it is determined that the PI measurement timer is overtime, then it is determined whether the outputs of parallel terminals DC0, DC1, and DC2 are set H, H, and H, respectively, so as to attain the brake output state or not (S6736). If it is determined that the brake output state is not attained, then the flow returns to S6700.

If it is determined that the brake output state is attained, then the outputs of parallel terminals DC0, DC1, and DC2 are set L, L, and H, respectively, so that the motor 95 is placed into the wait state (S6738), and the parallel terminals DC0, DC1, and DC2 are set to their energized state (S6740). Subsequently, the flow returns to S6700.

Figure 127:
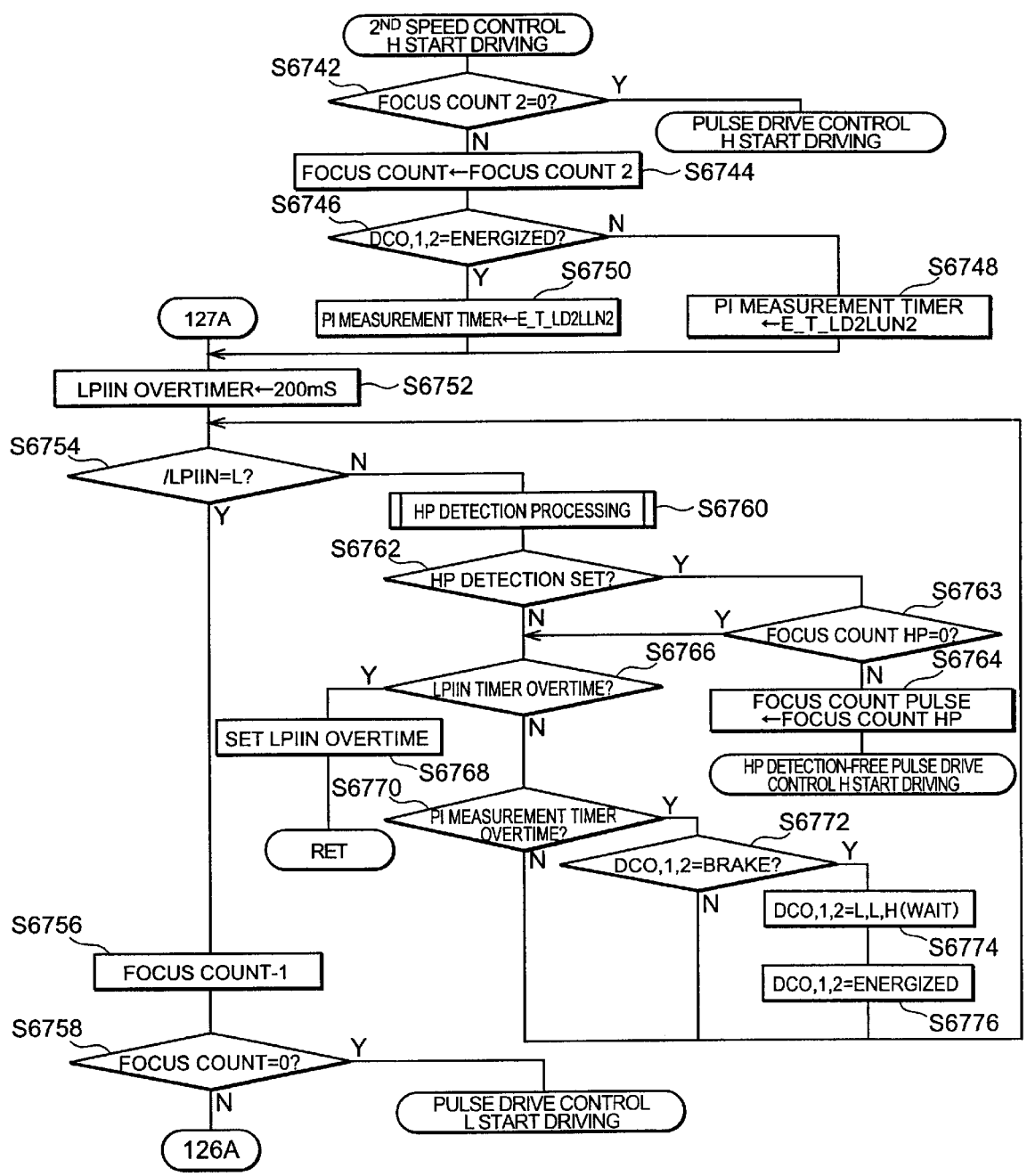

FIG. 127 shows a flowchart of the second speed control H start drive processing operation.

In the second speed control H start drive processing operation, as shown at S6742 in FIG. 127, it is initially determined whether 0 is set as the focus count 2 or not. If it is determined that 0 is set as the focus count 2, then the flow shifts to the pulse drive control H start drive processing operation in FIG. 129. If it is determined not, by contrast, then the focus count 2 is set as the focus count (S6744).

Subsequently, it is determined whether the parallel terminals DC0, DC1, and DC2 are in their energized state or not (S6746). If it is determined not, then the focus drive second speed upper limit pulse time (E_T_LD2LUN2) is set as the PI measurement timer (S6748). If it is determined that the parallel terminals DC0, DC1, and DC2 are in their energized state, by contrast, then the focus drive second speed lower limit pulse time (E_T_LD2LLN2) is set as the PI measurement timer (S6750).

Thereafter, the flow shifts to S6752, where a time of 200 ms is set as the LPIIN overtime, and it is determined whether the terminal LPIIN is at L or not (S6754). If it is determined that the terminal LPIIN is at L, then 1 is subtracted from the focus count (S6756), and it is determined whether 0 is set as the focus count or not (S6758). If it is determined that 0 is set as the focus count, then the flow shifts to the pulse drive control L start drive processing operation in FIG. 128. If it is determined that 0 is not set as the focus count, by contrast, then the flow shifts to S6698 in FIG. 126.

If it is determined at S6754 that the terminal LPIIN is not at L, then the flow shifts to S6760, where an HP detection processing operation is carried out. Subsequently, it is determined whether the HP detection is set or not (S6762). If it is determined that the HP detection is set, then it is determined whether the focus count HP is at 0 or not (S6763). If it is determined that the focus count HP is at 0, then the flow shifts to S6766. If it is determined that the focus count HP is not at 0, by contrast, then the focus count HP is set as the focus count pulse (S6764). Subsequently, the flow shifts to the HP detection-free pulse drive control H start drive processing operation in FIG. 131.

If it is determined at S6762 that the HP detection is not set, then it is determined whether the LPIIN timer is overtime or not (S6766). If it is determined that the LPIIN timer is overtime, then the LPIIN overtime is set (S6768), and the processing operation is terminated. If it is determined that the LPIIN timer is not overtime, by contrast, then it is determined whether the PI measurement timer is overtime or not (S6770).

If it is determined at S6770 that the PI measurement timer is not overtime, then the flow returns to S6754. If it is determined that the PI measurement timer is overtime, by contrast, then it is determined whether the outputs of parallel terminals DC0, DC1, and DC2 are set H, H, and H, respectively, so as to attain the brake output state or not (S6772). If it is determined that the brake output state is not attained, then the flow returns to S6754.

If it is determined that the brake output state is attained, then the outputs of parallel terminals DC0, DC1, and DC2 are set L, L, and H, respectively, so that the motor 95 is placed into the wait state (S6774), and the parallel terminals DC0, DC1, and DC2 are set to their energized state (S6776). Subsequently, the flow returns to S6754.

Figure 128:
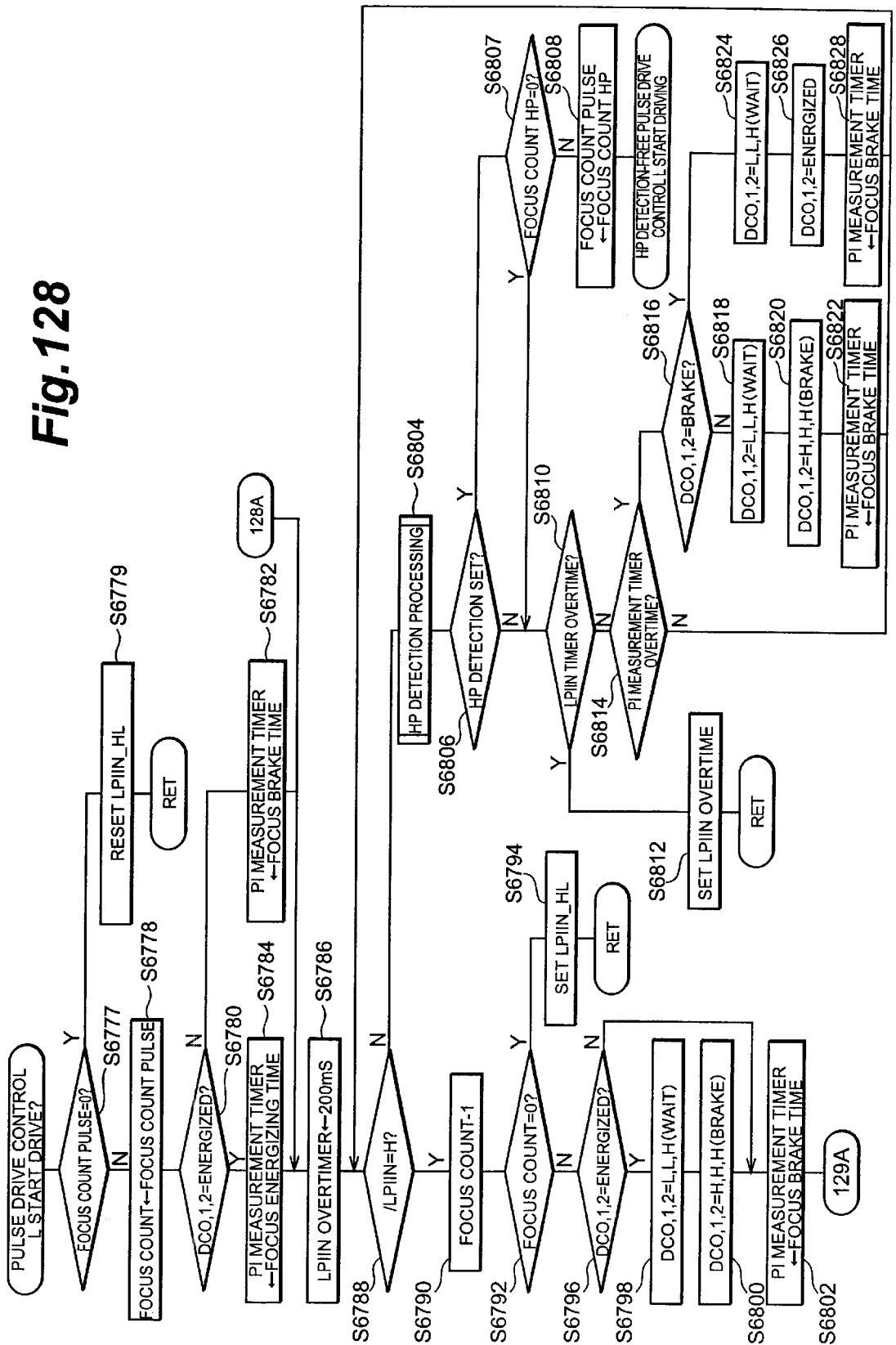

FIG. 128 shows a flowchart of the pulse drive control L start drive processing operation.

In the pulse drive control L start drive processing operation, as shown at S6777 in FIG. 128, it is determined whether the focus count pulse is at 0 or not. If it is determined that the focus count pulse is at 0, then the HL flag of LHPIN is reset (S6779). Subsequently, the processing operation is terminated. If it is determined not, by contrast, then the focus count pulse is set as the focus count (S6778).

Subsequently, it is determined whether the parallel terminals DC0, DC1, and DC2 are in their energized state or not (S6780). If it is determined not, then the focus brake time (E_T_BARIBRAKE) is set as the PI measurement timer (S6782). If it is determined that the parallel terminals DC0, DC1, and DC2 are in their energized state, by contrast, then the focus drive energizing time (E_T_BARIMON) is set as the PI measurement timer (S6784).

Thereafter, a time of 200 ms is set as the LPIIN overtime (S6786), and it is determined whether the terminal LPIIN is at H or not (S6788). If it is determined that the terminal LPIIN is at H, then 1 is subtracted from the focus count (S6790), and it is determined whether 0 is set as the focus count or not (S6792). If it is determined that 0 is set as the focus count, then the HL flag of LPIIN is set (S6794), and the processing operation is terminated.

If it is determined that 0 is not set as the focus count, by contrast, then it is determined whether the PI measurement timer is overtime or not (S6796). If it is determined that the parallel terminals DC0, DC1, and DC2 are not in their energized state, then the flow shifts to S6802. If it is determined that the parallel terminals DC0, DC1, and DC2 are in their energized state, by contrast, then the outputs of parallel terminals DC0, DC1, and DC2 are set L, L, and H, respectively, so that the motor 95 is placed into the wait state (S6798).

Subsequently, the outputs of parallel terminals DC0, DC1, and DC2 are set H, H, and H, respectively, so as to attain the brake output state (S6800). Then, the flow shifts to S6802, where the focus brake time (E_T_BARIBRAKE) is set as the PI measurement timer, and further to S6838 in FIG. 129.

If it is determined at S6788 that the terminal LPIIN is not at H, then the flow shifts to S6804, where an HP detection processing operation is carried out. Subsequently, it is determined whether the HP detection is set or not (S6806). If it is determined that the HP detection is set, then it is determined whether the focus count HP is at 0 or not (S6807). If it is determined that the focus count HP is at 0, then the flow shifts to S6810. If it is determined that the focus count HP is not at 0, by contrast, then the focus count HP is set as the focus count pulse (S6808). Subsequently, the flow shifts to the HP detection-free pulse drive control L start drive processing operation in FIG. 130.

If it is determined at S6806 that the HP detection is not set, then it is determined whether the LPIIN timer is overtime or not (S6810). If it is determined that the LPIIN timer is overtime, then the LPIIN overtime is set (S6812), and the processing operation is terminated. If it is determined that the LPIIN timer is not overtime, by contrast, then it is determined whether the PI measurement timer is overtime or not (S6814).

If it is determined at S6814 that the PI measurement timer is not overtime, then the flow returns to S6788. If it is determined that the PI measurement timer is overtime, then it is determined whether the outputs of parallel terminals DC0, DC1, and DC2 are set H, H, and H, respectively, so as to attain the brake output state or not (S6816).

If it is determined at S6816 that the brake output state is not attained, then the outputs of parallel terminals DC0, DC1, and DC2 are set L, L, and H, respectively, so that the motor 95 is placed into the wait state (S6818). Thereafter, the outputs of parallel terminals DC0, DC1, and DC2 are set H, H, and H, respectively, so as to attain the brake output state (S6820), and the focus brake time (E_T_BARIBRAKE) is set as the PI measurement timer (S6822). Subsequently, the flow returns to S6788.

If it is determined at S6816 that the brake output state is attained, then the outputs of parallel terminals DC0, DC1, and DC2 are set L, L, and H, respectively, so that the motor 95 is placed into the wait state (S6824). Subsequently, the parallel terminals DC0, DC1, and DC2 are set to their energized state (S6826). Then, the focus drive energizing time (E_T_BARIMON) is set as the PI measurement timer (S6828). Subsequently, the flow returns to S6788.

Figure 129:
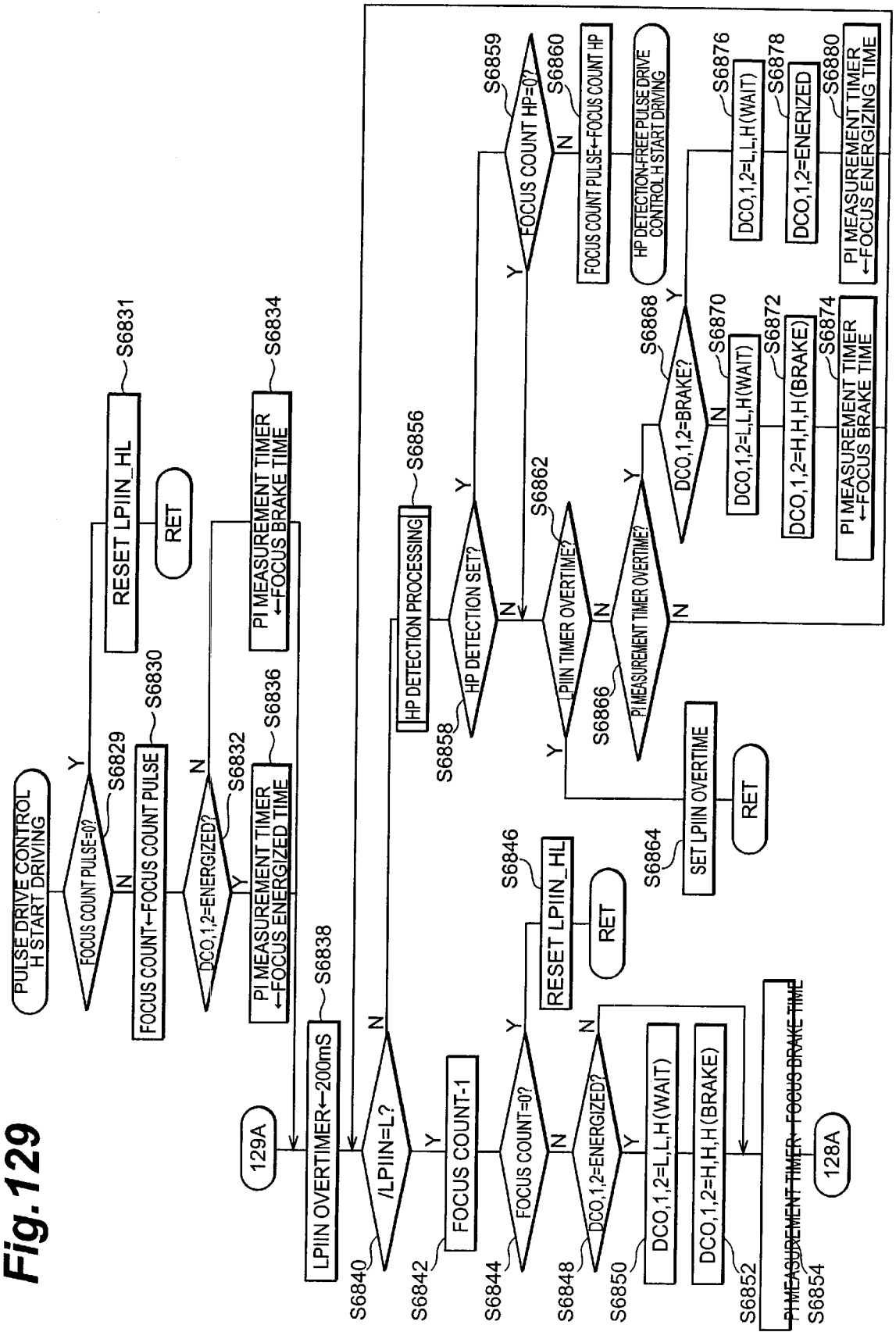

FIG. 129 shows a flowchart of the barrier pulse drive control H start drive processing operation.

In the pulse drive control H start drive processing operation, as shown at S6829 in FIG. 129, it is determined whether the focus count pulse is at 0 or not. If it is determined that the focus count pulse is at 0, then the HL flag of LHPIN is reset (S6831). Subsequently, the processing operation is terminated. If it is determined not, by contrast, then the flow shifts to S6830, where the focus count pulse is set as the focus count.

Subsequently, it is determined whether the parallel terminals DC0, DC1, and DC2 are in their energized state or not (S6832). If it is determined not, then the focus brake time (E_T_BARIBRAKE) is set as the PI measurement timer (S6834). If it is determined that the parallel terminals DC0, DC1, and DC2 are in their energized state, by contrast, then the focus drive energizing time (E_T_BARIMON) is set as the PI measurement timer (S6836).

Subsequently, the flow shifts to S6838, where a time of 200 ms is set as the LPIIN overtime. Then, it is determined whether the terminal LPIIN is at L or not (S6840). If it is determined that the terminal LPIIN is at L, then 1 is subtracted from the focus count (S6842), and it is determined whether 0 is set as the focus count or not (S6844). If it is determined that 0 is set as the focus count, then the HL flag of LPIIN is set (S6846), and the processing operation is terminated.

If it is determined at S6844 that 0 is not set as the focus count, by contrast, then it is determined whether the parallel terminals DC0, DC1, and DC2 are in their energized state or not (S6848). If it is determined that the parallel terminals DC0, DC1, and DC2 are not in their energized state, then the flow shifts to S6854. If it is determined that the parallel terminals DC0, DC1, and DC2 are in their energized state, then the outputs of parallel terminals DC0, DC1, and DC2 are set L, L, and H, respectively, so that the motor 95 is placed into the wait state (S6850).

Subsequently, the outputs of parallel terminals DC0, DC1, and DC2 are set H, H, and H, respectively, so as to attain the brake output state (S6852). Then, the flow shifts to S6854, where the focus brake time (E_T_BARIBRAKE) is set as the PI measurement timer, and further to S6786 in FIG. 128.

If it is determined at S6840 that the terminal LPIIN is not at L, then the flow shifts to S6856, where an HP detection processing operation is carried out. Subsequently, it is determined whether the HP detection is set or not (S6858). If it is determined that the HP detection is set, then it is determined whether the focus count HP is at 0 or not (S6859). If it is determined that the focus count HP is at 0, then the flow shifts to S6862. If it is determined that the focus count HP is not at 0, by contrast, then the focus count HP is set as the focus count pulse (S6860). Subsequently, the flow shifts to the HP detection-free pulse drive control H start drive processing operation in FIG. 131.

If it is determined at S6858 that the HP detection is not set, then it is determined whether the LPIIN timer is overtime or not (S6862). If it is determined that the LPIIN timer is overtime, then the LPIIN overtime is set (S6864), and the processing operation is terminated. If it is determined that the LPIIN timer is not overtime, by contrast, then it is determined whether the PI measurement timer is overtime or not (S6866).

If it is determined at S6866 that the PI measurement timer is not overtime, then the flow returns to S6840. If it is determined that the PI measurement timer is overtime, by contrast, then it is determined whether the outputs of parallel terminals DC0, DC1, and DC2 are set H, H, and H, respectively, so as to attain the brake output state or not (S6868).

If it is determined at S6868 that the brake output state is not attained, then the outputs of parallel terminals DC0, DC1, and DC2 are set L, L, and H, respectively, so that the motor 95 is placed into the wait state (S6870). Thereafter, the outputs of parallel terminals DC0, DC1, and DC2 are set H, H, and H, respectively, so as to attain the brake output state (S6872), and the focus brake time (E_T_BARIBRAKE) is set as the PI measurement timer (S6874). Subsequently, the flow returns to S6840.

If it is determined at S6868 that the brake output state is attained, then the outputs of parallel terminals DC0, DC1, and DC2 are set L, L, and H, respectively, so that the motor 95 is placed into the wait state (S6876). Subsequently, the parallel terminals DC0, DC1, and DC2 are set to their energized state (S6878). Then, the focus drive energizing time (E_T_BARIMON) is set as the PI measurement timer (S6880). Subsequently, the flow returns to S6840.

Figure 130:
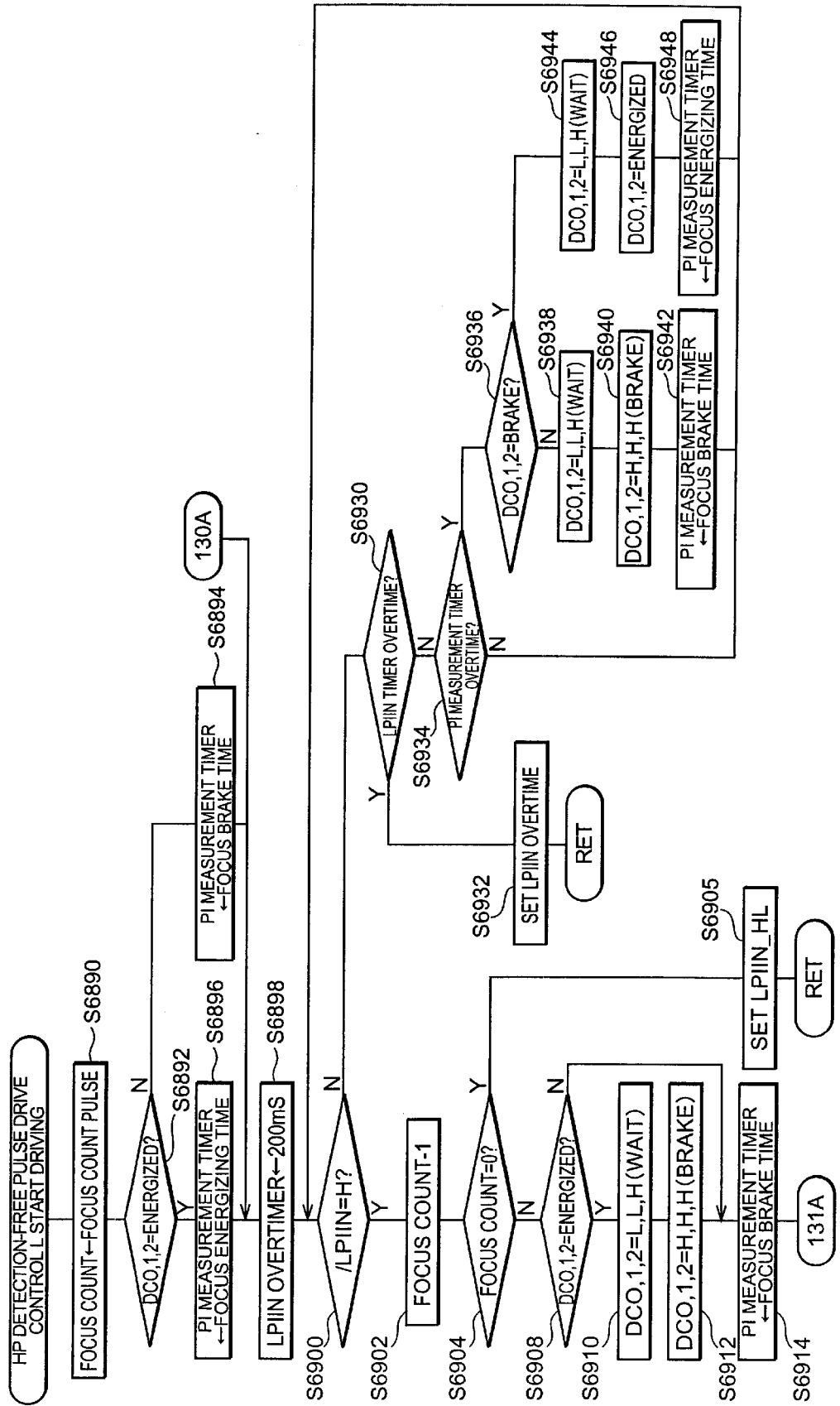

FIG. 130 shows a flowchart of the HP detection-free pulse drive control L start drive processing operation.

In the HP detection-free pulse drive control L start drive processing operation, as shown at S6890 in FIG. 130, the focus count pulse is initially set as the focus count. Subsequently, it is determined whether the parallel terminals DC0, DC1, and DC2 are in their energized state or not (S6892). If it is determined not, then the focus brake time (E_T_BARIBRAKE) is set as the PI measurement timer (S6894). If it is determined that the parallel terminals DC0, DC1, and DC2 are in their energized state, by contrast, then the focus drive energizing time (E_T_BARIMON) is set as the PI measurement timer (S6896).

Subsequently, a time of 200 ms is set as the LPIIN overtime (S6898), and it is determined whether the terminal LPIIN is at H or not (S6900). If it is determined that the terminal LPIIN is at H, then 1 is subtracted from the focus count (S6902), and it is determined whether 0 is set as the focus count or not (S6904). If it is determined that 0 is set as the focus count, then the HL flag of LPIIN is set (S6905), and the processing operation is terminated.

If it is determined at S6904 that 0 is not set as the focus count, by contrast, then it is determined whether the parallel terminals DC0, DC1, and DC2 are in their energized state or not (S6908). If it is determined that the parallel terminals DC0, DC1, and DC2 are not in their energized state, then the flow shifts to S6914. If it is determined that the parallel terminals DC0, DC1, and DC2 are in their energized state, by contrast, then the outputs of parallel terminals DC0, DC1, and DC2 are set L, L, and H, respectively, so that the motor 95 is placed into the wait state (S6910).

Subsequently, the outputs of parallel terminals DC0, DC1, and DC2 are set H, H, and H, respectively, so as to attain the brake output state (S6912). Then, the flow shifts to S6914, where the focus brake time (E_T_BARIBRAKE) is set as the PI measurement timer, and further to S6953 in FIG. 131.

If it is determined at S6900 that the terminal LPIIN is not at H, then the flow shifts to S6930, where it is determined whether the LPIIN timer is overtime or not. If it is determined that the LPIIN timer is overtime, then the LPIIN overtime is set (S6932), and the processing operation is terminated. If it is determined that the LPIIN timer is not overtime, by contrast, then it is determined whether the PI measurement timer is overtime or not (S6934).

If it is determined at S6934 that the PI measurement timer is not overtime, then the flow returns to S6900. If it is determined that the PI measurement timer is overtime, by contrast, then it is determined whether the outputs of parallel terminals DC0, DC1, and DC2 are set H, H, and H, respectively, so as to attain the brake output state or not (S6936).

If it is determined at S6936 that the brake output state is not attained, then the outputs of parallel terminals DC0, DC1, and DC2 are set L, L, and H, respectively, so that the motor 95 is placed into the wait state (S6938). Thereafter, the outputs of parallel terminals DC0, DC1, and DC2 are set H, H, and H, respectively, so as to attain the brake output state (S6940), and the focus brake time (E_T_BARIBRAKE) is set as the PI measurement timer (S6942). Subsequently, the flow returns to S6900.

If it is determined at S6936 that the brake output state is attained, then the outputs of parallel terminals DC0, DC1, and DC2 are set L, L, and H, respectively, so that the motor 95 is placed into the wait state (S6944). Subsequently, the parallel terminals DC0, DC1, and DC2 are set to their energized state (S6946). Then, the focus drive energizing time (E_T_BARIMON) is set as the PI measurement timer (S6948). Subsequently, the flow returns to S6900.

Figure 131:
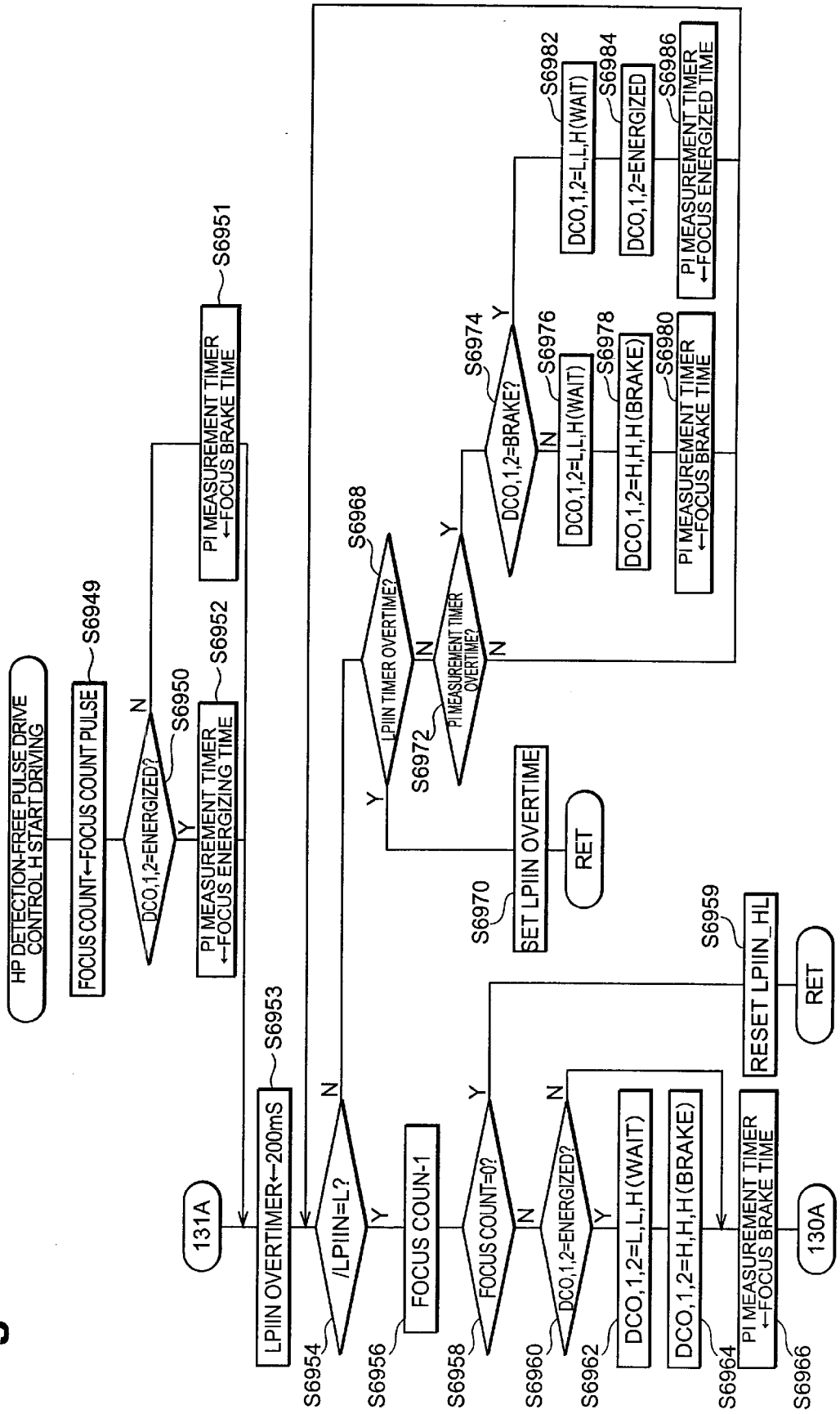

FIG. 131 shows a flowchart of the HP detection-free pulse drive control H start drive processing operation.

In the HP detection-free pulse drive control H start drive processing operation, as shown at S6949 in FIG. 131, the focus count pulse is initially set as the focus count. Subsequently, it is determined whether the parallel terminals DC0, DC1, and DC2 are in their energized state or not (S6950). If it is determined not, then the focus brake time (E_T_BARIBRAKE) is set as the PI measurement timer (S6951). If it is determined that the parallel terminals DC0, DC1, and DC2 are in their energized state, by contrast, then the focus drive energizing time (E_T_BARIMON) is set as the PI measurement timer (S6952).

Subsequently, a time of 200 ms is set as the LPIIN overtime (S6953), and it is determined whether the terminal LPIIN is at L or not (S6954). If it is determined that the terminal LPIIN is at L, then 1 is subtracted from the focus count (S6956), and it is determined whether 0 is set as the focus count or not (S6958). If it is determined that 0 is set as the focus count, then the HL flag of LPIIN is set (S6959), and the processing operation is terminated.

If it is determined at S6958 that 0 is not set as the focus count, by contrast, then it is determined whether the parallel terminals DC0, DC1, and DC2 are in their energized state or not (S6960). If it is determined that the parallel terminals DC0, DC1, and DC2 are not in their energized state, then the flow shifts to S6966. If it is determined that the parallel terminals DC0, DC1, and DC2 are in their energized state, by contrast, then the outputs of parallel terminals DC0, DC1, and DC2 are set L, L, and H, respectively, so that the motor 95 is placed into the wait state (S6962).

Subsequently, the outputs of parallel terminals DC0, DC1, and DC2 are set H, H, and H, respectively, so as to attain the brake output state (S6964). Then, the flow shifts to S6966, where the focus brake time (E_T_BARIBRAKE) is set as the PI measurement timer, and further to S6898 in FIG. 130.

If it is determined at S6954 that the terminal LPIIN is not at H, then the flow shifts to S6968, where it is determined whether the LPIIN timer is overtime or not. If it is determined that the LPIIN timer is overtime, then the LPIIN overtime is set (S6970), and the processing operation is terminated. If it is determined that the LPIIN timer is not overtime, by contrast, then it is determined whether the PI measurement timer is overtime or not (S6972).

If it is determined at S6972 that the PI measurement timer is not overtime, then the flow returns to S6954. If it is determined that the PI measurement timer is overtime, by contrast, then it is determined whether the outputs of parallel terminals DC0, DC1, and DC2 are set H, H, and H, respectively, so as to attain the brake output state or not (S6974).

If it is determined at S6974 that the brake output state is not attained, then the outputs of parallel terminals DC0, DC1, and DC2 are set L, L, and H, respectively, so that the motor 95 is placed into the wait state (S6976). Thereafter, the outputs of parallel terminals DC0, DC1, and DC2 are set H, H, and H, respectively, so as to attain the brake output state (S6978), and the focus brake time (E_T_BARIBRAKE) is set as the PI measurement timer (S6980). Subsequently, the flow returns to S6954.

If it is determined at S6974 that the brake output state is attained, then the outputs of parallel terminals DC0, DC1, and DC2 are set L, L, and H, respectively, so that the motor 95 is placed into the wait state (S6982). Subsequently, the parallel terminals DC0, DC1, and DC2 are set to their energized state (S6984). Then, the focus drive energizing time (E_T_BARIMON) is set as the PI measurement timer (S6986). Subsequently, the flow returns to S6954.

The HP detection processing operation will now be explained.

FIG. 132 shows a flowchart of the HP detection processing operation. In the HP detection processing operation, as shown at S7000 in FIG. 132, it is initially determined whether the HP detection flag is set or not. If it is determined that the HP detection flag is set, then the processing operation is terminated. If it is determined not, by contrast, then it is determined whether the terminal LHPIN is changed or not (S7002).

If it is determined at S7002 that there is no change at the terminal LHPIN, then the processing operation is terminated. If it is determined that the terminal LHPIN is changed, by contrast, then, after a wait of 50 .s (S7004), it is determined whether the HP falling flag is set or not (S7006).

If it is determined at S7006 that the HP falling flag is set, then it is determined whether the terminal LHPIN is at L or not (S7008). If it is determined that the terminal LHPIN is at L, then the flow shifts to S7010. If it is determined that the terminal LHPIN is not at L, by contrast, then the processing operation is terminated.

If it is determined at S7006 that the HP falling flag is not set, then it is determined whether the terminal LHPIN is at H or not (S7008). If it is determined that the terminal LHPIN is at H, then the flow shifts to S7010. If it is determined that the terminal LHPIN is not at H, by contrast, then the processing operation is terminated.

Subsequently, at S7010, the HP detection flag is set. Then, the HP detection processing operation is terminated.

The braking pitch count measurement drive processing operation will now be explained.

FIG. 133 shows a flowchart of the braking pitch count measurement drive processing operation. The braking pitch count measurement drive processing operation includes braking pitch count measurement L and H start drive processing operations.

In the braking pitch count measurement L start drive processing operation, as shown at S7100 in FIG. 133, a time of 15 ms is initially set as the LPIIN overtime. Subsequently, 0 is set as the focus-driving over-pitch number (C_FCOV) (S7102).

Thereafter, it is determined whether the terminal LHPIN is at H or not (S7104). If it is determined not, then it is determined whether the LHPIN overtime is reached or not (S7106). If it is determined that the LHPIN overtime is not reached, then the flow returns to S7104. If it is determined that the LHPIN overtime is reached, then the HL flag of LHPIN is reset (S7108), and the processing operation is terminated.

If it is determined at S7104 that the terminal LHPIN is at H, then 1 is added to the focus-driving over-pitch number (S7110). Subsequently, it is determined whether the terminal LHPIN is at L or not (S7116). If it is determined that the terminal LHPIN is not at L, then it is determined whether the LHPIN overtime is reached or not (S7120). If it is determined that the LHPIN overtime is not reached, then the flow returns to S7116. If it is determined that the LHPIN overtime is reached, by contrast, then the HL flag of LHPIN is set (S7122), and the processing operation is terminated.

If it is determined at S7116 that the terminal LHPIN is at L, then 1 is added to the focus-driving over-pitch number (S7118). Thereafter, the flow returns to S7104.

As in the foregoing, since the first lens group 101 and third lens group 103, which are two fixed lens groups, are accommodated within the third cylinder 6, whereas the second lens group 102 acting as a movable lens group is disposed between the first lens group 101 and third lens group 103, the sliding portion and moving mechanism concerning the movement of the second lens group 102 can be concealed by the first lens group 101 and third lens group 103. Therefore, dust, dirt, and the like can be kept from attaching to the sliding portion and moving mechanism, whereby delicate driving for focusing can securely be prevented from being obstructed.

Since all of the lens groups are accommodated in the third cylinder 6, which is a single cylindrical body, it becomes easier to accurately hold the optical axis and posture of each lens group. Also, even when an external force is exerted on the lens barrel 1, postures between the individual lens groups do not deteriorate, whereby optical performances are easier to keep. Further, zooming is possible by expanding and collapsing the third cylinder 6, which is the leading cylindrical body, so that delicate cam correction movements between the individual lens groups and the like are unnecessary, whereby accurate zooming can be carried out.

When the second lens group 102 is moved in the optical axis direction by the rotary driving section equipped with the threaded shaft 94, the second lens group 102 can precisely be controlled to move in the optical axis direction. Therefore, precise focusing by the movement of the second lens group 102 is possible.

When the first speed of the motor 95 is set lower in the state where the first driving transmission mechanism is capable of transmitting the driving force to the barrier opening/closing mechanism due to the meshing of the gears 141, 143, the meshing sound of the gears transmitting the motor 95 can be reduced.

Though this embodiment relates to a case where the lens barrel in accordance with the present invention is employed in the APS camera, the lens barrel in accordance with the present invention is not restricted thereto and may be used in other optical devices and the like.

According to the present invention, as explained in the foregoing, a state capable of transmitting the driving force to the barrier opening/closing mechanism is attained when a plurality of cylindrical bodies are collapsed to a certain extent or more whereas a state incapable of transmitting the driving force to the barrier opening/closing mechanism is attained when the plurality of cylindrical bodies are expanded to a certain extent or more, whereby a single driving source can open/close the barrier and adjust the focus of the lens optical system. Also, if the lens optical system is totally expanded so as to adjust the focus in a state where the driving force is transmittable to the barrier opening/closing mechanism, the focus can be adjusted while the driving source is stopped. If the lens barrel is employed in a camera or the like, photographing will be possible without expanding the lens barrel. Therefore, the power-varying range of the taking optical system can be widened.

If the first driving transmission mechanism fails to attain a state capable of normally transmitting the driving force to the barrier opening/closing mechanism when collapsing the lens barrel, the lens barrel may be collapsed again after being expanded, whereby the driving force transmitting state of the first driving transmission mechanism can be recovered. Also, if the lens barrel is expanded to a predetermined position, at least one of the two gears is rotated, and then the lens barrel is collapsed to a predetermined position, the two gears can favorably be meshed with each other. Since the driving force transmitting state of the first driving transmission mechanism is recovered, it is not required to be processed as an error. Therefore, camera failures can be reduced.

When the first driving transmission mechanism is placed in a state capable of transmitting the driving force to the barrier opening/closing mechanism by the driving transmission switching means, the driving source is driven while the driving speed of the driving source is set lower, whereby the meshing sound of the gears for transmitting the driving force can be lowered.

What is claimed is:

1. A lens barrel comprising:

a plurality of cylindrical bodies, accommodating an optical lens system having a plurality of lens groups, extending and collapsing said optical lens system in a multistage manner;

a first driving source, installed in one of said cylindrical bodies, for generating a first driving force;

a first driving transmission mechanism for transmitting the first driving force of said first driving source to a barrier opening/closing mechanism;

a second driving transmission mechanism for transmitting the first driving force of said first driving source to a moving mechanism of said optical lens system;

driving transmission switching means for placing said first driving transmission mechanism into a state capable of transmitting the first driving force to said barrier opening/closing mechanism when said plurality of cylindrical bodies are collapsed to a predetermined extent or more, and placing said first driving transmission mechanism into a state incapable of transmitting the first driving force to said barrier opening/closing mechanism when said plurality of cylindrical bodies are extended to a predetermined extent or more; and a second driving source for adjusting focus by moving said optical lens system in a totally extended state when said first driving source is stopped, if the first driving force is transmittable to said barrier opening/closing mechanism by said driving transmission switching means.

2. The lens barrel according to claim 1, wherein said first driving transmission mechanism has two gears for switching between meshed and unmeshed states, the driving force being transmitted by way of said two gears, said driving transmission switching means causes said two gears to mesh with each other to place said first drive transmission mechanism into a state capable of transmitting the driving force when said plurality of cylindrical bodies are collapsed to the predetermined first driving transmission mechanism into a state incapable of transmitting the driving force when said plurality of cylindrical bodies are extended to the predetermined extent or more.

3. The lens barrel according to claim 2, wherein said driving transmission switching means comprises a rod moving toward said two gears when said plurality of cylindrical bodies are collapsed to the predetermined extent or more and including a swing plate, in which one of said two gears is installed, swinging to place said two gears in the unmeshed state when said rod is moved.

4. A lens barrel comprising:

a plurality of cylindrical bodies, accommodating an optical lens system having a plurality of lens groups, extending and collapsing said optical lens system in a multistage manner;

a driving source, installed in one of said cylindrical bodies, for generating a driving force;

a first driving transmission mechanism for transmitting the driving force of said driving source to a barrier opening/closing mechanism;

a second driving transmission mechanism for transmitting the driving force of said driving source to a moving mechanism of said optical lens system;

driving transmission switching means for placing said first driving transmission mechanism into a state capable of transmitting the driving force to said barrier opening/closing mechanism when said plurality of cylindrical bodies are collapsed to a predetermined extent or more, and placing said first driving transmission mechanism into a state incapable of transmitting the driving force to said barrier opening/closing mechanism when said plurality of cylindrical bodies are extended to a predetermined extent or more; and switching error recovery means for expanding said plurality of cylindrical bodies to a predetermined position if said driving transmission switching means is not in a state capable of transmitting said driving force to said driving transmission switching means when said plurality of cylindrical bodies are collapsed to a predetermined extent or more, and then collapsing said plurality of cylindrical bodies to a predetermined position.

5. The lens barrel according to claim 4, wherein:

said first driving transmission mechanism has two gears adapted to switch between meshed and unmeshed states, said driving force being transmitted by way of said two gears;

said driving transmission switching means causes said two gears to mesh with each other so as to place said first drive transmission mechanism into a state capable of transmitting said driving force when said plurality of cylindrical bodies are collapsed to a predetermined extent or more and causes said two gears to come out of mesh with each other so as to place said first driving transmission mechanism into a state incapable of transmitting said driving force when said plurality of cylindrical bodies are extended to a predetermined extent or more; and said switching error recovery means expands said plurality of cylindrical bodies to the predetermined position if said gears are not in a normal meshed state when said plurality of cylindrical bodies are collapsed to the certain extent or more, rotates at least one of said two gears, and then collapses sa id plurality of cylindrical bodies to the predetermined position.

6. A lens barrel comprising:

a plurality of cylindrical bodies, accommodating an optical lens system having a plurality of lens groups, extending and collapsing said optical lens system in a multistage manner;

a driving source, installed in one of said cylindrical bodies, for generating a driving force;

a first driving transmission mechanism for transmitting the driving force of said driving source to a barrier opening/closing mechanism;

a second driving transmission mechanism for transmitting the driving force of said driving source to a moving mechanism of said optical lens system;

driving transmission switching means for placing said first driving transmission mechanism into a state capable of transmitting the driving force to said barrier opening/closing mechanism when said plurality of cylindrical bodies are collapsed to a predetermined extent or more and placing said first driving transmission mechanism into a state incapable of transmitting said driving force to said barrier opening/closing mechanism when said plurality of cylindrical bodies are extended to a predetermined extent or more; and drive control means for driving and controlling said driving source, said drive control means setting a lower driving speed for said driving source and driving said driving source when said first mechanism is placed in a state capable of transmitting said driving force to said barrier opening/closing mechanism.

* * * * *